(12) United States Patent
Kumakura et al.

(10) Patent No.: US 11,906,207 B2
(45) Date of Patent: *Feb. 20, 2024

(54) REFRIGERATION APPARATUS

(71) Applicant: DAIKIN INDUSTRIES, LTD., Osaka (JP)

(72) Inventors: Eiji Kumakura, Osaka (JP); Takuro Yamada, Osaka (JP); Atsushi Yoshimi, Osaka (JP); Ikuhiro Iwata, Osaka (JP); Mitsushi Itano, Osaka (JP); Daisuke Karube, Osaka (JP); Yuuki Yotsumoto, Osaka (JP); Kazuhiro Takahashi, Osaka (JP); Tatsuya Takakuwa, Osaka (JP); Yuzo Komatsu, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 235 days.

This patent is subject to a terminal disclaimer.

(21) Appl. No.: 16/913,589

(22) Filed: Jun. 26, 2020

(65) Prior Publication Data

US 2020/0326109 A1 Oct. 15, 2020

Related U.S. Application Data

(63) Continuation-in-part of application No. 16/955,218, filed as application No. PCT/JP2018/045978 on Dec. 13, 2018, now abandoned.

(30) Foreign Application Priority Data

| Dec. 18, 2017 | (JP) | 2017-242183 |
| Dec. 18, 2017 | (JP) | 2017-242185 |
| Dec. 18, 2017 | (JP) | 2017-242186 |
| Dec. 18, 2017 | (JP) | 2017-242187 |
| Oct. 5, 2018 | (WO) | PCT/JP2018/037483 |
| Oct. 17, 2018 | (WO) | PCT/JP2018/038748 |

(51) Int. Cl.
*F25B 13/00* (2006.01)
*F25B 31/00* (2006.01)
*F25B 5/04* (2006.01)

(52) U.S. Cl.
CPC .............. *F25B 13/00* (2013.01); *F25B 5/04* (2013.01); *F25B 31/004* (2013.01); *F25B 2400/053* (2013.01); *F25B 2400/054* (2013.01); *F25B 2400/07* (2013.01)

(58) Field of Classification Search
CPC .............. C09K 5/045; C09K 2205/126; C09K 2205/22; C09K 2205/40; F25B 13/00; F25B 5/04; F25B 31/004; F25B 2400/053; F25B 2400/054; F25B 2400/07; F25B 7/00; F25B 25/005; F25B 2313/003; F25B 2313/0233; F25B 2313/0311; F25B 2313/0314; F25B 2313/0315; F25B 2400/06; F25B 2400/121; F25B 2400/13; F25B 2700/1931; F25B 2700/1933; F25B 2700/21151; F25B 2700/21152
USPC ................................ 252/67; 62/467, 529
See application file for complete search history.

(56) References Cited

U.S. PATENT DOCUMENTS

| 5,185,092 | A | 2/1993 | Fukuda et al. |
| 5,344,069 | A | 9/1994 | Narikiyo |
| 5,851,968 | A | 12/1998 | Schnur |
| 6,591,631 | B1 | 7/2003 | Taira |
| 6,667,285 | B1 | 12/2003 | Kawahara et al. |
| 8,358,040 | B2 | 1/2013 | Komuro et al. |
| 10,131,827 | B2 | 11/2018 | Fukushima et al. |
| 10,883,745 | B2 | 1/2021 | Higashiiue et al. |
| 2002/0140309 | A1 | 10/2002 | Yanashima et al. |
| 2002/0193262 | A1 | 12/2002 | Kaimai et al. |
| 2004/0011062 | A1 | 1/2004 | Taira |

(Continued)

FOREIGN PATENT DOCUMENTS

| AU | 2001284508 | 3/2002 |
| CN | 1288132 | 3/2001 |

(Continued)

OTHER PUBLICATIONS

International Preliminary Report on Patentability dated Jun. 23, 2020 in International Application No. PCT/JP2018/045978.

(Continued)

*Primary Examiner* — Douglas J McGinty
(74) *Attorney, Agent, or Firm* — Wenderoth, Lind & Ponack, L.L.P.

(57) ABSTRACT

A two-stage refrigeration apparatus (500) includes a first cycle (510) and a second cycle (520). The first cycle (510) includes a first compressor (511), a first condenser (512), a first expansion mechanism (513), and a first evaporator (514) that are arranged in such a manner as to be connected to the first cycle. A first refrigerant circulates through the first cycle. The second cycle (520) includes a second downstream-side condenser (523) and a second evaporator (527) that are arranged in such a manner as to be connected to the second cycle. A second refrigerant circulates through the second cycle. The first evaporator (514) and the second downstream-side condenser (523) constitute a cascade condenser (531). In the cascade condenser (531), heat is exchanged between the first refrigerant and the second refrigerant. At least one of the first refrigerant and the second refrigerant is a refrigerant mixture containing at least 1,2-difluoroethylene (HFO-1132(E)).

5 Claims, 19 Drawing Sheets

(56) References Cited

U.S. PATENT DOCUMENTS

| | | |
|---|---|---|
| 2006/0000224 A1 | 1/2006 | Matsuoka |
| 2007/0209373 A1 | 9/2007 | Taira et al. |
| 2008/0184723 A1 | 8/2008 | Sato et al. |
| 2008/0184731 A1 | 8/2008 | Sienel et al. |
| 2008/0188173 A1 | 8/2008 | Chen et al. |
| 2009/0241569 A1 | 10/2009 | Okada et al. |
| 2009/0260382 A1 | 10/2009 | Takeichi et al. |
| 2010/0067264 A1 | 3/2010 | Ohashi et al. |
| 2010/0082162 A1 | 4/2010 | Mundy et al. |
| 2010/0122545 A1 | 5/2010 | Minor et al. |
| 2011/0108756 A1 | 5/2011 | Tsuchiya et al. |
| 2011/0167848 A1 | 7/2011 | Wakashima et al. |
| 2011/0253927 A1 | 10/2011 | Minor et al. |
| 2012/0260679 A1 | 10/2012 | Huerta-Ochoa |
| 2014/0070132 A1 | 3/2014 | Fukushima |
| 2014/0077123 A1 | 3/2014 | Fukushima |
| 2014/0291411 A1 | 10/2014 | Tamaki et al. |
| 2014/0314606 A1 | 10/2014 | Maeyama et al. |
| 2014/0373569 A1 | 12/2014 | Tsuboe et al. |
| 2015/0001981 A1 | 1/2015 | Hattori et al. |
| 2015/0075203 A1 | 3/2015 | Mochizuki et al. |
| 2015/0096321 A1 | 4/2015 | Kawano et al. |
| 2015/0143841 A1 | 5/2015 | Kawano et al. |
| 2015/0171775 A1 | 6/2015 | Cho et al. |
| 2015/0256038 A1 | 9/2015 | Nigo et al. |
| 2015/0362199 A1 | 12/2015 | Yumoto et al. |
| 2015/0376486 A1 | 12/2015 | Hashimoto et al. |
| 2016/0018135 A1 | 1/2016 | Yuzawa et al. |
| 2016/0047579 A1 | 2/2016 | Yan et al. |
| 2016/0075927 A1 | 3/2016 | Fukushima |
| 2016/0131378 A1 | 5/2016 | Hinokuma et al. |
| 2016/0276886 A1 | 9/2016 | Baba et al. |
| 2016/0333241 A1 | 11/2016 | Fukushima et al. |
| 2016/0333243 A1 | 11/2016 | Fukushima et al. |
| 2016/0340565 A1 | 11/2016 | Tasaka et al. |
| 2016/0348933 A1 | 12/2016 | Takeuchi et al. |
| 2016/0355719 A1 | 12/2016 | Fukushima et al. |
| 2017/0002245 A1 | 1/2017 | Fukushima |
| 2017/0058172 A1 | 3/2017 | Fukushima et al. |
| 2017/0058173 A1 | 3/2017 | Fukushima |
| 2017/0058174 A1 | 3/2017 | Fukushima et al. |
| 2017/0121581 A1 | 5/2017 | Horiike et al. |
| 2017/0138642 A1 | 5/2017 | Ueno et al. |
| 2017/0166831 A1 | 6/2017 | Matsumoto |
| 2017/0248328 A1 | 8/2017 | Eskew et al. |
| 2017/0328586 A1 | 11/2017 | Maeyama |
| 2017/0336085 A1 | 11/2017 | Yasuo et al. |
| 2017/0338707 A1 | 11/2017 | Shono et al. |
| 2018/0094844 A1 | 4/2018 | Suzuki |
| 2018/0051198 A1 | 5/2018 | Okamoto et al. |
| 2018/0138763 A1 | 5/2018 | Nakamura et al. |
| 2018/0156217 A1 | 6/2018 | Sakima et al. |
| 2018/0156511 A1 | 6/2018 | Chikami et al. |
| 2018/0254676 A1 | 9/2018 | Nigo et al. |
| 2018/0299175 A1 | 10/2018 | Hayamizu et al. |
| 2018/0320942 A1 | 11/2018 | Hayamizu et al. |
| 2018/0328596 A1 | 11/2018 | Hatanaka et al. |
| 2018/0331436 A1 | 11/2018 | Hayamizu et al. |
| 2018/0358861 A1 | 12/2018 | Hayamizu et al. |
| 2018/0363965 A1 | 12/2018 | Hayamizu et al. |
| 2019/0063773 A1 | 2/2019 | Nagahashi et al. |
| 2019/0068015 A1 | 2/2019 | Yabe et al. |
| 2019/0309963 A1 | 10/2019 | Zaki et al. |
| 2020/0079985 A1 | 3/2020 | Okamoto et al. |
| 2020/0321816 A1 | 10/2020 | Watanabe |
| 2020/0325375 A1 | 10/2020 | Kumakura et al. |
| 2020/0325376 A1 | 10/2020 | Kumakura et al. |
| 2020/0325377 A1 | 10/2020 | Kumakura et al. |
| 2020/0326100 A1 | 10/2020 | Ukibune et al. |
| 2020/0326101 A1 | 10/2020 | Itano et al. |
| 2020/0326102 A1 | 10/2020 | Kumakura et al. |
| 2020/0326103 A1 | 10/2020 | Kumakura et al. |
| 2020/0326105 A1 | 10/2020 | Kumakura et al. |
| 2020/0326109 A1 | 10/2020 | Kumakura et al. |
| 2020/0326110 A1 | 10/2020 | Asano et al. |
| 2020/0332164 A1 | 10/2020 | Itano et al. |
| 2020/0332166 A1 | 10/2020 | Kumakura et al. |
| 2020/0333041 A1 | 10/2020 | Itano et al. |
| 2020/0333054 A1 | 10/2020 | Asano et al. |
| 2020/0347283 A1 | 11/2020 | Itano et al. |
| 2020/0363085 A1 | 11/2020 | Itano et al. |
| 2020/0363105 A1 | 11/2020 | Kumakura et al. |
| 2020/0363106 A1 | 11/2020 | Itano et al. |
| 2020/0363112 A1 | 11/2020 | Ohtsuka et al. |
| 2020/0369934 A1 | 11/2020 | Itano et al. |
| 2020/0385620 A1 | 12/2020 | Itano et al. |
| 2020/0385621 A1 | 12/2020 | Itano et al. |
| 2020/0385622 A1 | 12/2020 | Itano et al. |
| 2020/0392387 A1 | 12/2020 | Ohtsuka et al. |
| 2020/0392388 A1 | 12/2020 | Itano et al. |
| 2020/0393178 A1 | 12/2020 | Kumakura et al. |
| 2021/0018191 A1 | 1/2021 | Itano et al. |
| 2021/0135520 A1 | 5/2021 | Shimokawa et al. |
| 2021/0163804 A1 | 6/2021 | Kumakura et al. |
| 2021/0189209 A1 | 6/2021 | Yotdumoto et al. |
| 2021/0222040 A1 | 7/2021 | Fukushima et al. |
| 2021/0355359 A1 | 11/2021 | Ohkubo et al. |
| 2022/0214085 A1* | 7/2022 | Kumakura ............... F28F 1/325 |
| 2022/0389299 A1* | 12/2022 | Itano ................. C10M 171/008 |
| 2022/0404070 A1* | 12/2022 | Ohtsuka ................ F25B 31/026 |
| 2023/0002659 A1* | 1/2023 | Itano ..................... C09K 5/045 |
| 2023/0110292 A1 | 4/2023 | Itano |

FOREIGN PATENT DOCUMENTS

| | | |
|---|---|---|
| CN | 1447491 | 10/2003 |
| CN | 1455855 | 11/2003 |
| CN | 1723373 | 1/2006 |
| CN | 1987264 | 6/2007 |
| CN | 101235815 | 8/2008 |
| CN | 101441012 | 5/2009 |
| CN | 102401519 | 4/2012 |
| CN | 103562338 | 2/2014 |
| CN | 203704143 | 7/2014 |
| CN | 103975204 | 8/2014 |
| CN | 104094069 | 10/2014 |
| CN | 104456760 | 3/2015 |
| CN | 104578493 | 4/2015 |
| CN | 204534884 | 8/2015 |
| CN | 104903661 | 9/2015 |
| CN | 104937350 | 9/2015 |
| CN | 204648544 | 9/2015 |
| CN | 105102905 | 11/2015 |
| CN | 204943959 | 1/2016 |
| CN | 205261858 | 5/2016 |
| CN | 106029821 | 10/2016 |
| CN | 106030222 | 10/2016 |
| CN | 106062159 | 10/2016 |
| CN | 106085363 | 10/2016 |
| CN | 106103992 | 11/2016 |
| CN | 106133110 | 11/2016 |
| CN | 106414653 | 2/2017 |
| CN | 106414654 | 2/2017 |
| CN | 106415152 | 2/2017 |
| CN | 106574802 | 4/2017 |
| CN | 106661477 | 5/2017 |
| CN | 106839496 | 6/2017 |
| CN | 107110570 | 8/2017 |
| CN | 107112830 | 8/2017 |
| CN | 107429957 | 12/2017 |
| CN | 107614980 | 1/2018 |
| CN | 107925285 | 4/2018 |
| CN | 108139112 | 6/2018 |
| CN | 108431414 | 8/2018 |
| CN | 108469126 | 8/2018 |
| EP | 1 231 255 | 8/2002 |
| EP | 1 246 348 | 10/2002 |
| EP | 1 326 057 | 7/2003 |
| EP | 1 632 732 | 3/2006 |
| EP | 1 953 388 | 8/2008 |
| EP | 2 423 609 | 2/2012 |
| EP | 2 620 736 | 7/2013 |
| EP | 2 711 405 | 3/2014 |
| EP | 2 789 933 | 10/2014 |

(56) References Cited

FOREIGN PATENT DOCUMENTS

| | | |
|---|---|---|
| EP | 2 840 335 | 2/2015 |
| EP | 2 853 826 | 4/2015 |
| EP | 2 918 953 | 9/2015 |
| EP | 2 952 828 | 12/2015 |
| EP | 2 980 508 | 2/2016 |
| EP | 3 012 555 | 4/2016 |
| EP | 3 012 557 | 4/2016 |
| EP | 3 070 417 | 9/2016 |
| EP | 3 101 082 | 12/2016 |
| EP | 3 109 302 | 12/2016 |
| EP | 3 115 716 | 1/2017 |
| EP | 3 121 242 | 1/2017 |
| EP | 3 128 259 | 2/2017 |
| EP | 3 147 595 | 3/2017 |
| EP | 3 153 559 | 4/2017 |
| EP | 3 153 561 | 4/2017 |
| EP | 3 170 881 | 5/2017 |
| EP | 3 222 934 | 9/2017 |
| EP | 3 249 309 | 11/2017 |
| EP | 3 299 731 | 3/2018 |
| EP | 3 358 272 | 8/2018 |
| EP | 3 358 278 | 8/2018 |
| EP | 3 399 189 | 11/2018 |
| EP | 3 795 925 | 3/2021 |
| GB | 2530915 | 4/2016 |
| JP | 51-90115 | 7/1976 |
| JP | 52-13025 | 4/1977 |
| JP | 57-198968 | 12/1982 |
| JP | 59-39790 | 3/1984 |
| JP | 62-69066 | 3/1987 |
| JP | 63-69066 | 3/1987 |
| JP | 2-4163 | 1/1990 |
| JP | 5-264070 | 10/1993 |
| JP | 5-272823 | 10/1993 |
| JP | 7-19627 | 1/1995 |
| JP | 7-190571 | 7/1995 |
| JP | 8-200273 | 8/1996 |
| JP | 10-46170 | 2/1998 |
| JP | 10-300292 | 11/1998 |
| JP | 10-309050 | 11/1998 |
| JP | 10-318564 | 12/1998 |
| JP | 11-206001 | 7/1999 |
| JP | 11-256358 | 9/1999 |
| JP | 2000161805 | 6/2000 |
| JP | 2000-220877 | 8/2000 |
| JP | 2000-234767 | 8/2000 |
| JP | 2000-304302 | 11/2000 |
| JP | 2001-82755 | 3/2001 |
| JP | 201-139972 | 5/2001 |
| JP | 2002-54888 | 2/2002 |
| JP | 2002-89978 | 3/2002 |
| JP | 2002-257366 | 9/2002 |
| JP | 2002-272043 | 9/2002 |
| JP | 2002-286286 | 10/2002 |
| JP | 2002-318028 | 10/2002 |
| JP | 2003-18776 | 1/2003 |
| JP | 2003-83614 | 3/2003 |
| JP | 2003-174794 | 6/2003 |
| JP | 2004-28035 | 1/2004 |
| JP | 2004-132647 | 4/2004 |
| JP | 2004-215406 | 7/2004 |
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-46737 | 2/2006 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-92289 | 4/2009 |
| JP | 2009-121654 | 6/2009 |
| JP | 2009-150620 | 7/2009 |
| JP | 2009-243793 | 10/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |
| JP | 2015-82875 | 4/2015 |
| JP | 201578789 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |
| JP | 2015-229767 | 12/2015 |
| JP | 2016-1062 | 1/2016 |
| JP | 2016-11423 | 1/2016 |
| JP | 2016-56340 | 4/2016 |
| JP | 2016-125808 | 7/2016 |
| JP | 2016-133256 | 7/2016 |
| JP | 2016-172869 | 9/2016 |
| JP | 2016-174461 | 9/2016 |
| JP | 2017-36861 | 2/2017 |
| JP | 2017-46430 | 3/2017 |
| JP | 2017-53285 | 3/2017 |
| JP | 2017-67373 | 4/2017 |
| JP | 2017-67428 | 4/2017 |
| JP | 2017-122549 | 7/2017 |
| JP | 2017-145975 | 8/2017 |
| JP | 2017-192190 | 10/2017 |
| JP | 2018-25377 | 2/2018 |
| JP | 6524995 | 6/2019 |
| KR | 2001-0029975 | 4/2001 |
| KR | 10-2001-0064286 | 7/2001 |
| KR | 2003-0028838 | 4/2003 |
| KR | 10-0939609 | 10/2003 |
| KR | 10-2004-0075737 | 8/2004 |
| KR | 10-2005-0044931 | 5/2005 |
| KR | 10-2013-0111186 | 10/2013 |
| KR | 10-2015-0067654 | 6/2015 |
| KR | 10-2017-0034887 | 3/2017 |
| RU | 2013 156 380 | 6/2015 |
| TW | 20030103482 | 2/2003 |
| WO | 01/36571 | 5/2001 |
| WO | 02/23100 | 3/2002 |
| WO | 2009-069679 | 6/2009 |

(56) References Cited

FOREIGN PATENT DOCUMENTS

| | | |
|---|---|---|
| WO | 2009/093345 | 7/2009 |
| WO | 2012/157764 | 11/2012 |
| WO | 2012/157765 | 11/2012 |
| WO | 2013/084301 | 6/2013 |
| WO | 2013/146103 | 10/2013 |
| WO | 2013/146208 | 10/2013 |
| WO | 2013/151043 | 10/2013 |
| WO | 2014/045400 | 3/2014 |
| WO | 2014/118945 | 8/2014 |
| WO | 2014/119149 | 8/2014 |
| WO | 2014/156190 | 10/2014 |
| WO | 2014/203353 | 12/2014 |
| WO | 2014/203354 | 12/2014 |
| WO | 2015/071967 | 5/2015 |
| WO | 2015/125763 | 8/2015 |
| WO | 2015/125884 | 8/2015 |
| WO | 2015115252 | 8/2015 |
| WO | 2015/136981 | 9/2015 |
| WO | 2015/140827 | 9/2015 |
| WO | 2015/141678 | 9/2015 |
| WO | 2015/186557 | 12/2015 |
| WO | 2015/186670 | 12/2015 |
| WO | 2016/009884 | 1/2016 |
| WO | 2016/017460 | 2/2016 |
| WO | 2016/103711 | 6/2016 |
| WO | 2016/104418 | 6/2016 |
| WO | 2016/117443 | 7/2016 |
| WO | 2016/157538 | 10/2016 |
| WO | 2016/182030 | 11/2016 |
| WO | 2016/190232 | 12/2016 |
| WO | 2017/038489 | 3/2017 |
| WO | 2017/056789 | 4/2017 |
| WO | 2017/057004 | 4/2017 |
| WO | 2017/115636 | 7/2017 |
| WO | 2017122517 | 7/2017 |
| WO | 2017/145826 | 8/2017 |
| WO | 2017/195248 | 11/2017 |
| WO | 2019/123782 | 6/2019 |
| WO | 2019/123804 | 6/2019 |
| WO | 2019/123805 | 6/2019 |
| WO | 2019/123806 | 6/2019 |
| WO | 2019/123807 | 6/2019 |
| WO | 2019/124400 | 6/2019 |
| WO | 2019/124401 | 6/2019 |
| WO | 2019/124402 | 6/2019 |
| WO | 2019/124403 | 6/2019 |
| WO | 2019/124404 | 6/2019 |

OTHER PUBLICATIONS

International Search Report dated Mar. 19, 2019 in International Application No. PCT/JP2018/045978.
International Preliminary Report on Patentability dated Jun. 23, 2020 in International Application No. PCT/JP2018/046532.
International Search Report dated Feb. 12, 2019 in International Application No. PCT/JP2018/046532.
International Preliminary on Patentability dated Jun. 23, 2020 in International Application No. PCT/JP2018/042027.
International Search Report dated Feb. 12, 2019 in International Application No. PCT/JP2018/042027.
International Preliminary Report on Patentability dated Jun. 23, 2020 in International Application No. PCT/JP2018/042032.
International Search Report dated Feb. 19, 2019 in International Application No. PCT/JP2018/042032.
International Preliminary Report on Patentability dated Jun. 23, 2020 in International Application No. PCT/JP2018/046666.
International Search Report dated Apr. 2, 2019 in International Application No. PCT/JP2018/046666.
International Preliminary Report on Patentability dated Jun. 23, 2020 in International Application No. PCT/JP2018/045336.
International Search Report dated Feb. 19, 2019 in International Application No. PCT/JP2018/045336.
International Preliminary Report on Patentability dated Jun. 23, 2020 in International Application No. PCT/JP2018/045557.
International Search Report dated Mar. 12, 2019 in International Application No. PCT/JP2018/045557.
International Preliminary Report on Patentability dated Jun. 23, 2020 in International Application No. PCT/JP2018/046426.
International Search Report dated Feb. 19, 2019 in International Application No. PCT/JP2018/046426.
International Preliminary Report on Patentability dated Jun. 23, 2020 in International Application No. PCT/JP2018/046427.
International Search Report dated Feb. 19, 2019 in International Application No. PCT/JP2018/046427.
International Preliminary Report on Patentability dated Jun. 23, 2020 in International Application No. PCT/JP2018/046428.
International Search Report dated Mar. 19, 2019 in International Application No. PCT/JP2018/046428.
International Preliminary Report on Patentability dated Jun. 23, 2020 in International Application No. PCT/JP2018/046581.
International Search Report dated Mar. 5, 2019 in International Application No. PCT/JP2018/046581.
International Preliminary Report on Patentability dated Jun. 23, 2020 in International Application No. PCT/JP2018/046630.
International Search Report issued Mar. 5, 2019 in International Application No. PCT/JP2018/046630.
International Search Report dated Mar. 5, 2019 in International Application No. PCT/JP2018/046582.
International Preliminary Report on Patentability dated Jun. 23, 2020 in International Application No. PCT/JP2018/046631.
International Search Report dated Mar. 5, 2019 in International Application No. PCT/JP2018/046631.
International Preliminary Report on Patentability dated Jun. 23, 2020 in International Application No. PCT/JP2018/046627.
International Search Report dated Mar. 19, 2019 in International Application No. PCT/JP2018/046627.
International Preliminary Report on Patentability dated Jun. 23, 2020 in International Application No. PCT/JP2018/046628.
International Search Report dated Mar. 19, 2019 in International Application No. PCT/JP2018/046628.
International Preliminary Report on Patentability dated Jun. 23, 2020 in International Application No. PCT/JP2018/045979.
International Search Report dated Mar. 12, 2019 in International Application No. PCT/JP2018/045979.
International Preliminary Report on Patentability dated Jun. 23, 2020 in International Application No. PCT/JP2018/046434.
International Search Report dated Feb. 19, 2019 in International Application No. PCT/JP2018/046434.
International Preliminary Report on Patentability dated Jun. 23, 2020 in International Application No. PCT/JP2018/045290.
International Search Report dated Jan. 22, 2019 in International Application No. PCT/JP2018/045290.
International Preliminary Report on Patentability dated Jun. 23, 2020 in International Application No. PCT/JP2018/045288.
International Search Report dated jan. 22, 2019 in International Application No. PCT/JP2018/045288.
International Preliminary Report on Patentability dated Jun. 23, 2020 in International Application No. PCT/JP2018/045289.
International Search Report dated Jan. 22, 2019 in International Application No. PCT/JP2018/045289.
International Preliminary Report on Patentability dated Jun. 23, 2020 in International Application No. PCT/JP2018/046639.
International Preliminary Report on Patentability dated Jun. 23, 2020 in International Application No. PCT/JP2018/046642.
International Preliminary Report on Patentability dated Jun. 23, 2020 in International Application No. PCT/JP2018/038746.
International Preliminary Report on Patentability dated Jun. 23, 2020 in International Application No. PCT/JP2018/046643.
International Preliminary Report on Patentability dated Jun. 23, 2020 in International Application No. PCT/JP2018/038748.
International Preliminary Report on Patentability dated Jun. 23, 2020 in International Application No. PCT/JP2018/046640.
International Preliminary Report on Patentability dated Jun. 23, 2020 in International Application No. PCT/JP2018/046644.

(56) References Cited

OTHER PUBLICATIONS

International Preliminary Report on Patentability dated Jun. 23, 2020 in International Application No. PCT/JP2018/038749.
International Preliminary Report on Patentability dated Jun. 23, 2020 in International Application No. PCT/JP2018/037483.
International Search Report dated Feb. 19, 2019 in International Application No. PCT/JP2018/045335.
International Preliminary Report on Patentability dated Jun. 23, 2020 in International Application no. PCT/JP2018/045335.
International Search Report dated Feb. 19, 2019 in International Application No. PCT/JP2018/046435.
International Preliminary Report on Patentability dated Jun. 23, 2020 in International Application No. PCT/JP2018/046435.
International Search Report dated Mar. 19, 2019 in International (PCT) Application No. PCT/JP2018/046530.
International Preliminary Report on Patentability dated Jun. 23, 2020 in International Application No. PCT/JP2018/046530.
International Search Report dated Feb. 12, 2019 in International (PCT) Application No. PCT/JP2018/046533.
International Preliminary Report on Patentability dated Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability dated Jun. 23, 2020 in International Application No. PCT/JP2018/038747.
International Search Report dated Mar. 12, 2019 in International (PCT) Application No. PCT/JP2018/046639.
International Search Report dated Mar. 12, 2019 in International (PCT) Application No. PCT/JP2018/046642.
International Search Report dated Dec. 18, 2018 in International (PCT) Application No. PCT/JP2018/038746.
International Search Report dated Mar. 19, 2019 in International (PCT) Application No. PCT/JP2018/046643.
International Search Report dated Dec. 18, 2018 in International (PCT) Application No. PCT/JP2018/038748.
International Search Report dated Mar. 12, 2019 in International (PCT) Application No. PCT/JP2018/046640.
International Search Report dated Mar. 19, 2019 in International (PCT) Application No. PCT/JP2018/046644.
International Search Report dated Dec. 18, 2018 in International (PCT) Application No. PCT/JP2018/038749.
International Search Report dated Dec. 18, 2018 in International (PCT) Application No. PCT/JP2018/037483.
International Search Report dated Dec. 18, 2018 in International (PCT) Application No. PCT/JP2018/038747.
Summary, Collection of Papers of the 2nd Symposium on New Technologies of Refrigeration and Air Conditioning, 2nd Edition, Ding Guoliang, Ed., published by Shanghai Jiatong University Press, 2003, with Concise Explanation.
International Search Report dated Mar. 19, 2019 in International Application No. PCT/JP2018/046531.
International Preliminary Report on Patentability dated Jun. 23, 2020 in International Application No. PCT/JP2018/046531.

* cited by examiner

REFRIGERATION APPARATUS

TECHNICAL FIELD

The present disclosure relates to a refrigeration apparatus.

BACKGROUND ART

A refrigeration apparatus known in the art includes a high-temperature-side (primary-side) refrigeration cycle and a low-temperature-side (secondary-side) refrigeration cycle. For example, PTL 1 (International Publication No. 2014/045400) describes a two-stage refrigeration apparatus in which an HFC refrigerant (e.g., R410A and R32) or an HFO refrigerant is used as refrigerant for the high-temperature-side refrigeration cycle and a carbon dioxide refrigerant is used as refrigerant for the low-temperature-side refrigeration cycle.

SUMMARY OF THE INVENTION

Technical Problem

Such a two-stage refrigeration apparatus in which two cycles are used in combination is in need of improvement in operational efficiency.

Solution to Problem

A refrigeration apparatus according to a first aspect includes a first cycle and a second cycle. The first cycle includes a first compressor, a first radiator, a first expansion mechanism, and a first heat absorber that are arranged in such a manner as to be connected to the first cycle. A first refrigerant circulates through the first cycle. The second cycle includes a second radiator and a second heat absorber that are arranged in such a manner as to be connected to the second cycle. A second refrigerant circulates through the second cycle. The first heat absorber and the second radiator constitute a heat exchanger. In the heat exchanger, heat is exchanged between the first refrigerant flowing through the first heat absorber and the second radiator refrigerant through the second radiator. At least one of the first refrigerant and the second refrigerant is a refrigerant mixture containing at least 1,2-difluoroethylene (HFO-1132(E)).

The efficiency of heat exchange in the heat exchanger may be enhanced through the use of the refrigerant mixture.

A refrigeration apparatus according to a second aspect includes a first cycle and a second cycle. The first cycle includes a first compressor, a first radiator, a first expansion mechanism, and a first heat absorber that are arranged in such a manner as to be connected to the first cycle. A first refrigerant circulates through the first cycle. The second cycle includes a second radiator and a second heat absorber that are arranged in such a manner as to be connected to the second cycle. A second refrigerant circulates through the second cycle. The first radiator and the second heat absorber constitute a heat exchanger. In the heat exchanger, heat is exchanged between the first refrigerant flowing through the first radiator and the second refrigerant flowing through the second heat absorber. At least one of the first refrigerant and the second refrigerant is a refrigerant mixture containing at least 1,2-difluoroethylene (HFO-1132(E)).

The efficiency of heat exchange in the heat exchanger may be enhanced through the use of the refrigerant mixture.

A refrigeration apparatus according to a third aspect is the refrigeration apparatus according to the first aspect in which the second cycle further includes a second compressor and a second expansion mechanism that are arranged in such a manner as to be connected to the second cycle. The first refrigerant flowing through the first radiator of the first cycle releases heat into outside air. The first refrigerant is the refrigerant mixture. The second refrigerant is carbon dioxide.

A refrigeration apparatus according to a fourth aspect is the refrigeration apparatus according to the first aspect in which the second cycle further includes a second compressor and a second expansion mechanism that are arranged in such a manner as to be connected to the second cycle. The first refrigerant flowing through the first radiator of the first cycle releases heat into outside air. The first refrigerant is the refrigerant mixture. The second refrigerant is the refrigerant mixture.

A refrigeration apparatus according to a fifth aspect is the refrigeration apparatus according to the first aspect in which the second cycle further includes a second compressor and a second expansion mechanism that are arranged in such a manner as to be connected to the second cycle. The first refrigerant flowing through the first radiator of the first cycle releases heat into outside air. The first refrigerant is R32. The second refrigerant is the refrigerant mixture.

A refrigeration apparatus according to a sixth aspect is the refrigeration apparatus according to the first aspect in which the first refrigerant flowing through the first radiator of the first cycle releases heat into outside air. The first refrigerant is the refrigerant mixture. The second refrigerant is a liquid medium.

A refrigeration apparatus according to a seventh aspect is the refrigeration apparatus according to the second aspect in which the second cycle further includes a second compressor and a second expansion mechanism that are arranged in such a manner as to be connected to the second cycle. The first refrigerant flowing through the first heat absorber of the first cycle takes away heat from outside air. The first refrigerant is the refrigerant mixture. The second refrigerant is a refrigerant whose saturation pressure at a predetermined temperature is lower than a saturation pressure of the refrigerant mixture at the predetermined temperature.

A refrigeration apparatus according to a 8th aspect is the refrigeration apparatus according to any of the 1st through 7th aspects, wherein, the refrigerant comprises trans-1,2-difluoroethylene (HFO-1132(E)), trifluoroethylene (HFO-1123), and 2,3,3,3-tetrafluoro-1-propene (R1234yf).

In this refrigeration apparatus, the efficiency of heat exchange in the heat exchanger can be enhanced when a refrigerant having a sufficiently low GWP, a refrigeration capacity (may also be referred to as a cooling capacity or a capacity) and a coefficient of performance (COP) equal to those of R410A is used.

A refrigeration apparatus according to a 9th aspect is the refrigeration apparatus according to the 8th aspect, wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
  point A (68.6, 0.0, 31.4),
  point A' (30.6, 30.0, 39.4),
  point B (0.0, 58.7, 41.3),
  point D (0.0, 80.4, 19.6),
  point C' (19.5, 70.5, 10.0),
  point C (32.9, 67.1, 0.0), and
  point O (100.0, 0.0, 0.0), or on the above line segments (excluding the points on the line segments BD, CO, and OA);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments BD, CO, and OA are straight lines.

A refrigeration apparatus according to a 10th aspect is the refrigeration apparatus according to the 8th aspect, wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments GI, IA, AA', A'B, BD, DC', C'C, and CG that connect the following 8 points:

point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0), or on the above line segments (excluding the points on the line segments IA, BD, and CG);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments GI, IA, BD, and CG are straight lines.

A refrigeration apparatus according to an 11th aspect is the refrigeration apparatus according to the 8th aspect, wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:

point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0), or on the above line segments (excluding the points on the line segments BD and CJ);

the line segment PN is represented by coordinates (x, $-0.1135x^2+12.112x-280.43$, $0.1135x^2-13.112x+380.43$), the line segment NK is represented by coordinates (x, $0.2421x^2-29.955x+931.91$, $-0.2421x^2+28.955x-831.91$), the line segment KA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, BD, and CJ are straight lines.

A refrigeration apparatus according to a 12th aspect is the refrigeration apparatus according to the 8th aspect, wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:

point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0), or on the above line segments (excluding the points on the line segments BD and CJ);

the line segment PL is represented by coordinates (x, $-0.1135x^2+12.112x-280.43$, $0.1135x^2-13.112x+380.43$)

the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, LM, BD, and CJ are straight lines.

A refrigeration apparatus according to a 13th aspect is the refrigeration apparatus according to the 8th aspect, wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:

point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3), or on the above line segments (excluding the points on the line segment BF);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TP is represented by coordinates (x, $0.00672x^2-0.7607x+63.525$, $-0.00672x^2-0.2393x+36.475$), and the line segments LM and BF are straight lines.

A refrigeration apparatus according to a 14th aspect is the refrigeration apparatus according to the 8th aspect, wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:

point P (55.8, 42.0, 2.2),
point L (63.1, 31.9, 5.0),
point Q (62.8, 29.6, 7.6), and
point R (49.8, 42.3, 7.9), or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

A refrigeration apparatus according to a 15th aspect is the refrigeration apparatus according to the 8th aspect, wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3), or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $0.0017x^2-0.7869x+70.888$, $-0.0017x^2-0.2131x+29.112$), and the line segments SM and BF are straight lines.

A refrigeration apparatus according to a 16th aspect is the refrigeration apparatus according to any of the 1st through 7th aspects, wherein, the refrigerant comprises trans-1,2-difluoroethylene (HFO-1132(E)) and trifluoroethylene (HFO-1123) in a total amount of 99.5 mass % or more based on the entire refrigerant, and the refrigerant comprises 62.0 mass % to 72.0 mass % of HFO-1132(E) based on the entire refrigerant.

In this refrigeration apparatus, the efficiency of heat exchange in the heat exchanger can be enhanced when a refrigerant having a sufficiently low GWP, a refrigeration capacity (may also be referred to as a cooling capacity or a capacity) and a coefficient of performance (COP) equal to those of R410A and classified with lower flammability (Class 2L) in the standard of The American Society of Heating, Refrigerating and Air-Conditioning Engineers (ASHRAE) is used.

A refrigeration apparatus according to a 17th aspect is the refrigeration apparatus according to any of the 1st through 7th aspects, wherein, the refrigerant comprises HFO-1132 (E) and HFO-1123 in a total amount of 99.5 mass % or more based on the entire refrigerant, and the refrigerant comprises 45.1 mass % to 47.1 mass % of HFO-1132(E) based on the entire refrigerant.

In this refrigeration apparatus, the efficiency of heat exchange in the heat exchanger can be enhanced when a refrigerant having a sufficiently low GWP, a refrigeration capacity (may also be referred to as a cooling capacity or a capacity) and a coefficient of performance (COP) equal to those of R410A and classified with lower flammability (Class 2L) in the standard of The American Society of Heating, Refrigerating and Air-Conditioning Engineers (ASHRAE) is used.

A refrigeration apparatus according to a 18th aspect is the refrigeration apparatus according to any of the 1st through 7th aspects, wherein, the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein when the mass % of HFO-1132(E), HFO-1123, R1234yf, and R32 based on their sum in the refrigerant is respectively represented by x, y, z, and a, if 0<a≤11.1, coordinates (x,y,z) in a ternary composition diagram in which the sum of HFO-1132(E), HFO-1123, and R1234yf is (100-a) mass % are within the range of a figure surrounded by straight lines GI, IA, AB, BD', D'C, and CG that connect the following 6 points:

point G ($0.026a^2-1.7478a+72.0$, $-0.026a^2+0.7478a+28.0$, 0.0),
point I ($0.026a^2-1.7478a+72.0$, 0.0, $-0.026a^2+0.7478a+28.0$),
point A ($0.0134a^2-1.9681a+68.6$, 0.0, $-0.0134a^2+0.9681a+31.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0), or on the straight lines GI, AB, and D'C (excluding point G, point I, point A, point B, point D', and point C);

if 11.1<a≤18.2, coordinates (x,y,z) in the ternary composition diagram are within the range of a figure surrounded by straight lines GI, IA, AB, BW, and WG that connect the following 5 points:

point G ($0.02a^2-1.6013a+71.105$, $-0.02a^2+0.6013a+28.895$, 0.0),
point I ($0.02a^2-1.6013a+71.105$, 0.0, $-0.02a^2+0.6013a+28.895$),
point A ($0.0112a^2-1.9337a+68.484$, 0.0, $-0.0112a^2+0.9337a+31.516$),
point B (0.0, $0.0075a^2-1.5156a+58.199$, $-0.0075a^2+0.5156a+41.801$), and
point W (0.0, 100.0-a, 0.0), or on the straight lines GI and AB (excluding point G, point I, point A, point B, and point W);

if 18.2<a≤26.7, coordinates (x,y,z) in the ternary composition diagram are within the range of a figure surrounded by straight lines GI, IA, AB, BW, and WG that connect the following 5 points:

point G ($0.0135a^2-1.4068a+69.727$, $-0.0135a^2+0.4068a+30.273$, 0.0),
point I ($0.0135a^2-1.4068a+69.727$, 0.0, $-0.0135a^2+0.4068a+30.273$),
point A ($0.0107a^2-1.9142a+68.305$, 0.0, $-0.0107a^2+0.9142a+31.695$),
point B (0.0, $0.009a^2-1.6045a+59.318$, $-0.009a^2+0.6045a+40.682$), and
point W (0.0, 100.0−a, 0.0),
or on the straight lines GI and AB (excluding point G, point I, point A, point B, and point W);
if 26.7<a≤36.7, coordinates (x,y,z) in the ternary composition diagram are within the range of a figure surrounded by straight lines GI, IA, AB, BW, and WG that connect the following 5 points:
point G ($0.0111a^2-1.3152a+68.986$, $-0.0111a^2+0.3152a+31.014$, 0.0),
point I ($0.0111a^2-1.3152a+68.986$, 0.0, $-0.0111a^2+0.3152a+31.014$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines GI and AB (excluding point G, point I, point A, point B, and point W); and
if 36.7<a≤46.7, coordinates (x,y,z) in the ternary composition diagram are within the range of a figure surrounded by straight lines GI, IA, AB, BW, and WG that connect the following 5 points:
point G ($0.0061a^2-0.9918a+63.902$, $-0.0061a^2-0.0082a+36.098$, 0.0),
point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines GI and AB (excluding point G, point I, point A, point B, and point W).

In this refrigeration apparatus, the efficiency of heat exchange in the heat exchanger can be enhanced when a refrigerant having a sufficiently low GWP, a refrigeration capacity (may also be referred to as a cooling capacity or a capacity) and a coefficient of performance (COP) equal to those of R410A is used.

A refrigeration apparatus according to a 19th aspect is the refrigeration apparatus according to any of the 1st through 7th aspects, wherein, the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein
when the mass % of HFO-1132(E), HFO-1123, R1234yf, and R32 based on their sum in the refrigerant is respectively represented by x, y, z, and a,
if 0<a≤11.1, coordinates (x,y,z) in a ternary composition diagram in which the sum of HFO-1132(E), HFO-1123, and R1234yf is (100-a) mass % are within the range of a figure surrounded by straight lines JK', K'B, BD', D'C, and CJ that connect the following 5 points:
point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);
if 11.1<a≤18.2, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$), and
point W (0.0, 100.0−a, 0.0),
or on the straight lines JK' and K'B (excluding point J, point B, and point W);
if 18.2<a≤26.7, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$), and
point W (0.0, 100.0−a, 0.0),
or on the straight lines JK' and K'B (excluding point J, point B, and point W);
if 26.7<a≤36.7, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, 100.0−a, 0.0),
or on the straight lines JK', K'A, and AB (excluding point J, point B, and point W); and
if 36.7<a≤46.7, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K' ($-0.1892a+29.443$, 0.0, $-0.8108a+70.557$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, 100.0−a, 0.0),
or on the straight lines JK', K'A, and AB (excluding point J, point B, and point W).

In this refrigeration apparatus, the efficiency of heat exchange in the heat exchanger can be enhanced when a refrigerant having a sufficiently low GWP, a refrigeration capacity (may also be referred to as a cooling capacity or a capacity) and a coefficient of performance (COP) equal to those of R410A is used.

A refrigeration apparatus according to a 20th aspect is the refrigeration apparatus according to any of the 1st through 7th aspects, wherein the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments IN and EI are straight lines.

In this refrigeration apparatus, the efficiency of heat exchange in the heat exchanger can be enhanced when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

A refrigeration apparatus according to a 21st aspect is the refrigeration apparatus according to any of the 1st through 7th aspects, wherein the refrigerant comprises HFO-1132 (E), R32, and R1234yf,
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.

In this refrigeration apparatus, the efficiency of heat exchange in the heat exchanger can be enhanced when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

A refrigeration apparatus according to a 22nd aspect is the refrigeration apparatus according to any of the 1st through 7th aspects, wherein the refrigerant comprises HFO-1132 (E), R32, and R1234yf, wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line.

In this refrigeration apparatus, the efficiency of heat exchange in the heat exchanger can be enhanced when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

A refrigeration apparatus according to a 23rd aspect is the refrigeration apparatus according to any of the 1st through 7th aspects, wherein the refrigerant comprises HFO-1132 (E), R32, and R1234yf,
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line.

In this refrigeration apparatus, the efficiency of heat exchange in the heat exchanger can be enhanced when a refrigerant having a sufficiently low GWP, a refrigeration capacity (may also be referred to as a cooling capacity or capacity) equal to those of R410A and classified with lower flammability (Class 2L) in the standard of The American Society of Heating, Refrigerating and Air-Conditioning Engineers (ASHRAE) is used.

A refrigeration apparatus according to a 24th aspect is the refrigeration apparatus according to any of the 1st through 7th aspects, wherein the refrigerant comprises HFO-1132 (E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
  point P (20.5, 51.7, 27.8),
  point S (21.9, 39.7, 38.4), and
  point T (8.6, 51.6, 39.8),
or on these line segments;
  the line segment PS is represented by coordinates $(0.0064y^2 - 0.7103y + 40.1, y, -0.0064y^2 - 0.2897y + 59.9)$;
  the line segment ST is represented by coordinates $(0.0082y - 1.8683y + 83.126, y, -0.0082y^2 + 0.8683y + 16.874)$; and
  the line segment TP is a straight line.

In this refrigeration apparatus, the efficiency of heat exchange in the heat exchanger can be enhanced when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

A refrigeration apparatus according to a 25th aspect is the refrigeration apparatus according to any of the 1st through 7th aspects, wherein the refrigerant comprises trans-1,2-difluoroethylene (HFO-1132(E)), trifluoroethylene (HFO-1123), and difluoromethane (R32), wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:
  point I (72.0, 28.0, 0.0),
  point K (48.4, 33.2, 18.4),
  point B' (0.0, 81.6, 18.4),
  point H (0.0, 84.2, 15.8),
  point R (23.1, 67.4, 9.5), and
  point G (38.5, 61.5, 0.0),
or on these line segments (excluding the points on the line segments B'H and GI);
  the line segment IK is represented by coordinates $(0.025z^2 - 1.7429z + 72.00, -0.025z^2 + 0.7429z + 28.0, z)$,
  the line segment HR is represented by coordinates $(-0.3123z^2 + 4.234z + 11.06, 0.3123z^2 - 5.234z + 88.94, z)$,
  the line segment RG is represented by coordinates $(-0.0491z^2 - 1.1544z + 38.5, 0.0491z^2 + 0.1544z + 61.5, z)$, and
  the line segments KB' and GI are straight lines.

In this refrigeration apparatus, the efficiency of heat exchange in the heat exchanger can be enhanced when a refrigerant having a sufficiently low GWP, and a coefficient of performance (COP) equal to that of R410A is used.

A refrigeration apparatus according to a 26th aspect is the refrigeration apparatus according to any of the 1st through 7th aspects, wherein the refrigerant comprises HFO-1132 (E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IJ, JR, RG, and GI that connect the following 4 points:
  point I (72.0, 28.0, 0.0),
  point J (57.7, 32.8, 9.5),
  point R (23.1, 67.4, 9.5), and
  point G (38.5, 61.5, 0.0),
or on these line segments (excluding the points on the line segment GI);
  the line segment IJ is represented by coordinates $(0.025z^2 - 1.7429z + 72.0, -0.025z^2 + 0.7429z + 28.0, z)$,
  the line segment RG is represented by coordinates $(-0.0491z^2 - 1.1544z + 38.5, 0.0491z^2 + 0.1544z + 61.5, z)$, and
  the line segments JR and GI are straight lines.

In this refrigeration apparatus, the efficiency of heat exchange in the heat exchanger can be enhanced when a refrigerant having a sufficiently low GWP, and a coefficient of performance (COP) equal to that of R410A is used.

A refrigeration apparatus according to a 27th aspect is the refrigeration apparatus according to any of the 1st through 7th aspects, wherein the refrigerant comprises HFO-1132 (E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:
  point M (47.1, 52.9, 0.0),
  point P (31.8, 49.8, 18.4),
  point B' (0.0, 81.6, 18.4),
  point H (0.0, 84.2, 15.8),
  point R (23.1, 67.4, 9.5), and
  point G (38.5, 61.5, 0.0),
or on these line segments (excluding the points on the line segments B'H and GM);
  the line segment MP is represented by coordinates $(0.0083z^2 - 0.984z + 47.1, -0.0083z^2 - 0.016z + 52.9, z)$,
  the line segment HR is represented by coordinates $(-0.3123z^2 + 4.234z + 11.06, 0.3123z^2 - 5.234z + 88.94, z)$,
  the line segment RG is represented by coordinates $(-0.0491z^2 - 1.1544z + 38.5, 0.0491z^2 + 0.1544z + 61.5, z)$, and
  the line segments PB' and GM are straight lines.

In this refrigeration apparatus, the efficiency of heat exchange in the heat exchanger can be enhanced when a refrigerant having a sufficiently low GWP, and a coefficient of performance (COP) equal to that of R410A is used.

A refrigeration apparatus according to a 28th aspect is the refrigeration apparatus according to any of the 1st through 7th aspects, wherein the refrigerant comprises HFO-1132 (E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);
the line segment MN is represented by coordinates $(0.0083z^2-0.984z+47.1, -0.0083z^2-0.016z+52.9, z)$,
the line segment RG is represented by coordinates $(-0.0491z^2-1.1544z+38.5, 0.0491z^2+0.1544z+61.5, z)$, and
the line segments JR and GI are straight lines.

In this refrigeration apparatus, the efficiency of heat exchange in the heat exchanger can be enhanced when a refrigerant having a sufficiently low GWP, and a coefficient of performance (COP) equal to that of R410A is used.

A refrigeration apparatus according to a 29th aspect is the refrigeration apparatus according to any of the 1st through 7th aspects, wherein the refrigerant comprises HFO-1132 (E), HFO-1123, and R32,
wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;
the line segment ST is represented by coordinates $(-0.0982z^2+0.9622z+40.931, 0.0982z^2-1.9622z+59.069, z)$,
the line segment TP is represented by coordinates $(0.0083z^2-0.984z+47.1, -0.0083z^2-0.016z+52.9, z)$, and
the line segment PS is a straight line.

In this refrigeration apparatus, the efficiency of heat exchange in the heat exchanger can be enhanced when a refrigerant having a sufficiently low GWP, and a coefficient of performance (COP) equal to that of R410A is used.

A refrigeration apparatus according to a 30th aspect is the refrigeration apparatus according to any of the 1st through 7th aspects, wherein the refrigerant comprises HFO-1132 (E), HFO-1123, and R32,
wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);
the line segment DU is represented by coordinates $(-3.4962z^2+210.71z-3146.1, 3.4962z^2-211.71z+3246.1, z)$,
the line segment UQ is represented by coordinates $(0.0135z^2-0.9181z+44.133, -0.0135z^2-0.0819z+55.867, z)$, and
the line segments QB" and B"D are straight lines.

In this refrigeration apparatus, the efficiency of heat exchange in the heat exchanger can be enhanced when a refrigerant having a sufficiently low GWP, and a coefficient of performance (COP) equal to that of R410A is used.

Figure 1:
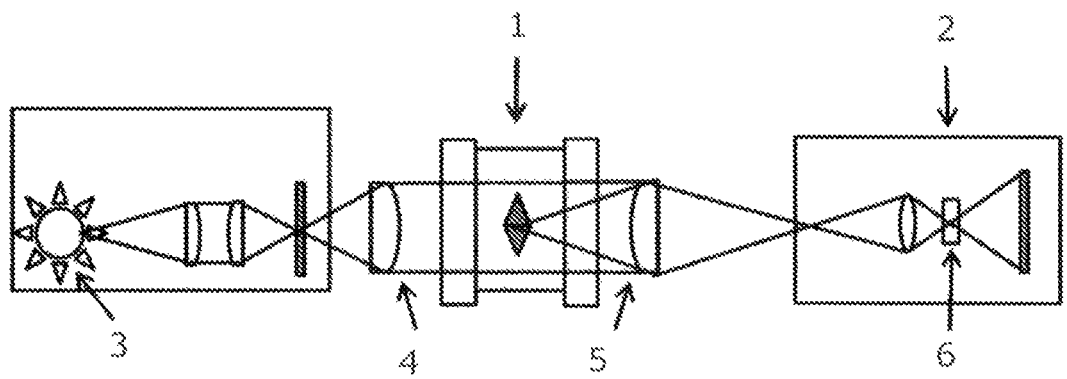
FIG. 1 is a schematic view of an instrument used for a flammability test.
Figure 2:
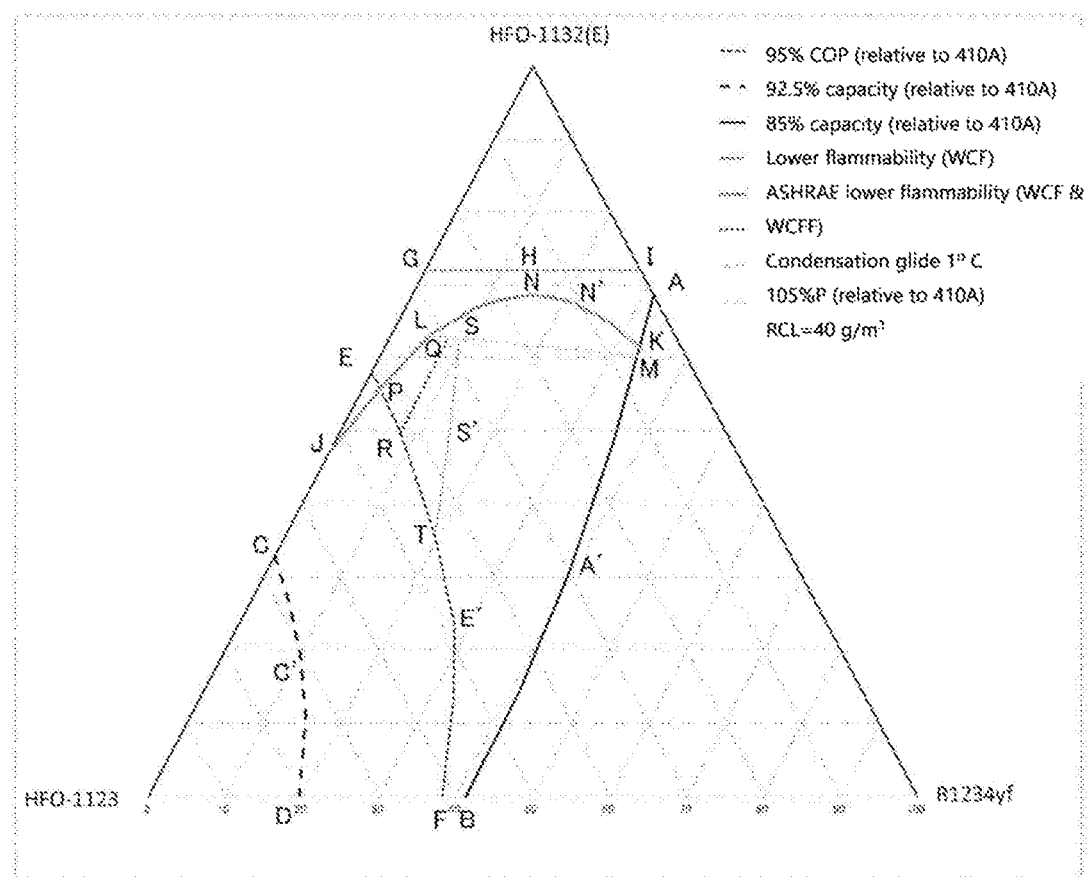
FIG. 2 is a diagram showing points A to T and line segments that connect these points in a ternary composition diagram in which the sum of HFO-1132(E), HFO-1123, and R1234yf is 100 mass %.

DESCRIPTION OF EMBODIMENTS (1) Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to classified as be "Class 2L."

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

In the present specification, temperature glide refers to an absolute value of the difference between the initial temperature and the end temperature in the phase change process of a composition containing the refrigerant of the present disclosure in the heat exchanger of a refrigerant system.

(2) Refrigerant

(2-1) Refrigerant Component

Any one of various refrigerants such as refrigerant A, refrigerant B, refrigerant C, refrigerant D, and refrigerant E, details of these refrigerant are to be mentioned later, can be used as the refrigerant.

(2-2) Use of Refrigerant

The refrigerant according to the present disclosure can be preferably used as a working fluid in a refrigerating machine.

The composition according to the present disclosure is suitable for use as an alternative refrigerant for HFC refrigerant such as R410A, R407C and R404 etc, or HCFC refrigerant such as R22 etc.

(3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(3-1) Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. Preferably, a compound that cannot be an impurity inevitably mixed in the refrigerant of the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a fluorocarbon, a hydrochlorocarbon, a fluorocarbon, or a fluoroether.

The following compounds are preferable as the tracer.
FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFVC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFVC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHCF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present in the refrigerant composition at a total concentration of about 10 parts per million (ppm) to about 1000 ppm. Preferably, the tracer compound is present in the refrigerant composition at a total concentration of about 30 ppm to about 500 ppm, and most preferably, the tracer compound is present at a total concentration of about 50 ppm to about 300 ppm.

(3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

(4) Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(4-1) Refrigeration Oil

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(5) Various Refrigerants

Hereinafter, the refrigerants A to E, which are the refrigerants used in the present embodiment, will be described in detail.

In addition, each description of the following refrigerant A, refrigerant B, refrigerant C, refrigerant D, and refrigerant E is each independent. The alphabet which shows a point or a line segment, the number of an Examples, and the number of a comparative examples are all independent of each other among the refrigerant A, the refrigerant B, the refrigerant C, the refrigerant D, and the refrigerant E. For example, the first embodiment of the refrigerant A and the first embodiment of the refrigerant B are different embodiment from each other.

(5-1) Refrigerant A

The refrigerant A according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant A according to the present disclosure has various properties that are desirable as an R410A-alternative refrigerant, i.e., a refrigerating capacity and a coefficient of performance that are equivalent to those of R410A, and a sufficiently low GWP.

The refrigerant A according to the present disclosure is a composition comprising HFO-1132(E) and R1234yf, and optionally further comprising HFO-1123, and may further satisfy the following requirements. This refrigerant also has various properties desirable as an alternative refrigerant for R410A; i.e., it has a refrigerating capacity and a coefficient of performance that are equivalent to those of R410A, and a sufficiently low GWP.

Requirements

Preferable refrigerant A is as follows:

When the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line CO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$,
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.

When the requirements above are satisfied, the refrigerant according to the present disclosure has a refrigerating capacity ratio of 85% or more relative to that of R410A, and a COP of 92.5% or more relative to that of R410A.

When the mass % of HFO-1132(E), HFO-1123, and R1234yf, based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant A has a WCF lower flammability according to the ASHRAE Standard (the WCF composition has a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CJ);
the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, BD, and CJ are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant exhibits a lower flammability (Class 2L) according to the ASHRAE Standard (the WCF composition and the WCFF composition have a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point (32.9, 67.1, 0.0),
or on the above line segments (excluding the points on the line segment CJ);
the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, LM, BD, and CJ are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant has an RCL of 40 g/m³ or more.

When the mass % of HFO-1132(E), HFO-1123, and R1234yf based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TP is represented by coordinates (x, $0.00672x^2-0.7607x+63.525$, $-0.00672x^2-0.2393x+36.475$), and the line segments LM and BF are straight lines.

When the requirements above are satisfied, the refrigerant according to the present disclosure has a refrigerating capacity ratio of 85% or more relative to that of R410A, and a COP of 95% or more relative to that of R410A; furthermore, the refrigerant has an RCL of 40 g/m³ or more.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:
point P (55.8, 42.0, 2.2),
point L (63.1, 31.9, 5.0),
point Q (62.8, 29.6, 7.6), and
point R (49.8, 42.3, 7.9),
or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

When the requirements above are satisfied, the refrigerant according to the present disclosure has a COP of 95% or more relative to that of R410A, and an RCL of 40 g/m³ or more, furthermore, the refrigerant has a condensation temperature glide of 1° C. or less.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:
point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $0.0017x^2-0.7869x+70.888$, $-0.0017x^2-0.2131x+29.112$), and the line segments SM and BF are straight lines.

When the requirements above are satisfied, the refrigerant according to the present disclosure has a refrigerating capacity ratio of 85% or more relative to that of R410A, a COP of 95% or more relative to that of R410A, and an RCL of 40 g/m³ or more furthermore, the refrigerant has a discharge pressure of 105% or more relative to that of R410A.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments Od, dg, gh, and hO that connect the following 4 points:
point d (87.6, 0.0, 12.4),
point g (18.2, 55.1, 26.7),
point h (56.7, 43.3, 0.0), and
point o (100.0, 0.0, 0.0),
or on the line segments Od, dg, gh, and hO (excluding the points O and h);

the line segment dg is represented by coordinates ($0.0047y^2-1.5177y+87.598$, y, $-0.0047y^2+0.5177y+12.402$), the line segment gh is represented by coordinates ($-0.0134z^2-1.0825z+56.692$, $0.0134z^2+0.0825z+43.308$, z), and the line segments hO and Od are straight lines.

When the requirements above are satisfied, the refrigerant according to the present disclosure has a refrigerating capacity ratio of 92.5% or more relative to that of R410A, and a COP ratio of 92.5% or more relative to that of R410A.

The refrigerant A according to the present disclosure is preferably a refrigerant wherein
when the mass % of HFO-1132(E), HFO-1123, and R1234yf, based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments lg, gh, hi, and il that connect the following 4 points:
point l (72.5, 10.2, 17.3),
point g (18.2, 55.1, 26.7),
point h (56.7, 43.3, 0.0), and
point i (72.5, 27.5, 0.0) or
on the line segments lg, gh, and il (excluding the points h and i);
the line segment lg is represented by coordinates $(0.0047y^2-1.5177y+87.598, y, -0.0047y^2+0.5177y+12.402)$,
the line gh is represented by coordinates $(-0.0134z^2-1.0825z+56.692, 0.0134z^2+0.0825z+43.308, z)$, and
the line segments hi and il are straight lines.

When the requirements above are satisfied, the refrigerant according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE Standard.

The refrigerant A according to the present disclosure is preferably a refrigerant wherein
when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Od, de, ef, and fO that connect the following 4 points:
point d (87.6, 0.0, 12.4),
point e (31.1, 42.9, 26.0),
point f (65.5, 34.5, 0.0), and
point O (100.0, 0.0, 0.0),
or on the line segments Od, de, and ef (excluding the points O and f);
the line segment de is represented by coordinates $(0.0047y^2-1.5177y+87.598, y, -0.0047y^2+0.5177y+12.402)$,
the line segment ef is represented by coordinates $(-0.0064z^2-1.1565z+65.501, 0.0064z^2+0.1565z+34.499, z)$, and
the line segments fO and Od are straight lines.

When the requirements above are satisfied, the refrigerant according to the present disclosure has a refrigerating capacity ratio of 93.5% or more relative to that of R410A, and a COP ratio of 93.5% or more relative to that of R410A.

The refrigerant A according to the present disclosure is preferably a refrigerant wherein
when the mass % of HFO-1132(E), HFO-1123, and R1234yf based on their sum is respectively represented by x, y, and z,
coordinates (x,y,z) in a ternary composition diagram in which the sum of HFO-1132(E), HFO-1123, and R1234yf is 100 mass % are within the range of a figure surrounded by line segments le, ef, fi, and il that connect the following 4 points:
point l (72.5, 10.2, 17.3),
point e (31.1, 42.9, 26.0),
point f (65.5, 34.5, 0.0), and
point i (72.5, 27.5, 0.0),
or on the line segments le, ef, and il (excluding the points f and i);
the line segment le is represented by coordinates $(0.0047y^2-1.5177y+87.598, y, -0.0047y^2+0.5177y+12.402)$,
the line segment ef is represented by coordinates $(-0.0134z^2-1.0825z+56.692, 0.0134z^2+0.0825z+43.308, z)$, and
the line segments fi and il are straight lines.

When the requirements above are satisfied, the refrigerant according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE Standard.

The refrigerant A according to the present disclosure is preferably a refrigerant wherein
when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Oa, ab, bc, and cO that connect the following 4 points:
point a (93.4, 0.0, 6.6),
point b (55.6, 26.6, 17.8),
point c (77.6, 22.4, 0.0), and
point O (100.0, 0.0, 0.0),
or on the line segments Oa, ab, and bc (excluding the points O and c);
the line segment ab is represented by coordinates $(0.0052y^2-1.5588y+93.385, y, -0.0052y^2+0.5588y+6.615)$,
the line segment bc is represented by coordinates $(-0.0032z^2-1.1791z+77.593, 0.0032z^2+0.1791z+22.407, z)$, and
the line segments cO and Oa are straight lines.

When the requirements above are satisfied, the refrigerant according to the present disclosure has a refrigerating capacity ratio of 95% or more relative to that of R410A, and a COP ratio of 95% or more relative to that of R410A.

The refrigerant A according to the present disclosure is preferably a refrigerant wherein
when the mass % of HFO-1132(E), HFO-1123, and R1234yf based on their sum is respectively represented by x, y, and z,
coordinates (x,y,z) in a ternary composition diagram in which the sum of HFO-1132(E), HFO-1123, and R1234yf is 100 mass % are within the range of a figure surrounded by line segments kb, bj, and jk that connect the following 3 points:
point k (72.5, 14.1, 13.4),
point b (55.6, 26.6, 17.8), and
point j (72.5, 23.2, 4.3),
or on the line segments kb, bj, and jk;
the line segment kb is represented by coordinates $(0.0052y^2-1.5588y+93.385, y, and -0.0052y^2+0.5588y+6.615)$,
the line segment bj is represented by coordinates $(-0.0032z^2-1.1791z+77.593, 0.0032z^2+0.1791z+22.407, z)$, and
the line segment jk is a straight line.

When the requirements above are satisfied, the refrigerant according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE Standard.

The refrigerant according to the present disclosure may further comprise other additional refrigerants in addition to HFO-1132(E), HFO-1123, and R1234yf, as long as the above properties and effects are not impaired. In this respect, the refrigerant according to the present disclosure preferably comprises HFO-1132(E), HFO-1123, and R1234yf in a total amount of 99.5 mass % or more, more preferably 99.75 mass % or more, and still more preferably 99.9 mass % or more, based on the entire refrigerant.

The refrigerant according to the present disclosure may comprise HFO-1132(E), HFO-1123, and R1234yf in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

Examples of Refrigerant A

The present disclosure is described in more detail below with reference to Examples of refrigerant A. However, refrigerant A is not limited to the Examples.

The GWP of R1234yf and a composition consisting of a mixed refrigerant R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in WO2015/141678). The refrigerating capacity of R410A and compositions each comprising a mixture of HFO-1132(E), HFO-1123, and R1234yf was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Further, the RCL of the mixture was calculated with the LFL of HFO-1132(E) being 4.7 vol. %, the LFL of FO-1123 being 10 vol. %, and the LFL of R1234yf being 6.2 vol. %, in accordance with the ASHRAE Standard 34-2013.

Evaporating temperature: 5° C.
Condensation temperature: 45° C.
Degree of superheating: 5K
Degree of subcooling: 5K
Compressor efficiency: 70

Tables to 34 show these values together with the GWP of each mixed refrigerant.

TABLE 1

| Item | Unit | Comp. Ex. 1 | Comp. Ex. 2 O | Comp. Ex. 3 A | Example 1 | Example 2 A' | Example 3 | Comp. Ex. 4 B |
|---|---|---|---|---|---|---|---|---|
| HFO-1132(E) | mass % | R410A | 100.0 | 68.6 | 49.0 | 30.6 | 14.1 | 0.0 |
| HFO-1123 | mass % | | 0.0 | 0.0 | 14.9 | 30.0 | 44.8 | 58.7 |
| R1234yf | mass % | | 0.0 | 31.4 | 36.1 | 39.4 | 41.1 | 41.3 |
| GWP | — | 2088 | 1 | 2 | 2 | 2 | 2 | 2 |
| COP ratio | % (relative to 410A) | 100 | 99.7 | 100.0 | 98.6 | 97.3 | 96.3 | 95.5 |
| Refrigerating capacity ratio | % (relative to 410A) | 100 | 98.3 | 85.0 | 85.0 | 85.0 | 85.0 | 85.0 |
| Condensation glide | ° C. | | 0.1 | 0.00 | 1.98 | 3.36 | 4.46 | 5.15 | 5.35 |
| Discharge pressure | % (relative to 410A) | 100.0 | 99.3 | 87.1 | 88.9 | 90.6 | 92.1 | 93.2 |
| RCL | g/m³ | — | 30.7 | 37.5 | 44.0 | 52.7 | 64.0 | 78.6 |

TABLE 2

| Item | Unit | Comp. Ex. 5 C | Example 4 | Example 5 C' | Example 6 | Comp. Ex. 6 D | Comp. Ex. 7 E | Example 7 E' | Comp. Ex. 8 F |
|---|---|---|---|---|---|---|---|---|---|
| HFO-1132(E) | mass % | 32.9 | 26.6 | 19.5 | 10.9 | 0.0 | 58.0 | 23.4 | 0.0 |
| HFO-1123 | mass % | 67.1 | 68.4 | 70.5 | 74.1 | 80.4 | 42.0 | 48.5 | 61.8 |
| R1234yf | mass % | 0.0 | 5.0 | 10.0 | 15.0 | 19.6 | 0.0 | 28.1 | 38.2 |
| GWP | — | 1 | 1 | 1 | 1 | 2 | 1 | 2 | 2 |
| COP ratio | % (relative to 410A) | 92.5 | 92.5 | 92.5 | 92.5 | 92.5 | 95.0 | 95.0 | 95.0 |
| Refrigerating capacity ratio | % (relative to 410A) | 107.4 | 105.2 | 102.9 | 100.5 | 97.9 | 105.0 | 92.5 | 86.9 |
| Condensation glide | ° C. | 0.16 | 0.52 | 0.94 | 1.42 | 1.90 | 0.42 | 3.16 | 4.80 |
| Discharge pressure | % (relative to 410A) | 119.5 | 117.4 | 115.3 | 113.0 | 115.9 | 112.7 | 101.0 | 95.8 |
| RCL | g/m³ | 53.5 | 57.1 | 62.0 | 69.1 | 81.3 | 41.9 | 46.3 | 79.0 |

TABLE 3

| Item | Unit | Comp. Ex. 9 J | Example 8 P | Example 9 L | Example 10 N | Example 11 N' | Example 12 K |
|---|---|---|---|---|---|---|---|
| HFO-1132(E) | mass % | 47.1 | 55.8 | 63.1 | 68.6 | 65.0 | 61.3 |
| HFO-1123 | mass % | 52.9 | 42.0 | 31.9 | 16.3 | 7.7 | 5.4 |
| R1234yf | mass % | 0.0 | 2.2 | 5.0 | 15.1 | 27.3 | 33.3 |
| GWP | — | 1 | 1 | 1 | 1 | 2 | 2 |
| COP ratio | % (relative to 410A) | 93.8 | 95.0 | 96.1 | 97.9 | 99.1 | 99.5 |
| Refrigerating capacity ratio | % (relative to 410A) | 106.2 | 104.1 | 101.6 | 95.0 | 88.2 | 85.0 |
| Condensation glide | ° C. | 0.31 | 0.57 | 0.81 | 1.41 | 2.11 | 2.51 |
| Discharge pressure | % (relative to 410A) | 115.8 | 111.9 | 107.8 | 99.0 | 91.2 | 87.7 |
| RCL | g/m³ | 46.2 | 42.6 | 40.0 | 38.0 | 38.7 | 39.7 |

TABLE 4

| Item | Unit | Example 13 L | Example 14 M | Example 15 Q | Example 16 R | Example 17 S | Example 18 S' | Example 19 T |
|---|---|---|---|---|---|---|---|---|
| HFO-1132(E) | mass % | 63.1 | 60.3 | 62.8 | 49.8 | 62.6 | 50.0 | 35.8 |
| HFO-1123 | mass % | 31.9 | 6.2 | 29.6 | 42.3 | 28.3 | 35.8 | 44.9 |
| R1234yf | mass % | 5.0 | 33.5 | 7.6 | 7.9 | 9.1 | 14.2 | 19.3 |
| GWP | — | 1 | 2 | 1 | 1 | 1 | 1 | 2 |
| COP ratio | % (relative to 410A) | 96.1 | 99.4 | 96.4 | 95.0 | 96.6 | 95.8 | 95.0 |
| Refrigerating capacity ratio | % (relative to 410A) | 101.6 | 85.0 | 100.2 | 101.7 | 99.4 | 98.1 | 96.7 |
| Condensation glide | ° C. | 0.81 | 2.58 | 1.00 | 1.00 | 1.10 | 1.55 | 2.07 |
| Discharge pressure | % (relative to 410A) | 107.8 | 87.9 | 106.0 | 109.6 | 105.0 | 105.0 | 105.0 |
| RCL | g/m³ | 40.0 | 40.0 | 40.0 | 44.8 | 40.0 | 44.4 | 50.8 |

TABLE 5

| Item | Unit | Comp. Ex. 10 G | Example 20 H | Example 21 I |
|---|---|---|---|---|
| HFO-1132(E) | mass % | 72.0 | 72.0 | 72.0 |
| HFO-1123 | mass % | 28.0 | 14.0 | 0.0 |
| R1234yf | mass % | 0.0 | 14.0 | 28.0 |
| GWP | — | 1 | 1 | 2 |
| COP ratio | % (relative to 410A) | 96.6 | 98.2 | 99.9 |
| Refrigerating capacity ratio | % (relative to 410A) | 103.1 | 95.1 | 86.6 |
| Condensation glide | ° C. | 0.46 | 1.27 | 1.71 |
| Discharge pressure | % (relative to 410A) | 108.4 | 98.7 | 88.6 |
| RCL | g/m³ | 37.4 | 37.0 | 36.6 |

TABLE 6

| Item | Unit | Comp. Ex. 11 | Comp. Ex. 12 | Example 22 | Example 23 | Example 24 | Example 25 | Example 26 | Comp. Ex. 13 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R1234yf | mass % | 5.0 | 5.0 | 5.0 | 5.0 | 5.0 | 5.0 | 5.0 | 5.0 |
| GWP | — | 1 | 1 | 1 | 1 | 1 | 1 | 1 | 1 |
| COP ratio | % (relative to 410A) | 91.4 | 92.0 | 92.8 | 93.7 | 94.7 | 95.8 | 96.9 | 98.0 |
| Refrigerating capacity ratio | % (relative to 410A) | 105.7 | 105.5 | 105.0 | 104.3 | 103.3 | 102.0 | 100.6 | 99.1 |
| Condensation glide | ° C. | 0.40 | 0.46 | 0.55 | 0.66 | 0.75 | 0.80 | 0.79 | 0.67 |
| Discharge pressure | % (relative to 410A) | 120.1 | 118.7 | 116.7 | 114.3 | 111.6 | 108.7 | 105.6 | 102.5 |
| RCL | g/m³ | 71.0 | 61.9 | 54.9 | 49.3 | 44.8 | 41.1 | 37.8 | 35.1 |

TABLE 7

| Item | Unit | Comp. Ex. 14 | Example 27 | Example 28 | Example 29 | Example 30 | Example 31 | Example 32 | Comp. Ex. 15 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 80.0 | 70.0 | 60.0 | 50.0 | 40.0 | 30.0 | 20.0 | 10.0 |
| R1234yf | mass % | 10.0 | 10.0 | 10.0 | 10.0 | 10.0 | 10.0 | 10.0 | 10.0 |
| GWP | — | 1 | 1 | 1 | 1 | 1 | 1 | 1 | 1 |
| COP ratio | % (relative to 410A) | 91.9 | 92.5 | 93.3 | 94.3 | 95.3 | 96.4 | 97.5 | 98.6 |
| Refrigerating capacity ratio | % (relative to 410A) | 103.2 | 102.9 | 102.4 | 101.5 | 100.5 | 99.2 | 97.8 | 96.2 |
| Condensation glide | ° C. | 0.87 | 0.94 | 1.03 | 1.12 | 1.18 | 1.18 | 1.09 | 0.88 |
| Discharge pressure | % (relative to 410A) | 116.7 | 115.2 | 113.2 | 110.8 | 108.1 | 105.2 | 102.1 | 99.0 |
| RCL | g/m$^3$ | 70.5 | 61.6 | 54.6 | 49.1 | 44.6 | 40.8 | 37.7 | 35.0 |

TABLE 8

| Item | Unit | Comp. Ex. 16 | Example 33 | Example 34 | Example 35 | Example 36 | Example 37 | Example 38 | Comp. Ex. 17 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 75.0 | 65.0 | 55.0 | 45.0 | 35.0 | 25.0 | 15.0 | 5.0 |
| R1234yf | mass % | 15.0 | 15.0 | 15.0 | 15.0 | 15.0 | 15.0 | 15.0 | 15.0 |
| GWP | — | 1 | 1 | 1 | 1 | 1 | 1 | 1 | 1 |
| COP ratio | % (relative to 410A) | 92.4 | 93.1 | 93.9 | 94.8 | 95.9 | 97.0 | 98.1 | 99.2 |
| Refrigerating capacity ratio | % (relative to 410A) | 100.5 | 100.2 | 99.6 | 98.7 | 97.7 | 96.4 | 94.9 | 93.2 |
| Condensation glide | ° C. | 1.41 | 1.49 | 1.56 | 1.62 | 1.63 | 1.55 | 1.37 | 1.05 |
| Discharge pressure | % (relative to 410A) | 113.1 | 111.6 | 109.6 | 107.2 | 104.5 | 101.6 | 98.6 | 95.5 |
| RCL | g/m$^3$ | 70.0 | 61.2 | 54.4 | 48.9 | 44.4 | 40.7 | 37.5 | 34.8 |

TABLE 9

| Item | Unit | Example 39 | Example 40 | Example 41 | Example 42 | Example 43 | Example 44 | Example 45 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 70.0 | 60.0 | 50.0 | 40.0 | 30.0 | 20.0 | 10.0 |
| R1234yf | mass % | 20.0 | 20.0 | 20.0 | 20.0 | 20.0 | 20.0 | 20.0 |
| GWP | — | 2 | 2 | 2 | 2 | 2 | 2 | 2 |
| COP ratio | % (relative to 410A) | 93.0 | 93.7 | 94.5 | 95.5 | 96.5 | 97.6 | 98.7 |
| Refrigerating capacity ratio | % (relative to 410A) | 97.7 | 97.4 | 96.8 | 95.9 | 94.7 | 93.4 | 91.9 |
| Condensation glide | ° C. | 2.03 | 2.09 | 2.13 | 2.14 | 2.07 | 1.91 | 1.61 |
| Discharge pressure | % (relative to 410A) | 109.4 | 107.9 | 105.9 | 103.5 | 100.8 | 98.0 | 95.0 |
| RCL | g/m$^3$ | 69.6 | 60.9 | 54.1 | 48.7 | 44.2 | 40.5 | 37.4 |

TABLE 10

| Item | Unit | Example 46 | Example 47 | Example 48 | Example 49 | Example 50 | Example 51 | Example 52 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 65.0 | 55.0 | 45.0 | 35.0 | 25.0 | 15.0 | 5.0 |
| R1234yf | mass % | 25.0 | 25.0 | 25.0 | 25.0 | 25.0 | 25.0 | 25.0 |

TABLE 10-continued

| Item | Unit | Example 46 | Example 47 | Example 48 | Example 49 | Example 50 | Example 51 | Example 52 |
|---|---|---|---|---|---|---|---|---|
| GWP | — | 2 | 2 | 2 | 2 | 2 | 2 | 2 |
| COP ratio | % (relative to 410A) | 93.6 | 94.3 | 95.2 | 96.1 | 97.2 | 98.2 | 99.3 |
| Refrigerating capacity ratio | % (relative to 410A) | 94.8 | 94.5 | 93.8 | 92.9 | 91.8 | 90.4 | 88.8 |
| Condensation glide | ° C. | 2.71 | 2.74 | 2.73 | 2.66 | 2.50 | 2.22 | 1.78 |
| Discharge pressure | % (relative to 410A) | 105.5 | 104.0 | 102.1 | 99.7 | 97.1 | 94.3 | 91.4 |
| RCL | g/m³ | 69.1 | 60.5 | 53.8 | 48.4 | 44.0 | 40.4 | 37.3 |

TABLE 11

| Item | Unit | Example 53 | Example 54 | Example 55 | Example 56 | Example 57 | Example 58 |
|---|---|---|---|---|---|---|---|
| HFO-1132(E) | mass % | 10.0 | 20.0 | 30.0 | 40.0 | 50.0 | 60.0 |
| HFO-1123 | mass % | 60.0 | 50.0 | 40.0 | 30.0 | 20.0 | 10.0 |
| R1234yf | mass % | 30.0 | 30.0 | 30.0 | 30.0 | 30.0 | 30.0 |
| GWP | — | 2 | 2 | 2 | 2 | 2 | 2 |
| COP ratio | % (relative to 410A) | 94.3 | 95.0 | 95.9 | 96.8 | 97.8 | 98.9 |
| Refrigerating capacity ratio | % (relative to 410A) | 91.9 | 91.5 | 90.8 | 89.9 | 88.7 | 87.3 |
| Condensation glide | ° C. | 3.46 | 3.43 | 3.35 | 3.18 | 2.90 | 2.47 |
| Discharge pressure | % (relative to 410A) | 101.6 | 100.1 | 98.2 | 95.9 | 93.3 | 90.6 |
| RCL | g/m³ | 68.7 | 60.2 | 53.5 | 48.2 | 43.9 | 40.2 |

TABLE 12

| Item | Unit | Example 59 | Example 60 | Example 61 | Example 62 | Example 63 | Comp. Ex. 18 |
|---|---|---|---|---|---|---|---|
| HFO-1132(E) | mass % | 10.0 | 20.0 | 30.0 | 40.0 | 50.0 | 60.0 |
| HFO-1123 | mass % | 55.0 | 45.0 | 35.0 | 25.0 | 15.0 | 5.0 |
| R1234yf | mass % | 35.0 | 35.0 | 35.0 | 35.0 | 35.0 | 35.0 |
| GWP | — | 2 | 2 | 2 | 2 | 2 | 2 |
| COP ratio | % (relative to 410A) | 95.0 | 95.8 | 96.6 | 97.5 | 98.5 | 99.6 |
| Refrigerating capacity ratio | % (relative to 410A) | 88.9 | 88.5 | 87.8 | 86.8 | 85.6 | 84.1 |
| Condensation glide | ° C. | 4.24 | 4.15 | 3.96 | 3.67 | 3.24 | 2.64 |
| Discharge pressure | % (relative to 410A) | 97.6 | 96.1 | 94.2 | 92.0 | 89.5 | 86.8 |
| RCL | g/m³ | 68.2 | 59.8 | 53.2 | 48.0 | 43.7 | 40.1 |

TABLE 13

| Item | Unit | Example 64 | Example 65 | Comp. Ex. 19 | Comp. Ex. 20 | Comp. Ex. 21 |
|---|---|---|---|---|---|---|
| HFO-1132(E) | mass % | 10.0 | 20.0 | 30.0 | 40.0 | 50.0 |
| HFO-1123 | mass % | 50.0 | 40.0 | 30.0 | 20.0 | 10.0 |
| R1234yf | mass % | 40.0 | 40.0 | 40.0 | 40.0 | 40.0 |
| GWP | — | 2 | 2 | 2 | 2 | 2 |
| COP ratio | % (relative to 410A) | 95.9 | 96.6 | 97.4 | 98.3 | 99.2 |
| Refrigerating capacity ratio | % (relative to 410A) | 85.8 | 85.4 | 84.7 | 83.6 | 82.4 |

TABLE 13-continued

| Item | Unit | Example 64 | Example 65 | Comp. Ex. 19 | Comp. Ex. 20 | Comp. Ex. 21 |
|---|---|---|---|---|---|---|
| Condensation glide | ° C. | 5.05 | 4.85 | 4.55 | 4.10 | 3.50 |
| Discharge pressure | % (relative to 410A) | 93.5 | 92.1 | 90.3 | 88.1 | 85.6 |
| RCL | g/m$^3$ | 67.8 | 59.5 | 53.0 | 47.8 | 43.5 |

TABLE 14

| Item | Unit | Example 66 | Example 67 | Example 68 | Example 69 | Example 70 | Example 71 | Example 72 | Example 73 |
|---|---|---|---|---|---|---|---|---|---|
| HFO-1132(E) | mass % | 54.0 | 56.0 | 58.0 | 62.0 | 52.0 | 54.0 | 56.0 | 58.0 |
| HFO-1123 | mass % | 41.0 | 39.0 | 37.0 | 33.0 | 41.0 | 39.0 | 37.0 | 35.0 |
| R1234yf | mass % | 5.0 | 5.0 | 5.0 | 5.0 | 7.0 | 7.0 | 7.0 | 7.0 |
| GWP | — | 1 | 1 | 1 | 1 | 1 | 1 | 1 | 1 |
| COP ratio | % (relative to 410A) | 95.1 | 95.3 | 95.6 | 96.0 | 95.1 | 95.4 | 95.6 | 95.8 |
| Refrigerating capacity ratio | % (relative to 410A) | 102.8 | 102.6 | 102.3 | 101.8 | 101.9 | 101.7 | 101.5 | 101.2 |
| Condensation glide | ° C. | 0.78 | 0.79 | 0.80 | 0.81 | 0.93 | 0.94 | 0.95 | 0.95 |
| Discharge pressure | % (relative to 410A) | 110.5 | 109.9 | 109.3 | 108.1 | 109.7 | 109.1 | 108.5 | 107.9 |
| RCL | g/m$^3$ | 43.2 | 42.4 | 41.7 | 40.3 | 43.9 | 43.1 | 42.4 | 41.6 |

TABLE 15

| Item | Unit | Example 74 | Example 75 | Example 76 | Example 77 | Example 78 | Example 79 | Example 80 | Example 81 |
|---|---|---|---|---|---|---|---|---|---|
| HFO-1132(E) | mass % | 60.0 | 62.0 | 61.0 | 58.0 | 60.0 | 62.0 | 52.0 | 54.0 |
| HFO-1123 | mass % | 33.0 | 31.0 | 29.0 | 30.0 | 28.0 | 26.0 | 34.0 | 32.0 |
| R1234yf | mass % | 7.0 | 7.0 | 10.0 | 12.0 | 12.0 | 12.0 | 14.0 | 14.0 |
| GWP | — | 1 | 1 | 1 | 1 | 1 | 1 | 1 | 1 |
| COP ratio | % (relative to 410A) | 96.0 | 96.2 | 96.5 | 96.4 | 96.6 | 96.8 | 96.0 | 96.2 |
| Refrigerating capacity ratio | % (relative to 410A) | 100.9 | 100.7 | 99.1 | 98.4 | 98.1 | 97.8 | 98.0 | 97.7 |
| Condensation glide | ° C. | 0.95 | 0.95 | 1.18 | 1.34 | 1.33 | 1.32 | 1.53 | 1.53 |
| Discharge pressure | % (relative to 410A) | 107.3 | 106.7 | 104.9 | 104.4 | 103.8 | 103.2 | 104.7 | 104.1 |
| RCL | g/m$^3$ | 40.9 | 40.3 | 40.5 | 41.5 | 40.8 | 40.1 | 43.6 | 42.9 |

TABLE 16

| Item | Unit | Example 82 | Example 83 | Example 84 | Example 85 | Example 86 | Example 87 | Example 88 | Example 89 |
|---|---|---|---|---|---|---|---|---|---|
| HFO-1132(E) | mass % | 56.0 | 58.0 | 60.0 | 48.0 | 50.0 | 52.0 | 54.0 | 56.0 |
| HFO-1123 | mass % | 30.0 | 28.0 | 26.0 | 36.0 | 34.0 | 32.0 | 30.0 | 28.0 |
| R1234yf | mass % | 14.0 | 14.0 | 14.0 | 16.0 | 16.0 | 16.0 | 16.0 | 16.0 |
| GWP | — | 1 | 1 | 1 | 1 | 1 | 1 | 1 | 1 |
| COP ratio | % (relative to 410A) | 96.4 | 96.6 | 96.9 | 95.8 | 96.0 | 96.2 | 96.4 | 96.7 |
| Refrigerating capacity ratio | % (relative to 410A) | 97.5 | 97.2 | 96.9 | 97.3 | 97.1 | 96.8 | 96.6 | 96.3 |
| Condensation glide | ° C. | 1.51 | 1.50 | 1.48 | 1.72 | 1.72 | 1.71 | 1.69 | 1.67 |
| Discharge pressure | % (relative to 410A) | 103.5 | 102.9 | 102.3 | 104.3 | 103.8 | 103.2 | 102.7 | 102.1 |
| RCL | g/m$^3$ | 42.1 | 41.4 | 40.7 | 45.2 | 44.4 | 43.6 | 42.8 | 42.1 |

TABLE 17

| Item | Unit | Example 90 | Example 91 | Example 92 | Example 93 | Example 94 | Example 95 | Example 96 | Example 97 |
|---|---|---|---|---|---|---|---|---|---|
| HFO-1132(E) | mass % | 58.0 | 60.0 | 42.0 | 44.0 | 46.0 | 48.0 | 50.0 | 52.0 |
| HFO-1123 | mass % | 26.0 | 24.0 | 40.0 | 38.0 | 36.0 | 34.0 | 32.0 | 30.0 |
| R1234yf | mass % | 16.0 | 16.0 | 18.0 | 18.0 | 18.0 | 18.0 | 18.0 | 18.0 |
| GWP | — | 1 | 1 | 2 | 2 | 2 | 2 | 2 | 2 |
| COP ratio | % (relative to 410A) | 96.9 | 97.1 | 95.4 | 95.6 | 95.8 | 96.0 | 96.3 | 96.5 |
| Refrigerating capacity ratio | % (relative to 410A) | 96.1 | 95.8 | 96.8 | 96.6 | 96.4 | 96.2 | 95.9 | 95.7 |
| Condensation glide | °C. | 1.65 | 1.63 | 1.93 | 1.92 | 1.92 | 1.91 | 1.89 | 1.88 |
| Discharge pressure | % (relative to 410A) | 101.5 | 100.9 | 104.5 | 103.9 | 103.4 | 102.9 | 102.3 | 101.8 |
| RCL | g/m³ | 41.4 | 40.7 | 47.8 | 46.9 | 46.0 | 45.1 | 44.3 | 43.5 |

TABLE 18

| Item | Unit | Example 98 | Example 99 | Example 100 | Example 101 | Example 102 | Example 103 | Example 104 | Example 105 |
|---|---|---|---|---|---|---|---|---|---|
| HFO-1132(E) | mass % | 54.0 | 56.0 | 58.0 | 60.0 | 36.0 | 38.0 | 42.0 | 44.0 |
| HFO-1123 | mass % | 28.0 | 26.0 | 24.0 | 22.0 | 44.0 | 42.0 | 38.0 | 36.0 |
| R1234yf | mass % | 18.0 | 18.0 | 18.0 | 18.0 | 20.0 | 20.0 | 20.0 | 20.0 |
| GWP | — | 2 | 2 | 2 | 2 | 2 | 2 | 2 | 2 |
| COP ratio | % (relative to 410A) | 96.7 | 96.9 | 97.1 | 97.3 | 95.1 | 95.3 | 95.7 | 95.9 |
| Refrigerating capacity ratio | % (relative to 410A) | 95.4 | 95.2 | 94.9 | 94.6 | 96.3 | 96.1 | 95.7 | 95.4 |
| Condensation glide | °C. | 1.86 | 1.83 | 1.80 | 1.77 | 2.14 | 2.14 | 2.13 | 2.12 |
| Discharge pressure | % (relative to 410A) | 101.2 | 100.6 | 100.0 | 99.5 | 104.5 | 104.0 | 103.0 | 102.5 |
| RCL | g/m³ | 42.7 | 42.0 | 41.3 | 40.6 | 50.7 | 49.7 | 47.7 | 46.8 |

TABLE 19

| Item | Unit | Example 106 | Example 107 | Example 108 | Example 109 | Example 110 | Example 111 | Example 112 | Example 113 |
|---|---|---|---|---|---|---|---|---|---|
| HFO-1132(E) | mass % | 46.0 | 48.0 | 52.0 | 54.0 | 56.0 | 58.0 | 34.0 | 36.0 |
| HFO-1123 | mass % | 34.0 | 32.0 | 28.0 | 26.0 | 24.0 | 22.0 | 44.0 | 42.0 |
| R1234yf | mass % | 20.0 | 20.0 | 20.0 | 20.0 | 20.0 | 20.0 | 22.0 | 22.0 |
| GWP | — | 2 | 2 | 2 | 2 | 2 | 2 | 2 | 2 |
| COP ratio | % (relative to 410A) | 96.1 | 96.3 | 96.7 | 96.9 | 97.2 | 97.4 | 95.1 | 95.3 |
| Refrigerating capacity ratio | % (relative to 410A) | 95.2 | 95.0 | 94.5 | 94.2 | 94.0 | 93.7 | 95.3 | 95.1 |
| Condensation glide | °C. | 2.11 | 2.09 | 2.05 | 2.02 | 1.99 | 1.95 | 2.37 | 2.36 |
| Discharge pressure | % (relative to 410A) | 101.9 | 101.4 | 100.3 | 99.7 | 99.2 | 98.6 | 103.4 | 103.0 |
| RCL | g/m³ | 45.9 | 45.0 | 43.4 | 42.7 | 41.9 | 41.2 | 51.7 | 50.6 |

TABLE 20

| Item | Unit | Example 114 | Example 115 | Example 116 | Example 117 | Example 118 | Example 119 | Example 120 | Example 121 |
|---|---|---|---|---|---|---|---|---|---|
| HFO-1132(E) | mass % | 38.0 | 40.0 | 42.0 | 44.0 | 46.0 | 48.0 | 50.0 | 52.0 |
| HFO-1123 | mass % | 40.0 | 38.0 | 36.0 | 34.0 | 32.0 | 30.0 | 28.0 | 26.0 |
| R1234yf | mass % | 22.0 | 22.0 | 22.0 | 22.0 | 22.0 | 22.0 | 22.0 | 22.0 |
| GWP | — | 2 | 2 | 2 | 2 | 2 | 2 | 2 | 2 |
| COP ratio | % (relative to 410A) | 95.5 | 95.7 | 95.9 | 96.1 | 96.4 | 96.6 | 96.8 | 97.0 |

TABLE 20-continued

| Item | Unit | Example 114 | Example 115 | Example 116 | Example 117 | Example 118 | Example 119 | Example 120 | Example 121 |
|---|---|---|---|---|---|---|---|---|---|
| Refrigerating capacity ratio | % (relative to 410A) | 94.9 | 94.7 | 94.5 | 94.3 | 94.0 | 93.8 | 93.6 | 93.3 |
| Condensation glide | ° C. | 2.36 | 2.35 | 2.33 | 2.32 | 2.30 | 2.27 | 2.25 | 2.21 |
| Discharge pressure | % (relative to 410A) | 102.5 | 102.0 | 101.5 | 101.0 | 100.4 | 99.9 | 99.4 | 98.8 |
| RCL | g/m$^3$ | 49.6 | 48.6 | 47.6 | 46.7 | 45.8 | 45.0 | 44.1 | 43.4 |

TABLE 21

| Item | Unit | Example 122 | Example 123 | Example 124 | Example 125 | Example 126 | Example 127 | Example 128 | Example 129 |
|---|---|---|---|---|---|---|---|---|---|
| HFO-1132(E) | mass % | 54.0 | 56.0 | 58.0 | 60.0 | 32.0 | 34.0 | 36.0 | 38.0 |
| HFO-1123 | mass % | 24.0 | 22.0 | 20.0 | 18.0 | 44.0 | 42.0 | 40.0 | 38.0 |
| R1234yf | mass % | 22.0 | 22.0 | 22.0 | 22.0 | 24.0 | 24.0 | 24.0 | 24.0 |
| GWP | — | 2 | 2 | 2 | 2 | 2 | 2 | 2 | 2 |
| COP ratio | % (relative to 410A) | 97.2 | 97.4 | 97.6 | 97.9 | 95.2 | 95.4 | 95.6 | 95.8 |
| Refrigerating capacity ratio | % (relative to 410A) | 93.0 | 92.8 | 92.5 | 92.2 | 94.3 | 94.1 | 93.9 | 93.7 |
| Condensation glide | ° C. | 2.18 | 2.14 | 2.09 | 2.04 | 2.61 | 2.60 | 2.59 | 2.58 |
| Discharge pressure | % (relative to 410A) | 98.2 | 97.7 | 97.1 | 96.5 | 102.4 | 101.9 | 101.5 | 101.0 |
| RCL | g/m$^3$ | 42.6 | 41.9 | 41.2 | 40.5 | 52.7 | 51.6 | 50.5 | 49.5 |

TABLE 22

| Item | Unit | Example 130 | Example 131 | Example 132 | Example 133 | Example 134 | Example 135 | Example 136 | Example 137 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 36.0 | 34.0 | 32.0 | 30.0 | 28.0 | 26.0 | 24.0 | 22.0 |
| R1234yf | mass % | 24.0 | 24.0 | 24.0 | 24.0 | 24.0 | 24.0 | 24.0 | 24.0 |
| GWP | — | 2 | 2 | 2 | 2 | 2 | 2 | 2 | 2 |
| COP ratio | % (relative to 410A) | 96.0 | 96.2 | 96.4 | 96.6 | 96.8 | 97.0 | 97.2 | 97.5 |
| Refrigerating capacity ratio | % (relative to 410A) | 93.5 | 93.3 | 93.1 | 92.8 | 92.6 | 92.4 | 92.1 | 91.8 |
| Condensation glide | ° C. | 2.56 | 2.54 | 2.51 | 2.49 | 2.45 | 2.42 | 2.38 | 2.33 |
| Discharge pressure | % (relative to 410A) | 100.5 | 100.0 | 99.5 | 98.9 | 98.4 | 97.9 | 97.3 | 96.8 |
| RCL | g/m$^3$ | 48.5 | 47.5 | 46.6 | 45.7 | 44.9 | 44.1 | 43.3 | 42.5 |

TABLE 23

| Item | Unit | Example 138 | Example 139 | Example 140 | Example 141 | Example 142 | Example 143 | Example 144 | Example 145 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 20.0 | 18.0 | 16.0 | 44.0 | 42.0 | 40.0 | 38.0 | 36.0 |
| R1234yf | mass % | 24.0 | 24.0 | 24.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 97.7 | 97.9 | 98.1 | 95.3 | 95.5 | 95.7 | 95.9 | 96.1 |
| Refrigerating capacity ratio | % (relative to 410A) | 91.6 | 91.3 | 91.0 | 93.2 | 93.1 | 92.9 | 92.7 | 92.5 |
| Condensation glide | ° C. | 2.28 | 2.22 | 2.16 | 2.86 | 2.85 | 2.83 | 2.81 | 2.79 |

TABLE 23-continued

| Item | Unit | Example 138 | Example 139 | Example 140 | Example 141 | Example 142 | Example 143 | Example 144 | Example 145 |
|---|---|---|---|---|---|---|---|---|---|
| Discharge pressure | % (relative to 410A) | 96.2 | 95.6 | 95.1 | 101.3 | 100.8 | 100.4 | 99.9 | 99.4 |
| RCL | g/m$^3$ | 41.8 | 41.1 | 40.4 | 53.7 | 52.6 | 51.5 | 50.4 | 49.4 |

TABLE 24

| Item | Unit | Example 146 | Example 147 | Example 148 | Example 149 | Example 150 | Example 151 | Example 152 | Example 153 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 34.0 | 32.0 | 30.0 | 28.0 | 26.0 | 24.0 | 22.0 | 20.0 |
| R1234yf | mass % | 26.0 | 26.0 | 26.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 96.3 | 96.5 | 96.7 | 96.9 | 97.1 | 97.3 | 97.5 | 97.7 |
| Refrigerating capacity ratio | % (relative to 410A) | 92.3 | 92.1 | 91.9 | 91.6 | 91.4 | 91.2 | 90.9 | 90.6 |
| Condensation glide | °C. | 2.77 | 2.74 | 2.71 | 2.67 | 2.63 | 2.59 | 2.53 | 2.48 |
| Discharge pressure | % (relative to 410A) | 99.0 | 98.5 | 97.9 | 97.4 | 96.9 | 96.4 | 95.8 | 95.3 |
| RCL | g/m$^3$ | 48.4 | 47.4 | 46.5 | 45.7 | 44.8 | 44.0 | 43.2 | 42.5 |

TABLE 25

| Item | Unit | Example 154 | Example 155 | Example 156 | Example 157 | Example 158 | Example 159 | Example 160 | Example 161 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 18.0 | 16.0 | 14.0 | 42.0 | 40.0 | 38.0 | 36.0 | 34.0 |
| R1234yf | mass % | 26.0 | 26.0 | 26.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 97.9 | 98.2 | 98.4 | 95.6 | 95.8 | 96.0 | 96.2 | 96.3 |
| Refrigerating capacity ratio | % (relative to 410A) | 90.3 | 90.1 | 89.8 | 92.1 | 91.9 | 91.7 | 91.5 | 91.3 |
| Condensation glide | °C. | 2.42 | 2.35 | 2.27 | 3.10 | 3.09 | 3.06 | 3.04 | 3.01 |
| Discharge pressure | % (relative to 410A) | 94.7 | 94.1 | 93.6 | 99.7 | 99.3 | 98.8 | 98.4 | 97.9 |
| RCL | g/m$^3$ | 41.7 | 41.0 | 40.3 | 53.6 | 52.5 | 51.4 | 50.3 | 49.3 |

TABLE 26

| Item | Unit | Example 162 | Example 163 | Example 164 | Example 165 | Example 166 | Example 167 | Example 168 | Example 169 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 32.0 | 30.0 | 28.0 | 26.0 | 24.0 | 22.0 | 20.0 | 18.0 |
| R1234yf | mass % | 28.0 | 28.0 | 28.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 96.5 | 96.7 | 96.9 | 97.2 | 97.4 | 97.6 | 97.8 | 98.0 |
| Refrigerating capacity ratio | % (relative to 410A) | 91.1 | 90.9 | 90.7 | 90.4 | 90.2 | 89.9 | 89.7 | 89.4 |
| Condensation glide | °C. | 2.98 | 2.94 | 2.90 | 2.85 | 2.80 | 2.75 | 2.68 | 2.62 |
| Discharge pressure | % (relative to 410A) | 97.4 | 96.9 | 96.4 | 95.9 | 95.4 | 94.9 | 94.3 | 93.8 |
| RCL | g/m$^3$ | 48.3 | 47.4 | 46.4 | 45.6 | 44.7 | 43.9 | 43.1 | 42.4 |

TABLE 27

| Item | Unit | Example 170 | Example 171 | Example 172 | Example 173 | Example 174 | Example 175 | Example 176 | Example 177 |
|---|---|---|---|---|---|---|---|---|---|
| HFO-1132(E) | mass % | 56.0 | 58.0 | 60.0 | 32.0 | 34.0 | 36.0 | 38.0 | 42.0 |
| HFO-1123 | mass % | 16.0 | 14.0 | 12.0 | 38.0 | 36.0 | 34.0 | 32.0 | 28.0 |
| R1234yf | mass % | 28.0 | 28.0 | 28.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 98.2 | 98.4 | 98.6 | 96.1 | 96.2 | 96.4 | 96.6 | 97.0 |
| Refrigerating capacity ratio | % (relative to 410A) | 89.1 | 88.8 | 88.5 | 90.7 | 90.5 | 90.3 | 90.1 | 89.7 |
| Condensation glide | ° C. | 2.54 | 2.46 | 2.38 | 3.32 | 3.30 | 3.26 | 3.22 | 3.14 |
| Discharge pressure | % (relative to 410A) | 93.2 | 92.6 | 92.1 | 97.7 | 97.3 | 96.8 | 96.4 | 95.4 |
| RCL | g/m$^3$ | 41.7 | 41.0 | 40.3 | 52.4 | 51.3 | 50.2 | 49.2 | 47.3 |

TABLE 28

| Item | Unit | Example 178 | Example 179 | Example 180 | Example 181 | Example 182 | Example 183 | Example 184 | Example 185 |
|---|---|---|---|---|---|---|---|---|---|
| HFO-1132(E) | mass % | 44.0 | 46.0 | 48.0 | 50.0 | 52.0 | 54.0 | 56.0 | 58.0 |
| HFO-1123 | mass % | 26.0 | 24.0 | 22.0 | 20.0 | 18.0 | 16.0 | 14.0 | 12.0 |
| R1234yf | mass % | 30.0 | 30.0 | 30.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 97.2 | 97.4 | 97.6 | 97.8 | 98.0 | 98.3 | 98.5 | 98.7 |
| Refrigerating capacity ratio | % (relative to 410A) | 89.4 | 89.2 | 89.0 | 88.7 | 88.4 | 88.2 | 87.9 | 87.6 |
| Condensation glide | ° C. | 3.08 | 3.03 | 2.97 | 2.90 | 2.83 | 2.75 | 2.66 | 2.57 |
| Discharge pressure | % (relative to 410A) | 94.9 | 94.4 | 93.9 | 93.3 | 92.8 | 92.3 | 91.7 | 91.1 |
| RCL | g/m$^3$ | 46.4 | 45.5 | 44.7 | 43.9 | 43.1 | 42.3 | 41.6 | 40.9 |

TABLE 29

| Item | Unit | Example 186 | Example 187 | Example 188 | Example 189 | Example 190 | Example 191 | Example 192 | Example 193 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 38.0 | 36.0 | 34.0 | 32.0 | 30.0 | 28.0 | 26.0 | 24.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 96.2 | 96.3 | 96.5 | 96.7 | 96.9 | 97.1 | 97.3 | 97.5 |
| Refrigerating capacity ratio | % (relative to 410A) | 89.6 | 89.5 | 89.3 | 89.1 | 88.9 | 88.7 | 88.4 | 88.2 |
| Condensation glide | ° C. | 3.60 | 3.56 | 3.52 | 3.48 | 3.43 | 3.38 | 3.33 | 3.26 |
| Discharge pressure | % (relative to 410A) | 96.6 | 96.2 | 95.7 | 95.3 | 94.8 | 94.3 | 93.9 | 93.4 |
| RCL | g/m$^3$ | 53.4 | 52.3 | 51.2 | 50.1 | 49.1 | 48.1 | 47.2 | 46.3 |

TABLE 30

| Item | Unit | Example 194 | Example 195 | Example 196 | Example 197 | Example 198 | Example 199 | Example 200 | Example 201 |
|---|---|---|---|---|---|---|---|---|---|
| HFO-1132(E) | mass % | 46.0 | 48.0 | 50.0 | 52.0 | 54.0 | 56.0 | 58.0 | 60.0 |
| HFO-1123 | mass % | 22.0 | 20.0 | 18.0 | 16.0 | 14.0 | 12.0 | 10.0 | 8.0 |
| R1234yf | mass % | 32.0 | 32.0 | 32.0 | 32.0 | 32.0 | 32.0 | 32.0 | 32.0 |

TABLE 30-continued

| Item | Unit | Example 194 | Example 195 | Example 196 | Example 197 | Example 198 | Example 199 | Example 200 | Example 201 |
|---|---|---|---|---|---|---|---|---|---|
| GWP | — | 2 | 2 | 2 | 2 | 2 | 2 | 2 | 2 |
| COP ratio | % (relative to 410A) | 97.7 | 97.9 | 98.1 | 98.3 | 98.5 | 98.7 | 98.9 | 99.2 |
| Refrigerating capacity ratio | % (relative to 410A) | 88.0 | 87.7 | 87.5 | 87.2 | 86.9 | 86.6 | 86.3 | 86.0 |
| Condensation glide | ° C. | 3.20 | 3.12 | 3.04 | 2.96 | 2.87 | 2.77 | 2.66 | 2.55 |
| Discharge pressure | % (relative to 410A) | 92.8 | 92.3 | 91.8 | 91.3 | 90.7 | 90.2 | 89.6 | 89.1 |
| RCL | g/m³ | 45.4 | 44.6 | 43.8 | 43.0 | 42.3 | 41.5 | 40.8 | 40.2 |

TABLE 31

| Item | Unit | Example 202 | Example 203 | Example 204 | Example 205 | Example 206 | Example 207 | Example 208 | Example 209 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 36.0 | 34.0 | 32.0 | 30.0 | 28.0 | 26.0 | 24.0 | 22.0 |
| R1234yf | mass % | 34.0 | 34.0 | 34.0 | 34.0 | 34.0 | 34.0 | 34.0 | 34.0 |
| GWP | — | 2 | 2 | 2 | 2 | 2 | 2 | 2 | 2 |
| COP ratio | % (relative to 410A) | 96.5 | 96.6 | 96.8 | 97.0 | 97.2 | 97.4 | 97.6 | 97.8 |
| Refrigerating capacity ratio | % (relative to 410A) | 88.4 | 88.2 | 88.0 | 87.8 | 87.6 | 87.4 | 87.2 | 87.0 |
| Condensation glide | ° C. | 3.84 | 3.80 | 3.75 | 3.70 | 3.64 | 3.58 | 3.51 | 3.43 |
| Discharge pressure | % (relative to 410A) | 95.0 | 94.6 | 94.2 | 93.7 | 93.3 | 92.8 | 92.3 | 91.8 |
| RCL | g/m³ | 53.3 | 52.2 | 51.1 | 50.0 | 49.0 | 48.0 | 47.1 | 46.2 |

TABLE 32

| Item | Unit | Example 210 | Example 211 | Example 212 | Example 213 | Example 214 | Example 215 | Example 216 | Example 217 |
|---|---|---|---|---|---|---|---|---|---|
| HFO-1132(E) | mass % | 46.0 | 48.0 | 50.0 | 52.0 | 54.0 | 30.0 | 32.0 | 34.0 |
| HFO-1123 | mass % | 20.0 | 18.0 | 16.0 | 14.0 | 12.0 | 34.0 | 32.0 | 30.0 |
| R1234yf | mass % | 34.0 | 34.0 | 34.0 | 34.0 | 34.0 | 36.0 | 36.0 | 36.0 |
| GWP | — | 2 | 2 | 2 | 2 | 2 | 2 | 2 | 2 |
| COP ratio | % (relative to 410A) | 98.0 | 98.2 | 98.4 | 98.6 | 98.8 | 96.8 | 96.9 | 97.1 |
| Refrigerating capacity ratio | % (relative to 410A) | 86.7 | 86.5 | 86.2 | 85.9 | 85.6 | 87.2 | 87.0 | 86.8 |
| Condensation glide | ° C. | 3.36 | 3.27 | 3.18 | 3.08 | 2.97 | 4.08 | 4.03 | 3.97 |
| Discharge pressure | % (relative to 410A) | 91.3 | 90.8 | 90.3 | 89.7 | 89.2 | 93.4 | 93.0 | 92.6 |
| RCL | g/m³ | 45.3 | 44.5 | 43.7 | 42.9 | 42.2 | 53.2 | 52.1 | 51.0 |

TABLE 33

| Item | Unit | Example 218 | Example 219 | Example 220 | Example 221 | Example 222 | Example 223 | Example 224 | Example 225 |
|---|---|---|---|---|---|---|---|---|---|
| HFO-1132(E) | mass % | 36.0 | 38.0 | 40.0 | 42.0 | 44.0 | 46.0 | 30.0 | 32.0 |
| HFO-1123 | mass % | 28.0 | 26.0 | 24.0 | 22.0 | 20.0 | 18.0 | 32.0 | 30.0 |
| R1234yf | mass % | 36.0 | 36.0 | 36.0 | 36.0 | 36.0 | 36.0 | 38.0 | 38.0 |
| GWP | — | 2 | 2 | 2 | 2 | 2 | 2 | 2 | 2 |
| COP ratio | % (relative to 410A) | 97.3 | 97.5 | 97.7 | 97.9 | 98.1 | 98.3 | 97.1 | 97.2 |
| Refrigerating capacity ratio | % (relative to 410A) | 86.6 | 86.4 | 86.2 | 85.9 | 85.7 | 85.5 | 85.9 | 85.7 |
| Condensation glide | ° C. | 3.91 | 3.84 | 3.76 | 3.68 | 3.60 | 3.50 | 4.32 | 4.25 |

TABLE 33-continued

| Item | Unit | Example 218 | Example 219 | Example 220 | Example 221 | Example 222 | Example 223 | Example 224 | Example 225 |
|---|---|---|---|---|---|---|---|---|---|
| Discharge pressure | % (relative to 410A) | 92.1 | 91.7 | 91.2 | 90.7 | 90.3 | 89.8 | 91.9 | 91.4 |
| RCL | g/m³ | 49.9 | 48.9 | 47.9 | 47.0 | 46.1 | 45.3 | 53.1 | 52.0 |

TABLE 34

| Item | Unit | Example 226 | Example 227 |
|---|---|---|---|
| HFO-1132(E) | mass % | 34.0 | 36.0 |
| HFO-1123 | mass % | 28.0 | 26.0 |
| R1234yf | mass % | 38.0 | 38.0 |
| GWP | — | 2 | 2 |
| COP ratio | % (relative to 410A) | 97.4 | 97.6 |
| Refrigerating capacity ratio | % (relative to 410A) | 85.6 | 85.3 |
| Condensation glide | °C. | 4.18 | 4.11 |
| Discharge pressure | % (relative to 410A) | 91.0 | 90.6 |
| RCL | g/m³ | 50.9 | 49.8 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segment CO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$,
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines,
the refrigerant has a refrigerating capacity ratio of 85% or more relative to that of R410A,
and a COP of 92.5% or more relative to that of R410A.

The point on the line segment AA' was determined by obtaining an approximate curve connecting point A, Example 1, and point A' by the least square method.

The point on the line segment A'B was determined by obtaining an approximate curve connecting point A', Example 3, and point B by the least square method.

The point on the line segment DC' was determined by obtaining an approximate curve connecting point D, Example 6, and point C' by the least square method.

The point on the line segment C'C was determined by obtaining an approximate curve connecting point C', Example 4, and point C by the least square method.

Likewise, the results indicate that when coordinates (x,y,z) are within the range of a figure surrounded by line segments AA', A'B, BF, FT, TE, EO, and OA that connect the following 7 points:
point A (68.6, 0.0, 31.4),
point A' (30.6, 30.0, 39.4),
point B (0.0, 58.7, 41.3),
point F (0.0, 61.8, 38.2),
point T (35.8, 44.9, 19.3),
point E (58.0, 42.0, 0.0) and
point O (100.0, 0.0, 0.0), or on the above line segments (excluding the points on the line EO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$), and
the line segment TE is represented by coordinates (x, $0.00672x^2-0.7607x+63.525$, $-0.00672x^2-0.2393x+36.475$), and
the line segments BF, FO, and OA are straight lines,
the refrigerant has a refrigerating capacity ratio of 85% or more relative to that of R410A,
and a COP of 95% or more relative to that of R410A.

The point on the line segment FT was determined by obtaining an approximate curve connecting three points, i.e., points T, E', and F, by the least square method.

The point on the line segment TE was determined by obtaining an approximate curve connecting three points, i.e., points E, R, and T, by the least square method.

The results in Tables 1 to 34 clearly indicate that in a ternary composition diagram of the mixed refrigerant of HFO-1132(E), HFO-1123, and R1234yf in which the sum of these components is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below the line segment LM connecting point L (63.1, 31.9, 5.0) and point M (60.3, 6.2, 33.5), the refrigerant has an RCL of 40 g/m³ or more.

The results in Tables 1 to 34 clearly indicate that in a ternary composition diagram of the mixed refrigerant of HFO-1132(E), HFO-1123 and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment QR connecting point Q (62.8, 29.6, 7.6) and point R (49.8, 42.3, 7.9) or on the left side of the line segment, the refrigerant has a temperature glide of 1° C. or less.

The results in Tables 1 to 34 clearly indicate that in a ternary composition diagram of the mixed refrigerant of HFO-1132(E), HFO-1123, and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment ST connecting point S (62.6, 28.3, 9.1) and point T (35.8, 44.9, 19.3) or on the right side of the line segment, the refrigerant has a discharge pressure of 105% or less relative to that of 410A.

In these compositions, R1234yf contributes to reducing flammability, and suppressing deterioration of polymerization etc. Therefore, the composition preferably contains R1234yf.

Further, the burning velocity of these mixed refrigerants whose mixed formulations were adjusted to WCF concentrations was measured according to the ANSI/ASHRAE Standard 34-2013. Compositions having a burning velocity of 10 cm/s or less were determined to be classified as "Class 2L (lower flammability)."

A burning velocity test was performed using the apparatus shown in FIG. 1 in the following manner. In FIG. 1, reference numeral 901 refers to a sample cell, 902 refers to a high-speed camera, 903 refers to a xenon lamp, 904 refers to a collimating lens, 905 refers to a collimating lens, and 906 refers to a ring filter. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Each WCFF concentration was obtained by using the WCF concentration as the initial concentration and performing a leak simulation using NIST Standard Reference Database REFLEAK Version 4.0.

Tables 35 and 36 show the results.

TABLE 35

| Item | | Unit | G | H | I |
|---|---|---|---|---|---|
| WCF | HFO-1132(E) | mass % | 72.0 | 72.0 | 72.0 |
| | HFO-1123 | mass % | 28.0 | 9.6 | 0.0 |
| | R1234yf | mass % | 0.0 | 18.4 | 28.0 |
| Burning velocity (WCF) | | cm/s | 10 | 10 | 10 |

TABLE 36

| | Item | Unit | J | P | L | N | N' | K |
|---|---|---|---|---|---|---|---|---|
| WCF | HFO-1132(E) | mass % | 47.1 | 55.8 | 63.1 | 68.6 | 65.0 | 61.3 |
| | HFO-1123 | mass % | 52.9 | 42.0 | 31.9 | 16.3 | 7.7 | 5.4 |
| | R1234yf | mass % | 0.0 | 2.2 | 5.0 | 15.1 | 27.3 | 33.3 |
| | Leak condition that results in WCFF | | Storage/Shipping −40° C., 92% release, liquid phase side | Storage/Shipping −40° C., 90% release, liquid phase side | Storage/Shipping −40° C., 90% release, gas phase side | Storage/Shipping −40° C., 66% release, gas phase side | Storage/Shipping −40° C., 12% release, gas phase side | Storage/Shipping, −40° C., 0% release, gas phase side |
| WCFF | HFO-1132(E) | mass % | 72.0 | 72.0 | 72.0 | 72.0 | 72.0 | 72.0 |
| | HFO-1123 | mass % | 28.0 | 17.8 | 17.4 | 13.6 | 12.3 | 9.8 |
| | R1234yf | mass % | 0.0 | 10.2 | 10.6 | 14.4 | 15.7 | 18.2 |
| Burning velocity (WCF) | | cm/s | 8 or less | 8 or less | 8 or less | 9 | 9 | 8 or less |
| Burning velocity (WCFF) | | cm/s | 10 | 10 | 10 | 10 | 10 | 10 |

The results in Table 35 clearly indicate that when a mixed refrigerant of HFO-1132(E), HFO-1123, and R1234yf contains HFO-1132(E) in a proportion of 72.0 mass % or less based on their sum, the refrigerant can be determined to have a WCF lower flammability.

The results in Tables 36 clearly indicate that in a ternary composition diagram of a mixed refrigerant of HFO-1132 (E), HFO-1123, and R1234yf in which their sum is 100 mass %, and a line segment connecting a point (0.0, 100.0, 0.0) and a point (0.0, 0.0, 100.0) is the base, when coordinates (x,y,z) are on or below the line segments JP, PN, and NK connecting the following 6 points:

point J (47.1, 52.9, 0.0),
point P (55.8, 42.0, 2.2),
point L (63.1, 31.9, 5.0)
point N (68.6, 16.3, 15.1)
point N' (65.0, 7.7, 27.3) and
point K (61.3, 5.4, 33.3), the refrigerant can be determined to have a WCF lower flammability, and a WCFF lower flammability.

In the diagram, the line segment PN is represented by coordinates (x, $-0.1135x^2+12.112x-280.43$, $0.1135x^2-13.112x+380.43$), and the line segment NK is represented by coordinates (x, $0.2421x^2-29.955x+931.91$, $-0.2421x^2+28.955x-831.91$).

The point on the line segment PN was determined by obtaining an approximate curve connecting three points, i.e., points P, L, and N, by the least square method.

The point on the line segment NK was determined by obtaining an approximate curve connecting three points, i.e., points N, N', and K, by the least square method.

(5-2) Refrigerant B

The refrigerant B according to the present disclosure is
a mixed refrigerant comprising trans-1,2-difluoroethylene (HFO-1132(E)) and trifluoroethylene (HFO-1123) in a total amount of 99.5 mass % or more based on the entire refrigerant, and the refrigerant comprising 62.0 mass % to 72.0 mass % or 45.1 mass % to 47.1 mass % of HFO-1132 (E) based on the entire refrigerant, or a mixed refrigerant comprising HFO-1132(E) and HFO-1123 in a total amount of 99.5 mass % or more based on the entire refrigerant, and the refrigerant comprising 45.1 mass % to 47.1 mass % of HFO-1132(E) based on the entire refrigerant.

The refrigerant B according to the present disclosure has various properties that are desirable as an R410A-alternative refrigerant, i.e., (1) a coefficient of performance equivalent to that of R410A, (2) a refrigerating capacity equivalent to that of R410A, (3) a sufficiently low GWP, and (4) a lower flammability (Class 2L) according to the ASHRAE standard.

When the refrigerant B according to the present disclosure is a mixed refrigerant comprising 72.0 mass % or less of HFO-1132(E), it has WCF lower flammability. When the refrigerant B according to the present disclosure is a composition comprising 47.1% or less of HFO-1132(E), it has WCF lower flammability and WCFF lower flammability, and is determined to be "Class 2L," which is a lower flammable refrigerant according to the ASHRAE standard, and which is further easier to handle.

When the refrigerant B according to the present disclosure comprises 62.0 mass % or more of HFO-1132(E), it becomes superior with a coefficient of performance of 95% or more relative to that of R410A, the polymerization reaction of HFO-1132(E) and/or HFO-1123 is further suppressed, and the stability is further improved. When the refrigerant B according to the present disclosure comprises 45.1 mass % or more of HFO-1132(E), it becomes superior with a coefficient of performance of 93% or more relative to that of R410A, the polymerization reaction of HFO-1132(E) and/or HFO-1123 is further suppressed, and the stability is further improved.

The refrigerant B according to the present disclosure may further comprise other additional refrigerants in addition to HFO-1132(E) and HFO-1123, as long as the above properties and effects are not impaired. In this respect, the refrigerant according to the present disclosure preferably comprises HFO-1132(E) and HFO-1123 in a total amount of 99.75 mass % or more, and more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

Examples of Refrigerant B

The present disclosure is described in more detail below with reference to Examples of refrigerant B. However, the refrigerant B is not limited to the Examples.

Mixed refrigerants were prepared by mixing HFO-1132 (E) and HFO-1123 at mass % based on their sum shown in Tables 37 and 38.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in WO2015/141678). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 5° C.
Condensation temperature: 45° C.
Superheating temperature: 5 K
Subcooling temperature: 5 K
Compressor efficiency: 70%

The composition of each mixture was defined as WCF. A leak simulation was performed using NIST Standard Reference Data Base Refleak Version 4.0 under the conditions of Equipment, Storage, Shipping, Leak, and Recharge according to the ASHRAE Standard 34-2013. The most flammable fraction was defined as WCFF.

Tables 1 and 2 show GWP, COP, and refrigerating capacity, which were calculated based on these results. The COP and refrigerating capacity are ratios relative to R410A.

The coefficient of performance (COP) was determined by the following formula.

COP=(refrigerating capacity or heating capacity)/power consumption

For the flammability, the burning velocity was measured according to the ANSI/ASHRAE Standard 34-2013. Both WCF and WCFF having a burning velocity of 10 cm/s or less were determined to be "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 37

| Item | Unit | Comparative Example 1 R410A | Comparative Example 2 HFO-1132E | Comparative Example 3 | Example 1 | Example 2 | Example 3 | Example 4 | Example 5 | Comparative Example 4 |
|---|---|---|---|---|---|---|---|---|---|---|
| HFO-1132E (WCF) | mass % | — | 100 | 80 | 72 | 70 | 68 | 65 | 62 | 60 |
| HFO-1123 (WCF) | mass % |  | 0 | 20 | 28 | 30 | 32 | 35 | 38 | 40 |
| GWP | — | 2088 | 1 | 1 | 1 | 1 | 1 | 1 | 1 | 1 |
| COP ratio | % (relative to R410A) | 100 | 99.7 | 97.5 | 96.6 | 96.3 | 96.1 | 95.8 | 95.4 | 95.2 |
| Refrigerating capacity ratio | % (relative to R410A) | 100 | 98.3 | 101.9 | 103.1 | 103.4 | 103.8 | 104.1 | 104.5 | 104.8 |
| Discharge pressure | Mpa | 2.73 | 2.71 | 2.89 | 2.96 | 2.98 | 3.00 | 3.02 | 3.04 | 3.06 |
| Burning velocity (WCF) | cm/sec | Non-flammable | 20 | 13 | 10 | 9 | 9 | 8 | 8 or less | 8 or less |

TABLE 38

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| HFO-1132E (WCF) | mass % | 50 | 48 | 47.1 | 46.1 | 45.1 | 43 | 40 | 25 | 0 |
| HFO-1123 (WCF) | mass % | 50 | 52 | 52.9 | 53.9 | 54.9 | 57 | 60 | 75 | 100 |
| GWP | — | 1 | 1 | 1 | 1 | 1 | 1 | 1 | 1 | 1 |
| COP ratio | % (relative to R410A) | 94.1 | 93.9 | 93.8 | 93.7 | 93.6 | 93.4 | 93.1 | 91.9 | 90.6 |
| Refrigerating capacity ratio | % (relative to R410A) | 105.9 | 106.1 | 106.2 | 106.3 | 106.4 | 106.6 | 106.9 | 107.9 | 108.0 |
| Discharge pressure | Mpa | 3.14 | 3.16 | 3.16 | 3.17 | 3.18 | 3.20 | 3.21 | 3.31 | 3.39 |
| Leakage test conditions (WCFF) |  | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 90% release, liquid phase side | — |
| HFO-1132E (WCFF) | mass % | 74 | 73 | 72 | 71 | 70 | 67 | 63 | 38 | — |
| HFO-1123 (WCFF) | mass % | 26 | 27 | 28 | 29 | 30 | 33 | 37 | 62 |  |
| Burning velocity (WCF) | cm/sec | 8 or less | 8 or less | 8 or less | 8 or less | 8 or less | 8 or less | 8 or less | 8 or less | 5 |
| Burning velocity (WCFF) | cm/sec | 11 | 10.5 | 10.0 | 9.5 | 9.5 | 8.5 | 8 or less | 8 or less |  |
| ASHRAE flammability classification |  | 2 | 2 | 2 L | 2 L | 2 L | 2 L | 2 L | 2 L | 2 L |

The compositions each comprising 62.0 mass % to 72.0 mass % of HFO-1132(E) based on the entire composition are stable while having a low GWP (GWP=1), and they ensure WCF lower flammability. Further, surprisingly, they can ensure performance equivalent to that of R410A. Moreover, compositions each comprising 45.1 mass % to 47.1 mass % of HFO-1132(E) based on the entire composition are stable while having a low GWP (GWP=1), and they ensure WCFF lower flammability. Further, surprisingly, they can ensure performance equivalent to that of R410A.

(5-3) Refrigerant C

The refrigerant C according to the present disclosure is a composition comprising trans-1,2-difluoroethylene (HFO-1132(E)), trifluoroethylene (HFO-1123), 2,3,3,3-tetrafluoro-1-propene (R1234yf), and difluoromethane (R32), and satisfies the following requirements. The refrigerant C according to the present disclosure has various properties that are desirable as an alternative refrigerant for R410A; i.e. it has a coefficient of performance and a refrigerating capacity that are equivalent to those of R410A, and a sufficiently low GWP.

Requirements

Preferable refrigerant C is as follows:

When the mass % of HFO-1132(E), HFO-1123, R1234yf, and R32 based on their sum is respectively represented by x, y, z, and a, if $0<a\leq11.1$, coordinates (x,y,z) in a ternary composition diagram in which the sum of HFO-1132(E), HFO-1123, and R1234yf is (100-a) mass % are within the range of a figure surrounded by straight lines GI, IA, AB, BD', D'C, and CG that connect the following 6 points:

point G ($0.026a^2-1.7478a+72.0$, $-0.026a^2+0.7478a+28.0$, 0.0), point I ($0.026a^2-1.7478a+72.0$, 0.0, $-0.026a^2+0.7478a+28.0$), point A ($0.0134a^2-1.9681a+68.6$, 0.0, $-0.0134a^2+0.9681a+31.4$), point B (0.0, $0.0144a^2-1.6377a+58.7$, $-0.0144a^2+0.6377a+41.3$), point D' (0.0, $0.0224a^2+0.968a+75.4$, $-0.0224a^2-1.968a+24.6$), and point C ($-0.2304a^2-0.4062a+32.9$, $0.2304a^2-0.5938a+67.1$, 0.0), or on the straight lines GI, AB, and D'C (excluding point G, point I, point A, point B, point D', and point C);

if $11.1<a\leq18.2$, coordinates (x,y,z) in the ternary composition diagram are within the range of a figure surrounded by straight lines GI, IA, AB, BW, and WG that connect the following 5 points:

point G ($0.02a^2-1.6013a+71.105$, $-0.02a^2+0.6013a+28.895$, 0.0), point I ($0.02a^2-1.6013a+71.105$, 0.0, $-0.02a^2+0.6013a+28.895$), point A ($0.0112a^2-1.9337a+68.484$, 0.0, $-0.0112a^2+0.9337a+31.516$), point B (0.0, $0.0075a^2-1.5156a+58.199$, $-0.0075a^2+0.5156a+41.801$) and point W (0.0, 100.0-a, 0.0), or on the straight lines GI and AB (excluding point G, point I, point A, point B, and point W);

if $18.2<a\leq26.7$, coordinates (x,y,z) in the ternary composition diagram are within the range of a figure surrounded by straight lines GI, IA, AB, BW, and WG that connect the following 5 points:

point G ($0.0135a^2-1.4068a+69.727$, $-0.0135a^2+0.4068a+30.273$, 0.0), point I ($0.0135a^2-1.4068a+69.727$, 0.0, $-0.0135a^2+0.4068a+30.273$), point A ($0.0107a^2-1.9142a+68.305$, 0.0, $-0.0107a^2+0.9142a+31.695$), point B (0.0, $0.009a^2-1.6045a+59.318$, $-0.009a^2+0.6045a+40.682$) and point W (0.0, 100.0-a, 0.0), or on the straight lines GI and AB (excluding point G, point I, point A, point B, and point W);

if $26.7<a\leq36.7$, coordinates (x,y,z) in the ternary composition diagram are within the range of a figure surrounded by straight lines GI, IA, AB, BW, and WG that connect the following 5 points:

point G ($0.0111a^2-1.3152a+68.986$, $-0.0111a^2+0.3152a+31.014$, 0.0), point I ($0.0111a^2-1.3152a+68.986$, 0.0, $-0.0111a^2+0.3152a+31.014$), point A ($0.0103a^2-1.9225a+68.793$, 0.0, $-0.0103a^2+0.9225a+31.207$), point B (0.0, $0.0046a^2-1.41a+57.286$, $-0.0046a^2+0.41a+42.714$) and point W (0.0, 100.0-a, 0.0), or on the straight lines GI and AB (excluding point G, point I, point A, point B, and point W); and if $36.7<a\leq46.7$, coordinates (x,y,z) in the ternary composition diagram are within the range of a figure surrounded by straight lines GI, IA, AB, BW, and WG that connect the following 5 points:

point G ($0.0061a^2-0.9918a+63.902$, $-0.0061a^2-0.0082a+36.098$, 0.0), point I ($0.0061a^2-0.9918a+63.902$, 0.0, $-0.0061a^2-0.0082a+36.098$), point A ($0.0085a^2-1.8102a+67.1$, 0.0, $-0.0085a^2+0.8102a+32.9$), point B (0.0, $0.0012a^2-1.1659a+52.95$, $-0.0012a^2+0.1659a+47.05$) and point W (0.0, 100.0-a, 0.0), or on the straight lines GI and AB (excluding point G, point I, point A, point B, and point W). When the refrigerant according to the present disclosure satisfies the above requirements, it has a refrigerating capacity ratio of 85% or more relative to that of R410A, and a COP ratio of 92.5% or more relative to that of R410A, and further ensures a WCF lower flammability.

The refrigerant C according to the present disclosure is preferably a refrigerant wherein when the mass % of HFO-1132(E), HFO-1123, and R1234yf based on their sum is respectively represented by x, y, and z, if $0<a\leq11.1$, coordinates (x,y,z) in a ternary composition diagram in which the sum of HFO-1132(E), HFO-1123, and R1234yf is (100-a) mass % are within the range of a figure surrounded by straight lines JK', K'B, BD', D'C, and CJ that connect the following 5 points:

point J ($0.0049a^2-0.9645a+47.1$, $-0.0049a^2-0.0355a+52.9$, 0.0), point K' ($0.0514a^2-2.4353a+61.7$, $-0.0323a^2+0.4122a+5.9$, $-0.0191a^2+1.0231a+32.4$), point B (0.0, $0.0144a^2-1.6377a+58.7$, $-0.0144a^2+0.6377a+41.3$), point D' (0.0, $0.0224a^2+0.968a+75.4$, $-0.0224a^2-1.968a+24.6$), and point C ($-0.2304a^2-0.4062a+32.9$, $0.2304a^2-0.5938a+67.1$, 0.0), or on the straight lines JK', K'B, and D'C (excluding point J, point B, point D', and point C);

if $11.1<a\leq18.2$, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$) and
point W (0.0, 100.0−a, 0.0),
or on the straight lines JK' and K'B (excluding point J, point B, and point W);

if $18.2<a\leq26.7$, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$) and
point W (0.0, 100.0−a, 0.0),
or on the straight lines JK' and K'B (excluding point J, point B, and point W);

if $26.7<a\leq36.7$, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$) and
point W (0.0, 100.0−a, 0.0),
or on the straight lines JK', K'A, and AB (excluding point J, point B, and point W); and if $36.7<a\leq46.7$, coordinates (x,y,z) in the ternary composition diagram are within the range of a figure surrounded by straight lines JK', K'A, AB, BW, and WJ that connect the following 5 points:
point J ($-0.0134a^2+1.0956a+7.13$, $0.0134a^2-2.0956a+92.87$, 0.0),
point K' ($-0.1892a+29.443$, 0.0, $-0.8108a+70.557$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$) and
point W (0.0, 100.0−a, 0.0),
or on the straight lines JK', K'A, and AB (excluding point J, point B, and point W). When the refrigerant according to the present disclosure satisfies the above requirements, it has a refrigerating capacity ratio of 85% or more relative to that of R410A, and a COP ratio of 92.5% or more relative to that of R410A. Additionally, the refrigerant has a WCF lower flammability and a WCFF lower flammability, and is classified as "Class 2L," which is a lower flammable refrigerant according to the ASHRAE standard.

When the refrigerant C according to the present disclosure further contains R32 in addition to HFO-1132 (E), HFO-1123, and R1234yf, the refrigerant may be a refrigerant wherein when the mass % of HFO-1132(E), HFO-1123, R1234yf, and R32 based on their sum is respectively represented by x, y, z, and a, if $0<a\leq10.0$, coordinates (x,y,z) in a ternary composition diagram in which the sum of HFO-1132(E), HFO-1123, and R1234yf is (100-a) mass % are within the range of a figure surrounded by straight lines that connect the following 4 points:
point a ($0.02a^2-2.46a+93.4$, 0, $-0.02a^2+2.46a+6.6$),
point b' ($-0.008a^2-1.38a+56$, $0.018a^2-0.53a+26.3$, $-0.01a^2+1.91a+17.7$),
point c ($-0.016a^2+1.02a+77.6$, $0.016a^2-1.02a+22.4$, 0), and
point o (100.0−a, 0.0, 0.0)
or on the straight lines oa, ab', and b'c (excluding point o and point c);

if $10.0<a\leq16.5$, coordinates (x,y,z) in the ternary composition diagram are within the range of a figure surrounded by straight lines that connect the following 4 points:
point a ($0.0244a^2-2.5695a+94.056$, 0, $-0.0244a^2+2.5695a+5.944$),
point b' ($0.1161a^2-1.9959a+59.749$, $0.014a^2-0.3399a+24.8$, $-0.1301a^2+2.3358a+15.451$),
point c ($-0.0161a^2+1.02a+77.6$, $0.0161a^2-1.02a+22.4$, 0), and
point o (100.0−a, 0.0, 0.0),
or on the straight lines oa, ab', and b'c (excluding point o and point c); or if $16.5<a\leq21.8$, coordinates (x,y,z) in the ternary composition diagram are within the range of a figure surrounded by straight lines that connect the following 4 points:
point a ($0.0161a^2-2.3535a+92.742$, 0, $-0.0161a^2+2.3535a+7.258$),
point b' ($-0.0435a^2-0.0435a+50.406$, $0.0304a^2+1.8991a-0.0661$, $0.0739a^2-1.8556a+49.6601$),
point c ($-0.0161a^2+0.9959a+77.851$, $0.0161a^2-0.9959a+22.149$, 0), and
point o (100.0−a, 0.0, 0.0),
or on the straight lines oa, ab', and b'c (excluding point o and point c). Note that when point b in the ternary composition diagram is defined as a point where a refrigerating capacity ratio of 95% relative to that of R410A and a COP ratio of 95% relative to that of R410A are both achieved, point b' is the intersection of straight line ab and an approximate line formed by connecting the points where the COP ratio relative to that of R410A is 95%. When the refrigerant according to the present disclosure meets the above requirements, the refrigerant has a refrigerating capacity ratio of 95% or more relative to that of R410A, and a COP ratio of 95% or more relative to that of R410A.

The refrigerant C according to the present disclosure may further comprise other additional refrigerants in addition to HFO-1132(E), HFO-1123, R1234yf, and R32 as long as the above properties and effects are not impaired. In this respect, the refrigerant according to the present disclosure preferably comprises HFO-1132(E), HFO-1123, R1234yf, and R32 in a total amount of 99.5 mass % or more, more preferably 99.75 mass % or more, and still more preferably 99.9 mass % or more, based on the entire refrigerant.

The refrigerant C according to the present disclosure may comprise HFO-1132(E), HFO-1123, R1234yf, and R32 in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

Examples of Refrigerant C

The present disclosure is described in more detail below with reference to Examples of refrigerant C. However, the refrigerant C is not limited to the Examples.

Mixed refrigerants were prepared by mixing HFO-1132 (E), HFO-1123, R1234yf, and R32 at mass % based on their sum shown in Tables 39 to 96.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in WO2015/141678). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

For each of these mixed refrigerants, the COP ratio and the refrigerating capacity ratio relative to those of R410 were obtained. Calculation was conducted under the following conditions.

Evaporating temperature: 5° C.
Condensation temperature: 45° C.
Superheating temperature: 5 K
Subcooling temperature: 5 K
Compressor efficiency: 70%

Tables 39 to 96 show the resulting values together with the GWP of each mixed refrigerant. The COP and refrigerating capacity are ratios relative to R410A.

The coefficient of performance (COP) was determined by the following formula.

$$\text{COP} = \text{(refrigerating capacity or heating capacity)} / \text{power consumption}$$

TABLE 39

| Item | Unit | Comp. Ex. 1 | Comp. Ex. 2 A | Comp. Ex. 3 B | Comp. Ex. 4 C | Comp. Ex. 5 D' | Comp. Ex. 6 G | Comp. Ex. 7 I | Comp. Ex. 8 J | Ex. 1 K' |
|---|---|---|---|---|---|---|---|---|---|---|
| HFO-1132(E) | Mass % | R410A | 68.6 | 0.0 | 32.9 | 0.0 | 72.0 | 72.0 | 47.1 | 61.7 |
| HFO-1123 | Mass % | | 0.0 | 58.7 | 67.1 | 75.4 | 28.0 | 0.0 | 52.9 | 5.9 |
| R1234yf | Mass % | | 31.4 | 41.3 | 0.0 | 24.6 | 0.0 | 28.0 | 0.0 | 32.4 |
| R32 | Mass % | | 0.0 | 0.0 | 0.0 | 0.0 | 0.0 | 0.0 | 0.0 | 0.0 |
| GWP | — | 2088 | 2 | 2 | 1 | 2 | 1 | 2 | 1 | 2 |
| COP ratio | % (relative to R410A) | 100 | 100.0 | 95.5 | 92.5 | 93.1 | 96.6 | 99.9 | 93.8 | 99.4 |
| Refrigerating capacity ratio | % (relative to R410A) | 100 | 85.0 | 85.0 | 107.4 | 95.0 | 103.1 | 86.6 | 106.2 | 85.5 |

TABLE 40

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| HFO-1132(E) | Mass % | 55.3 | 0.0 | 18.4 | 0.0 | 60.9 | 60.9 | 40.5 | 47.0 |
| HFO-1123 | Mass % | 0.0 | 47.8 | 74.5 | 83.4 | 32.0 | 0.0 | 52.4 | 7.2 |
| R1234yf | Mass % | 37.6 | 45.1 | 0.0 | 9.5 | 0.0 | 32.0 | 0.0 | 38.7 |
| R32 | Mass % | 7.1 | 7.1 | 7.1 | 7.1 | 7.1 | 7.1 | 7.1 | 7.1 |
| GWP | — | 50 | 50 | 49 | 49 | 49 | 50 | 49 | 50 |
| COP ratio | % (relative to R410A) | 99.8 | 96.9 | 92.5 | 92.5 | 95.9 | 99.6 | 94.0 | 99.2 |
| Refrigerating capacity ratio | % (relative to R410A) | 85.0 | 85.0 | 110.5 | 106.0 | 106.5 | 87.7 | 108.9 | 85.5 |

TABLE 41

| Item | Unit | Comp. Ex. 16 A | Comp. Ex. 17 B | Comp. Ex. 18 C = D' | Comp. Ex. 19 G | Comp. Ex. 20 I | Comp. Ex. 21 J | Ex. 3 K' |
|---|---|---|---|---|---|---|---|---|
| HFO-1132(E) | Mass % | 48.4 | 0.0 | 0.0 | 55.8 | 55.8 | 37.0 | 41.0 |
| HFO-1123 | Mass % | 0.0 | 42.3 | 88.9 | 33.1 | 0.0 | 51.9 | 6.5 |
| R1234yf | Mass % | 40.5 | 46.6 | 0.0 | 0.0 | 33.1 | 0.0 | 41.4 |
| R32 | Mass % | 11.1 | 11.1 | 11.1 | 11.1 | 11.1 | 11.1 | 11.1 |

TABLE 41-continued

| Item | Unit | Comp. Ex. 16 A | Comp. Ex. 17 B | Comp. Ex. 18 C = D' | Comp. Ex. 19 G | Comp. Ex. 20 I | Comp. Ex. 21 J | Ex. 3 K' |
|---|---|---|---|---|---|---|---|---|
| GWP | — | 77 | 77 | 76 | 76 | 77 | 76 | 77 |
| COP ratio | % (relative to R410A) | 99.8 | 97.6 | 92.5 | 95.8 | 99.5 | 94.2 | 99.3 |
| Refrigerating capacity ratio | % (relative to R410A) | 85.0 | 85.0 | 112.0 | 108.0 | 88.6 | 110.2 | 85.4 |

TABLE 42

| Item | Unit | Comp. Ex. 22 A | Comp. Ex. 23 B | Comp. Ex. 24 G | Comp. Ex. 25 I | Comp. Ex. 26 J | Ex. 4 K' |
|---|---|---|---|---|---|---|---|
| HFO-1132(E) | Mass % | 42.8 | 0.0 | 52.1 | 52.1 | 34.3 | 36.5 |
| HFO-1123 | Mass % | 0.0 | 37.8 | 33.4 | 0.0 | 51.2 | 5.6 |
| R1234yf | Mass % | 42.7 | 47.7 | 0.0 | 33.4 | 0.0 | 43.4 |
| R32 | Mass % | 14.5 | 14.5 | 14.5 | 14.5 | 14.5 | 14.5 |
| GWP | — | 100 | 100 | 99 | 100 | 99 | 100 |
| COP ratio | % (relative to R410A) | 99.9 | 98.1 | 95.8 | 99.5 | 94.4 | 99.5 |
| Refrigerating capacity ratio | % (relative to R410A) | 85.0 | 85.0 | 109.1 | 89.6 | 111.1 | 85.3 |

TABLE 43

| Item | Unit | Comp. Ex. 27 A | Comp. Ex. 28 B | Comp. Ex. 29 G | Comp. Ex. 30 I | Comp. Ex. 31 J | Ex. 5 K' |
|---|---|---|---|---|---|---|---|
| HFO-1132(E) | Mass % | 37.0 | 0.0 | 48.6 | 48.6 | 32.0 | 32.5 |
| HFO-1123 | Mass % | 0.0 | 33.1 | 33.2 | 0.0 | 49.8 | 4.0 |
| R1234yf | Mass % | 44.8 | 48.7 | 0.0 | 33.2 | 0.0 | 45.3 |
| R32 | Mass % | 18.2 | 18.2 | 18.2 | 18.2 | 18.2 | 18.2 |
| GWP | — | 125 | 125 | 124 | 125 | 124 | 125 |
| COP ratio | % (relative to R410A) | 100.0 | 98.6 | 95.9 | 99.4 | 94.7 | 99.8 |
| Refrigerating capacity ratio | % (relative to R410A) | 85.0 | 85.0 | 110.1 | 90.8 | 111.9 | 85.2 |

TABLE 44

| Item | Unit | Comp. Ex. 32 A | Comp. Ex. 33 B | Comp. Ex. 34 G | Comp. Ex. 35 I | Comp. Ex. 36 J | Ex. 6 K' |
|---|---|---|---|---|---|---|---|
| HFO-1132(E) | Mass % | 31.5 | 0.0 | 45.4 | 45.4 | 30.3 | 28.8 |
| HFO-1123 | Mass % | 0.0 | 28.5 | 32.7 | 0.0 | 47.8 | 2.4 |
| R1234yf | Mass % | 46.6 | 49.6 | 0.0 | 32.7 | 0.0 | 46.9 |
| R32 | Mass % | 21.9 | 21.9 | 21.9 | 21.9 | 21.9 | 21.9 |
| GWP | — | 150 | 150 | 149 | 150 | 149 | 150 |
| COP ratio | % (relative to R410A) | 100.2 | 99.1 | 96.0 | 99.4 | 95.1 | 100.0 |
| Refrigerating capacity ratio | % (relative to R410A) | 85.0 | 85.0 | 111.0 | 92.1 | 112.6 | 85.1 |

TABLE 45

| Item | Unit | Comp. Ex. 37 A | Comp. Ex. 38 B | Comp. Ex. 39 G | Comp. Ex. 40 I | Comp. Ex. 41 J | Comp. Ex. 42 K' |
|---|---|---|---|---|---|---|---|
| HFO-1132(E) | Mass % | 24.8 | 0.0 | 41.8 | 41.8 | 29.1 | 24.8 |
| HFO-1123 | Mass % | 0.0 | 22.9 | 31.5 | 0.0 | 44.2 | 0.0 |
| R1234yf | Mass % | 48.5 | 50.4 | 0.0 | 31.5 | 0.0 | 48.5 |
| R32 | Mass % | 26.7 | 26.7 | 26.7 | 26.7 | 26.7 | 26.7 |
| GWP | — | 182 | 182 | 181 | 182 | 181 | 182 |
| COP ratio | % (relative to R410A) | 100.4 | 99.8 | 96.3 | 99.4 | 95.6 | 100.4 |
| Refrigerating capacity ratio | % (relative to R410A) | 85.0 | 85.0 | 111.9 | 93.8 | 113.2 | 85.0 |

TABLE 46

| Item | Unit | Comp. Ex. 43 A | Comp. Ex. 44 B | Comp. Ex. 45 G | Comp. Ex. 46 I | Comp. Ex. 47 J | Comp. Ex. 48 K' |
|---|---|---|---|---|---|---|---|
| HFO-1132(E) | Mass % | 21.3 | 0.0 | 40.0 | 40.0 | 28.8 | 24.3 |
| HFO-1123 | Mass % | 0.0 | 19.9 | 30.7 | 0.0 | 41.9 | 0.0 |
| R1234yf | Mass % | 49.4 | 50.8 | 0.0 | 30.7 | 0.0 | 46.4 |
| R32 | Mass % | 29.3 | 29.3 | 29.3 | 29.3 | 29.3 | 29.3 |
| GWP | — | 200 | 200 | 198 | 199 | 198 | 200 |
| COP ratio | % (relative to R410A) | 100.6 | 100.1 | 96.6 | 99.5 | 96.1 | 100.4 |
| Refrigerating capacity ratio | % (relative to R410A) | 85.0 | 85.0 | 112.4 | 94.8 | 113.6 | 86.7 |

TABLE 47

| Item | Unit | Comp. Ex. 49 A | Comp. Ex. 50 B | Comp. Ex. 51 G | Comp. Ex. 52 I | Comp. Ex. 53 J | Comp. Ex. 54 K' |
|---|---|---|---|---|---|---|---|
| HFO-1132(E) | Mass % | 12.1 | 0.0 | 35.7 | 35.7 | 29.3 | 22.5 |
| HFO-1123 | Mass % | 0.0 | 11.7 | 27.6 | 0.0 | 34.0 | 0.0 |
| R1234yf | Mass % | 51.2 | 51.6 | 0.0 | 27.6 | 0.0 | 40.8 |
| R32 | Mass % | 36.7 | 36.7 | 36.7 | 36.7 | 36.7 | 36.7 |
| GWP | — | 250 | 250 | 248 | 249 | 248 | 250 |
| COP ratio | %(relative to R410A) | 101.2 | 101.0 | 96.4 | 99.6 | 97.0 | 100.4 |
| Refrigerating capacity ratio | % (relative to R410A) | 85.0 | 85.0 | 113.2 | 97.6 | 113.9 | 90.9 |

TABLE 48

| Item | Unit | Comp. Ex. 55 A | Comp. Ex. 56 B | Comp. Ex. 57 G | Comp. Ex. 58 I | Comp. Ex. 59 J | Comp. Ex. 60 K' |
|---|---|---|---|---|---|---|---|
| HFO-1132(E) | Mass % | 3.8 | 0.0 | 32.0 | 32.0 | 29.4 | 21.1 |
| HFO-1123 | Mass % | 0.0 | 3.9 | 23.9 | 0.0 | 26.5 | 0.0 |
| R1234yf | Mass % | 52.1 | 52.0 | 0.0 | 23.9 | 0.0 | 34.8 |
| R32 | Mass % | 44.1 | 44.1 | 44.1 | 44.1 | 44.1 | 44.1 |
| GWP | — | 300 | 300 | 298 | 299 | 298 | 299 |
| COP ratio | % (relative to R410A) | 101.8 | 101.8 | 97.9 | 99.8 | 97.8 | 100.5 |
| Refrigerating capacity ratio | % (relative to R410A) | 85.0 | 85.0 | 113.7 | 100.4 | 113.9 | 94.9 |

TABLE 49

| Item | Unit | Comp. Ex. 61 A = B | Comp. Ex. 62 G | Comp. Ex. 63 I | Comp. Ex. 64 J | Comp. Ex. 65 K' |
|---|---|---|---|---|---|---|
| HFO-1132(E) | Mass % | 0.0 | 30.4 | 30.4 | 28.9 | 20.4 |
| HFO-1123 | Mass % | 0.0 | 21.8 | 0.0 | 23.3 | 0.0 |
| R1234yf | Mass % | 52.2 | 0.0 | 21.8 | 0.0 | 31.8 |
| R32 | Mass % | 47.8 | 47.8 | 47.8 | 47.8 | 47.8 |
| GWP | — | 325 | 323 | 324 | 323 | 324 |
| COP ratio | % (relative to R410A) | 102.1 | 98.2 | 100.0 | 98.2 | 100.6 |
| Refrigerating capacity ratio | % (relative to R410A) | 85.0 | 113.8 | 101.8 | 113.9 | 96.8 |

TABLE 50

| Item | Unit | Comp. Ex. 66 | Ex. 7 | Ex. 8 | Ex. 9 | Ex. 10 | Ex. 11 | Ex. 12 | Ex. 13 |
|---|---|---|---|---|---|---|---|---|---|
| HFO-1132(E) | Mass % | 5.0 | 10.0 | 15.0 | 20.0 | 25.0 | 30.0 | 35.0 | 40.0 |
| HFO-1123 | Mass % | 82.9 | 77.9 | 72.9 | 67.9 | 62.9 | 57.9 | 52.9 | 47.9 |
| R1234yf | Mass % | 5.0 | 5.0 | 5.0 | 5.0 | 5.0 | 5.0 | 5.0 | 5.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 92.4 | 92.6 | 92.8 | 93.1 | 93.4 | 93.7 | 94.1 | 94.5 |
| Refrigerating capacity ratio | % (relative to R410A) | 108.4 | 108.3 | 108.2 | 107.9 | 107.6 | 107.2 | 106.8 | 106.3 |

TABLE 51

| Item | Unit | Ex. 14 | Ex. 15 | Ex. 16 | Ex. 17 | Comp. Ex. 67 | Ex. 18 | Ex. 19 | Ex. 20 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 42.9 | 37.9 | 32.9 | 27.9 | 22.9 | 72.9 | 67.9 | 62.9 |
| R1234yf | Mass % | 5.0 | 5.0 | 5.0 | 5.0 | 5.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.4 | 95.9 | 96.4 | 96.9 | 93.0 | 93.3 | 93.6 |
| Refrigerating capacity ratio | % (relative to R410A) | 105.8 | 105.2 | 104.5 | 103.9 | 103.1 | 105.7 | 105.5 | 105.2 |

TABLE 52

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 57.9 | 52.9 | 47.9 | 42.9 | 37.9 | 32.9 | 27.9 | 22.9 |
| R1234yf | Mass % | 10.0 | 10.0 | 10.0 | 10.0 | 10.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 93.9 | 94.2 | 94.6 | 95.0 | 95.5 | 96.0 | 96.4 | 96.9 |
| Refrigerating capacity ratio | % (relative to R410A) | 104.9 | 104.5 | 104.1 | 103.6 | 103.0 | 102.4 | 101.7 | 101.0 |

TABLE 53

| Item | Unit | Comp. Ex. 68 | Ex. 29 | Ex. 30 | Ex. 31 | Ex. 32 | Ex. 33 | Ex. 34 | Ex. 35 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 17.9 | 67.9 | 62.9 | 57.9 | 52.9 | 47.9 | 42.9 | 37.9 |
| R1234yf | Mass % | 10.0 | 15.0 | 15.0 | 15.0 | 15.0 | 15.0 | 15.0 | 15.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 97.4 | 93.5 | 93.8 | 94.1 | 94.4 | 94.8 | 95.2 | 95.6 |
| Refrigerating capacity ratio | % (relative to R410A) | 100.3 | 102.9 | 102.7 | 102.5 | 102.1 | 101.7 | 101.2 | 100.7 |

TABLE 54

| Item | Unit | Ex. 36 | Ex. 37 | Ex. 38 | Ex. 39 | Comp. Ex. 69 | Ex. 40 | Ex. 41 | Ex. 42 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 32.9 | 27.9 | 22.9 | 17.9 | 12.9 | 62.9 | 57.9 | 52.9 |
| R1234yf | Mass % | 15.0 | 15.0 | 15.0 | 15.0 | 15.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 96.0 | 96.5 | 97.0 | 97.5 | 98.0 | 94.0 | 94.3 | 94.6 |
| Refrigerating capacity ratio | % (relative to R410A) | 100.1 | 99.5 | 98.9 | 98.1 | 97.4 | 100.1 | 99.9 | 99.6 |

TABLE 55

| Item | Unit | Ex. 43 | Ex. 44 | Ex. 45 | Ex. 46 | Ex. 47 | Ex. 48 | Ex. 49 | Ex. 50 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 47.9 | 42.9 | 37.9 | 32.9 | 27.9 | 22.9 | 17.9 | 12.9 |
| R1234yf | Mass % | 20.0 | 20.0 | 20.0 | 20.0 | 20.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.3 | 95.7 | 96.2 | 96.6 | 97.1 | 97.6 | 98.1 |
| Refrigerating capacity ratio | % (relative to R410A) | 99.2 | 98.8 | 98.3 | 97.8 | 97.2 | 96.6 | 95.9 | 95.2 |

TABLE 56

| Item | Unit | Comp. Ex. 70 | Ex. 51 | Ex. 52 | Ex. 53 | Ex. 54 | Ex. 55 | Ex. 56 | Ex. 57 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 7.9 | 57.9 | 52.9 | 47.9 | 42.9 | 37.9 | 32.9 | 27.9 |
| R1234yf | Mass % | 20.0 | 25.0 | 25.0 | 25.0 | 25.0 | 25.0 | 25.0 | 25.0 |
| R32 | Mass % | 7.1 | 7.1 | 7.1 | 7.1 | 7.1 | 7.1 | 7.1 | 7.1 |
| GWP | — | 49 | 50 | 50 | 50 | 50 | 50 | 50 | 50 |
| COP ratio | % (relative to R410A) | 98.6 | 94.6 | 94.9 | 95.2 | 95.5 | 95.9 | 96.3 | 96.8 |
| Refrigerating capacity ratio | % (relative to R410A) | 94.4 | 97.1 | 96.9 | 96.7 | 96.3 | 95.9 | 95.4 | 94.8 |

TABLE 57

| Item | Unit | Ex. 58 | Ex. 59 | Ex. 60 | Ex. 61 | Comp. Ex. 71 | Ex. 62 | Ex. 63 | Ex. 64 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 7.1 | 7.1 | 7.1 | 7.1 | 7.1 | 7.1 | 7.1 | 7.1 |
| R1234yf | Mass % | 25.0 | 25.0 | 25.0 | 25.0 | 25.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 97.2 | 97.7 | 98.2 | 98.7 | 99.2 | 95.2 | 95.5 | 95.8 |
| Refrigerating capacity ratio | % (relative to R410A) | 94.2 | 93.6 | 92.9 | 92.2 | 91.4 | 94.2 | 93.9 | 93.7 |

TABLE 58

| Item | Unit | Ex. 65 | Ex. 66 | Ex. 67 | Ex. 68 | Ex. 69 | Ex. 70 | Ex. 71 | Ex. 72 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 37.9 | 32.9 | 27.9 | 22.9 | 17.9 | 12.9 | 7.9 | 2.9 |
| R1234yf | Mass % | 30.0 | 30.0 | 30.0 | 30.0 | 30.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 96.2 | 96.6 | 97.0 | 97.4 | 97.9 | 98.3 | 98.8 | 99.3 |
| Refrigerating capacity ratio | % (relative to R410A) | 93.3 | 92.9 | 92.4 | 91.8 | 91.2 | 90.5 | 89.8 | 89.1 |

TABLE 59

| Item | Unit | Ex. 73 | Ex. 74 | Ex. 75 | Ex. 76 | Ex. 77 | Ex. 78 | Ex. 79 | Ex. 80 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 47.9 | 42.9 | 37.9 | 32.9 | 27.9 | 22.9 | 17.9 | 12.9 |
| R1234yf | Mass % | 35.0 | 35.0 | 35.0 | 35.0 | 35.0 | 35.0 | 35.0 | 35.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 95.9 | 96.2 | 96.5 | 96.9 | 97.2 | 97.7 | 98.1 | 98.5 |
| Refrigerating capacity ratio | % (relative to R410A) | 91.1 | 90.9 | 90.6 | 90.2 | 89.8 | 89.3 | 88.7 | 88.1 |

TABLE 60

| Item | Unit | Ex. 81 | Ex. 82 | Ex. 83 | Ex. 84 | Ex. 85 | Ex. 86 | Ex. 87 | Ex. 88 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 7.9 | 2.9 | 42.9 | 37.9 | 32.9 | 27.9 | 22.9 | 17.9 |
| R1234yf | Mass % | 35.0 | 35.0 | 40.0 | 40.0 | 40.0 | 40.0 | 40.0 | 40.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 99.0 | 99.4 | 96.6 | 96.9 | 97.2 | 97.6 | 98.0 | 98.4 |
| Refrigerating capacity ratio | % (relative to R410A) | 87.4 | 86.7 | 88.0 | 87.8 | 87.5 | 87.1 | 86.6 | 86.1 |

TABLE 61

| Item | Unit | Comp. Ex. 72 | Comp. Ex. 73 | Comp. Ex. 74 | Comp. Ex. 75 | Comp. Ex. 76 | Comp. Ex. 77 | Comp. Ex. 78 | Comp. Ex. 79 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 12.9 | 7.9 | 2.9 | 37.9 | 32.9 | 27.9 | 22.9 | 17.9 |
| R1234yf | Mass % | 40.0 | 40.0 | 40.0 | 45.0 | 45.0 | 45.0 | 45.0 | 45.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 98.8 | 99.2 | 99.6 | 97.4 | 97.7 | 98.0 | 98.3 | 98.7 |
| Refrigerating capacity ratio | % (relative to R410A) | 85.5 | 84.9 | 84.2 | 84.9 | 84.6 | 84.3 | 83.9 | 83.5 |

TABLE 62

| Item | Unit | Comp. Ex. 80 | Comp. Ex. 81 | Comp. Ex. 82 |
|---|---|---|---|---|
| HFO-1132(E) | Mass % | 35.0 | 40.0 | 45.0 |
| HFO-1123 | Mass % | 12.9 | 7.9 | 2.9 |
| R1234yf | Mass % | 45.0 | 45.0 | 45.0 |
| R32 | Mass % | 7.1 | 7.1 | 7.1 |
| GWP | — | 50 | 50 | 50 |
| COP ratio | % (relative to R410A) | 99.1 | 99.5 | 99.9 |
| Refrigerating capacity ratio | % (relative to R410A) | 82.9 | 82.3 | 81.7 |

TABLE 63

| Item | Unit | Ex. 89 | Ex. 90 | Ex. 91 | Ex. 92 | Ex. 93 | Ex. 94 | Ex. 95 | Ex. 96 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 70.5 | 65.5 | 60.5 | 55.5 | 50.5 | 45.5 | 40.5 | 35.5 |
| R1234yf | Mass % | 5.0 | 5.0 | 5.0 | 5.0 | 5.0 | 5.0 | 5.0 | 5.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 93.7 | 93.9 | 94.1 | 94.4 | 94.7 | 95.0 | 95.4 | 95.8 |
| Refrigerating capacity ratio | % (relative to R410A) | 110.2 | 110.0 | 109.7 | 109.3 | 108.9 | 108.4 | 107.9 | 107.3 |

TABLE 64

| Item | Unit | Ex. 97 | Comp. Ex. 83 | Ex. 98 | Ex. 99 | Ex. 100 | Ex. 101 | Ex. 102 | Ex. 103 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 30.5 | 25.5 | 65.5 | 60.5 | 55.5 | 50.5 | 45.5 | 40.5 |
| R1234yf | Mass % | 5.0 | 5.0 | 10.0 | 10.0 | 10.0 | 10.0 | 10.0 | 10.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 96.2 | 96.6 | 94.2 | 94.4 | 94.6 | 94.9 | 95.2 | 95.5 |
| Refrigerating capacity ratio | % (relative to R410A) | 106.6 | 106.0 | 107.5 | 107.3 | 107.0 | 106.6 | 106.1 | 105.6 |

TABLE 65

| Item | Unit | Ex. 104 | Ex. 105 | Ex. 106 | Comp. Ex. 84 | Ex. 107 | Ex. 108 | Ex. 109 | Ex. 110 |
|---|---|---|---|---|---|---|---|---|---|
| HFO-1132(E) | Mass % | 40.0 | 45.0 | 50.0 | 55.0 | 10.0 | 15.0 | 20.0 | 25.0 |
| HFO-1123 | Mass % | 35.5 | 30.5 | 25.5 | 20.5 | 60.5 | 55.5 | 50.5 | 45.5 |

TABLE 65-continued

| Item | Unit | Ex. 104 | Ex. 105 | Ex. 106 | Comp. Ex. 84 | Ex. 107 | Ex. 108 | Ex. 109 | Ex. 110 |
|---|---|---|---|---|---|---|---|---|---|
| R1234yf | Mass % | 10.0 | 10.0 | 10.0 | 10.0 | 15.0 | 15.0 | 15.0 | 15.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.9 | 96.3 | 96.7 | 97.1 | 94.6 | 94.8 | 95.1 | 95.4 |
| Refrigerating capacity ratio | % (relative to R410A) | 105.1 | 104.5 | 103.8 | 103.1 | 104.7 | 104.5 | 104.1 | 103.7 |

TABLE 66

| Item | Unit | Ex. 111 | Ex. 112 | Ex. 113 | Ex. 114 | Ex. 115 | Comp. Ex. 85 | Ex. 116 | Ex. 117 |
|---|---|---|---|---|---|---|---|---|---|
| HFO-1132(E) | Mass % | 30.0 | 35.0 | 40.0 | 45.0 | 50.0 | 55.0 | 10.0 | 15.0 |
| HFO-1123 | Mass % | 40.5 | 35.5 | 30.5 | 25.5 | 20.5 | 15.5 | 55.5 | 50.5 |
| R1234yf | Mass % | 15.0 | 15.0 | 15.0 | 15.0 | 15.0 | 15.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.7 | 96.0 | 96.4 | 96.8 | 97.2 | 97.6 | 95.1 | 95.3 |
| Refrigerating capacity ratio | % (relative to R410A) | 103.3 | 102.8 | 102.2 | 101.6 | 101.0 | 100.3 | 101.8 | 101.6 |

TABLE 67

| Item | Unit | Ex. 118 | Ex. 119 | Ex. 120 | Ex. 121 | Ex. 122 | Ex. 123 | Ex. 124 | Comp. Ex. 86 |
|---|---|---|---|---|---|---|---|---|---|
| HFO-1132(E) | Mass % | 20.0 | 25.0 | 30.0 | 35.0 | 40.0 | 45.0 | 50.0 | 55.0 |
| HFO-1123 | Mass % | 45.5 | 40.5 | 35.5 | 30.5 | 25.5 | 20.5 | 15.5 | 10.5 |
| R1234yf | Mass % | 20.0 | 20.0 | 20.0 | 20.0 | 20.0 | 20.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.2 | 96.5 | 96.9 | 97.3 | 97.7 | 98.2 |
| Refrigerating capacity ratio | % (relative to R410A) | 101.2 | 100.8 | 100.4 | 99.9 | 99.3 | 98.7 | 98.0 | 97.3 |

TABLE 68

| Item | Unit | Ex. 125 | Ex. 126 | Ex. 127 | Ex. 128 | Ex. 129 | Ex. 130 | Ex. 131 | Ex. 132 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.5 | 45.5 | 40.5 | 35.5 | 30.5 | 25.5 | 20.5 | 15.5 |
| R1234yf | Mass % | 25.0 | 25.0 | 25.0 | 25.0 | 25.0 | 25.0 | 25.0 | 25.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.1 | 96.4 | 96.7 | 97.1 | 97.5 | 97.9 |
| Refrigerating capacity ratio | % (relative to R410A) | 98.9 | 98.6 | 98.3 | 97.9 | 97.4 | 96.9 | 96.3 | 95.7 |

TABLE 69

| Item | Unit | Ex. 133 | Comp. Ex. 87 | Ex. 134 | Ex. 135 | Ex. 136 | Ex. 137 | Ex. 138 | Ex. 139 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 10.5 | 5.5 | 45.5 | 40.5 | 35.5 | 30.5 | 25.5 | 20.5 |
| R1234yf | Mass % | 25.0 | 25.0 | 30.0 | 30.0 | 30.0 | 30.0 | 30.0 | 30.0 |
| R32 | Mass % | 14.5 | 14.5 | 14.5 | 14.5 | 14.5 | 14.5 | 14.5 | 14.5 |
| GWP | — | 99 | 99 | 100 | 100 | 100 | 100 | 100 | 100 |
| COP ratio | % (relative to R410A) | 98.3 | 98.7 | 96.2 | 96.4 | 96.7 | 97.0 | 97.3 | 97.7 |
| Refrigerating capacity ratio | % (relative to R410A) | 95.0 | 94.3 | 95.8 | 95.6 | 95.2 | 94.8 | 94.4 | 93.8 |

TABLE 70

| Item | Unit | Ex. 140 | Ex. 141 | Ex. 142 | Ex. 143 | Ex. 144 | Ex. 145 | Ex. 146 | Ex. 147 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 15.5 | 10.5 | 5.5 | 40.5 | 35.5 | 30.5 | 25.5 | 20.5 |
| R1234yf | Mass % | 30.0 | 30.0 | 30.0 | 35.0 | 35.0 | 35.0 | 35.0 | 35.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.1 | 98.5 | 98.9 | 96.8 | 97.0 | 97.3 | 97.6 | 97.9 |
| Refrigerating capacity ratio | % (relative to R410A) | 93.3 | 92.6 | 92.0 | 92.8 | 92.5 | 92.2 | 91.8 | 91.3 |

TABLE 71

| Item | Unit | Ex. 148 | Ex. 149 | Ex. 150 | Ex. 151 | Ex. 152 | Ex. 153 | Ex. 154 | Ex. 155 |
|---|---|---|---|---|---|---|---|---|---|
| HFO-1132(E) | Mass % | 35.0 | 40.0 | 45.0 | 10.0 | 15.0 | 20.0 | 25.0 | 30.0 |
| HFO-1123 | Mass % | 15.5 | 10.5 | 5.5 | 35.5 | 30.5 | 25.5 | 20.5 | 15.5 |
| R1234yf | Mass % | 35.0 | 35.0 | 35.0 | 40.0 | 40.0 | 40.0 | 40.0 | 40.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.3 | 98.7 | 99.1 | 97.4 | 97.7 | 98.0 | 98.3 | 98.6 |
| Refrigerating capacity ratio | % (relative to R410A) | 90.8 | 90.2 | 89.6 | 89.6 | 89.4 | 89.0 | 88.6 | 88.2 |

TABLE 72

| Item | Unit | Ex. 156 | Ex. 157 | Ex. 158 | Ex. 159 | Ex. 160 | Comp. Ex. 88 | Comp. Ex. 89 | Comp. Ex. 90 |
|---|---|---|---|---|---|---|---|---|---|
| HFO-1132(E) | Mass % | 35.0 | 40.0 | 10.0 | 15.0 | 20.0 | 25.0 | 30.0 | 35.0 |
| HFO-1123 | Mass % | 10.5 | 5.5 | 30.5 | 25.5 | 20.5 | 15.5 | 10.5 | 5.5 |
| R1234yf | Mass % | 40.0 | 40.0 | 45.0 | 45.0 | 45.0 | 45.0 | 45.0 | 45.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.9 | 99.3 | 98.1 | 98.4 | 98.7 | 98.9 | 99.3 | 99.6 |
| Refrigerating capacity ratio | % (relative to R410A) | 87.6 | 87.1 | 86.5 | 86.2 | 85.9 | 85.5 | 85.0 | 84.5 |

TABLE 73

| Item | Unit | Comp. Ex. 91 | Comp. Ex. 92 | Comp. Ex. 93 | Comp. Ex. 94 | Comp. Ex. 95 |
|---|---|---|---|---|---|---|
| HFO-1132(E) | Mass % | 10.0 | 15.0 | 20.0 | 25.0 | 30.0 |
| HFO-1123 | Mass % | 25.5 | 20.5 | 15.5 | 10.5 | 5.5 |
| R1234yf | Mass % | 50.0 | 50.0 | 50.0 | 50.0 | 50.0 |
| R32 | Mass % | 14.5 | 14.5 | 14.5 | 14.5 | 14.5 |
| GWP | — | 100 | 100 | 100 | 100 | 100 |
| COP ratio | % (relative to R410A) | 98.9 | 99.1 | 99.4 | 99.7 | 100.0 |
| Refrigerating capacity ratio | % (relative to R410A) | 83.3 | 83.0 | 82.7 | 82.2 | 81.8 |

TABLE 74

| Item | Unit | Ex. 161 | Ex. 162 | Ex. 163 | Ex. 164 | Ex. 165 | Ex. 166 | Ex. 167 | Ex. 168 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 63.1 | 58.1 | 53.1 | 48.1 | 43.1 | 38.1 | 33.1 | 28.1 |
| R1234yf | Mass % | 5.0 | 5.0 | 5.0 | 5.0 | 5.0 | 5.0 | 5.0 | 5.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 94.8 | 95.0 | 95.2 | 95.4 | 95.7 | 95.9 | 96.2 | 96.6 |
| Refrigerating capacity ratio | % (relative to R410A) | 111.5 | 111.2 | 110.9 | 110.5 | 110.0 | 109.5 | 108.9 | 108.3 |

TABLE 75

| Item | Unit | Comp. Ex. 96 | Ex. 169 | Ex. 170 | Ex. 171 | Ex. 172 | Ex. 173 | Ex. 174 | Ex. 175 |
|---|---|---|---|---|---|---|---|---|---|
| HFO-1132(E) | Mass % | 50.0 | 10.0 | 15.0 | 20.0 | 25.0 | 30.0 | 35.0 | 40.0 |
| HFO-1123 | Mass % | 23.1 | 58.1 | 53.1 | 48.1 | 43.1 | 38.1 | 33.1 | 28.1 |
| R1234yf | Mass % | 5.0 | 10.0 | 10.0 | 10.0 | 10.0 | 10.0 | 10.0 | 10.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 96.9 | 95.3 | 95.4 | 95.6 | 95.8 | 96.1 | 96.4 | 96.7 |
| Refrigerating capacity ratio | % (relative to R410A) | 107.7 | 108.7 | 108.5 | 108.1 | 107.7 | 107.2 | 106.7 | 106.1 |

TABLE 76

| Item | Unit | Ex. 176 | Comp. Ex. 97 | Ex. 177 | Ex. 178 | Ex. 179 | Ex. 180 | Ex. 181 | Ex. 182 |
|---|---|---|---|---|---|---|---|---|---|
| HFO-1132(E) | Mass % | 45.0 | 50.0 | 10.0 | 15.0 | 20.0 | 25.0 | 30.0 | 35.0 |
| HFO-1123 | Mass % | 23.1 | 18.1 | 53.1 | 48.1 | 43.1 | 38.1 | 33.1 | 28.1 |
| R1234yf | Mass % | 10.0 | 10.0 | 15.0 | 15.0 | 15.0 | 15.0 | 15.0 | 15.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.0 | 97.4 | 95.7 | 95.9 | 96.1 | 96.3 | 96.6 | 96.9 |
| Refrigerating capacity ratio | % (relative to R410A) | 105.5 | 104.9 | 105.9 | 105.6 | 105.3 | 104.8 | 104.4 | 103.8 |

TABLE 77

| Item | Unit | Ex. 183 | Ex. 184 | Comp. Ex. 98 | Ex. 185 | Ex. 186 | Ex. 187 | Ex. 188 | Ex. 189 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 23.1 | 18.1 | 13.1 | 48.1 | 43.1 | 38.1 | 33.1 | 28.1 |
| R1234yf | Mass % | 15.0 | 15.0 | 15.0 | 20.0 | 20.0 | 20.0 | 20.0 | 20.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.2 | 97.5 | 97.9 | 96.1 | 96.3 | 96.5 | 96.8 | 97.1 |
| Refrigerating capacity ratio | % (relative to R410A) | 103.3 | 102.6 | 102.0 | 103.0 | 102.7 | 102.3 | 101.9 | 101.4 |

TABLE 78

| Item | Unit | Ex. 190 | Ex. 191 | Ex. 192 | Comp. Ex. 99 | Ex. 193 | Ex. 194 | Ex. 195 | Ex. 196 |
|---|---|---|---|---|---|---|---|---|---|
| HFO-1132(E) | Mass % | 35.0 | 40.0 | 45.0 | 50.0 | 10.0 | 15.0 | 20.0 | 25.0 |
| HFO-1123 | Mass % | 23.1 | 18.1 | 13.1 | 8.1 | 43.1 | 38.1 | 33.1 | 28.1 |
| R1234yf | Mass % | 20.0 | 20.0 | 20.0 | 20.0 | 25.0 | 25.0 | 25.0 | 25.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.4 | 97.7 | 98.0 | 98.4 | 96.6 | 96.8 | 97.0 | 97.3 |
| Refrigerating capacity ratio | % (relative to R410A) | 100.9 | 100.3 | 99.7 | 99.1 | 100.0 | 99.7 | 99.4 | 98.9 |

TABLE 79

| Item | Unit | Ex. 197 | Ex. 198 | Ex. 199 | Ex. 200 | Comp. Ex. 100 | Ex. 201 | Ex. 202 | Ex. 203 |
|---|---|---|---|---|---|---|---|---|---|
| HFO-1132(E) | Mass % | 30.0 | 35.0 | 40.0 | 45.0 | 50.0 | 10.0 | 15.0 | 20.0 |
| HFO-1123 | Mass % | 23.1 | 18.1 | 13.1 | 8.1 | 3.1 | 38.1 | 33.1 | 28.1 |
| R1234yf | Mass % | 25.0 | 25.0 | 25.0 | 25.0 | 25.0 | 30.0 | 30.0 | 30.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 150 | 150 | 150 |
| COP ratio | % (relative to R410A) | 97.6 | 97.9 | 98.2 | 98.5 | 98.9 | 97.1 | 97.3 | 97.6 |
| Refrigerating capacity ratio | % (relative to R410A) | 98.5 | 97.9 | 97.4 | 96.8 | 96.1 | 97.0 | 96.7 | 96.3 |

TABLE 80

| Item | Unit | Ex. 204 | Ex. 205 | Ex. 206 | Ex. 207 | Ex. 208 | Ex. 209 | Ex. 210 | Ex. 211 |
|---|---|---|---|---|---|---|---|---|---|
| HFO-1132(E) | Mass % | 25.0 | 30.0 | 35.0 | 40.0 | 45.0 | 10.0 | 15.0 | 20.0 |
| HFO-1123 | Mass % | 23.1 | 18.1 | 13.1 | 8.1 | 3.1 | 33.1 | 28.1 | 23.1 |
| R1234yf | Mass % | 30.0 | 30.0 | 30.0 | 30.0 | 30.0 | 35.0 | 35.0 | 35.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 97.8 | 98.1 | 98.4 | 98.7 | 99.1 | 97.7 | 97.9 | 98.1 |
| Refrigerating capacity ratio | % (relative to R410A) | 95.9 | 95.4 | 94.9 | 94.4 | 93.8 | 93.9 | 93.6 | 93.3 |

TABLE 81

| Item | Unit | Ex. 212 | Ex. 213 | Ex. 214 | Ex. 215 | Ex. 216 | Ex. 217 | Ex. 218 | Ex. 219 |
|---|---|---|---|---|---|---|---|---|---|
| HFO-1132(E) | Mass % | 25.0 | 30.0 | 35.0 | 40.0 | 10.0 | 15.0 | 20.0 | 25.0 |
| HFO-1123 | Mass % | 18.1 | 13.1 | 8.1 | 3.1 | 28.1 | 23.1 | 18.1 | 13.1 |
| R1234yf | Mass % | 35.0 | 35.0 | 35.0 | 35.0 | 40.0 | 40.0 | 40.0 | 40.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 98.4 | 98.7 | 99.0 | 99.3 | 98.3 | 98.5 | 98.7 | 99.0 |
| Refrigerating capacity ratio | % (relative to R410A) | 92.9 | 92.4 | 91.9 | 91.3 | 90.8 | 90.5 | 90.2 | 89.7 |

TABLE 82

| Item | Unit | Ex. 220 | Ex. 221 | Ex. 222 | Ex. 223 | Ex. 224 | Ex. 225 | Ex. 226 | Comp. Ex. 101 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 8.1 | 3.1 | 23.1 | 18.1 | 13.1 | 8.1 | 3.1 | 18.1 |
| R1234yf | Mass % | 40.0 | 40.0 | 45.0 | 45.0 | 45.0 | 45.0 | 45.0 | 50.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 99.3 | 99.6 | 98.9 | 99.1 | 99.3 | 99.6 | 99.9 | 99.6 |
| Refrigerating capacity ratio | % (relative to R410A) | 89.3 | 88.8 | 87.6 | 87.3 | 87.0 | 86.6 | 86.2 | 84.4 |

TABLE 83

| Item | Unit | Comp. Ex. 102 | Comp. Ex. 103 | Comp. Ex. 104 |
|---|---|---|---|---|
| HFO-1132(E) | Mass % | 15.0 | 20.0 | 25.0 |
| HFO-1123 | Mass % | 13.1 | 8.1 | 3.1 |
| R1234yf | Mass % | 50.0 | 50.0 | 50.0 |
| R32 | Mass % | 21.9 | 21.9 | 21.9 |
| GWP | — | 150 | 150 | 150 |
| COP ratio | % (relative to R410A) | 99.8 | 100.0 | 100.2 |
| Refrigerating capacity ratio | % (relative to R410A) | 84.1 | 83.8 | 83.4 |

TABLE 84

| Item | Unit | Ex. 227 | Ex. 228 | Ex. 229 | Ex. 230 | Ex. 231 | Ex. 232 | Ex. 233 | Comp. Ex. 105 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 55.7 | 50.7 | 45.7 | 40.7 | 35.7 | 30.7 | 25.7 | 20.7 |
| R1234yf | Mass % | 5.0 | 5.0 | 5.0 | 5.0 | 5.0 | 5.0 | 5.0 | 5.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 95.9 | 96.0 | 96.2 | 96.3 | 96.6 | 96.8 | 97.1 | 97.3 |
| Refrigerating capacity ratio | % (relative to R410A) | 112.2 | 111.9 | 111.6 | 111.2 | 110.7 | 110.2 | 109.6 | 109.0 |

TABLE 85

| Item | Unit | Ex. 234 | Ex. 235 | Ex. 236 | Ex. 237 | Ex. 238 | Ex. 239 | Ex. 240 | Comp. Ex. 106 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.7 | 45.7 | 40.7 | 35.7 | 30.7 | 25.7 | 20.7 | 15.7 |
| R1234yf | Mass % | 10.0 | 10.0 | 10.0 | 10.0 | 10.0 | 10.0 | 10.0 | 10.0 |
| R32 | Mass % | 29.3 | 29.3 | 29.3 | 29.3 | 29.3 | 29.3 | 29.3 | 29.3 |

TABLE 85-continued

| Item | Unit | Ex. 234 | Ex. 235 | Ex. 236 | Ex. 237 | Ex. 238 | Ex. 239 | Ex. 240 | Comp. Ex. 106 |
|---|---|---|---|---|---|---|---|---|---|
| GWP | — | 199 | 199 | 199 | 199 | 199 | 199 | 199 | 199 |
| COP ratio | % (relative to R410A) | 96.3 | 96.4 | 96.6 | 96.8 | 97.0 | 97.2 | 97.5 | 97.8 |
| Refrigerating capacity ratio | % (relative to R410A) | 109.4 | 109.2 | 108.8 | 108.4 | 107.9 | 107.4 | 106.8 | 106.2 |

TABLE 86

| Item | Unit | Ex. 241 | Ex. 242 | Ex. 243 | Ex. 244 | Ex. 245 | Ex. 246 | Ex. 247 | Comp. Ex. 107 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 45.7 | 40.7 | 35.7 | 30.7 | 25.7 | 20.7 | 15.7 | 10.7 |
| R1234yf | Mass % | 15.0 | 15.0 | 15.0 | 15.0 | 15.0 | 15.0 | 15.0 | 15.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.7 | 96.8 | 97.0 | 97.2 | 97.4 | 97.7 | 97.9 | 98.2 |
| Refrigerating capacity ratio | % (relative to R410A) | 106.6 | 106.3 | 106.0 | 105.5 | 105.1 | 104.5 | 104.0 | 103.4 |

TABLE 87

| Item | Unit | Ex. 248 | Ex. 249 | Ex. 250 | Ex. 251 | Ex. 252 | Ex. 253 | Ex. 254 | Comp. Ex. 108 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 40.7 | 35.7 | 30.7 | 25.7 | 20.7 | 15.7 | 10.7 | 5.7 |
| R1234yf | Mass % | 20.0 | 20.0 | 20.0 | 20.0 | 20.0 | 20.0 | 20.0 | 20.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.1 | 97.3 | 97.5 | 97.7 | 97.9 | 98.1 | 98.4 | 98.7 |
| Refrigerating capacity ratio | % (relative to R410A) | 103.7 | 103.4 | 103.0 | 102.6 | 102.2 | 101.6 | 101.1 | 100.5 |

TABLE 88

| Item | Unit | Ex. 255 | Ex. 256 | Ex. 257 | Ex. 258 | Ex. 259 | Ex. 260 | Ex. 261 | Ex. 262 |
|---|---|---|---|---|---|---|---|---|---|
| HFO-1132(E) | Mass % | 10.0 | 15.0 | 20.0 | 25.0 | 30.0 | 35.0 | 40.0 | 10.0 |
| HFO-1123 | Mass % | 35.7 | 30.7 | 25.7 | 20.7 | 15.7 | 10.7 | 5.7 | 30.7 |
| R1234yf | Mass % | 25.0 | 25.0 | 25.0 | 25.0 | 25.0 | 25.0 | 25.0 | 30.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.6 | 97.7 | 97.9 | 98.1 | 98.4 | 98.6 | 98.9 | 98.1 |
| Refrigerating capacity ratio | % (relative to R410A) | 100.7 | 100.4 | 100.1 | 99.7 | 99.2 | 98.7 | 98.2 | 97.7 |

TABLE 89

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| HFO-1132(E) | Mass % | 15.0 | 20.0 | 25.0 | 30.0 | 35.0 | 10.0 | 15.0 | 20.0 |
| HFO-1123 | Mass % | 25.7 | 20.7 | 15.7 | 10.7 | 5.7 | 25.7 | 20.7 | 15.7 |
| R1234yf | Mass % | 30.0 | 30.0 | 30.0 | 30.0 | 30.0 | 35.0 | 35.0 | 35.0 |
| R32 | Mass % | 29.3 | 29.3 | 29.3 | 29.3 | 29.3 | 29.3 | 29.3 | 29.3 |

TABLE 89-continued

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| GWP | — | 199 | 199 | 199 | 199 | 199 | 200 | 200 | 200 |
| COP ratio | % (relative to R410A) | 98.2 | 98.4 | 98.6 | 98.9 | 99.1 | 98.6 | 98.7 | 98.9 |
| Refrigerating capacity ratio | % (relative to R410A) | 97.4 | 97.1 | 96.7 | 96.2 | 95.7 | 94.7 | 94.4 | 94.0 |

TABLE 90

| Item | Unit | Ex. 271 | Ex. 272 | Ex. 273 | Ex. 274 | Ex. 275 | Ex. 276 | Ex. 277 | Ex. 278 |
|---|---|---|---|---|---|---|---|---|---|
| HFO-1132(E) | Mass % | 25.0 | 30.0 | 10.0 | 15.0 | 20.0 | 25.0 | 10.0 | 15.0 |
| HFO-1123 | Mass % | 10.7 | 5.7 | 20.7 | 15.7 | 10.7 | 5.7 | 15.7 | 10.7 |
| R1234yf | Mass % | 35.0 | 35.0 | 40.0 | 40.0 | 40.0 | 40.0 | 45.0 | 45.0 |
| R32 | Mass % | 29.3 | 29.3 | 29.3 | 29.3 | 29.3 | 29.3 | 29.3 | 29.3 |
| GWP | — | 200 | 200 | 200 | 200 | 200 | 200 | 200 | 200 |
| COP ratio | % (relative to R410A) | 99.2 | 99.4 | 99.1 | 99.3 | 99.5 | 99.7 | 99.7 | 99.8 |
| Refrigerating capacity ratio | % (relative to R410A) | 93.6 | 93.2 | 91.5 | 91.3 | 90.9 | 90.6 | 88.4 | 88.1 |

TABLE 91

| Item | Unit | Ex. 279 | Ex. 280 | Comp. Ex. 109 | Comp. Ex. 110 |
|---|---|---|---|---|---|
| HFO-1132(E) | Mass % | 20.0 | 10.0 | 15.0 | 10.0 |
| HFO-1123 | Mass % | 5.7 | 10.7 | 5.7 | 5.7 |
| R1234yf | Mass % | 45.0 | 50.0 | 50.0 | 55.0 |
| R32 | Mass % | 29.3 | 29.3 | 29.3 | 29.3 |
| GWP | — | 200 | 200 | 200 | 200 |
| COP ratio | % (relative to R410A) | 100.0 | 100.3 | 100.4 | 100.9 |
| Refrigerating capacity ratio | % (relative to R410A) | 87.8 | 85.2 | 85.0 | 82.0 |

TABLE 92

| Item | Unit | Ex. 281 | Ex. 282 | Ex. 283 | Ex. 284 | Ex. 285 | Comp. Ex. 111 | Ex. 286 | Ex. 287 |
|---|---|---|---|---|---|---|---|---|---|
| HFO-1132(E) | Mass % | 10.0 | 15.0 | 20.0 | 25.0 | 30.0 | 35.0 | 10.0 | 15.0 |
| HFO-1123 | Mass % | 40.9 | 35.9 | 30.9 | 25.9 | 20.9 | 15.9 | 35.9 | 30.9 |
| R1234yf | Mass % | 5.0 | 5.0 | 5.0 | 5.0 | 5.0 | 5.0 | 10.0 | 10.0 |
| R32 | Mass % | 44.1 | 44.1 | 44.1 | 44.1 | 44.1 | 44.1 | 44.1 | 44.1 |
| GWP | — | 298 | 298 | 298 | 298 | 298 | 298 | 299 | 299 |
| COP ratio | % (relative to R410A) | 97.8 | 97.9 | 97.9 | 98.1 | 98.2 | 98.4 | 98.2 | 98.2 |
| Refrigerating capacity ratio | % (relative to R410A) | 112.5 | 112.3 | 111.9 | 111.6 | 111.2 | 110.7 | 109.8 | 109.5 |

TABLE 93

| Item | Unit | Ex. 288 | Ex. 289 | Ex. 290 | Comp. Ex. 112 | Ex. 291 | Ex. 292 | Ex. 293 | Ex. 294 |
|---|---|---|---|---|---|---|---|---|---|
| HFO-1132(E) | Mass % | 20.0 | 25.0 | 30.0 | 35.0 | 10.0 | 15.0 | 20.0 | 25.0 |
| HFO-1123 | Mass % | 25.9 | 20.9 | 15.9 | 10.9 | 30.9 | 25.9 | 20.9 | 15.9 |
| R1234yf | Mass % | 10.0 | 10.0 | 10.0 | 10.0 | 15.0 | 15.0 | 15.0 | 15.0 |
| R32 | Mass % | 44.1 | 44.1 | 44.1 | 44.1 | 44.1 | 44.1 | 44.1 | 44.1 |

TABLE 93-continued

| Item | Unit | Ex. 288 | Ex. 289 | Ex. 290 | Comp. Ex. 112 | Ex. 291 | Ex. 292 | Ex. 293 | Ex. 294 |
|---|---|---|---|---|---|---|---|---|---|
| GWP | — | 299 | 299 | 299 | 299 | 299 | 299 | 299 | 299 |
| COP ratio | % (relative to R410A) | 98.3 | 98.5 | 98.6 | 98.8 | 98.6 | 98.6 | 98.7 | 98.9 |
| Refrigerating capacity ratio | % (relative to R410A) | 109.2 | 108.8 | 108.4 | 108.0 | 107.0 | 106.7 | 106.4 | 106.0 |

TABLE 94

| Item | Unit | Ex. 295 | Comp. Ex. 113 | Ex. 296 | Ex. 297 | Ex. 298 | Ex. 299 | Ex. 300 | Ex. 301 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 10.9 | 5.9 | 25.9 | 20.9 | 15.9 | 10.9 | 5.9 | 20.9 |
| R1234yf | Mass % | 15.0 | 15.0 | 20.0 | 20.0 | 20.0 | 20.0 | 20.0 | 25.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.0 | 99.2 | 99.0 | 99.0 | 99.2 | 99.3 | 99.4 | 99.4 |
| Refrigerating capacity ratio | % (relative to R410A) | 105.6 | 105.2 | 104.1 | 103.9 | 103.6 | 103.2 | 102.8 | 101.2 |

TABLE 95

| Item | Unit | Ex. 302 | Ex. 303 | Ex. 304 | Ex. 305 | Ex. 306 | Ex. 307 | Ex. 308 | Ex. 309 |
|---|---|---|---|---|---|---|---|---|---|
| HFO-1132(E) | Mass % | 15.0 | 20.0 | 25.0 | 10.0 | 15.0 | 20.0 | 10.0 | 15.0 |
| HFO-1123 | Mass % | 15.9 | 10.9 | 5.9 | 15.9 | 10.9 | 5.9 | 10.9 | 5.9 |
| R1234yf | Mass % | 25.0 | 25.0 | 25.0 | 30.0 | 30.0 | 30.0 | 35.0 | 35.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.5 | 99.6 | 99.7 | 99.8 | 99.9 | 100.0 | 100.3 | 100.4 |
| Refrigerating capacity ratio | % (relative to R410A) | 101.0 | 100.7 | 100.3 | 98.3 | 98.0 | 97.8 | 95.3 | 95.1 |

TABLE 96

| Item | Unit | Ex. 400 |
|---|---|---|
| HFO-1132(E) | Mass % | 10.0 |
| HFO-1123 | Mass % | 5.9 |
| R1234yf | Mass % | 40.0 |
| R32 | Mass % | 44.1 |
| GWP | — | 299 |
| COP ratio | % (relative to R410A) | 100.7 |
| Refrigerating capacity ratio | % (relative to R410A) | 92.3 |

The above results indicate that the refrigerating capacity ratio relative to R410A is 85% or more in the following cases:

When the mass % of HFO-1132(E), HFO-1123, R1234yf, and R32 based on their sum is respectively represented by x, y, z, and a, in a ternary composition diagram in which the sum of HFO-1132(E), HFO-1123, and R1234yf is (100-a) mass %, a straight line connecting a point (0.0, 100.0-a, 0.0) and a point (0.0, 0.0, 100.0-a) is the base, and the point (0.0, 100.0-a, 0.0) is on the left side, if 0<a≤11.1, coordinates (x,y,z) in the ternary composition diagram are on, or on the left side of, a straight line AB that connects point A $(0.0134a^2-1.9681a+68.6,\ 0.0,\ -0.0134a^2+0.9681a+31.4)$ and point B $(0.0,\ 0.0144a^2-1.6377a+58.7,\ -0.0144a^2+0.6377a+41.3)$;

if 11.1<a≤18.2, coordinates (x,y,z) in the ternary composition diagram are on, or on the left side of, a straight line AB that connects point A $(0.0112a^2-1.9337a+68.484,\ 0.0,\ -0.0112a^2+0.9337a+31.516)$ and point B $(0.0,\ 0.0075a^2-1.5156a+58.199,\ -0.0075a^2+0.5156a+41.801)$;

if 18.2<a≤26.7, coordinates (x,y,z) in the ternary composition diagram are on, or on the left side of, a straight line AB that connects point A $(0.0107a^2-1.9142a+68.305,\ 0.0,\ -0.0107a^2+0.9142a+31.695)$ and point B $(0.0,\ 0.009a^2-1.6045a+59.318,\ -0.009a^2+0.6045a+40.682)$;

if 26.7<a≤36.7, coordinates (x,y,z) in the ternary composition diagram are on, or on the left side of, a straight line AB that connects point A $(0.0103a^2-1.9225a+68.793,\ 0.0,\ -0.0103a^2+0.9225a+31.207)$ and point B $(0.0,\ 0.0046a^2-1.41a+57.286,\ -0.0046a^2+0.41a+42.714)$; and if 36.7<a≤46.7, coordinates (x,y,z) in the ternary composition diagram are on, or on the left side of, a straight line AB that connects point A $(0.0085a^2-1.8102a+67.1,\ 0.0,\ -0.0085a^2+0.8102a+32.9)$ and point B $(0.0,\ 0.0012a^2-1.1659a+52.95,\ -0.0012a^2+0.1659a+47.05)$.

Figure 3:
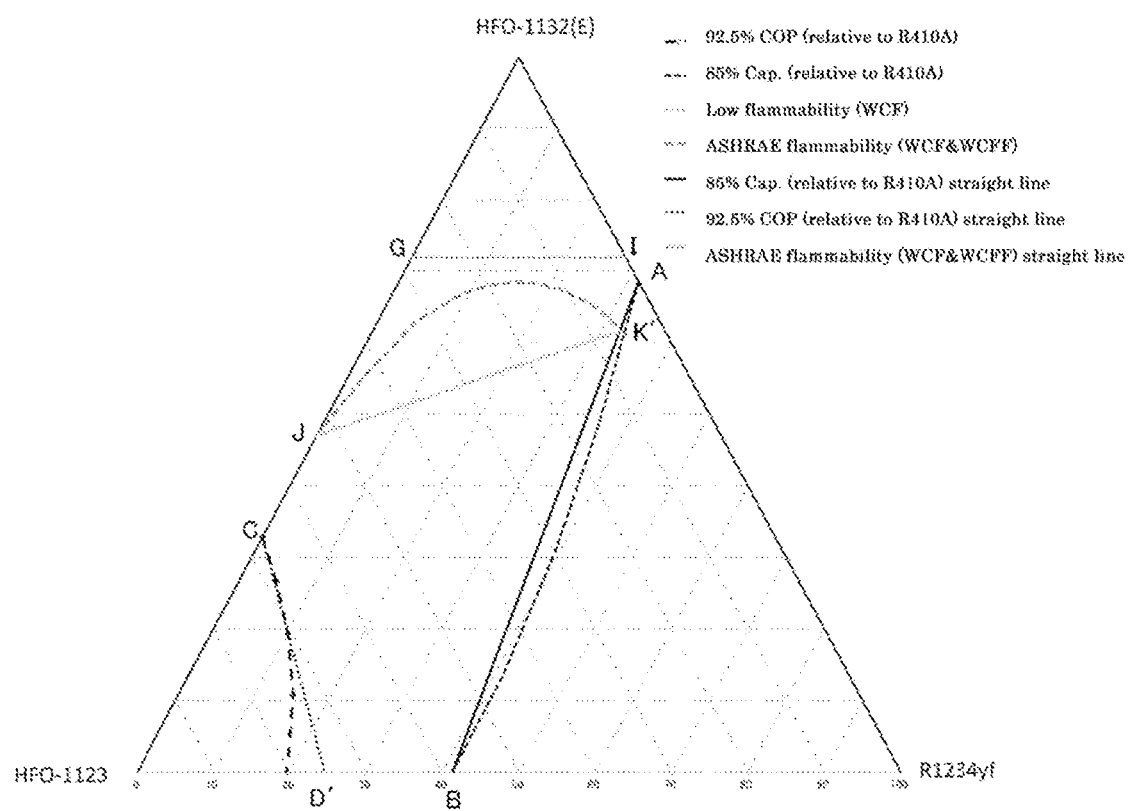
FIG. 3 is a diagram showing points A to C, D', G, I, J, and K', and line segments that connect these points to each other in a ternary composition diagram in which the sum of HFO-1132(E), HFO-1123, and R1234yf is (100-a) mass %.

Actual points having a refrigerating capacity ratio of 85% or more form a curved line that connects point A and point B in FIG. 3, and that extends toward the 1234yf side. Accordingly, when coordinates are on, or on the left side of, the straight line AB, the refrigerating capacity ratio relative to R410A is 85% or more.

Similarly, it was also found that in the ternary composition diagram, if $0<a\leq11.1$, when coordinates (x,y,z) are on, or on the left side of, a straight line D'C that connects point D' (0.0, $0.0224a^2+0.968a+75.4$, $-0.0224a^2-1.968a+24.6$) and point C ($-0.2304a^2-0.4062a+32.9$, $0.2304a^2-0.5938a+67.1$, 0.0); or if $11.1<a\leq46.7$, when coordinates are in the entire region, the COP ratio relative to that of R410A is 92.5% or more.

Figure 4:
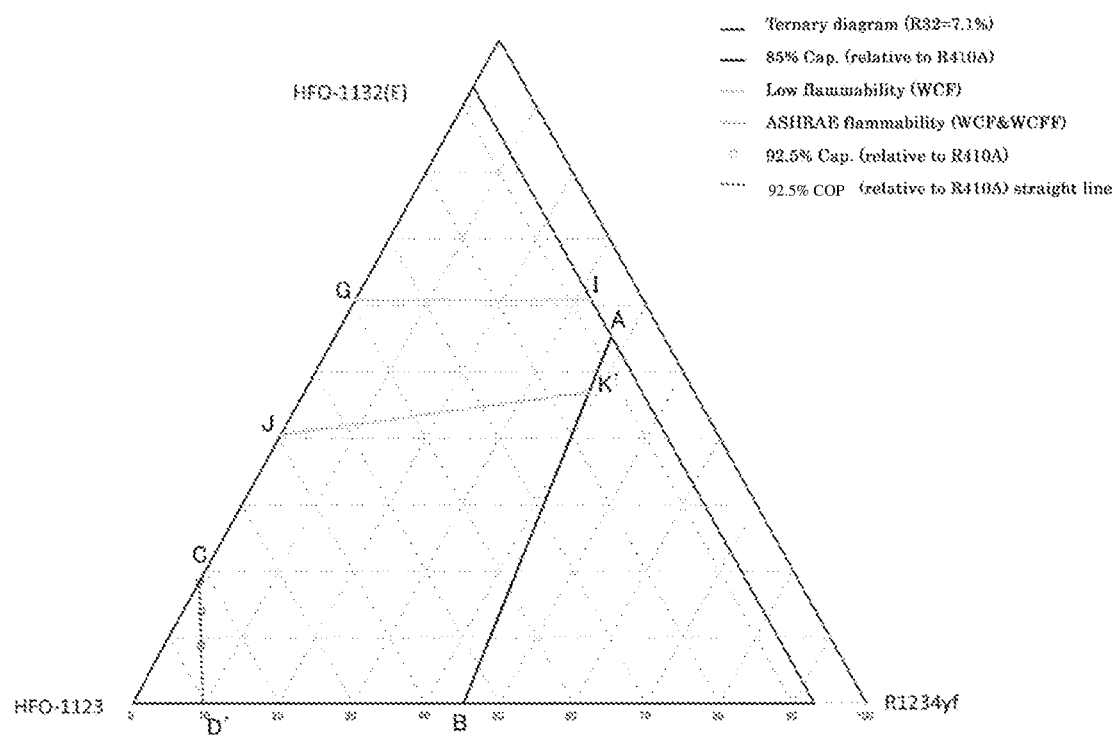
FIG. 4 is a diagram showing points A to C, D', G, I, J, and K', and line segments that connect these points to each other in a ternary composition diagram in which the sum of HFO-1132(E), HFO-1123, and R1234yf is 92.9 mass % (the content of R32 is 7.1 mass %).
Figure 5:
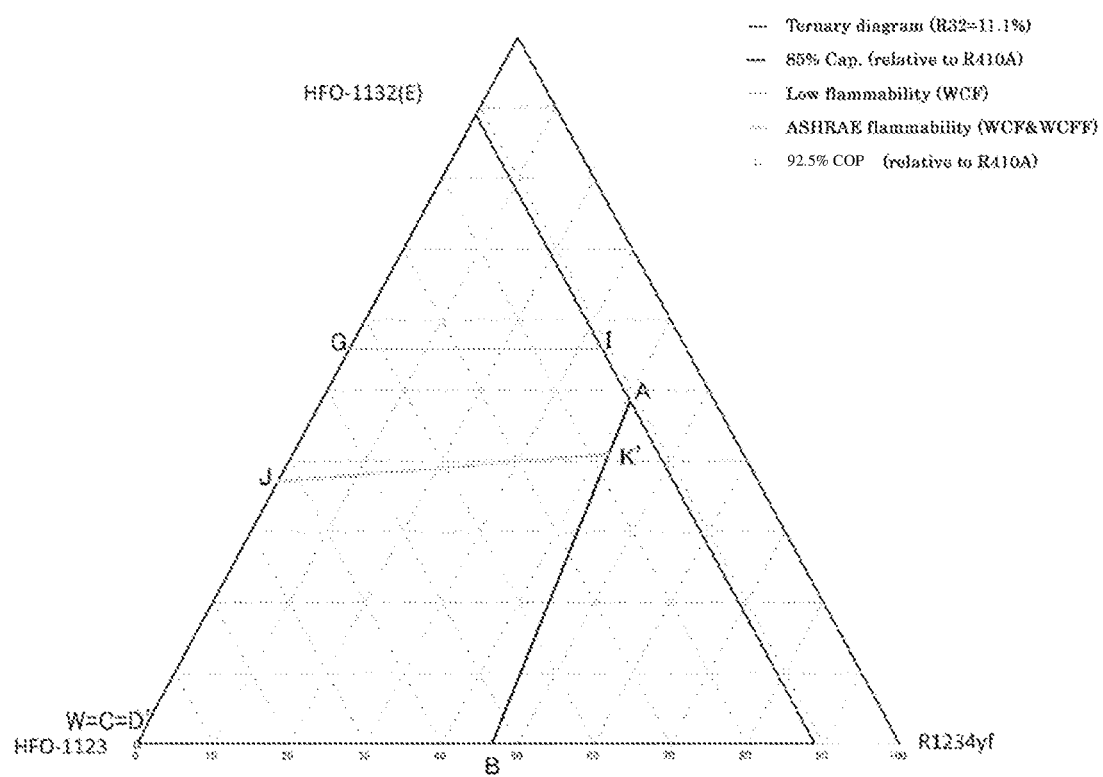
FIG. 5 is a diagram showing points A to C, D', G, I, J, K', and W, and line segments that connect these points to each other in a ternary composition diagram in which the sum of HFO-1132(E), HFO-1123, and R1234yf is 88.9 mass % (the content of R32 is 11.1 mass %).
Figure 6:
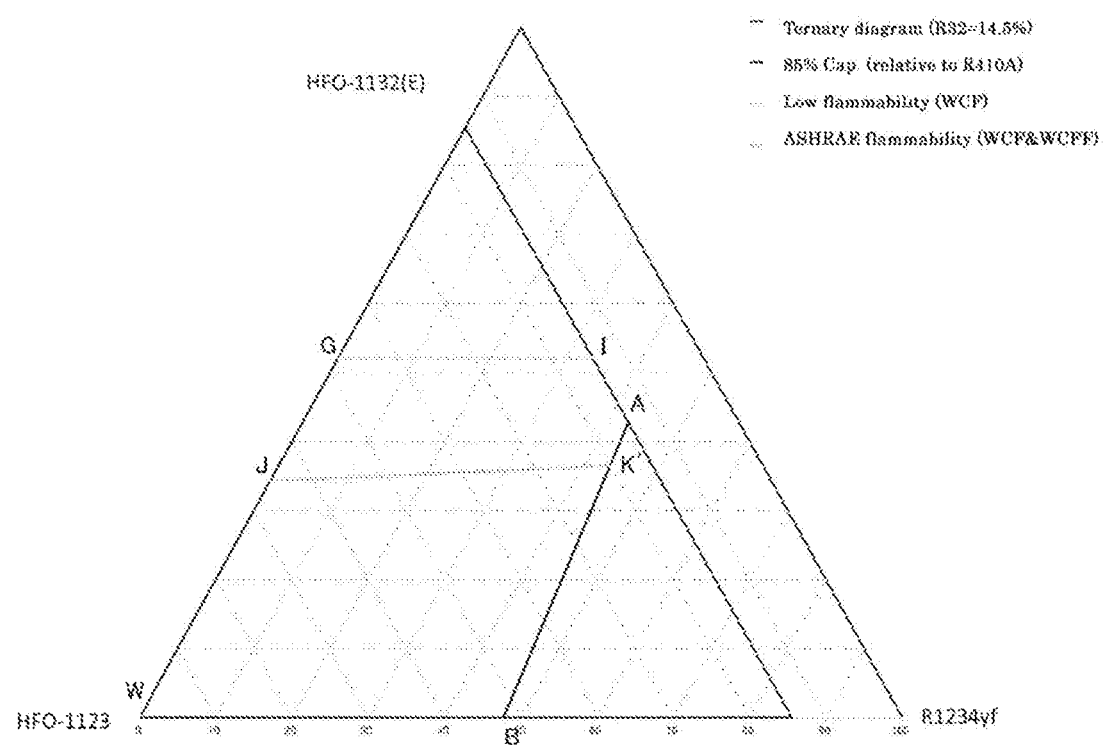
FIG. 6 is a diagram showing points A, B, G, I, J, K', and W, and line segments that connect these points to each other in a ternary composition diagram in which the sum of HFO-1132(E), HFO-1123, and R1234yf is 85.5 mass % (the content of R32 is 14.5 mass %).
Figure 7:
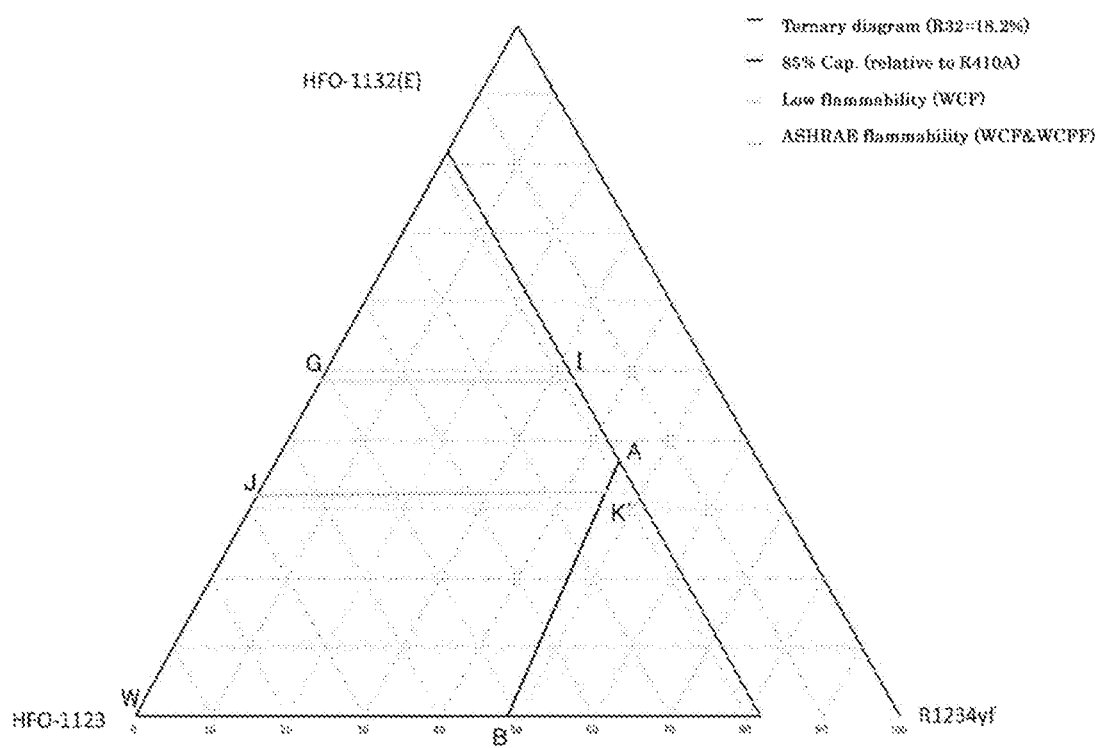
FIG. 7 is a diagram showing points A, B, G, I, J, K', and W, and line segments that connect these points to each other in a ternary composition diagram in which the sum of HFO-1132(E), HFO-1123, and R1234yf is 81.8 mass % (the content of R32 is 18.2 mass %).
Figure 8:
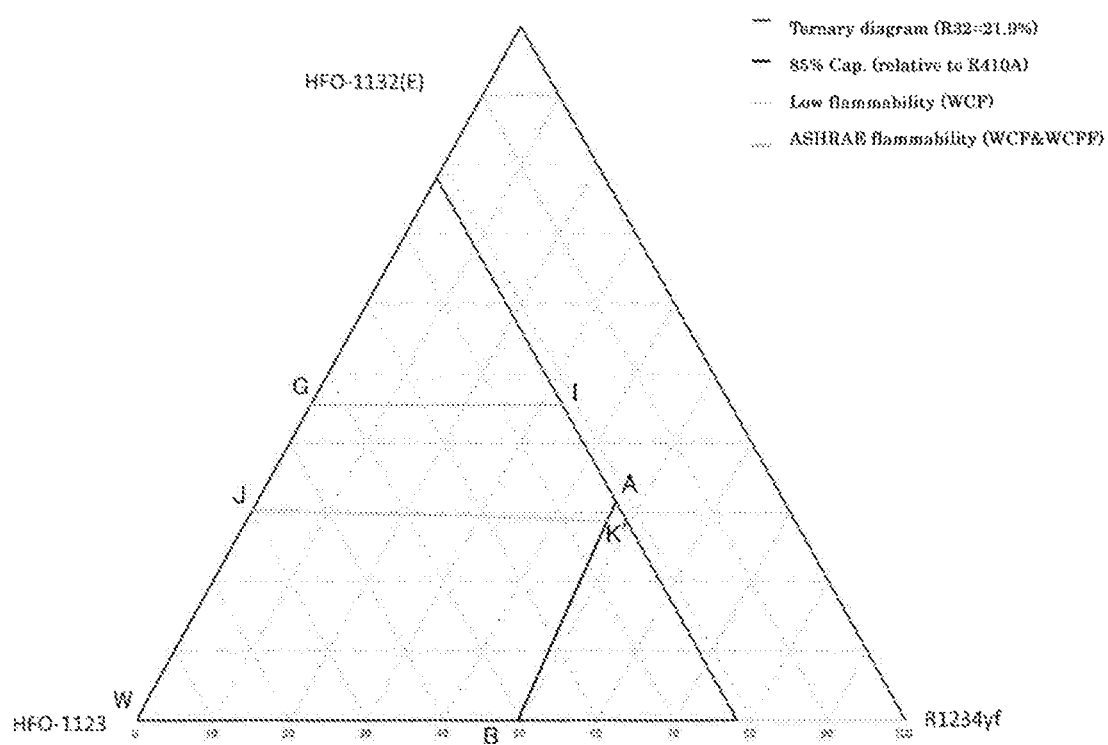
FIG. 8 is a diagram showing points A, B, G, I, J, K', and W, and line segments that connect these points to each other in a ternary composition diagram in which the sum of HFO-1132(E), HFO-1123, and R1234yf is 78.1 mass % (the content of R32 is 21.9 mass %).
Figure 9:
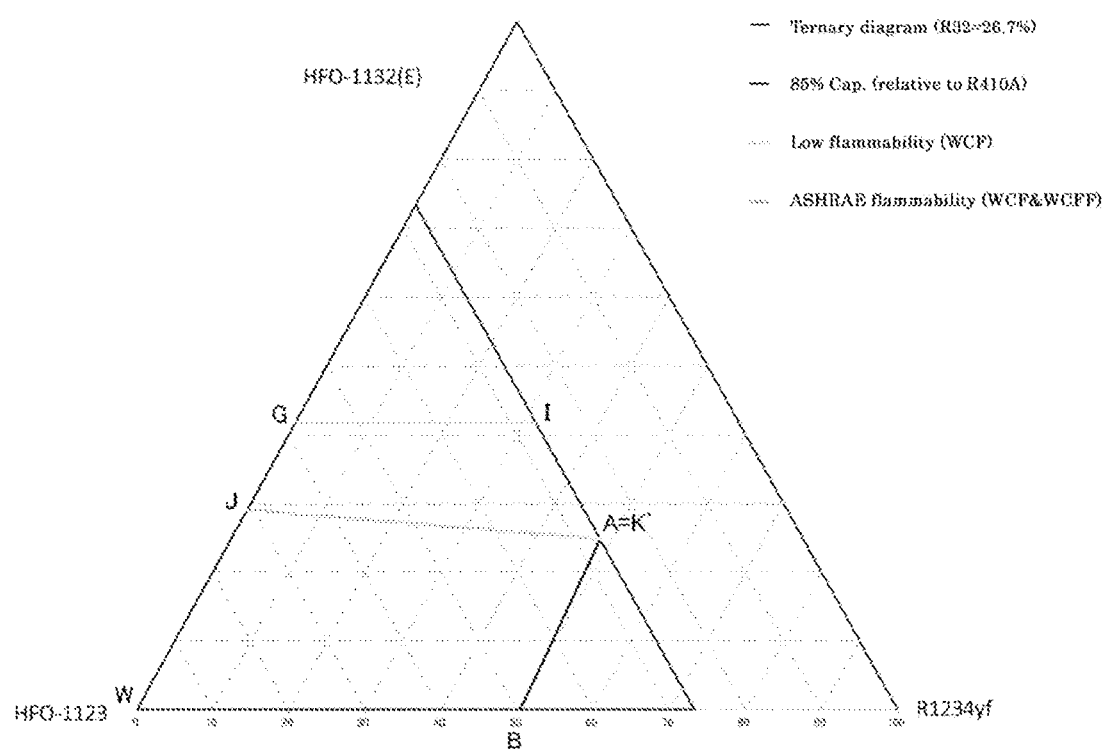
FIG. 9 is a diagram showing points A, B, G, I, J, K', and W, and line segments that connect these points to each other in a ternary composition diagram in which the sum of HFO-1132(E), HFO-1123, and R1234yf is 73.3 mass % (the content of R32 is 26.7 mass %).
Figure 10:
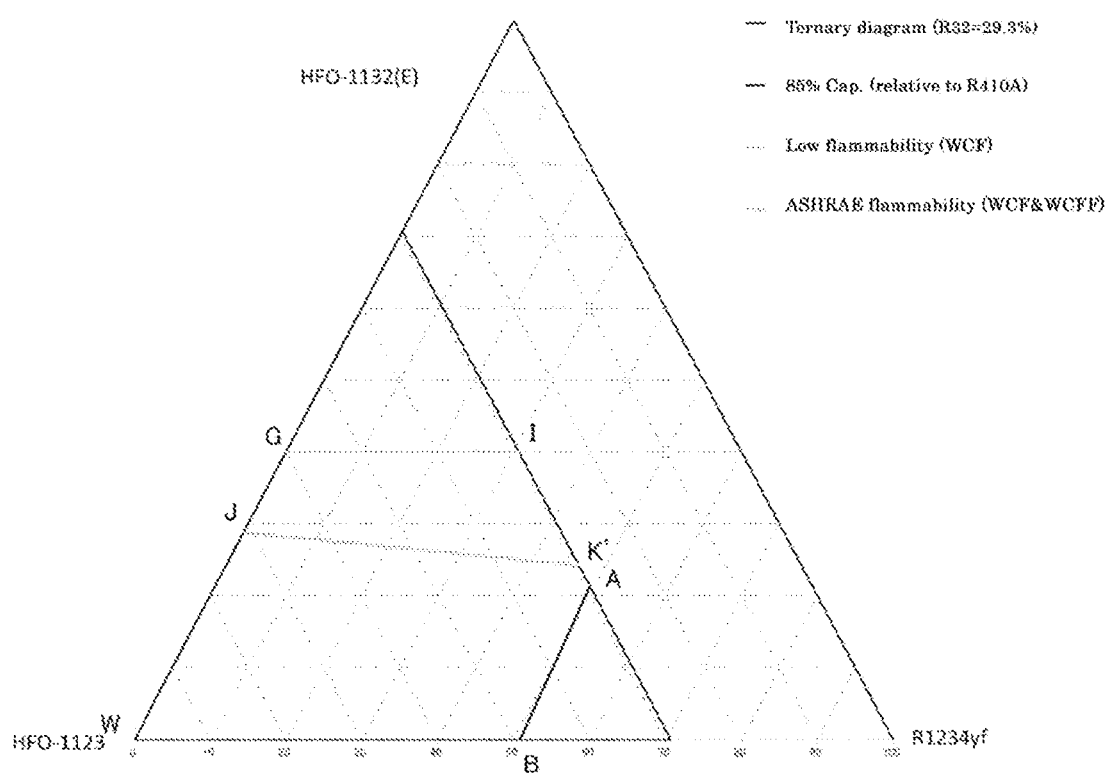
FIG. 10 is a diagram showing points A, B, G, I, J, K', and W, and line segments that connect these points to each other in a ternary composition diagram in which the sum of HFO-1132(E), HFO-1123, and R1234yf is 70.7 mass % (the content of R32 is 29.3 mass %).
Figure 11:
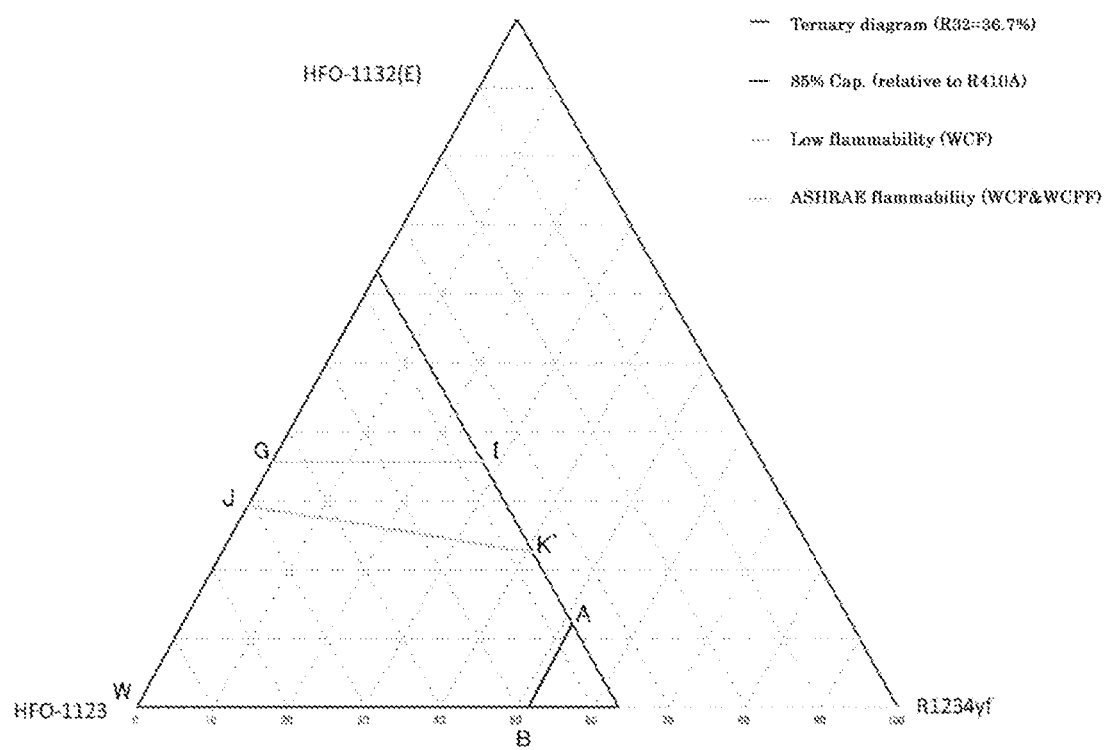
FIG. 11 is a diagram showing points A, B, G, I, J, K', and W, and line segments that connect these points to each other in a ternary composition diagram in which the sum of HFO-1132(E), HFO-1123, and R1234yf is 63.3 mass % (the content of R32 is 36.7 mass %).
Figure 12:
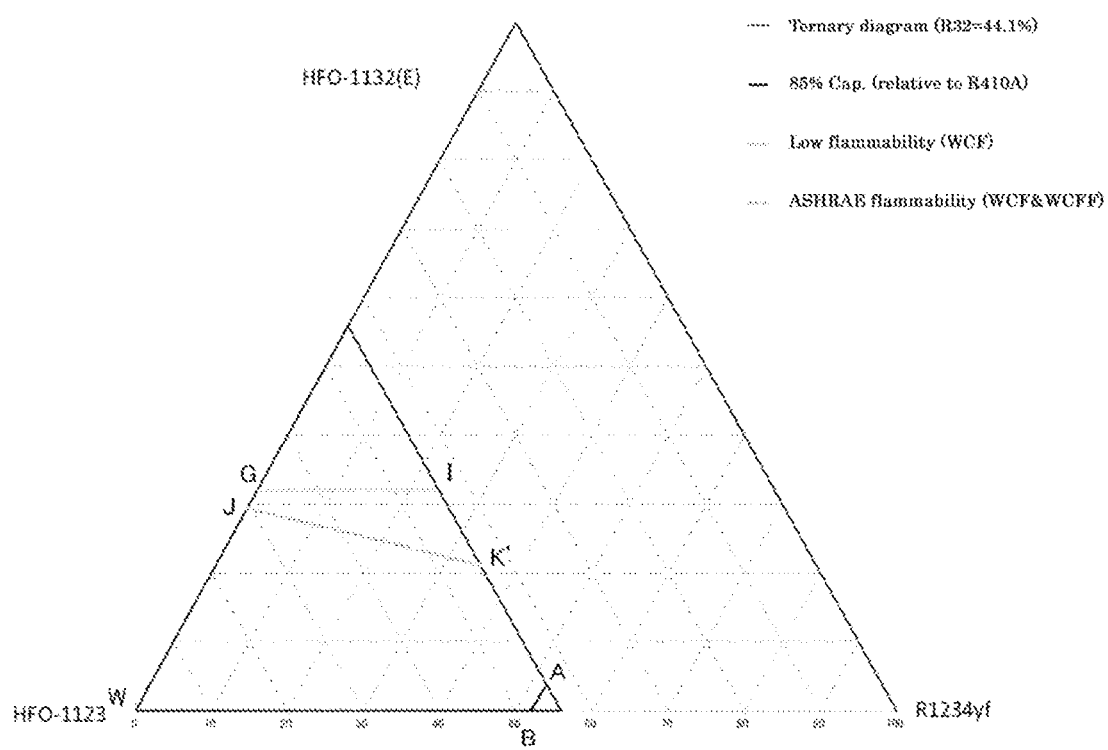
FIG. 12 is a diagram showing points A, B, G, I, J, K', and W, and line segments that connect these points to each other in a ternary composition diagram in which the sum of HFO-1132(E), HFO-1123, and R1234yf is 55.9 mass % (the content of R32 is 44.1 mass %).
Figure 13:
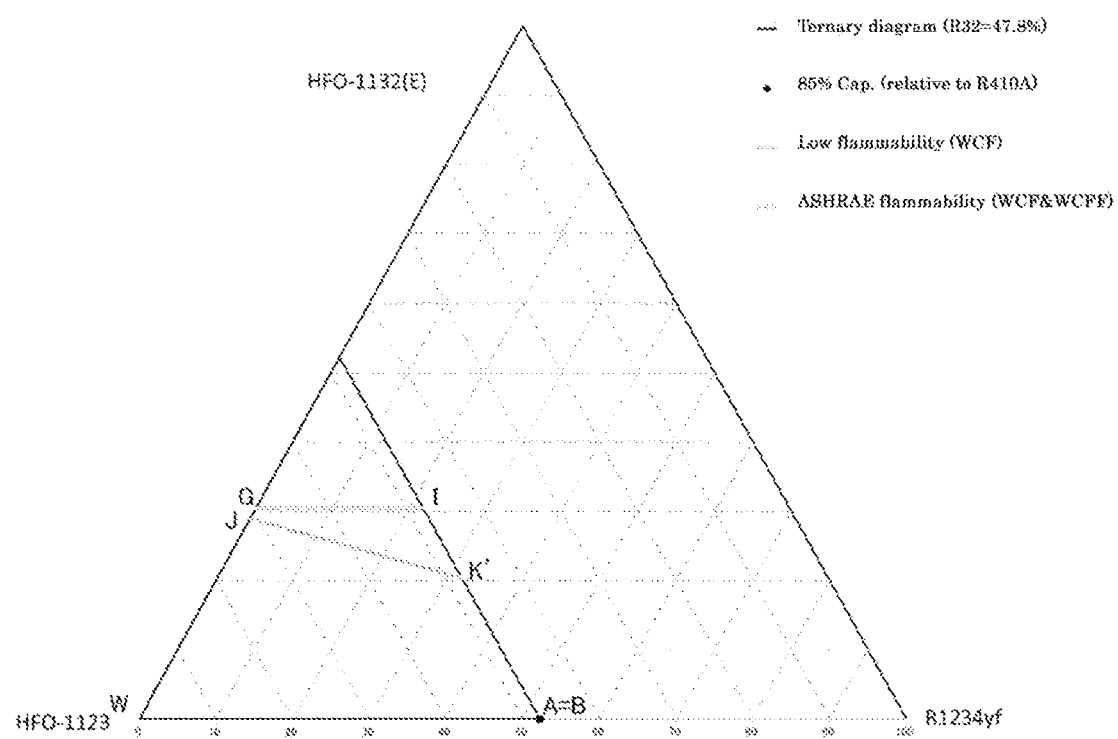
FIG. 13 is a diagram showing points A, B, G, I, J, K', and W, and line segments that connect these points to each other in a ternary composition diagram in which the sum of HFO-1132(E), HFO-1123, and R1234yf is 52.2 mass % (the content of R32 is 47.8 mass %).

In FIG. 3, the COP ratio of 92.5% or more forms a curved line CD. In FIG. 3, an approximate line formed by connecting three points: point C (32.9, 67.1, 0.0) and points (26.6, 68.4, 5) (19.5, 70.5, 10) where the COP ratio is 92.5% when the concentration of R1234yf is 5 mass % and 10 mass was obtained, and a straight line that connects point C and point D' (0, 75.4, 24.6), which is the intersection of the approximate line and a point where the concentration of HFO-1132 (E) is 0.0 mass % was defined as a line segment D'C. In FIG. 4, point D' (0, 83.4, 9.5) was similarly obtained from an approximate curve formed by connecting point C (18.4, 74.5, 0) and points (13.9, 76.5, 2.5) (8.7, 79.2, 5) where the COP ratio is 92.5%, and a straight line that connects point C and point D' was defined as the straight line D'C.

The composition of each mixture was defined as WCF. A leak simulation was performed using NIST Standard Reference Database REFLEAK Version 4.0 under the conditions of Equipment, Storage, Shipping, Leak, and Recharge according to the ASHRAE Standard 34-2013. The most flammable fraction was defined as WCFF.

For the flammability, the burning velocity was measured according to the ANSI/ASHRAE Standard 34-2013. Both WCF and WCFF having a burning velocity of 10 cm/s or less were determined to be classified as "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

The results are shown in Tables 97 to 104.

TABLE 97

| | Item | | Comp. Ex. 6 | Comp. Ex. 13 | Comp. Ex. 19 | Comp. Ex. 24 | Comp. Ex. 29 | Comp. Ex. 34 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 28.0 | 32.0 | 33.1 | 33.4 | 33.2 | 32.7 |
| | R1234yf | Mass % | 0.0 | 0.0 | 0.0 | 0 | 0 | 0 |
| | R32 | Mass % | 0.0 | 7.1 | 11.1 | 14.5 | 18.2 | 21.9 |
| | Burning velocity (WCF) | cm/s | 10 | 10 | 10 | 10 | 10 | 10 |

TABLE 98

| | Item | | Comp. Ex. 39 | Comp. Ex. 45 | Comp. Ex. 51 | Comp. Ex. 57 | Comp. Ex. 62 |
|---|---|---|---|---|---|---|---|
| WCF | HFO-1132(E) | Mass % | 41.8 | 40 | 35.7 | 32 | 30.4 |
| | HFO-1123 | Mass % | 31.5 | 30.7 | 23.6 | 23.9 | 21.8 |
| | R1234yf | Mass % | 0 | 0 | 0 | 0 | 0 |
| | R32 | Mass % | 26.7 | 29.3 | 36.7 | 44.1 | 47.8 |
| | Burning velocity (WCF) | cm/s | 10 | 10 | 10 | 10 | 10 |

TABLE 99

| | Item | | Comp. Ex. 7 | Comp. Ex. 14 | Comp. Ex. 20 | Comp. Ex. 25 | Comp. Ex. 30 | Comp. Ex. 35 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 0.0 | 0.0 | 0.0 | 0 | 0 | 0 |

TABLE 99-continued

| Item | | Comp. Ex. 7 | Comp. Ex. 14 | Comp. Ex. 20 | Comp. Ex. 25 | Comp. Ex. 30 | Comp. Ex. 35 |
|---|---|---|---|---|---|---|---|
| R1234yf | Mass % | 28.0 | 32.0 | 33.1 | 33.4 | 33.2 | 32.7 |
| R32 | Mass % | 0.0 | 7.1 | 11.1 | 14.5 | 18.2 | 21.9 |
| Burning velocity (WCF) | cm/s | 10 | 10 | 10 | 10 | 10 | 10 |

TABLE 100

| | Item | | Comp. Ex. 40 | Comp. Ex. 46 | Comp. Ex. 52 | Comp. Ex. 58 | Comp. Ex. 63 |
|---|---|---|---|---|---|---|---|
| WCF | HFO-1132(E) | Mass % | 41.8 | 40 | 35.7 | 32 | 30.4 |
| | HFO-1123 | Mass % | 0 | 0 | 0 | 0 | 0 |
| | R1234yf | Mass % | 31.5 | 30.7 | 23.6 | 23.9 | 21.8 |
| | R32 | Mass % | 26.7 | 29.3 | 36.7 | 44.1 | 47.8 |
| Burning velocity (WCF) | | cm/s | 10 | 10 | 10 | 10 | 10 |

TABLE 101

| | Item | | Comp. Ex. 8 | Comp. Ex. 15 | Comp. Ex. 21 | Comp. Ex. 26 | Comp. Ex. 31 | Comp. Ex. 36 |
|---|---|---|---|---|---|---|---|---|
| WCF | HFO-1132(E) | Mass % | 47.1 | 40.5 | 37.0 | 34.3 | 32.0 | 30.3 |
| | HFO-1123 | Mass % | 52.9 | 52.4 | 51.9 | 51.2 | 49.8 | 47.8 |
| | R1234yf | Mass % | 0.0 | 0.0 | 0.0 | 0.0 | 0.0 | 0.0 |
| | R32 | Mass % | 0.0 | 7.1 | 11.1 | 14.5 | 18.2 | 21.9 |
| | Leak condition that results in WCFF | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side |
| WCFF | HFO-1132(E) | Mass % | 72.0 | 62.4 | 56.2 | 50.6 | 45.1 | 40.0 |
| | HFO-1123 | Mass % | 28.0 | 31.6 | 33.0 | 33.4 | 32.5 | 30.5 |
| | R1234yf | Mass % | 0.0 | 0.0 | 0.0 | 20.4 | 0.0 | 0.0 |
| | R32 | Mass % | 0.0 | 50.9 | 10.8 | 16.0 | 22.4 | 29.5 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

TABLE 102

| | Item | | Comp. Ex. 41 | Comp. Ex. 47 | Comp. Ex. 53 | Comp. Ex. 59 | Comp. Ex. 64 |
|---|---|---|---|---|---|---|---|
| WCF | HFO-1132(E) | Mass % | 29.1 | 28.8 | 29.3 | 29.4 | 28.9 |
| | HFO-1123 | Mass % | 44.2 | 41.9 | 34.0 | 26.5 | 23.3 |
| | R1234yf | Mass % | 0.0 | 0.0 | 0.0 | 0.0 | 0.0 |
| | R32 | Mass % | 26.7 | 29.3 | 36.7 | 44.1 | 47.8 |
| | Leak condition that results in WCFF | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 90% release, gas phase side | Storage/Shipping −40° C., 86% release, gas phase side |
| WCFF | HFO-1132(E) | Mass % | 34.6 | 32.2 | 27.7 | 28.3 | 27.5 |
| | HFO-1123 | Mass % | 26.5 | 23.9 | 17.5 | 18.2 | 16.7 |
| | R1234yf | Mass % | 0.0 | 0.0 | 0.0 | 0.0 | 0.0 |
| | R32 | Mass % | 38.9 | 43.9 | 54.8 | 53.5 | 55.8 |

TABLE 102-continued

| Item | | Comp. Ex. 41 | Comp. Ex. 47 | Comp. Ex. 53 | Comp. Ex. 59 | Comp. Ex. 64 |
|---|---|---|---|---|---|---|
| Burning velocity (WCF) | cm/s | 8 or less | 8 or less | 8.3 | 9.3 | 9.6 |
| Burning velocity (WCFF) | cm/s | 10 | 10 | 10 | 10 | 10 |

TABLE 103

| | Item | | Comp. Ex. 9 | Comp. Ex. 16 | Comp. Ex. 22 | Comp. Ex. 27 | Comp. Ex. 32 | Comp. Ex. 37 |
|---|---|---|---|---|---|---|---|---|
| WCF | HFO-1132(E) | Mass % | 61.7 | 47.0 | 41.0 | 36.5 | 32.5 | 28.8 |
| | HFO-1123 | Mass % | 5.9 | 7.2 | 6.5 | 5.6 | 4.0 | 2.4 |
| | R1234yf | Mass % | 32.4 | 38.7 | 41.4 | 43.4 | 45.3 | 46.9 |
| | R32 | Mass % | 0.0 | 7.1 | 11.1 | 14.5 | 18.2 | 21.9 |
| | Leak condition that results in WCFF | | Storage/Shipping −40° C., 0% release, gas phase side | Storage/Shipping −40° C., 0% release, gas phase side | Storage/Shipping −40° C., 0% release, gas phase side | Storage/Shipping −40° C., 92% release, liquid phase side | Storage/Shipping −40° C., 0% release, gas phase side | Storage/Shipping −40° C., 0% release, gas phase side |
| WCFF | HFO-1132(E) | Mass % | 72.0 | 56.2 | 50.4 | 46.0 | 42.4 | 39.1 |
| | HFO-1123 | Mass % | 10.5 | 12.6 | 11.4 | 10.1 | 7.4 | 4.4 |
| | R1234yf | Mass % | 17.5 | 20.4 | 21.8 | 22.9 | 24.3 | 25.7 |
| | R32 | Mass % | 0.0 | 10.8 | 16.3 | 21.0 | 25.9 | 30.8 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

TABLE 104

| | Item | | Comp. Ex. 42 | Comp. Ex. 48 | Comp. Ex. 54 | Comp. Ex. 60 | Comp. Ex. 65 |
|---|---|---|---|---|---|---|---|
| WCF | HFO-1132(E) | Mass % | 24.8 | 24.3 | 22.5 | 21.1 | 20.4 |
| | HFO-1123 | Mass % | 0.0 | 0.0 | 0.0 | 0.0 | 0.0 |
| | R1234yf | Mass % | 48.5 | 46.4 | 40.8 | 34.8 | 31.8 |
| | R32 | Mass % | 26.7 | 29.3 | 36.7 | 44.1 | 47.8 |
| | Leak condition that results in WCF | | Storage/Shipping −40° C., 0% release, gas phase side | Storage/Shipping −40° C., 0% release, gas phase side | Storage/Shipping −40° C., 0% release, gas phase side | Storage/Shipping −40° C., 0% release, gas phase side | Storage/Shipping −40° C., 0% release, gas phase side |
| WCFF | HFO-1132(E) | Mass % | 35.3 | 34.3 | 31.3 | 29.1 | 28.1 |
| | HFO-1123 | Mass % | 0.0 | 0.0 | 0.0 | 0.0 | 0.0 |
| | R1234yf | Mass % | 27.4 | 26.2 | 23.1 | 19.8 | 18.2 |
| | R32 | Mass % | 37.3 | 39.6 | 45.6 | 51.1 | 53.7 |
| Burning velocity (WCF) | | cm/s | 8 or less | 8 or less | 8 or less | 8 or less | 8 or less |
| Burning velocity (WCFF) | | cm/s | 10 | 10 | 10 | 10 | 10 |

The results in Tables 97 to 100 indicate that the refrigerant has a WCF lower flammability in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, coordinates (x,y,z) in a ternary composition diagram in which the sum of HFO-1132(E), HFO-1123, and R1234yf is (100-a) mass % and a straight line connecting a point (0.0, 100.0-a, 0.0) and a point (0.0, 0.0, 100.0-a) is the base, if $0<a\leq11.1$, coordinates (x,y,z) in the ternary composition diagram are on or below a straight line GI that connects point G ($0.026a^2-1.7478a+72.0$, $-0.026a^2+0.7478a+28.0$, 0.0) and point I ($0.026a^2-1.7478a+72.0$, 0.0, $-0.026a^2+0.7478a+28.0$);
if $11.1<a\leq18.2$, coordinates (x,y,z) in the ternary composition diagram are on or below a straight line GI that connects point G ($0.02a^2-1.6013a+71.105$, $-0.02a^2+0.6013a+28.895$, 0.0) and point I ($0.02a^2-1.6013a+71.105$, 0.0, $-0.02a^2+0.6013a+28.895$); if $18.2<a\leq26.7$, coordinates (x,y,z) in the ternary composition diagram are on or below a straight line GI that connects point G ($0.0135a^2-1.4068a+69.727$, $-0.0135a^2+0.4068a+30.273$, 0.0) and point I ($0.0135a^2-1.4068a+69.727$, 0.0, $-0.0135a^2+0.4068a+30.273$); if $26.7<a\leq36.7$, coordinates (x,y,z) in the ternary composition diagram are on or below a straight line GI that connects point G ($0.0111a^2-1.3152a+68.986$, $-0.0111a^2+0.3152a+31.014$, 0.0) and point I ($0.0111a^2-1.3152a+68.986$, 0.0, $-0.0111a^2+0.3152a+31.014$); and if $36.7<a\leq46.7$, coordinates (x,y,z) in the ternary composition diagram are on or below a straight line GI that connects point G ($0.0061a^2-0.9918a+63.902$, $-0.0061a^2-0.0082a+36.098$, 0.0) and point I ($0.0061a^2-0.9918a+63.902$, 0.0, $-0.0061a^2-0.0082a+36.098$).

Three points corresponding to point G (Table 105) and point I (Table 106) were individually obtained in each of the following five ranges by calculation, and their approximate expressions were obtained.

TABLE 105

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 28.0 | 32.0 | 33.1 | 33.1 | 33.4 | 33.2 | 33.2 | 32.7 | 31.5 |
| R1234yf | 0 | 0 | 0 | 0 | 0 | 0 | 0 | 0 | 0 |
| R32 | | a | | | a | | | a | |
| HFO-1132(E) Approximate expression | | $0.026a^2 - 1.7478a + 72.0$ | | | $0.02a^2 - 1.6013a + 71.105$ | | | $0.0135a^2 - 1.4068a + 69.727$ | |
| HFO-1123 Approximate expression | | $-0.026a^2 + 0.7478a + 28.0$ | | | $-0.02a^2 + 0.6013a + 28.895$ | | | $-0.0135a^2 + 0.4068a + 30.273$ | |
| R1234yf Approximate expression | | 0 | | | 0 | | | 0 | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 31.5 | 30.7 | 27.6 | 27.6 | 23.9 | 21.8 |
| R1234yf | 0 | 0 | 0 | 0 | 0 | 0 |
| R32 | | a | | | a | |
| HFO-1132(E) Approximate expression | | $0.0111a^2 - 1.3152a + 68.986$ | | | $0.0061a^2 - 0.9918a + 63.902$ | |
| HFO-1123 Approximate expression | | $-0.0111a^2 + 0.3152a + 31.014$ | | | $-0.0061a^2 - 0.0082a + 36.098$ | |
| R1234yf Approximate expression | | 0 | | | 0 | |

TABLE 106

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 0 | 0 | 0 | 0 | 0 | 0 | 0 | 0 | 0 |
| R1234yf | 28.0 | 32.0 | 33.1 | 33.1 | 33.4 | 33.2 | 33.2 | 32.7 | 31.5 |
| R32 | | a | | | a | | | a | |
| HFO-1132(E) Approximate expression | | $0.026a^2 - 1.7478a + 72.0$ | | | $0.02a^2 - 1.6013a + 71.105$ | | | $0.0135a^2 - 1.4068a + 69.727$ | |
| HFO-1123 Approximate expression | | 0 | | | 0 | | | 0 | |
| R1234yf Approximate expression | | $-0.026a^2 + 0.7478a + 28.0$ | | | $-0.02a^2 + 0.6013a + 28.895$ | | | $-0.0135a^2 + 0.4068a + 30.273$ | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 0 | 0 | 0 | 0 | 0 | 0 |
| R1234yf | 31.5 | 30.7 | 23.6 | 23.6 | 23.5 | 21.8 |
| R32 | | x | | | x | |

TABLE 106-continued

| | | |
|---|---|---|
| HFO-1132(E) Approximate expression | $0.0111a^2 - 1.3152a + 68.986$ | $0.0061a^2 - 0.9918a + 63.902$ |
| HFO-1123 Approximate expression | 0 | 0 |
| R1234yf Approximate expression | $-0.0111a^2 + 0.3152a + 31.014$ | $-0.0061a^2 - 0.0082a + 36.098$ |

The results in Tables 101 to 104 indicate that the refrigerant is determined to have a WCFF lower flammability, and the flammability classification according to the ASHRAE Standard is "2L (flammability)" in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, in a ternary composition diagram in which the sum of HFO-1132(E), HFO-1123, and R1234yf is (100-a) mass % and a straight line connecting a point (0.0, 100.0-a, 0.0) and a point (0.0, 0.0, 100.0-a) is the base, if 0<a11.1, coordinates (x,y,z) in the ternary composition diagram are on or below a straight line JK' that connects point J (0.0049a2−0.9645a+47.1, −0.0049a$^2$−0.0355a+52.9, 0.0) and point K'(0.0514a$^2$−2.4353a+61.7, −0.0323a$^2$+0.4122a+5.9, −0.0191a$^2$+1.0231a+32.4); if 11.1<a18.2, coordinates are on a straight line JK' that connects point J (0.0243a$^2$−1.4161a+49.725, −0.0243a$^2$+0.4161a+50.275, 0.0) and point K'(0.0341a$^2$−2.1977a+61.187, −0.0236a$^2$+0.34a+5.636, −0.0105a$^2$+0.8577a+33.177); if 18.2<a26.7, coordinates are on or below a straight line JK' that connects point J (0.0246a$^2$−1.4476a+50.184, −0.0246a$^2$+0.4476a+49.816, 0.0) and point K' (0.0196a$^2$−1.7863a+58.515, −0.0079a$^2$−0.1136a+8.702, −0.0117a$^2$+0.8999a+32.783); if 26.7<a36.7, coordinates are on or below a straight line JK' that connects point J (0.0183a$^2$−1.1399a+46.493, −0.0183a$^2$+0.1399a+53.507, 0.0) and point K' (−0.0051a$^2$+0.0929a+25.95, 0.0, 0.0051a$^2$−1.0929a+74.05); and if 36.7<a46.7, coordinates are on or below a straight line JK' that connects point J (−0.0134a$^2$+1.0956a+7.13, 0.0134a$^2$-2.0956a+92.87, 0.0) and point K' 0.1892a+29.443, 0.0, −0.8108a+70.557).

Actual points having a WCFF lower flammability form a curved line that connects point J and point K' (on the straight line AB) in FIG. 3 and extends toward the HFO-1132(E) side. Accordingly, when coordinates are on or below the straight line JK', WCFF lower flammability is achieved.

Three points corresponding to point J (Table 107) and point K' (Table 108) were individually obtained in each of the following five ranges by calculation, and their approximate expressions were obtained.

TABLE 107

| Item | 1.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 47.1 | 40.5 | 37 | 37.0 | 34.3 | 32.0 | 32.0 | 30.3 | 29.1 |
| HFO-1123 | 52.9 | 52.4 | 51.9 | 51.9 | 51.2 | 49.8 | 49.8 | 47.8 | 44.2 |
| R1234yf | 0 | 0 | 0 | 0 | 0 | 0 | 0 | 0 | 0 |
| R32 | a | | | a | | | a | | |
| HFO-1132(E) Approximate expression | $0.0049a^2 - 0.9645a + 47.1$ | | | $0.0243a^2 - 1.4161a + 49.725$ | | | $0.0246a^2 - 1.4476a + 50.184$ | | |
| HFO-1123 Approximate expression | $-0.0049a^2 - 0.0355a + 52.9$ | | | $-0.0243a^2 + 0.4161a + 50.275$ | | | $-0.0246a^2 + 0.4476a + 49.816$ | | |
| R1234yf Approximate expression | 0 | | | 0 | | | 0 | | |

| Item | 36.7 ≥ R32 ≥ 26.7 | | | 47.8 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 29.1 | 28.8 | 29.3 | 29.3 | 29.4 | 28.9 |
| HFO-1123 | 44.2 | 41.9 | 34.0 | 34.0 | 26.5 | 23.3 |
| R1234yf | 0 | 0 | 0 | 0 | 0 | 0 |
| R32 | a | | | a | | |
| HFO-1132(E) Approximate expression | $0.0183a^2 - 1.1399a + 46.493$ | | | $-0.0134a^2 + 1.0956a + 7.13$ | | |
| HFO-1123 Approximate expression | $-0.0183a^2 + 0.1399a + 53.507$ | | | $0.0134a^2 - 2.0956a + 92.87$ | | |
| R1234yf Approximate expression | 0 | | | 0 | | |

TABLE 108

| Item | 1.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 61.7 | 47.0 | 41.0 | 41.0 | 36.5 | 32.5 | 32.5 | 28.8 | 24.8 |
| HFO-1123 | 5.9 | 7.2 | 6.5 | 6.5 | 5.6 | 4.0 | 4.0 | 2.4 | 0 |
| R1234yf | 32.4 | 38.7 | 41.4 | 41.4 | 43.4 | 45.3 | 45.3 | 46.9 | 48.5 |
| R32 | x | | | x | | | x | | |
| HFO-1132(E) Approximate expression | $0.0514a^2 - 2.4353a + 61.7$ | | | $0.0341a^2 - 2.1977a + 61.187$ | | | $0.0196a^2 - 1.7863a + 58.515$ | | |
| HFO-1123 Approximate expression | $-0.0323a^2 + 0.4122a + 5.9$ | | | $-0.0236a^2 + 0.34a + 5.636$ | | | $-0.0079a^2 - 0.1136a + 8.702$ | | |
| R1234yf Approximate expression | $-0.0191a^2 + 1.0231a + 32.4$ | | | $-0.0105a^2 + 0.8577a + 33.177$ | | | $-0.0117a^2 + 0.8999a + 32.783$ | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 24.8 | 24.3 | 22.5 | 22.5 | 21.1 | 20.4 |
| HFO-1123 | 0 | 0 | 0 | 0 | 0 | 0 |
| R1234yf | 48.5 | 46.4 | 40.8 | 40.8 | 34.8 | 31.8 |
| R32 | x | | | x | | |
| HFO-1132(E) Approximate expression | $-0.0051a^2 + 0.0929a + 25.95$ | | | $-1.892a + 29.443$ | | |
| HFO-1123 Approximate expression | 0 | | | 0 | | |
| R1234yf Approximate expression | $0.0051a^2 - 1.0929a + 74.05$ | | | $0.892a + 70.557$ | | |

FIGS. 3 to 13 show compositions whose R32 content a (mass %) is 0 mass %, 7.1 mass %, 11.1 mass %, 14.5 mass %, 18.2 mass %, 21.9 mass %, 26.7 mass %, 29.3 mass %, 36.7 mass %, 44.1 mass %, and 47.8 mass %, respectively.

Points A, B, C, and D' were obtained in the following manner according to approximate calculation.

Point A is a point where the content of HFO-1123 is 0 mass %, and a refrigerating capacity ratio of 85% relative to that of R410A is achieved. Three points corresponding to point A were obtained in each of the following five ranges by calculation, and their approximate expressions were obtained (Table 109).

TABLE 109

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 68.6 | 55.3 | 48.4 | 48.4 | 42.8 | 37 | 37 | 31.5 | 24.8 |
| HFO-1123 | 0 | 0 | 0 | 0 | 0 | 0 | 0 | 0 | 0 |
| R1234yf | 31.4 | 37.6 | 40.5 | 40.5 | 42.7 | 44.8 | 44.8 | 46.6 | 48.5 |
| R32 | a | | | a | | | a | | |
| HFO-1132(E) Approximate expression | $0.0134a^2 - 1.9681a + 68.6$ | | | $0.0112a^2 - 1.9337a + 68.484$ | | | $0.0107a^2 - 1.9142a + 68.305$ | | |
| HFO-1123 Approximate expression | 0 | | | 0 | | | 0 | | |
| R1234yf Approximate expression | $-0.0134a^2 + 0.9681a + 31.4$ | | | $-0.0112a^2 + 0.9337a + 31.516$ | | | $-0.0107a^2 + 0.9142a + 31.695$ | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 24.8 | 21.3 | 12.1 | 12.1 | 3.8 | 0 |
| HFO-1123 | 0 | 0 | 0 | 0 | 0 | 0 |
| R1234yf | 48.5 | 49.4 | 51.2 | 51.2 | 52.1 | 52.2 |
| R32 | a | | | a | | |
| HFO-1132(E) Approximate expression | $0.0103a^2 - 1.9225a + 68.793$ | | | $0.0085a^2 - 1.8102a + 67.1$ | | |

TABLE 109-continued

| | | |
|---|---|---|
| HFO-1123 | 0 | 0 |
| Approximate expression | | |
| R1234yf Approximate expression | $-0.0103a^2 + 0.9225a + 31.207$ | $-0.0085a^2 + 0.8102a + 32.9$ |

Point B is a point where the content of HFO-1132(E) is 0 mass %, and a refrigerating capacity ratio of 85% relative to that of R410A is achieved.

Three points corresponding to point B were obtained in each of the following five ranges by calculation, and their approximate expressions were obtained (Table 110).

TABLE 110

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 0 | 0 | 0 | 0 | 0 | 0 | 0 | 0 | 0 |
| HFO-1123 | 58.7 | 47.8 | 42.3 | 42.3 | 37.8 | 33.1 | 33.1 | 28.5 | 22.9 |
| R1234yf | 41.3 | 45.1 | 46.6 | 46.6 | 47.7 | 48.7 | 48.7 | 49.6 | 50.4 |
| R32 | a | | | a | | | a | | |
| HFO-1132(E) Approximate expression | 0 | | | 0 | | | 0 | | |
| HFO-1123 Approximate expression | $0.0144a^2 - 1.6377a + 58.7$ | | | $0.0075a^2 - 1.5156a + 58.199$ | | | $0.009a^2 - 1.6045a + 59.318$ | | |
| R1234yf Approximate expression | $-0.0144a^2 + 0.6377a + 41.3$ | | | $-0.0075a^2 + 0.5156a + 41.801$ | | | $-0.009a^2 + 0.6045a + 40.682$ | | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 0 | 0 | 0 | 0 | 0 | 0 |
| HFO-1123 | 22.9 | 19.9 | 11.7 | 11.8 | 3.9 | 0 |
| R1234yf | 50.4 | 50.8 | 51.6 | 51.5 | 52.0 | 52.2 |
| R32 | a | | | a | | |
| HFO-1132(E) Approximate expression | 0 | | | 0 | | |
| HFO-1123 Approximate expression | $0.0046a^2 - 1.41a + 57.286$ | | | $0.0012a^2 - 1.1659a + 52.95$ | | |
| R1234yf Approximate expression | $-0.0046a^2 + 0.41a + 42.714$ | | | $-0.0012a^2 + 0.1659a + 47.05$ | | |

Point D' is a point where the content of HFO-1132(E) is 0 mass %, and a COP ratio of 95.5% relative to that of R410A is achieved.

Three points corresponding to point D' were obtained in each of the following by calculation, and their approximate expressions were obtained (Table 111).

TABLE 111

| Item | $11.1 \geq R32 > 0$ | | |
|---|---|---|---|
| R32 | 0 | 7.1 | 11.1 |
| HFO-1132(E) | 0 | 0 | 0 |
| HFO-1123 | 75.4 | 83.4 | 88.9 |
| R1234yf | 24.6 | 9.5 | 0 |
| R32 | a | | |
| HFO-1132(E) Approximate expression | 0 | | |
| HFO-1123 Approximate expression | $0.0224a^2 + 0.968a + 75.4$ | | |
| R1234yf Approximate expression | $-0.0224a^2 - 1.968a + 24.6$ | | |

Point C is a point where the content of R1234yf is 0 mass %, and a COP ratio of 95.5% relative to that of R410A is achieved.

Three points corresponding to point C were obtained in each of the following by calculation, and their approximate expressions were obtained (Table 112).

TABLE 112

| Item | $11.1 \geq R32 > 0$ | | |
|---|---|---|---|
| R32 | 0 | 7.1 | 11.1 |
| HFO-1132(E) | 32.9 | 18.4 | 0 |
| HFO-1123 | 67.1 | 74.5 | 88.9 |
| R1234yf | 0 | 0 | 0 |

TABLE 112-continued

| Item | $11.1 \geq R32 > 0$ |
|---|---|
| R32 | a |
| HFO-1132(E) Approximate expression | $-0.2304a^2 - 0.4062a + 32.9$ |
| HFO-1123 Approximate expression | $0.2304a^2 - 0.5938a + 67.1$ |
| R1234yf Approximate expression | 0 |

(5-4) Refrigerant D

The refrigerant D according to the present disclosure is a mixed refrigerant comprising trans-1,2-difluoroethylene (HFO-1132(E)), difluoromethane (R32), and 2,3,3,3-tetrafluoro-1-propene (R1234yf).

The refrigerant D according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI);
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and E are straight lines. When the requirements above are satisfied, the refrigerant according to the present disclosure has a refrigerating capacity ratio of 80% or more relative to R410A, a GWP of 125 or less, and a WCF lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines. When the requirements above are satisfied, the refrigerant according to the present disclosure has a refrigerating capacity ratio of 70% or more relative to R410A, a GWP of 125 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line. When the requirements above are satisfied, the refrigerant according to the present disclosure has a refrigerating capacity ratio of 80% or more relative to R410A, a GWP of 250 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line. When the requirements above are satisfied, the refrigerant according to the present disclosure has a refrigerating capacity ratio of 92.5% or more relative to R410A, a GWP of 350 or less, and a WCF lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2-0.7103y+40.1, y, -0.0064y^2-0.2897y+59.9)$;
the line segment ST is represented by coordinates $(0.0082y^2-1.8683y+83.126, y, -0.0082y^2+0.8683y+16.874)$; and
the line segment TP is a straight line. When the requirements above are satisfied, the refrigerant according to the present disclosure has a refrigerating capacity ratio of 92.5% or more relative to R410A, a GWP of 350 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ac, cf, fd, and da that connect the following 4 points:
point a (71.1, 0.0, 28.9),
point c (36.5, 18.2, 45.3),
point f (47.6, 18.3, 34.1), and
point d (72.0, 0.0, 28.0),
or on these line segments;
the line segment ac is represented by coordinates $(0.0181y^2-2.2288y+71.096, y, -0.0181y^2+1.2288y+28.904)$;
the line segment fd is represented by coordinates $(0.02y^2-1.7y+72, y, -0.02y^2+0.7y+28)$; and
the line segments cf and da are straight lines. When the requirements above are satisfied, the refrigerant according to the present disclosure has a refrigerating capacity ratio of 85% or more relative to R410A, a GWP of 125 or less, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ab, be, ed, and da that connect the following 4 points:
point a (71.1, 0.0, 28.9),
point b (42.6, 14.5, 42.9),
point e (51.4, 14.6, 34.0), and
point d (72.0, 0.0, 28.0),
or on these line segments;
the line segment ab is represented by coordinates $(0.0181y^2-2.2288y+71.096, y, -0.0181y^2+1.2288y+28.904)$;
the line segment ed is represented by coordinates $(0.02y-1.7y+72, y, -0.02y^2+0.7y+28)$; and the line segments be and da are straight lines. When the requirements above are satisfied, the refrigerant according to the present disclosure has a refrigerating capacity ratio of 85% or more relative to R410A, a GWP of 100 or less, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gi, ij, and jg that connect the following 3 points:
point g (77.5, 6.9, 15.6),
point i (55.1, 18.3, 26.6), and
point j (77.5. 18.4, 4.1),
or on these line segments;
the line segment gi is represented by coordinates $(0.02y^2-2.4583y+93.396, y, -0.02y^2+1.4583y+6.604)$; and
the line segments ij and jg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gh, hk, and kg that connect the following 3 points:
point g (77.5, 6.9, 15.6),
point h (61.8, 14.6, 23.6), and
point k (77.5, 14.6, 7.9),
or on these line segments;
the line segment gh is represented by coordinates $(0.02y^2-2.4583y+93.396, y, -0.02y^2+1.4583y+6.604)$; and
the line segments hk and kg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure may further comprise other additional refrigerants in addition to HFO-1132(E), R32, and R1234yf, as long as the above properties and effects are not impaired. In this respect, the refrigerant according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant.

Such additional refrigerants are not limited, and can be selected from a wide range of refrigerants. The mixed refrigerant may comprise a single additional refrigerant, or two or more additional refrigerants.

Examples of Refrigerant D

The present disclosure is described in more detail below with reference to Examples of refrigerant D. However, the refrigerant D is not limited to the Examples.

The composition of each mixed refrigerant of HFO-1132 (E), R32, and R1234yf was defined as WCF. A leak simulation was performed using the NIST Standard Reference Database REFLEAK Version 4.0 under the conditions of Equipment, Storage, Shipping, Leak, and Recharge according to the ASHRAE Standard 34-2013. The most flammable fraction was defined as WCFF.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC. Tables 113 to 115 show the results.

TABLE 113

| Item | | Unit | Comparative Example 13 I | Example 11 | Example 12 J | Example 13 | Example 14 K | Example 15 | Example 16 L |
|---|---|---|---|---|---|---|---|---|---|
| WCF | HFO-1132(E) | Mass % | 72 | 57.2 | 48.5 | 41.2 | 35.6 | 32 | 28.9 |
| | R32 | Mass % | 0 | 10 | 18.3 | 27.6 | 36.8 | 44.2 | 51.7 |
| | R1234yf | Mass % | 28 | 32.8 | 33.2 | 31.2 | 27.6 | 23.8 | 19.4 |
| Burning Velocity (WCF) | | cm/s | 10 | 10 | 10 | 10 | 10 | 10 | 10 |

TABLE 114

| Item | | Unit | Comparative Example 14 M | Example 18 | Example 19 W | Example 20 | Example 21 N | Example 22 |
|---|---|---|---|---|---|---|---|---|
| WCF | HFO-1132(E) | Mass % | 52.6 | 39.2 | 32.4 | 29.3 | 27.7 | 24.6 |
| | R32 | Mass % | 0.0 | 5.0 | 10.0 | 14.5 | 18.2 | 27.6 |
| | R1234yf | Mass % | 47.4 | 55.8 | 57.6 | 56.2 | 54.1 | 47.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side |
| WCF | HFO-1132(E) | Mass % | 72.0 | 57.8 | 48.7 | 43.6 | 40.6 | 34.9 |
| | R32 | Mass % | 0.0 | 9.5 | 17.9 | 24.2 | 28.7 | 38.1 |
| | R1234yf | Mass % | 28.0 | 32.7 | 33.4 | 32.2 | 30.7 | 27.0 |
| Burning Velocity (WCF) | | cm/s | 8 or less | 8 or less | 8 or less | 8 or less | 8 or less | 8 or less |
| Burning Velocity (WCFF) | | cm/s | 10 | 10 | 10 | 10 | 10 | 10 |

TABLE 115

| Item | | Unit | Example 23 O | Example 24 | Example 25 P |
|---|---|---|---|---|---|
| WCF | HFO-1132 (E) | Mass % | 22.6 | 21.2 | 20.5 |
| | HFO-1123 | Mass % | 36.8 | 44.2 | 51.7 |
| | R1234yf | Mass % | 40.6 | 34.6 | 27.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side |
| WCFF | HFO-1132 (E) | Mass % | 31.4 | 29.2 | 27.1 |
| | HFO-1123 | Mass % | 45.7 | 51.1 | 56.4 |
| | R1234yf | Mass % | 23.0 | 19.7 | 16.5 |
| Burning Velocity (WCF) | | cm/s | 8 or less | 8 or less | 8 or less |
| Burning Velocity (WCFF) | | cm/s | 10 | 10 | 10 |

The results indicate that under the condition that the mass % of HFO-1132(E), R32, and R1234yf based on their sum is respectively represented by x, y, and z, when coordinates (x,y,z) in the ternary composition diagram shown in FIG. 14 in which the sum of HFO-1132(E), R32, and R1234yf is 100 mass % are on the line segment that connects point I, point J, point K, and point L, or below these line segments, the refrigerant has a WCF lower flammability.

Figure 14:
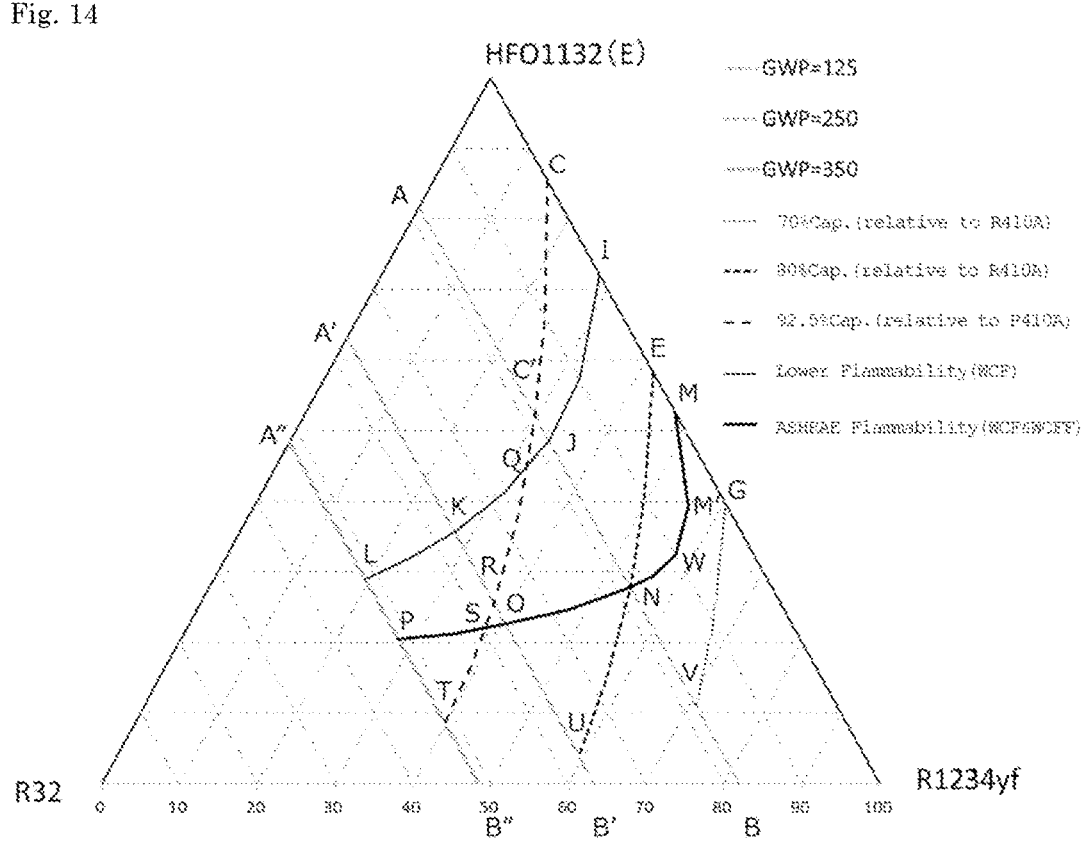
FIG. 14 is a view showing points A to C, E, G, and I to W; and line segments that connect points A to C, E, G, and I to W in a ternary composition diagram in which the sum of HFO-1132(E), R32, and R1234yf is 100 mass %.
Figure 15:
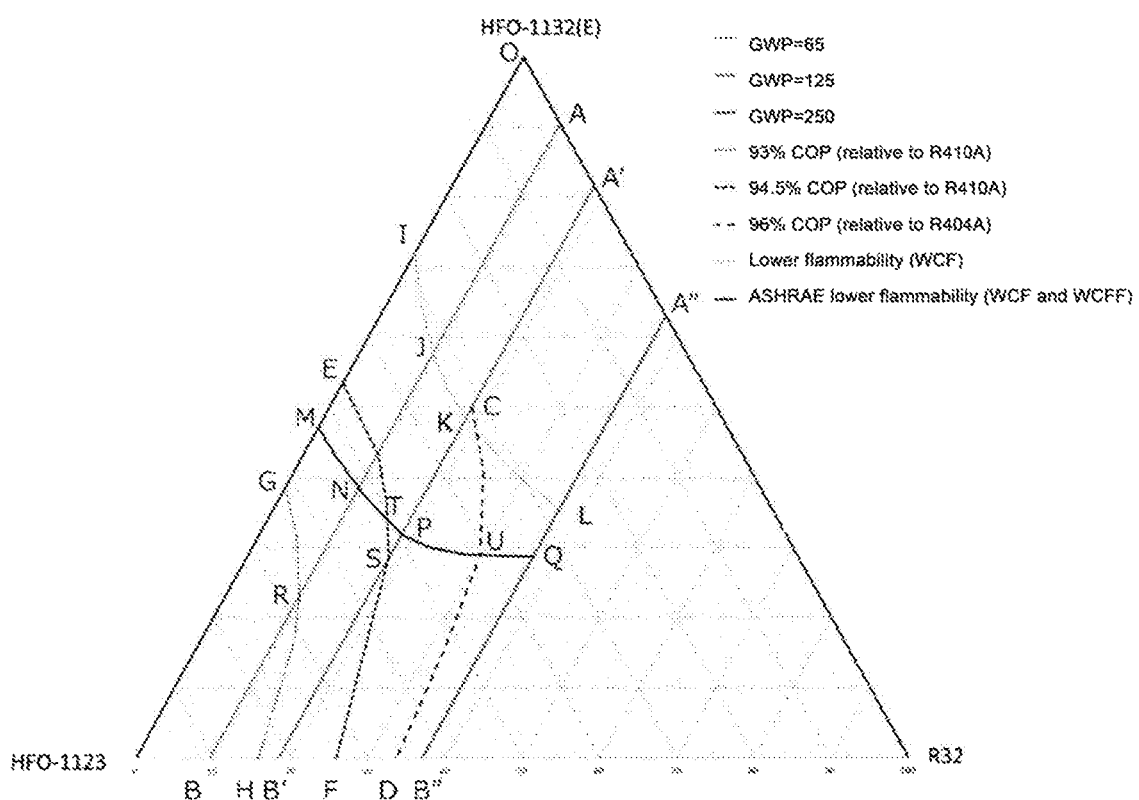
FIG. 15 is a view showing points A to U; and line segments that connect the points in a ternary composition diagram in which the sum of HFO-1132(E), HFO-1123, and R32 is 100 mass %.

The results also indicate that when coordinates (x,y,z) in the ternary composition diagram shown in FIG. 14 are on the line segments that connect point M, point M', point W, point J, point N, and point P, or below these line segments, the refrigerant has an ASHRAE lower flammability.

Mixed refrigerants were prepared by mixing HFO-1132 (E), R32, and R1234yf in amounts (mass %) shown in Tables 116 to 144 based on the sum of HFO-1132(E), R32, and R1234yf. The coefficient of performance (COP) ratio and the refrigerating capacity ratio relative to R410 of the mixed refrigerants shown in Tables 116 to 144 were determined. The conditions for calculation were as described below.

Evaporating temperature: 5° C.
Condensation temperature: 45° C.
Degree of superheating: 5 K
Degree of subcooling: 5 K
Compressor efficiency: 70%

Tables 116 to 144 show these values together with the GWP of each mixed refrigerant.

TABLE 116

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | Mass % | R410A | 81.6 | 0.0 | 63.1 | 0.0 | 48.2 | 0.0 |
| R32 | Mass % |  | 18.4 | 18.1 | 36.9 | 36.7 | 51.8 | 51.5 |
| R1234yf | Mass % |  | 0.0 | 81.9 | 0.0 | 63.3 | 0.0 | 48.5 |
| GWP | — | 2088 | 125 | 125 | 250 | 250 | 350 | 350 |
| COP Ratio | % (relative to R410A) | 100 | 98.7 | 103.6 | 98.7 | 102.3 | 99.2 | 102.2 |
| Refrigerating Capacity Ratio | % (relative to R410A) | 100 | 105.3 | 62.5 | 109.9 | 77.5 | 112.1 | 87.3 |

TABLE 117

| Item | Unit | Comparative Example 8 C | Comparative Example 9 | Comparative Example 10 C' | Example 1 | Example 2 R | Example 3 | Example 4 T |
|---|---|---|---|---|---|---|---|---|
| HFO-1132(E) | Mass % | 85.5 | 66.1 | 52.1 | 37.8 | 25.5 | 16.6 | 8.6 |
| R32 | Mass % | 0.0 | 10.0 | 18.2 | 27.6 | 36.8 | 44.2 | 51.6 |
| R1234yf | Mass % | 14.5 | 23.9 | 29.7 | 34.6 | 37.7 | 39.2 | 39.8 |
| GWP | — | 1 | 69 | 125 | 188 | 250 | 300 | 350 |
| COP Ratio | % (relative to R410A) | 99.8 | 99.3 | 99.3 | 99.6 | 100.2 | 100.8 | 101.4 |
| Refrigerating Capacity Ratio | % (relative to R410A) | 92.5 | 92.5 | 92.5 | 92.5 | 92.5 | 92.5 | 92.5 |

TABLE 118

| Item | Unit | Comparative Example 11 E | Example 5 | Example 6 N | Example 7 | Comparative Example 8 U | Example 12 G | Example 9 | Example 10 V |
|---|---|---|---|---|---|---|---|---|---|
| HFO-1132(E) | Mass % | 58.3 | 40.5 | 27.7 | 14.9 | 3.9 | 39.6 | 22.8 | 11.0 |
| R32 | Mass % | 0.0 | 10.0 | 18.2 | 27.6 | 36.7 | 0.0 | 10.0 | 18.1 |
| R1234yf | Mass % | 41.7 | 49.5 | 54.1 | 57.5 | 59.4 | 60.4 | 67.2 | 70.9 |
| GWP | — | 2 | 70 | 125 | 189 | 250 | 3 | 70 | 125 |
| COP Ratio | % (relative to R410A) | 100.3 | 100.3 | 100.7 | 101.2 | 101.9 | 101.4 | 101.8 | 102.3 |
| Refrigerating Capacity Ratio | % (relative to R410A) | 80.0 | 80.0 | 80.0 | 80.0 | 80.0 | 70.0 | 70.0 | 70.0 |

TABLE 119

| Item | Unit | Comparative Example 13 I | Example 11 | Example 12 J | Example 13 | Example 14 K | Example 15 | Example 16 L | Example 17 Q |
|---|---|---|---|---|---|---|---|---|---|
| HFO-1132(E) | Mass % | 72.0 | 57.2 | 48.5 | 41.2 | 35.6 | 32.0 | 28.9 | 44.6 |
| R32 | Mass % | 0.0 | 10.0 | 18.3 | 27.6 | 36.8 | 44.2 | 51.7 | 23.0 |
| R1234yf | Mass % | 28.0 | 32.8 | 33.2 | 31.2 | 27.6 | 23.8 | 19.4 | 32.4 |
| GWP | — | 2 | 69 | 125 | 188 | 250 | 300 | 350 | 157 |
| COP Ratio | % (relative to R410A) | 99.9 | 99.5 | 99.4 | 99.5 | 99.6 | 99.8 | 100.1 | 99.4 |
| Refrigerating Capacity Ratio | % (relative to R410A) | 86.6 | 88.4 | 90.9 | 94.2 | 97.7 | 100.5 | 103.3 | 92.5 |

TABLE 120

| Item | Unit | Comparative Example 14 M | Example 18 | Example 19 W | Example 20 | Example 21 N | Example 22 |
|---|---|---|---|---|---|---|---|
| HFO-1132(E) | Mass % | 52.6 | 39.2 | 32.4 | 29.3 | 27.7 | 24.5 |
| R32 | Mass % | 0.0 | 5.0 | 10.0 | 14.5 | 18.2 | 27.6 |
| R1234yf | Mass % | 47.4 | 55.8 | 57.6 | 56.2 | 54.1 | 47.9 |
| GWP | — | 2 | 36 | 70 | 100 | 125 | 188 |
| COP Ratio | % (relative to R410A) | 100.5 | 100.9 | 100.9 | 100.8 | 100.7 | 100.4 |
| Refrigerating Capacity Ratio | % (relative to R410A) | 77.1 | 74.8 | 75.6 | 77.8 | 80.0 | 85.5 |

TABLE 121

| Item | Unit | Example 23 O | Example 24 | Example 25 P | Example 26 S |
|---|---|---|---|---|---|
| HFO-1132(E) | Mass % | 22.6 | 21.2 | 20.5 | 21.9 |
| R32 | Mass % | 36.8 | 44.2 | 51.7 | 39.7 |
| R1234yf | Mass % | 40.6 | 34.6 | 27.8 | 38.4 |
| GWP | — | 250 | 300 | 350 | 270 |
| COP Ratio | % (relative to R410A) | 100.4 | 100.5 | 100.6 | 100.4 |
| Refrigerating Capacity Ratio | % (relative to R410A) | 91.0 | 95.0 | 99.1 | 92.5 |

TABLE 122

| Item | Unit | Comparative Example 15 | Comparative Example 16 | Comparative Example 17 | Comparative Example 18 | Example 27 | Example 28 | Comparative Example 19 | Comparative Example 20 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 5.0 | 5.0 | 5.0 | 5.0 | 5.0 | 5.0 | 5.0 | 5.0 |
| R1234yf | Mass % | 85.0 | 75.0 | 65.0 | 55.0 | 45.0 | 35.0 | 25.0 | 15.0 |
| GWP | — | 37 | 37 | 37 | 36 | 36 | 36 | 35 | 35 |
| COP Ratio | % (relative to R410A) | 103.4 | 102.6 | 101.6 | 100.8 | 100.2 | 99.8 | 99.6 | 99.4 |
| Refrigerating Capacity Ratio | % (relative to R410A) | 56.4 | 63.3 | 69.5 | 75.2 | 80.5 | 85.4 | 90.1 | 94.4 |

TABLE 123

| Item | Unit | Comparative Example 21 | Comparative Example 22 | Example 29 | Comparative Example 23 | Example 30 | Comparative Example 24 | Comparative Example 25 | Comparative Example 26 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 10.0 | 10.0 | 10.0 | 10.0 | 10.0 | 10.0 | 10.0 | 10.0 |
| R1234yf | Mass % | 80.0 | 70.0 | 60.0 | 50.0 | 40.0 | 30.0 | 20.0 | 10.0 |
| GWP | — | 71 | 71 | 70 | 70 | 70 | 69 | 69 | 69 |
| COP Ratio | % (relative to R410A) | 103.1 | 102.1 | 101.1 | 100.4 | 99.8 | 99.5 | 99.2 | 99.1 |
| Refrigerating Capacity Ratio | % (relative to R410A) | 61.8 | 68.3 | 74.3 | 79.7 | 84.9 | 89.7 | 94.2 | 98.4 |

TABLE 124

| Item | Unit | Comparative Example 27 | Example 31 | Comparative Example 28 | Example 32 | Example 33 | Comparative Example 29 | Comparative Example 30 | Comparative Example 31 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 15.0 | 15.0 | 15.0 | 15.0 | 15.0 | 15.0 | 15.0 | 15.0 |
| R1234yf | Mass % | 75.0 | 65.0 | 55.0 | 45.0 | 35.0 | 25.0 | 15.0 | 5.0 |
| GWP | — | 104 | 104 | 104 | 103 | 103 | 103 | 103 | 102 |
| COP Ratio | % (relative to R410A) | 102.7 | 101.6 | 100.7 | 100.0 | 99.5 | 99.2 | 99.0 | 98.9 |
| Refrigerating Capacity Ratio | % (relative to R410A) | 66.6 | 72.9 | 78.6 | 84.0 | 89.0 | 93.7 | 98.1 | 102.2 |

TABLE 125

| Item | Unit | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|
| HFO-1132(E) | Mass % | 10.0 | 20.0 | 30.0 | 40.0 | 50.0 | 60.0 | 70.0 | 10.0 |
| R32 | Mass % | 20.0 | 20.0 | 20.0 | 20.0 | 20.0 | 20.0 | 20.0 | 25.0 |
| R1234yf | Mass % | 70.0 | 60.0 | 50.0 | 40.0 | 30.0 | 20.0 | 10.0 | 65.0 |
| GWP | — | 138 | 138 | 137 | 137 | 137 | 136 | 136 | 171 |
| COP Ratio | % (relative to R410A) | 102.3 | 101.2 | 100.4 | 99.7 | 99.3 | 99.0 | 98.8 | 101.9 |
| Refrigerating Capacity Ratio | % (relative to R410A) | 71.0 | 77.1 | 82.7 | 88.0 | 92.9 | 97.5 | 101.7 | 75.0 |

TABLE 126

| Item | Unit | Example 34 | Comparative Example 40 | Comparative Example 41 | Comparative Example 42 | Comparative Example 43 | Comparative Example 44 | Comparative Example 45 | Example 35 |
|---|---|---|---|---|---|---|---|---|---|
| HFO-1132(E) | Mass % | 20.0 | 30.0 | 40.0 | 50.0 | 60.0 | 70.0 | 10.0 | 20.0 |
| R32 | Mass % | 25.0 | 25.0 | 25.0 | 25.0 | 25.0 | 25.0 | 30.0 | 30.0 |
| R1234yf | Mass % | 55.0 | 45.0 | 35.0 | 25.0 | 15.0 | 5.0 | 60.0 | 50.0 |
| GWP | — | 171 | 171 | 171 | 170 | 170 | 170 | 205 | 205 |
| COP Ratio | % (relative to R410A) | 100.9 | 100.1 | 99.6 | 99.2 | 98.9 | 98.7 | 101.6 | 100.7 |
| Refrigerating Capacity Ratio | % (relative to R410A) | 81.0 | 86.6 | 91.7 | 96.5 | 101.0 | 105.2 | 78.9 | 84.8 |

TABLE 127

| Item | Unit | Comparative Example 46 | Comparative Example 47 | Comparative Example 48 | Comparative Example 49 | Example 36 | Example 37 | Example 38 | Comparative Example 50 |
|---|---|---|---|---|---|---|---|---|---|
| HFO-1132(E) | Mass % | 30.0 | 40.0 | 50.0 | 60.0 | 10.0 | 20.0 | 30.0 | 40.0 |
| R32 | Mass % | 30.0 | 30.0 | 30.0 | 30.0 | 35.0 | 35.0 | 35.0 | 35.0 |

TABLE 127-continued

| Item | Unit | Comparative Example 46 | Comparative Example 47 | Comparative Example 48 | Comparative Example 49 | Example 36 | Example 37 | Example 38 | Comparative Example 50 |
|---|---|---|---|---|---|---|---|---|---|
| R1234yf | Mass % | 40.0 | 30.0 | 20.0 | 10.0 | 55.0 | 45.0 | 35.0 | 25.0 |
| GWP | — | 204 | 204 | 204 | 204 | 239 | 238 | 238 | 238 |
| COP Ratio | % (relative to R410A) | 100.0 | 99.5 | 99.1 | 98.8 | 101.4 | 100.6 | 99.9 | 99.4 |
| Refrigerating Capacity Ratio | % (relative to R410A) | 90.2 | 95.3 | 100.0 | 104.4 | 82.5 | 88.3 | 93.7 | 98.6 |

TABLE 128

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| HFO-1132(E) | Mass % | 50.0 | 60.0 | 10.0 | 20.0 | 30.0 | 40.0 | 50.0 | 10.0 |
| R32 | Mass % | 35.0 | 35.0 | 40.0 | 40.0 | 40.0 | 40.0 | 40.0 | 45.0 |
| R1234yf | Mass % | 15.0 | 5.0 | 50.0 | 40.0 | 30.0 | 20.0 | 10.0 | 45.0 |
| GWP | — | 237 | 237 | 272 | 272 | 272 | 271 | 271 | 306 |
| COP Ratio | % (relative to R410A) | 99.0 | 98.8 | 101.3 | 100.6 | 99.9 | 99.4 | 99.0 | 101.3 |
| Refrigerating Capacity Ratio | % (relative to R410A) | 103.2 | 107.5 | 86.0 | 91.7 | 96.9 | 101.8 | 106.3 | 89.3 |

TABLE 129

| Item | Unit | Example 40 | Example 41 | Comparative Example 58 | Comparative Example 59 | Comparative Example 60 | Example 42 | Comparative Example 61 | Comparative Example 62 |
|---|---|---|---|---|---|---|---|---|---|
| HFO-1132(E) | Mass % | 20.0 | 30.0 | 40.0 | 50.0 | 10.0 | 20.0 | 30.0 | 40.0 |
| R32 | Mass % | 45.0 | 45.0 | 45.0 | 45.0 | 50.0 | 50.0 | 50.0 | 50.0 |
| R1234yf | Mass % | 35.0 | 25.0 | 15.0 | 5.0 | 40.0 | 30.0 | 20.0 | 10.0 |
| GWP | — | 305 | 305 | 305 | 304 | 339 | 339 | 339 | 338 |
| COP Ratio | % (relative to R410A) | 100.6 | 100.0 | 99.5 | 99.1 | 101.3 | 100.6 | 100.0 | 99.5 |
| Refrigerating Capacity Ratio | % (relative to R410A) | 94.9 | 100.0 | 104.7 | 109.2 | 92.4 | 97.8 | 102.9 | 107.5 |

TABLE 130

| Item | Unit | Comparative Example 63 | Comparative Example 64 | Comparative Example 65 | Comparative Example 66 | Example 43 | Example 44 | Example 45 | Example 46 |
|---|---|---|---|---|---|---|---|---|---|
| HFO-1132(E) | Mass % | 10.0 | 20.0 | 30.0 | 40.0 | 56.0 | 59.0 | 62.0 | 65.0 |
| R32 | Mass % | 55.0 | 55.0 | 55.0 | 55.0 | 3.0 | 3.0 | 3.0 | 3.0 |
| R1234yf | Mass % | 35.0 | 25.0 | 15.0 | 5.0 | 41.0 | 38.0 | 35.0 | 32.0 |
| GWP | — | 373 | 372 | 372 | 372 | 22 | 22 | 22 | 22 |
| COP Ratio | % (relative to R410A) | 101.4 | 100.7 | 100.1 | 99.6 | 100.1 | 100.0 | 99.9 | 99.8 |
| Refrigerating Capacity Ratio | % (relative to R410A) | 95.3 | 100.6 | 105.6 | 110.2 | 81.7 | 83.2 | 84.6 | 86.0 |

TABLE 131

| Item | Unit | Example 47 | Example 48 | Example 49 | Example 50 | Example 51 | Example 52 | Example 53 | Example 54 |
|---|---|---|---|---|---|---|---|---|---|
| HFO-1132(E) | Mass % | 49.0 | 52.0 | 55.0 | 58.0 | 61.0 | 43.0 | 46.0 | 49.0 |
| R32 | Mass % | 6.0 | 6.0 | 6.0 | 6.0 | 6.0 | 9.0 | 9.0 | 9.0 |
| R1234yf | Mass % | 45.0 | 42.0 | 39.0 | 36.0 | 33.0 | 48.0 | 45.0 | 42.0 |

TABLE 131-continued

| Item | Unit | Example 47 | Example 48 | Example 49 | Example 50 | Example 51 | Example 52 | Example 53 | Example 54 |
|---|---|---|---|---|---|---|---|---|---|
| GWP | — | 43 | 43 | 43 | 43 | 42 | 63 | 63 | 63 |
| COP Ratio | % (relative to R410A) | 100.2 | 100.0 | 99.9 | 99.8 | 99.7 | 100.3 | 100.1 | 99.9 |
| Refrigerating Capacity Ratio | % (relative to R410A) | 80.9 | 82.4 | 83.9 | 85.4 | 86.8 | 80.4 | 82.0 | 83.5 |

TABLE 132

| Item | Unit | Example 55 | Example 56 | Example 57 | Example 58 | Example 59 | Example 60 | Example 61 | Example 62 |
|---|---|---|---|---|---|---|---|---|---|
| HFO-1132(E) | Mass % | 52.0 | 55.0 | 58.0 | 38.0 | 41.0 | 44.0 | 47.0 | 50.0 |
| R32 | Mass % | 9.0 | 9.0 | 9.0 | 12.0 | 12.0 | 12.0 | 12.0 | 12.0 |
| R1234yf | Mass % | 39.0 | 36.0 | 33.0 | 50.0 | 47.0 | 44.0 | 41.0 | 38.0 |
| GWP | — | 63 | 63 | 63 | 83 | 83 | 83 | 83 | 83 |
| COP Ratio | % (relative to R410A) | 99.8 | 99.7 | 99.6 | 100.3 | 100.1 | 100.0 | 99.8 | 99.7 |
| Refrigerating Capacity Ratio | % (relative to R410A) | 85.0 | 86.5 | 87.9 | 80.4 | 82.0 | 83.5 | 85.1 | 86.6 |

TABLE 133

| Item | Unit | Example 63 | Example 64 | Example 65 | Example 66 | Example 67 | Example 68 | Example 69 | Example 70 |
|---|---|---|---|---|---|---|---|---|---|
| HFO-1132(E) | Mass % | 53.0 | 33.0 | 36.0 | 39.0 | 42.0 | 45.0 | 48.0 | 51.0 |
| R32 | Mass % | 12.0 | 15.0 | 15.0 | 15.0 | 15.0 | 15.0 | 15.0 | 15.0 |
| R1234yf | Mass % | 35.0 | 52.0 | 49.0 | 46.0 | 43.0 | 40.0 | 37.0 | 34.0 |
| GWP | — | 83 | 104 | 104 | 103 | 103 | 103 | 103 | 103 |
| COP Ratio | % (relative to R410A) | 99.6 | 100.5 | 100.3 | 100.1 | 99.9 | 99.7 | 99.6 | 99.5 |
| Refrigerating Capacity Ratio | % (relative to R410A) | 88.0 | 80.3 | 81.9 | 83.5 | 85.0 | 86.5 | 88.0 | 89.5 |

TABLE 134

| Item | Unit | Example 71 | Example 72 | Example 73 | Example 74 | Example 75 | Example 76 | Example 77 | Example 78 |
|---|---|---|---|---|---|---|---|---|---|
| HFO-1132(E) | Mass % | 29.0 | 32.0 | 35.0 | 38.0 | 41.0 | 44.0 | 47.0 | 36.0 |
| R32 | Mass % | 18.0 | 18.0 | 18.0 | 18.0 | 18.0 | 18.0 | 18.0 | 3.0 |
| R1234yf | Mass % | 53.0 | 50.0 | 47.0 | 44.0 | 41.0 | 38.0 | 35.0 | 61.0 |
| GWP | — | 124 | 124 | 124 | 124 | 124 | 123 | 123 | 23 |
| COP Ratio | % (relative to R410A) | 100.6 | 100.3 | 100.1 | 99.9 | 99.8 | 99.6 | 99.5 | 101.3 |
| Refrigerating Capacity Ratio | % (relative to R410A) | 80.6 | 82.2 | 83.8 | 85.4 | 86.9 | 88.4 | 89.9 | 71.0 |

TABLE 135

| Item | Unit | Example 79 | Example 80 | Example 81 | Example 82 | Example 83 | Example 84 | Example 85 | Example 86 |
|---|---|---|---|---|---|---|---|---|---|
| HFO-1132(E) | Mass % | 39.0 | 42.0 | 30.0 | 33.0 | 36.0 | 26.0 | 29.0 | 32.0 |
| R32 | Mass % | 3.0 | 3.0 | 6.0 | 6.0 | 6.0 | 9.0 | 9.0 | 9.0 |
| R1234yf | Mass % | 58.0 | 55.0 | 64.0 | 61.0 | 58.0 | 65.0 | 62.0 | 59.0 |
| GWP | — | 23 | 23 | 43 | 43 | 43 | 64 | 64 | 63 |
| COP Ratio | % (relative to R410A) | 101.1 | 100.9 | 101.5 | 101.3 | 101.0 | 101.6 | 101.3 | 101.1 |
| Refrigerating Capacity Ratio | % (relative to R410A) | 72.7 | 74.4 | 70.5 | 72.2 | 73.9 | 71.0 | 72.8 | 74.5 |

TABLE 136

| Item | Unit | Example 87 | Example 88 | Example 89 | Example 90 | Example 91 | Example 92 | Example 93 | Example 94 |
|---|---|---|---|---|---|---|---|---|---|
| HFO-1132(E) | Mass % | 21.0 | 24.0 | 27.0 | 30.0 | 16.0 | 19.0 | 22.0 | 25.0 |
| R32 | Mass % | 12.0 | 12.0 | 12.0 | 12.0 | 15.0 | 15.0 | 15.0 | 15.0 |
| R1234yf | Mass % | 67.0 | 64.0 | 61.0 | 58.0 | 69.0 | 66.0 | 63.0 | 60.0 |
| GWP | — | 84 | 84 | 84 | 84 | 104 | 104 | 104 | 104 |
| COP Ratio | % (relative to R410A) | 101.8 | 101.5 | 101.2 | 101.0 | 102.1 | 101.8 | 101.4 | 101.2 |
| Refrigerating Capacity Ratio | % (relative to R410A) | 70.8 | 72.6 | 74.3 | 76.0 | 70.4 | 72.3 | 74.0 | 75.8 |

TABLE 137

| Item | Unit | Example 95 | Example 96 | Example 97 | Example 98 | Example 99 | Example 100 | Example 101 | Example 102 |
|---|---|---|---|---|---|---|---|---|---|
| HFO-1132(E) | Mass % | 28.0 | 12.0 | 15.0 | 18.0 | 21.0 | 24.0 | 27.0 | 25.0 |
| R32 | Mass % | 15.0 | 18.0 | 18.0 | 18.0 | 18.0 | 18.0 | 18.0 | 21.0 |
| R1234yf | Mass % | 57.0 | 70.0 | 67.0 | 64.0 | 61.0 | 58.0 | 55.0 | 54.0 |
| GWP | — | 104 | 124 | 124 | 124 | 124 | 124 | 124 | 144 |
| COP Ratio | % (relative to R410A) | 100.9 | 102.2 | 101.9 | 101.6 | 101.3 | 101.0 | 100.7 | 100.7 |
| Refrigerating Capacity Ratio | % (relative to R410A) | 77.5 | 70.5 | 72.4 | 74.2 | 76.0 | 77.7 | 79.4 | 80.7 |

TABLE 138

| Item | Unit | Example 103 | Example 104 | Example 105 | Example 106 | Example 107 | Example 108 | Example 109 | Example 110 |
|---|---|---|---|---|---|---|---|---|---|
| HFO-1132(E) | Mass % | 21.0 | 24.0 | 17.0 | 20.0 | 23.0 | 13.0 | 16.0 | 19.0 |
| R32 | Mass % | 24.0 | 24.0 | 27.0 | 27.0 | 27.0 | 30.0 | 30.0 | 30.0 |
| R1234yf | Mass % | 55.0 | 52.0 | 56.0 | 53.0 | 50.0 | 57.0 | 54.0 | 51.0 |
| GWP | — | 164 | 164 | 185 | 185 | 184 | 205 | 205 | 205 |
| COP Ratio | % (relative to R410A) | 100.9 | 100.6 | 101.1 | 100.8 | 100.6 | 101.3 | 101.0 | 100.8 |
| Refrigerating Capacity Ratio | % (relative to R410A) | 80.8 | 82.5 | 80.8 | 82.5 | 84.2 | 80.7 | 82.5 | 84.2 |

TABLE 139

| Item | Unit | Example 111 | Example 112 | Example 113 | Example 114 | Example 115 | Example 116 | Example 117 | Example 118 |
|---|---|---|---|---|---|---|---|---|---|
| HFO-1132 (E) | Mass % | 22.0 | 9.0 | 12.0 | 15.0 | 18.0 | 21.0 | 8.0 | 12.0 |
| R32 | Mass % | 30.0 | 33.0 | 33.0 | 33.0 | 33.0 | 33.0 | 36.0 | 36.0 |
| R1234yf | Mass % | 48.0 | 58.0 | 55.0 | 52.0 | 49.0 | 46.0 | 56.0 | 52.0 |
| GWP | — | 205 | 225 | 225 | 225 | 225 | 225 | 245 | 245 |
| COP Ratio | % (relative to R410A) | 100.5 | 101.6 | 101.3 | 101.0 | 100.8 | 100.5 | 101.6 | 101.2 |
| Refrigerating Capacity Ratio | % (relative to R410A) | 85.9 | 80.5 | 82.3 | 84.1 | 85.8 | 87.5 | 82.0 | 84.4 |

TABLE 140

| Item | UnIt | Example 119 | Example 120 | Example 121 | Example 122 | Example 123 | Example 124 | Example 125 | Example 126 |
|---|---|---|---|---|---|---|---|---|---|
| HFO-1132(E) | Mass % | 15.0 | 18.0 | 21.0 | 42.0 | 39.0 | 34.0 | 37.0 | 30.0 |
| R32 | Mass % | 36.0 | 36.0 | 36.0 | 25.0 | 28.0 | 31.0 | 31.0 | 34.0 |
| R1234yf | Mass % | 49.0 | 46.0 | 43.0 | 33.0 | 33.0 | 35.0 | 32.0 | 36.0 |

TABLE 140-continued

| Item | Unit | Example 119 | Example 120 | Example 121 | Example 122 | Example 123 | Example 124 | Example 125 | Example 126 |
|---|---|---|---|---|---|---|---|---|---|
| GWP | — | 245 | 245 | 245 | 170 | 191 | 211 | 211 | 231 |
| COP Ratio | % (relative to R410A) | 101.0 | 100.7 | 100.5 | 99.5 | 99.5 | 99.8 | 99.6 | 99.9 |
| Refrigerating Capacity Ratio | % (relative to R410A) | 86.2 | 87.9 | 89.6 | 92.7 | 93.4 | 93.0 | 94.5 | 93.0 |

TABLE 141

| Item | Unit | Example 127 | Example 128 | Example 129 | Example 130 | Example 131 | Example 132 | Example 133 | Example 134 |
|---|---|---|---|---|---|---|---|---|---|
| HFO-1132(E) | Mass % | 33.0 | 36.0 | 24.0 | 27.0 | 30.0 | 33.0 | 23.0 | 26.0 |
| R32 | Mass % | 34.0 | 34.0 | 37.0 | 37.0 | 37.0 | 37.0 | 40.0 | 40.0 |
| R1234yf | Mass % | 33.0 | 30.0 | 39.0 | 36.0 | 33.0 | 30.0 | 37.0 | 34.0 |
| GWP | — | 231 | 231 | 252 | 251 | 251 | 251 | 272 | 272 |
| COP Ratio | % (relative to R410A) | 99.8 | 99.6 | 100.3 | 100.1 | 99.9 | 99.8 | 100.4 | 100.2 |
| Refrigerating Capacity Ratio | % (relative to R410A) | 94.5 | 96.0 | 91.9 | 93.4 | 95.0 | 96.5 | 93.3 | 94.9 |

TABLE 142

| Item | Unit | Example 135 | Example 136 | Example 137 | Example 138 | Example 139 | Example 140 | Example 141 | Example 142 |
|---|---|---|---|---|---|---|---|---|---|
| HFO-1132(E) | Mass % | 29.0 | 32.0 | 19.0 | 22.0 | 25.0 | 28.0 | 31.0 | 18.0 |
| R32 | Mass % | 40.0 | 40.0 | 43.0 | 43.0 | 43.0 | 43.0 | 43.0 | 46.0 |
| R1234yf | Mass % | 31.0 | 28.0 | 38.0 | 35.0 | 32.0 | 29.0 | 26.0 | 36.0 |
| GWP | — | 272 | 271 | 292 | 292 | 292 | 292 | 292 | 312 |
| COP Ratio | % (relative to R410A) | 100.0 | 99.8 | 100.6 | 100.4 | 100.2 | 100.1 | 99.9 | 100.7 |
| Refrigerating Capacity Ratio | % (relative to R410A) | 96.4 | 97.9 | 93.1 | 94.7 | 96.2 | 97.8 | 99.3 | 94.4 |

TABLE 143

| Item | Unit | Example 143 | Example 144 | Example 145 | Example 146 | Example 147 | Example 148 | Example 149 | Example 150 |
|---|---|---|---|---|---|---|---|---|---|
| HFO-1132(E) | Mass % | 21.0 | 23.0 | 26.0 | 29.0 | 13.0 | 16.0 | 19.0 | 22.0 |
| R32 | Mass % | 46.0 | 46.0 | 46.0 | 46.0 | 49.0 | 49.0 | 49.0 | 49.0 |
| R1234yf | Mass % | 33.0 | 31.0 | 28.0 | 25.0 | 38.0 | 35.0 | 32.0 | 29.0 |
| GWP | — | 312 | 312 | 312 | 312 | 332 | 332 | 332 | 332 |
| COP Ratio | % (relative to R410A) | 100.5 | 100.4 | 100.2 | 100.0 | 101.1 | 100.9 | 100.7 | 100.5 |
| Refrigerating Capacity Ratio | % (relative to R410A) | 96.0 | 97.0 | 98.6 | 100.1 | 93.5 | 95.1 | 96.7 | 98.3 |

TABLE 144

| Item | Unit | Example 151 | Example 152 |
|---|---|---|---|
| HFO-1132(E) | Mass % | 25.0 | 28.0 |
| R32 | Mass % | 49.0 | 49.0 |
| R1234yf | Mass % | 26.0 | 23.0 |
| GWP | — | 332 | 332 |
| COP Ratio | % (relative to R410A) | 100.3 | 100.1 |
| Refrigerating Capacity Ratio | % (relative to R410A) | 99.8 | 101.3 |

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI),
the line segment IJ is represented by coordinates $(0.0236y^2-1.7616y+72.0, y, -0.0236y^2+0.7616y+28.0)$,
the line segment NE is represented by coordinates $(0.012y-1.9003y+58.3, y, -0.012y^2+0.9003y+41.7)$, and
the line segments JN and EI are straight lines, the refrigerant D has a refrigerating capacity ratio of 80% or more relative to R410A, a GWP of 125 or less, and a WCF lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM),
the line segment MM' is represented by coordinates $(0.132y^2-3.34y+52.6, y, -0.132y^2+2.34y+47.4)$,
the line segment M'N is represented by coordinates $(0.0596y^2-2.2541y+48.98, y, -0.0596y^2+1.2541y+51.02)$,
the line segment VG is represented by coordinates $(0.0123y^2-1.8033y+39.6, y, -0.0123y^2+0.8033y+60.4)$, and
the line segments NV and GM are straight lines, the refrigerant D according to the present disclosure has a refrigerating capacity ratio of 70% or more relative to R410A, a GWP of 125 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments,
the line segment ON is represented by coordinates $(0.0072y^2-0.6701y+37.512, y, -0.0072y^2-0.3299y+62.488)$,
the line segment NU is represented by coordinates $(0.0083y^2-1.7403y+56.635, y, -0.0083y^2+0.7403y+43.365)$, and
the line segment UO is a straight line, the refrigerant D according to the present disclosure has a refrigerating capacity ratio of 80% or more relative to R410A, a GWP of 250 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments,
the line segment QR is represented by coordinates $(0.0099y^2-1.975y+84.765, y, -0.0099y^2+0.975y+15.235)$,
the line segment RT is represented by coordinates $(0.0082y^2-1.8683y+83.126, y, -0.0082y^2+0.8683y+16.874)$,
the line segment LK is represented by coordinates $(0.0049y^2-0.8842y+61.488, y, -0.0049y^2-0.1158y+38.512)$,
the line segment KQ is represented by coordinates $(0.0095y^2-1.2222y+67.676, y, -0.0095y^2+0.2222y+32.324)$, and
the line segment TL is a straight line, the refrigerant D according to the present disclosure has a refrigerating capacity ratio of 92.5% or more relative to R410A, a GWP of 350 or less, and a WCF lower flammability.

The results further indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments,
the line segment PS is represented by coordinates $(0.0064y^2-0.7103y+40.1, y, -0.0064y^2-0.2897y+59.9)$,
the line segment ST is represented by coordinates $(0.0082y^2-1.8683y+83.126, y, -0.0082y^2+0.8683y+16.874)$, and
the line segment TP is a straight line, the refrigerant D according to the present disclosure has a refrigerating capacity ratio of 92.5% or more relative to R410A, a GWP of 350 or less, and an ASHRAE lower flammability.

(5-5) Refrigerant E

The refrigerant E according to the present disclosure is a mixed refrigerant comprising trans-1,2-difluoroethylene (HFO-1132(E)), trifluoroethylene (HFO-1123), and difluoromethane (R32).

The refrigerant E according to the present disclosure has various properties that are desirable as an R410A-alternative refrigerant, i.e., a coefficient of performance equivalent to that of R410A and a sufficiently low GWP.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:
point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GI);
the line segment IK is represented by coordinates $(0.025z^2-1.7429z+72.00, -0.025z^2+0.7429z+28.0, z)$,
the line segment HR is represented by coordinates $(-0.3123z^2+4.234z+11.06, 0.3123z^2-5.234z+88.94, z)$,
the line segment RG is represented by coordinates $(-0.0491z^2-1.1544z+38.5, 0.0491z^2+0.1544z+61.5, z)$, and
the line segments KB' and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments J, JR, RG, and GI that connect the following 4 points:
point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);
the line segment IJ is represented by coordinates $(0.025z^2-1.7429z+72.0, -0.025z^2+0.7429z+28.0, z)$,
the line segment RG is represented by coordinates $(-0.0491z^2-1.1544z+38.5, 0.0491z^2+0.1544z+61.5, z)$, and
the line segments JR and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:
point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);
the line segment MP is represented by coordinates $(0.0083z^2-0.984z+47.1, -0.0083z^2-0.016z+52.9, z)$,
the line segment HR is represented by coordinates $(-0.3123z^2+4.234z+11.06, 0.3123z^2-5.234z+88.94, z)$,
the line segment RG is represented by coordinates $(-0.0491z^2-1.1544z+38.5, 0.0491z^2+0.1544z+61.5, z)$, and
the line segments PB' and GM are straight lines. When the requirements above are satisfied, the refrigerant according to the present disclosure has ASHRAE lower flammability, a COP ratio of 93% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);
the line segment MN is represented by coordinates $(0.0083z^2-0.984z+47.1, -0.0083z^2-0.016z+52.9, z)$,
the line segment RG is represented by coordinates $(-0.0491z^2-1.1544z+38.5, 0.0491z^2+0.1544z+61.5, z)$,
the line segments NR and GM are straight lines. When the requirements above are satisfied, the refrigerant according to the present disclosure has ASHRAE lower flammability, a COP ratio of 93% or more relative to that of R410A, and a GWP of 65 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;
the line segment ST is represented by coordinates $(-0.0982z^2+0.9622z+40.931, 0.0982z^2-1.9622z+59.069, z)$,
the line segment TP is represented by coordinates $(0.0083z^2-0.984z+47.1, -0.0083z^2-0.016z+52.9, z)$, and
the line segment PS is a straight line. When the requirements above are satisfied, the refrigerant according to the present disclosure has ASHRAE lower flammability, a COP ratio of 94.5% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);
the line segment DU is represented by coordinates $(-3.4962z^2+210.71z-3146.1, 3.4962z^2-211.71z+3246.1, z)$,
the line segment UQ is represented by coordinates $(0.0135z^2-0.9181z+44.133, -0.0135z^2-0.0819z+55.867, z)$, and
the line segments QB" and B"D are straight lines. When the requirements above are satisfied, the refrigerant according to the present disclosure has ASHRAE lower flammability, a COP ratio of 96% or more relative to that of R410A, and a GWP of 250 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'e', e'a', and a'O that connect the following 5 points:
- point O (100.0, 0.0, 0.0),
- point c' (56.7, 43.3, 0.0),
- point d' (52.2, 38.3, 9.5),
- point e' (41.8, 39.8, 18.4), and
- point a' (81.6, 0.0, 18.4), or on the line segments c'd', d'e', and e'a' (excluding the points c' and a');
the line segment c'd' is represented by coordinates $(-0.0297z^2-0.1915z+56.7,\ 0.0297z^2+1.1915z+43.3,\ z)$,
the line segment d'e' is represented by coordinates $(-0.0535z^2+0.3229z+53.957,\ 0.0535z^2+0.6771z+46.043,\ z)$, and
the line segments Oc', e'a', and a'O are straight lines. When the requirements above are satisfied, the refrigerant according to the present disclosure has a COP ratio of 92.5% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, de, ea', and a'O that connect the following 5 points:
- point O (100.0, 0.0, 0.0),
- point c (77.7, 22.3, 0.0),
- point d (76.3, 14.2, 9.5),
- point e (72.2, 9.4, 18.4), and
- point a' (81.6, 0.0, 18.4), or on the line segments cd, de, and ea' (excluding the points c and a');
the line segment cde is represented by coordinates $(-0.017z^2+0.0148z+77.684,\ 0.017z^2+0.9852z+22.316,\ z)$, and
the line segments Oc, ea', and a'O are straight lines. When the requirements above are satisfied, the refrigerant according to the present disclosure has a COP ratio of 95% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'a, and aO that connect the following 5 points:
- point O (100.0, 0.0, 0.0),
- point c' (56.7, 43.3, 0.0),
- point d' (52.2, 38.3, 9.5), and
- point a (90.5, 0.0, 9.5), or on the line segments c'd' and d'a (excluding the points c' and a);
the line segment c'd' is represented by coordinates $(-0.0297z^2-0.1915z+56.7,\ 0.0297z^2+1.1915z+43.3,\ z)$, and
the line segments Oc', d'a, and aO are straight lines. When the requirements above are satisfied, the refrigerant according to the present disclosure has a COP ratio of 93.5% or more relative to that of R410A, and a GWP of 65 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, da, and aO that connect the following 4 points:
- point O (100.0, 0.0, 0.0),
- point c (77.7, 22.3, 0.0),
- point d (76.3, 14.2, 9.5), and
- point a (90.5, 0.0, 9.5), or on the line segments cd and da (excluding the points c and a);
the line segment cd is represented by coordinates $(-0.017z^2+0.0148z+77.684,\ 0.017z^2+0.9852z+22.316,\ z)$, and
the line segments Oc, da, and aO are straight lines. When the requirements above are satisfied, the refrigerant according to the present disclosure has a COP ratio of 95% or more relative to that of R410A, and a GWP of 65 or less.

The refrigerant E according to the present disclosure may further comprise other additional refrigerants in addition to HFO-1132(E), HFO-1123, and R32, as long as the above properties and effects are not impaired. In this respect, the refrigerant according to the present disclosure preferably comprises HFO-1132(E), HFO-1123, and R32 in a total amount of 99.5 mass % or more, more preferably 99.75 mass % or more, and even more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

Examples of Refrigerant E

The present disclosure is described in more detail below with reference to Examples of refrigerant E. However, the refrigerant E is not limited to the Examples.

Mixed refrigerants were prepared by mixing HFO-1132 (E), HFO-1123, and R32 at mass % based on their sum shown in Tables 145 and 146.

The composition of each mixture was defined as WCF. A leak simulation was performed using National Institute of Science and Technology (NIST) Standard Reference Data Base Refleak Version 4.0 under the conditions for equipment, storage, shipping, leak, and recharge according to the ASHRAE Standard 34-2013. The most flammable fraction was defined as WCFF.

For each mixed refrigerant, the burning velocity was measured according to the ANSI/ASHRAE Standard 34-2013. When the burning velocities of the WCF composition and the WCFF composition are 10 cm/s or less, the flammability of such a refrigerant is classified as Class 2L (lower flammability) in the ASHRAE flammability classification.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Tables 145 and 146 show the results.

TABLE 145

|  | Item | Unit | I | J | K | L |
|---|---|---|---|---|---|---|
| WCF | HFO-1132(E) | mass % | 72.0 | 57.7 | 48.4 | 35.5 |
|  | HFO-1123 | mass % | 28.0 | 32.8 | 33.2 | 27.5 |
|  | R32 | mass % | 0.0 | 9.5 | 18.4 | 37.0 |
| Burning velocity (WCF) |  | cm/s | 10 | 10 | 10 | 10 |

TABLE 146

|  | Item | Unit | M | N | T | P | U | Q |
|---|---|---|---|---|---|---|---|---|
| WCF | HFO-1132(E) | mass % | 47.1 | 38.5 | 34.8 | 31.8 | 28.7 | 28.6 |
|  | HFO-1123 | mass % | 52.9 | 52.1 | 51.0 | 49.8 | 41.2 | 34.4 |
|  | R32 | mass % | 0.0 | 9.5 | 14.2 | 18.4 | 30.1 | 37.0 |
| Leak condition that results in WCFF |  |  | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side |
| WCFF | HFO-1132(E) | mass % | 72.0 | 58.9 | 51.5 | 44.6 | 31.4 | 27.1 |
|  | HFO-1123 | mass % | 28.0 | 32.4 | 33.1 | 32.6 | 23.2 | 18.3 |
|  | R32 | mass % | 0.0 | 8.7 | 15.4 | 22.8 | 45.4 | 54.6 |
| Burning velocity (WCF) |  | cm/s | 8 or less | 8 or less | 8 or less | 8 or less | 8 or less | 8 or less |
| Burning velocity (WCFF) |  | cm/s | 10 | 10 | 10 | 10 | 10 | 10 |

The results in Table 1 indicate that in a ternary composition diagram of a mixed refrigerant of HFO-1132(E), HFO-1123, and R32 in which their sum is 100 mass, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments IK and KL that connect the following 3 points:
point I (72.0, 28.0, 0.0),
point K (48.4, 33.2, 18.4), and
point L (35.5, 27.5, 37.0);
the line segment IK is represented by coordinates $(0.025z^2-1.7429z+72.00, -0.025z^2+0.7429z+28.00, z)$, and
the line segment KL is represented by coordinates $(0.0098z^2-1.238z+67.852, -0.0098z^2+0.238z+32.148, z)$,
it can be determined that the refrigerant has WCF lower flammability.

For the points on the line segment IK, an approximate curve $(x=0.025z^2-1.7429z+72.00)$ was obtained from three points, i.e., I (72.0, 28.0, 0.0), J (57.7, 32.8, 9.5), and K (48.4, 33.2, 18.4) by using the least-square method to determine coordinates $(x=0.025z^2-1.7429z+72.00, y=100-z-x=-0.00922z^2+0.2114z+32.443, z)$.

Likewise, for the points on the line segment KL, an approximate curve was determined from three points, i.e., K (48.4, 33.2, 18.4), Example 10 (41.1, 31.2, 27.7), and L (35.5, 27.5, 37.0) by using the least-square method to determine coordinates.

The results in Table 146 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments MP and PQ that connect the following 3 points:
point M (47.1, 52.9, 0.0),
point P (31.8, 49.8, 18.4), and
point Q (28.6, 34.4, 37.0),
it can be determined that the refrigerant has ASHRAE lower flammability.

In the above, the line segment MP is represented by coordinates $(0.0083z^2-0.984z+47.1, -0.0083z^2-0.016z+52.9, z)$, and the line segment PQ is represented by coordinates $(0.0135z^2-0.9181z+44.133, -0.0135z^2-0.0819z+55.867, z)$.

For the points on the line segment MP, an approximate curve was obtained from three points, i.e., points M, N, and P, by using the least-square method to determine coordinates. For the points on the line segment PQ, an approximate curve was obtained from three points, i.e., points P, U, and Q, by using the least-square method to determine coordinates.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in WO2015/141678). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity (which may be referred to as "cooling capacity" or "capacity") ratio relative to those of R410 of the mixed refrigerants were determined. The conditions for calculation were as described below.

Evaporating temperature: 5° C.
Condensation temperature: 45° C.
Degree of superheating: 5K
Degree of subcooling: 5K
Compressor efficiency: 70%

Tables 147 to 166 show these values together with the GWP of each mixed refrigerant.

TABLE 147

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | mass % | R410A | 90.5 | 0.0 | 81.6 | 0.0 | 63.0 | 0.0 |
| HFO-1123 | mass % |  | 0.0 | 90.5 | 0.0 | 81.6 | 0.0 | 63.0 |
| R32 | mass % |  | 9.5 | 9.5 | 18.4 | 18.4 | 37.0 | 37.0 |
| GWP | — | 2088 | 65 | 65 | 125 | 125 | 250 | 250 |
| COP ratio | % (relative to R410A) | 100 | 99.1 | 92.0 | 98.7 | 93.4 | 98.7 | 96.1 |
| Refrigerating capacity ratio | % (relative to R410A) | 100 | 102.2 | 111.6 | 105.3 | 113.7 | 110.0 | 115.4 |

TABLE 148

| Item | Unit | Comparative Example 8 O | Comparative Example 9 C | Comparative Example 10 | Example 1 U | Example 2 | Comparative Example 11 D |
|---|---|---|---|---|---|---|---|
| HFO-1132(E) | mass % | 100.0 | 50.0 | 41.1 | 28.7 | 15.2 | 0.0 |
| HFO-1123 | mass % | 0.0 | 31.6 | 34.6 | 41.2 | 52.7 | 67.0 |
| R32 | mass % | 0.0 | 18.4 | 24.3 | 30.1 | 32.1 | 33.0 |
| GWP | — | 1 | 125 | 165 | 204 | 217 | 228 |
| COP ratio | % (relative to R410A) | 99.7 | 96.0 | 96.0 | 96.0 | 96.0 | 96.0 |
| Refrigerating capacity ratio | % (relative to R410A) | 98.3 | 109.9 | 111.7 | 113.5 | 114.8 | 115.4 |

TABLE 149

| Item | Unit | Comparative Example 12 E | Comparative Example 13 | Example 3 T | Example 4 S | Comparative Example 14 F |
|---|---|---|---|---|---|---|
| HFO-1132(E) | mass % | 53.4 | 43.4 | 34.8 | 25.4 | 0.0 |
| HFO-1123 | mass % | 46.6 | 47.1 | 51.0 | 56.2 | 74.1 |
| R32 | mass % | 0.0 | 9.5 | 14.2 | 18.4 | 25.9 |
| GWP | — | 1 | 65 | 97 | 125 | 176 |
| COP ratio | % (relative to R410A) | 94.5 | 94.5 | 94.5 | 94.5 | 94.5 |
| Refrigerating capacity ratio | % (relative to R410A) | 105.6 | 109.2 | 110.8 | 112.3 | 114.8 |

TABLE 150

| Item | Unit | Comparative Example 15 G | Example 5 | Example 6 R | Example 7 | Comparative Example 16 H |
|---|---|---|---|---|---|---|
| HFO-1132(E) | mass % | 38.5 | 31.5 | 23.1 | 16.9 | 0.0 |
| HFO-1123 | mass % | 61.5 | 63.5 | 67.4 | 71.1 | 84.2 |
| R32 | mass % | 0.0 | 5.0 | 9.5 | 12.0 | 15.8 |
| GWP | — | 1 | 35 | 65 | 82 | 107 |
| COP ratio | % (relative to R410A) | 93.0 | 93.0 | 93.0 | 93.0 | 93.0 |
| Refrigerating capacity ratio | % (relative to R410A) | 107.0 | 109.1 | 110.9 | 111.9 | 113.2 |

TABLE 151

| Item | Unit | Comparative Example 17 I | Example 8 J | Example 9 K | Comparative Example 18 | Comparative Example 19 L |
|---|---|---|---|---|---|---|
| HFO-1132(E) | mass % | 72.0 | 57.7 | 48.4 | 41.1 | 35.5 |
| HFO-1123 | mass % | 28.0 | 32.8 | 33.2 | 31.2 | 27.5 |
| R32 | mass % | 0.0 | 9.5 | 18.4 | 27.7 | 37.0 |
| GWP | — | 1 | 65 | 125 | 188 | 250 |
| COP ratio | % (relative to R410A) | 96.6 | 95.8 | 95.9 | 96.4 | 97.1 |
| Refrigerating capacity ratio | % (relative to R410A) | 103.1 | 107.4 | 110.1 | 112.1 | 113.2 |

TABLE 152

| Item | Unit | Comparative Example 20 M | Example 10 N | Example 11 P | Example 12 Q |
|---|---|---|---|---|---|
| HFO-1132(E) | mass % | 47.1 | 38.5 | 31.8 | 28.6 |
| HFO-1123 | mass % | 52.9 | 52.1 | 49.8 | 34.4 |
| R32 | mass % | 0.0 | 9.5 | 18.4 | 37.0 |
| GWP | — | 1 | 65 | 125 | 250 |
| COP ratio | % (relative to R410A) | 93.9 | 94.1 | 94.7 | 96.9 |
| Refrigerating capacity ratio | % (relative to R410A) | 106.2 | 109.7 | 112.0 | 114.1 |

TABLE 153

| Item | Unit | Comparative Example 22 | Comparative Example 23 | Comparative Example 24 | Example 14 | Example 15 | Example 16 | Comparative Example 25 | Comparative Example 26 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R32 | mass % | 5.0 | 5.0 | 5.0 | 5.0 | 5.0 | 5.0 | 5.0 | 5.0 |
| GWP | — | 35 | 35 | 35 | 35 | 35 | 35 | 35 | 35 |
| COP ratio | % relative to R410A) | 91.7 | 92.2 | 92.9 | 93.7 | 94.6 | 95.6 | 96.7 | 97.7 |
| Refrigerating capacity ratio | % (relative to R410A) | 110.1 | 109.8 | 109.2 | 108.4 | 107.4 | 106.1 | 104.7 | 103.1 |

TABLE 154

| Item | Unit | Comparative Example 27 | Comparative Example 28 | Comparative Example 29 | Example 17 | Example 18 | Example 19 | Comparative Example 30 | Comparative Example 31 |
|---|---|---|---|---|---|---|---|---|---|
| HFO-1132(E) | mass % | 90.0 | 10.0 | 20.0 | 30.0 | 40.0 | 50.0 | 60.0 | 70.0 |
| HFO-1123 | mass % | 5.0 | 80.0 | 70.0 | 60.0 | 50.0 | 40.0 | 30.0 | 20.0 |
| R32 | mass % | 5.0 | 10.0 | 10.0 | 10.0 | 10.0 | 10.0 | 10.0 | 10.0 |
| GWP | — | 35 | 68 | 68 | 68 | 68 | 68 | 68 | 68 |
| COP ratio | % (relative to R410A) | 98.8 | 92.4 | 92.9 | 93.5 | 94.3 | 95.1 | 96.1 | 97.0 |
| Refrigerating capacity ratio | % (relative to R410A) | 01.4 | 111.7 | 111.3 | 110.6 | 109.6 | 108.5 | 107.2 | 105.7 |

TABLE 155

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 10.0 | 75.0 | 65.0 | 55.0 | 45.0 | 35.0 | 25.0 | 15.0 |
| R32 | mass % | 10.0 | 15.0 | 15.0 | 15.0 | 15.0 | 15.0 | 15.0 | 15.0 |
| GWP | — | 68 | 102 | 102 | 102 | 102 | 102 | 102 | 102 |
| COP ratio | % (relative to R410A) | 98.0 | 93.1 | 93.6 | 94.2 | 94.9 | 95.6 | 96.5 | 97.4 |
| Refrigerating capacity ratio | % (relative to R410A) | 104.1 | 112.9 | 112.4 | 111.6 | 110.6 | 109.4 | 108.1 | 106.6 |

TABLE 156

| Item | Unit | Comparative Example 35 | Comparative Example 36 | Comparative Example 37 | Comparative Example 38 | Comparative Example 39 | Comparative Example 40 | Comparative Example 41 | Comparative Example 42 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 5.0 | 70.0 | 60.0 | 50.0 | 40.0 | 30.0 | 20.0 | 10.0 |
| R32 | mass % | 15.0 | 20.0 | 20.0 | 20.0 | 20.0 | 20.0 | 20.0 | 20.0 |
| GWP | — | 102 | 136 | 136 | 136 | 136 | 136 | 136 | 136 |
| COP ratio | % (relative to R410A) | 98.3 | 93.9 | 94.3 | 94.8 | 95.4 | 96.2 | 97.0 | 97.8 |
| Refrigerating capacity ratio | % (relative to R410A) | 105.0 | 113.8 | 113.2 | 112.4 | 111.4 | 110.2 | 108.8 | 107.3 |

TABLE 157

| Item | Unit | Comparative Example 43 | Comparative Example 44 | Comparative Example 45 | Comparative Example 46 | Comparative Example 47 | Comparative Example 48 | Comparative Example 49 | Comparative Example 50 |
|---|---|---|---|---|---|---|---|---|---|
| HFO-1132(E) | mass % | 10.0 | 20.0 | 30.0 | 40.0 | 50.0 | 60.0 | 70.0 | 10.0 |
| HFO-1123 | mass % | 65.0 | 55.0 | 45.0 | 35.0 | 25.0 | 15.0 | 5.0 | 60.0 |
| R32 | mass % | 25.0 | 25.0 | 25.0 | 25.0 | 25.0 | 25.0 | 25.0 | 30.0 |
| GWP | — | 170 | 170 | 170 | 170 | 170 | 170 | 170 | 203 |
| COP ratio | % (relative to R410A) | 94.6 | 94.9 | 95.4 | 96.0 | 96.7 | 97.4 | 98.2 | 95.3 |
| Refrigerating capacity ratio | % (relative to R410A) | 114.4 | 113.8 | 113.0 | 111.9 | 110.7 | 109.4 | 107.9 | 114.8 |

TABLE 158

| Item | Unit | Comparative Example 51 | Comparative Example 52 | Comparative Example 53 | Comparative Example 54 | Comparative Example 55 | Example 25 | Example 26 | Comparative Example 56 |
|---|---|---|---|---|---|---|---|---|---|
| HFO-1132(E) | mass % | 20.0 | 30.0 | 40.0 | 50.0 | 60.0 | 10.0 | 20.0 | 30.0 |
| HFO-1123 | mass % | 50.0 | 40.0 | 30.0 | 20.0 | 10.0 | 55.0 | 45.0 | 35.0 |
| R32 | mass % | 30.0 | 30.0 | 30.0 | 30.0 | 30.0 | 35.0 | 35.0 | 35.0 |
| GWP | — | 203 | 203 | 203 | 203 | 203 | 237 | 237 | 237 |
| COP ratio | % (relative to R410A) | 95.6 | 96.0 | 96.6 | 97.2 | 97.9 | 96.0 | 96.3 | 96.6 |
| Refrigerating capacity ratio | % (relative to R410A) | 114.2 | 113.4 | 112.4 | 111.2 | 109.8 | 115.1 | 114.5 | 113.6 |

TABLE 159

| Item | Unit | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|---|
| HFO-1132(E) | mass % | 40.0 | 50.0 | 60.0 | 10.0 | 20.0 | 30.0 | 40.0 | 50.0 |
| HFO-1123 | mass % | 25.0 | 15.0 | 5.0 | 50.0 | 40.0 | 30.0 | 20.0 | 10.0 |
| R32 | mass % | 35.0 | 35.0 | 35.0 | 40.0 | 40.0 | 40.0 | 40.0 | 40.0 |
| GWP | — | 237 | 237 | 237 | 271 | 271 | 271 | 271 | 271 |
| COP ratio | % (relative to R410A) | 97.1 | 97.7 | 98.3 | 96.6 | 96.9 | 97.2 | 97.7 | 98.2 |
| Refrigerating capacity ratio | % (relative to R410A) | 112.6 | 111.5 | 110.2 | 115.1 | 114.6 | 113.8 | 112.8 | 111.7 |

TABLE 160

| Item | Unit | Example 27 | Example 28 | Example 29 | Example 30 | Example 31 | Example 32 | Example 33 | Example 34 |
|---|---|---|---|---|---|---|---|---|---|
| HFO-1132(E) | mass % | 38.0 | 40.0 | 42.0 | 44.0 | 35.0 | 37.0 | 39.0 | 41.0 |
| HFO-1123 | mass % | 60.0 | 58.0 | 56.0 | 54.0 | 61.0 | 59.0 | 57.0 | 55.0 |
| R32 | mass % | 2.0 | 2.0 | 2.0 | 2.0 | 4.0 | 4.0 | 4.0 | 4.0 |
| GWP | — | 14 | 14 | 14 | 14 | 28 | 28 | 28 | 28 |
| COP ratio | % (relative to R410A) | 93.2 | 93.4 | 93.6 | 93.7 | 93.2 | 93.3 | 93.5 | 93.7 |
| Refrigerating capacity ratio | % (relative to R410A) | 107.7 | 107.5 | 107.3 | 107.2 | 108.6 | 108.4 | 108.2 | 108.0 |

TABLE 161

| Item | Unit | Example 35 | Example 36 | Example 37 | Example 38 | Example 39 | Example 40 | Example 41 | Example 42 |
|---|---|---|---|---|---|---|---|---|---|
| HFO-1132(E) | mass % | 43.0 | 31.0 | 33.0 | 35.0 | 37.0 | 39.0 | 41.0 | 27.0 |
| HFO-1123 | mass % | 53.0 | 63.0 | 61.0 | 59.0 | 57.0 | 55.0 | 53.0 | 65.0 |
| R32 | mass % | 4.0 | 6.0 | 6.0 | 6.0 | 6.0 | 6.0 | 6.0 | 8.0 |
| GWP | — | 28 | 41 | 41 | 41 | 41 | 41 | 41 | 55 |
| COP ratio | % (relative to R410A) | 93.9 | 93.1 | 93.2 | 93.4 | 93.6 | 93.7 | 93.9 | 93.0 |
| Refrigerating capacity ratio | % (relative to R410A) | 107.8 | 109.5 | 109.3 | 109.1 | 109.0 | 108.8 | 108.6 | 110.3 |

TABLE 162

| Item | Unit | Example 43 | Example 44 | Example 45 | Example 46 | Example 47 | Example 48 | Example 49 | Example 50 |
|---|---|---|---|---|---|---|---|---|---|
| HFO-1132(E) | mass % | 29.0 | 31.0 | 33.0 | 35.0 | 37.0 | 39.0 | 32.0 | 32.0 |
| HFO-1123 | mass % | 63.0 | 61.0 | 59.0 | 57.0 | 55.0 | 53.0 | 51.0 | 50.0 |
| R32 | mass % | 8.0 | 8.0 | 8.0 | 8.0 | 8.0 | 8.0 | 17.0 | 18.0 |

TABLE 162-continued

| Item | Unit | Example 43 | Example 44 | Example 45 | Example 46 | Example 47 | Example 48 | Example 49 | Example 50 |
|---|---|---|---|---|---|---|---|---|---|
| GWP | — | 55 | 55 | 55 | 55 | 55 | 55 | 116 | 122 |
| COP ratio | % (relative to R410A) | 93.2 | 93.3 | 93.5 | 93.6 | 93.8 | 94.0 | 94.5 | 94.7 |
| Refrigerating capacity ratio | % (relative to R410A) | 110.1 | 110.0 | 109.8 | 109.6 | 109.5 | 109.3 | 111.8 | 111.9 |

TABLE 163

| Item | Unit | Example 51 | Example 52 | Example 53 | Example 54 | Example 55 | Example 56 | Example 57 | Example 58 |
|---|---|---|---|---|---|---|---|---|---|
| HFO-1132(E) | mass % | 30.0 | 27.0 | 21.0 | 23.0 | 25.0 | 27.0 | 11.0 | 13.0 |
| HFO-1123 | mass % | 52.0 | 42.0 | 46.0 | 44.0 | 42.0 | 40.0 | 54.0 | 52.0 |
| R32 | mass % | 18.0 | 31.0 | 33.0 | 33.0 | 33.0 | 33.0 | 35.0 | 35.0 |
| GWP | — | 122 | 210 | 223 | 223 | 223 | 223 | 237 | 237 |
| COP ratio | % (relative to R410A) | 94.5 | 96.0 | 96.0 | 96.1 | 96.2 | 96.3 | 96.0 | 96.0 |
| Refrigerating capacity ratio | % (relative to R410A) | 112.1 | 113.7 | 114.3 | 114.2 | 114.0 | 113.8 | 115.0 | 114.9 |

TABLE 164

| Item | Unit | Example 59 | Example 60 | Example 61 | Example 62 | Example 63 | Example 64 | Example 65 | Example 66 |
|---|---|---|---|---|---|---|---|---|---|
| HFO-1132(E) | mass % | 15.0 | 17.0 | 19.0 | 21.0 | 23.0 | 25.0 | 27.0 | 11.0 |
| HFO-1123 | mass % | 50.0 | 48.0 | 46.0 | 44.0 | 42.0 | 40.0 | 38.0 | 52.0 |
| R32 | mass % | 35.0 | 35.0 | 35.0 | 35.0 | 35.0 | 35.0 | 35.0 | 37.0 |
| GWP | — | 237 | 237 | 237 | 237 | 237 | 237 | 237 | 250 |
| COP ratio | % (relative to R410A) | 96.1 | 96.2 | 96.2 | 96.3 | 96.4 | 96.4 | 96.5 | 96.2 |
| Refrigerating capacity ratio | % (relative to R410A) | 114.8 | 114.7 | 114.5 | 114.4 | 114.2 | 114.1 | 113.9 | 115.1 |

TABLE 165

| Item | Unit | Example 67 | Example 68 | Example 69 | Example 70 | Example 71 | Example 72 | Example 73 | Example 74 |
|---|---|---|---|---|---|---|---|---|---|
| HFO-1132(E) | mass % | 13.0 | 15.0 | 17.0 | 15.0 | 17.0 | 19.0 | 21.0 | 23.0 |
| HFO-1123 | mass % | 50.0 | 48.0 | 46.0 | 50.0 | 48.0 | 46.0 | 44.0 | 42.0 |
| R32 | mass % | 37.0 | 37.0 | 37.0 | 0.0 | 0.0 | 0.0 | 0.0 | 0.0 |
| GWP | — | 250 | 250 | 250 | 237 | 237 | 237 | 237 | 237 |
| COP ratio | % (relative to R410A) | 96.3 | 96.4 | 96.4 | 96.1 | 96.2 | 96.2 | 96.3 | 96.4 |
| Refrigerating capacity ratio | % (relative to R410A) | 115.0 | 114.9 | 114.7 | 114.8 | 114.7 | 114.5 | 114.4 | 114.2 |

TABLE 166

| Item | Unit | Example 75 | Example 76 | Example 77 | Example 78 | Example 79 | Example 80 | Example 81 | Example 82 |
|---|---|---|---|---|---|---|---|---|---|
| HFO-1132(E) | mass % | 25.0 | 27.0 | 11.0 | 19.0 | 21.0 | 23.0 | 25.0 | 27.0 |
| HFO-1123 | mass % | 40.0 | 38.0 | 52.0 | 44.0 | 42.0 | 40.0 | 38.0 | 36.0 |
| R32 | mass % | 0.0 | 0.0 | 0.0 | 37.0 | 37.0 | 37.0 | 37.0 | 37.0 |
| GWP | — | 237 | 237 | 250 | 250 | 250 | 250 | 250 | 250 |
| COP ratio | % (relative to R410A) | 96.4 | 96.5 | 96.2 | 96.5 | 96.5 | 96.6 | 96.7 | 96.8 |
| Refrigerating capacity ratio | % (relative to R410A) | 114.1 | 113.9 | 115.1 | 114.6 | 114.5 | 114.3 | 114.1 | 114.0 |

The above results indicate that under the condition that the mass % of FO-1132(E), HFO-1123, and R32 based on their sum is respectively represented by x, y, and z, when coordinates (x,y,z) in a ternary composition diagram in which the sum of HFO-1132(E), HFO-1123, and R32 is 100 mass %, a line segment connecting a point (0.0, 100.0, 0.0) and a point (0.0, 0.0, 100.0) is the base, and the point (0.0, 100.0, 0.0) is on the left side are within the range of a figure surrounded by line segments that connect the following 4 points:
point O (100.0, 0.0, 0.0),
point A" (63.0, 0.0, 37.0),
point B" (0.0, 63.0, 37.0), and
point (0.0, 100.0, 0.0),
or on these line segments,
the refrigerant has a GWP of 250 or less.

The results also indicate that when coordinates (x,y,z) are within the range of a figure surrounded by line segments that connect the following 4 points:
point O (100.0, 0.0, 0.0),
point A' (81.6, 0.0, 18.4),
point B' (0.0, 81.6, 18.4), and
point (0.0, 100.0, 0.0),
or on these line segments,
the refrigerant has a GWP of 125 or less.

The results also indicate that when coordinates (x,y,z) are within the range of a figure surrounded by line segments that connect the following 4 points:
point O (100.0, 0.0, 0.0),
point A (90.5, 0.0, 9.5),
point B (0.0, 90.5, 9.5), and
point (0.0, 100.0, 0.0),
or on these line segments,
the refrigerant has a GWP of 65 or less.

The results also indicate that when coordinates (x,y,z) are on the left side of line segments that connect the following 3 points:
point C (50.0, 31.6, 18.4),
point U (28.7, 41.2, 30.1), and
point D (52.2, 38.3, 9.5),
or on these line segments,
the refrigerant has a COP ratio of 96% or more relative to that of R410A.

In the above, the line segment CU is represented by coordinates $(-0.0538z^2+0.7888z+53.701, 0.0538z^2-1.7888z+46.299, z)$, and the line segment UD is represented by coordinates $(-3.4962z^2+210.71z-3146.1, 3.4962z^2-211.71z+3246.1, z)$.

The points on the line segment CU are determined from three points, i.e., point C, Comparative Example 10, and point U, by using the least-square method.

The points on the line segment UD are determined from three points, i.e., point U, Example 2, and point D, by using the least-square method.

The results also indicate that when coordinates (x,y,z) are on the left side of line segments that connect the following 3 points:
point E (55.2, 44.8, 0.0),
point T (34.8, 51.0, 14.2), and
point F (0.0, 76.7, 23.3),
or on these line segments,
the refrigerant has a COP ratio of 94.5% or more relative to that of R410A.

In the above, the line segment ET is represented by coordinates $(-0.0547z^2\ 0.5327z+53.4, 0.0547z^2-0.4673z+46.6, z)$, and the line segment TF is represented by coordinates $(-0.0982z^2+0.9622z+40.931, 0.0982z^2-1.9622z+59.069, z)$.

The points on the line segment ET are determined from three points, i.e., point E, Example 2, and point T, by using the least-square method.

The points on the line segment TF are determined from three points, i.e., points T, S, and F, by using the least-square method.

The results also indicate that when coordinates (x,y,z) are on the left side of line segments that connect the following 3 points:
point G (0.0, 76.7, 23.3),
point R (21.0, 69.5, 9.5), and
point H (0.0, 85.9, 14.1),
or on these line segments,
the refrigerant has a COP ratio of 93% or more relative to that of R410A.

In the above, the line segment GR is represented by coordinates $(-0.0491z^2-1.1544z+38.5, 0.0491z^2+0.1544z+61.5, z)$, and the line segment RH is represented by coordinates $(-0.3123z^2+4.234z+11.06, 0.3123z^2-5.234z+88.94, z)$.

The points on the line segment GR are determined from three points, i.e., point G, Example 5, and point R, by using the least-square method.

The points on the line segment RH are determined from three points, i.e., point R, Example 7, and point H, by using the least-square method.

In contrast, as shown in, for example, Comparative Examples 8, 9, 13, 15, 17, and 18, when R32 is not contained, the concentrations of HFO-1132(E) and HFO-1123, which have a double bond, become relatively high; this undesirably leads to deterioration, such as decomposition, or polymerization in the refrigerant compound.

(6) First Embodiment

The following describes, with reference to the drawings, a heat load treatment system 100, which is a refrigeration apparatus according to a first embodiment. The following embodiments, which are provided as specific examples, should not be construed as limiting the technical scope and may be altered as appropriate within a range not departing from the spirit thereof. Words such as up, down, left, right, forward (frontside), and rearward (backside) may be hereinafter used to refer to directions. Unless specified otherwise, these directions correspond to directions denoted by arrows in the drawings. The words relevant to the directions are merely used to facilitate the understanding of the embodiments and should not be construed as limiting the ideas presented in the present disclosure.

(6-1) Overall Configuration

Figure 16:
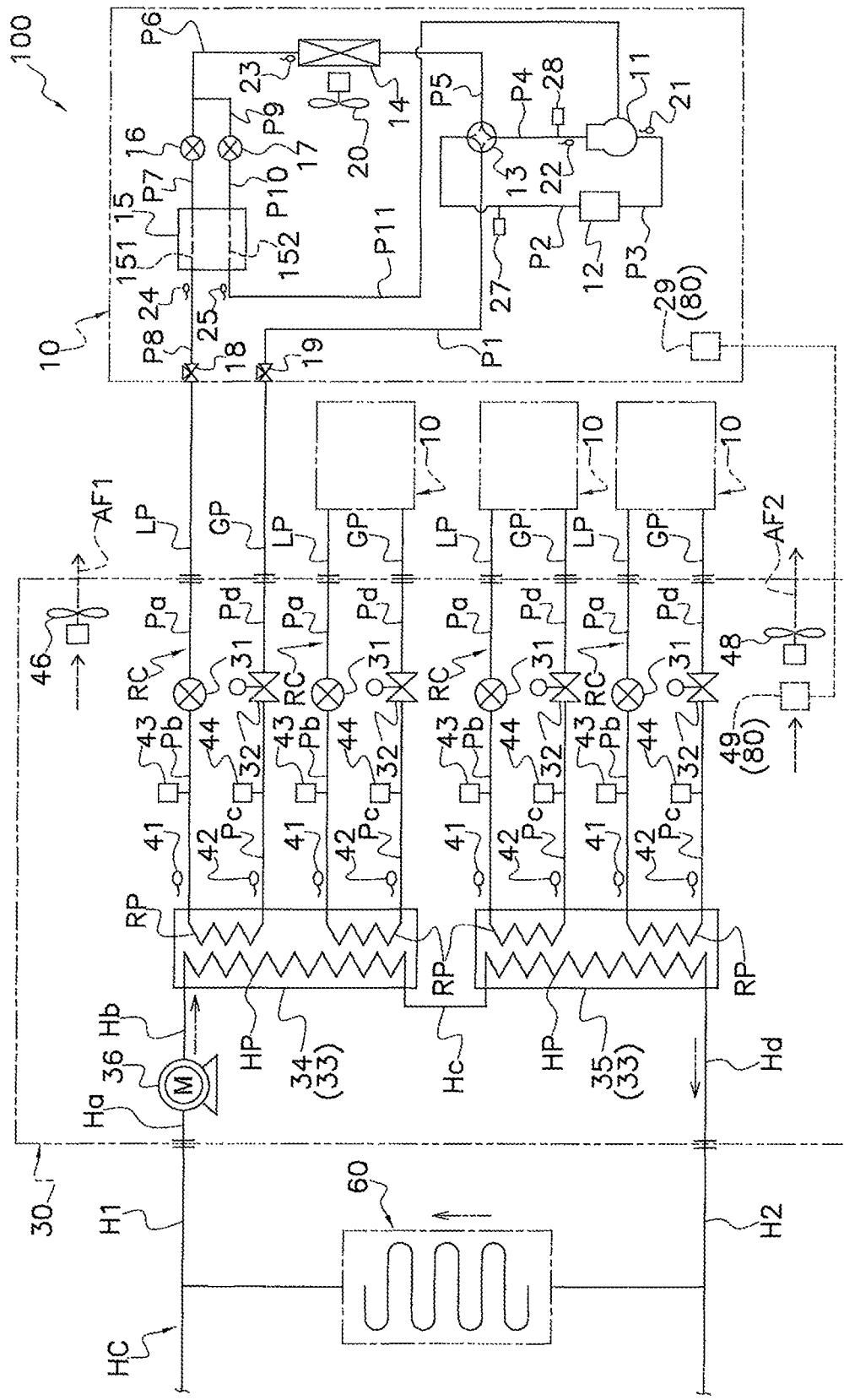
FIG. 16 is a schematic configuration diagram of a heat load treatment system that is a refrigeration apparatus according to a first embodiment.

FIG. 16 is a schematic configuration diagram of the heat load treatment system 100. The heat load treatment system 100 is a system for treating a heat load in an installation environment. In the present embodiment, the heat load treatment system 100 is an air conditioning system that air-conditions a target space.

The heat load treatment system 100 includes mainly a plurality of heat-source-side units 10 (four heat-source-side units 10 in the example concerned), a heat exchanger unit 30, a plurality of use-side units 60 (four use-side units 60 in the example concerned), a plurality of liquid-side connection pipes LP (four liquid-side connection pipes LP in the example concerned), a plurality of gas-side connection pipes GP (four gas-side connection pipes GP in the example concerned), a first heat-medium connection pipe H1, a second heat-medium connection pipe H2, a refrigerant leakage sensor 70, and a controller 80, which controls the operation of the heat load treatment system 100.

In the heat load treatment system 100, a refrigerant circuit RC, through which refrigerant circulates, is formed in such a manner that each of the heat-source-side units 10 is connected to the heat exchanger unit 30 via the corresponding one of the liquid-side connection pipes LP and the corresponding one of the gas-side connection pipes GP. The plurality of heat-source-side units 10 are arranged in parallel, and a plurality of refrigerant circuits RC (four refrigerant circuits RC in the example concerned) are formed in the heat load treatment system 100 accordingly. In other words, the heat load treatment system 100 includes the plurality of refrigerant circuits RC, each of which is constructed of the corresponding one of the plurality of heat-source-side units 10 and the heat exchanger unit 30. The heat load treatment system 100 performs a vapor compression refrigeration cycle in each refrigerant circuit RC.

In the present embodiment, refrigerant sealed in the refrigerant circuits RC is a refrigerant mixture containing 1,2-difluoroethylene and may be any one of the refrigerants A to E mentioned above.

In the heat load treatment system 100, a heat medium circuit HC, through which a heat medium circulates, is formed in such a manner that the heat exchanger unit 30 and the use-side units 60 are connected to each other via the first heat-medium connection pipe H1 and the second heat-medium connection pipe H2. In other words, the heat exchanger unit 30 and the use-side units 60 constitute the heat medium circuit HC in the heat load treatment system 100. When being driven, a pump 36 of the heat exchanger unit 30 causes the heat medium to circulate through the heat medium circuit HC.

In the present embodiment, the heat medium sealed in the heat medium circuit HC is, for example, a liquid medium such as water or brine. Examples of brine include aqueous sodium chloride solution, aqueous calcium chloride solution, aqueous ethylene glycol solution, and aqueous propylene glycol solution. The liquid medium is not limited to these examples and may be selected as appropriate. Specifically, brine is used as the heat medium in the present embodiment.

(6-2) Details on Configuration (6-2-1) Heat-Source-Side Unit

In the present embodiment, the heat load treatment system 100 includes four heat-source-side units 10 (see FIG. 16). The four heat-source-side units 10 cool or heat refrigerant, which is in turn used by the heat exchanger unit 30 to cool or heat the liquid medium. The number of the heat-source-side units 10 is not limited to particular values such as four, which is merely given as an example. One, two, three, or five or more heat-source-side units 10 may be included. The internal configuration of one of the four heat-source-side units 10 is illustrated in FIG. 16, in which the internal configuration of the remaining three heat-source-side units 10 is omitted. Each of the heat-source-side units 10 that are not illustrated in full has the same configuration as the heat-source-side unit 10 that will be described below.

The heat-source-side units 10 are units that use air as a heat source to cool or heat refrigerant. The heat-source-side units 10 are individually connected to the heat exchanger unit 30 via the respective liquid-side connection pipes LP and the respective gas-side connection pipes GP. In other words, the individual heat-source-side units 10 together with the heat exchanger unit 30 are constituent components of the corresponding refrigerant circuits RC. That is, the plurality of refrigerant circuits RC (four refrigerant circuits RC in the example concerned) are formed in the heat load treatment system 100 in such a manner that the respective heat-source-side units 10 (four heat-source-side units 10 in the example concerned) are individually connected to the heat exchanger unit 30. The refrigerant circuits RC are separated from each other and do not communicate with each other.

Although the installation site of the heat-source-side units 10 is not limited, each of the heat-source-side unit 10 may be installed on a roof or in a space around a building. The heat-source-side unit 10 is connected to the heat exchanger unit 30 via the liquid-side connection pipe LP and the gas-side connection pipe GP to form part of the refrigerant circuit RC.

The heat-source-side unit 10 includes mainly, as devices constituting the refrigerant circuit RC, a plurality of refrigerant pipes (a first pipe P1 to an eleventh pipe P11), a compressor 11, an accumulator 12, a four-way switching valve 13, a heat-source-side heat exchanger 14, a subcooler 15, a heat-source-side first control valve 16, a heat-source-side second control valve 17, a liquid-side shutoff valve 18, and a gas-side shutoff valve 19.

The first pipe P1 forms a connection between the gas-side shutoff valve 19 and a first port of the four-way switching valve 13. The second pipe P2 forms a connection between an inlet port of the accumulator 12 and a second port of the four-way switching valve 13. The third pipe P3 forms a connection between an outlet port of the accumulator 12 and an intake port of the compressor 11. The fourth pipe P4 forms a connection between a discharge port of the compressor 11 and a third port of the four-way switching valve 13. The fifth pipe P5 forms a connection between a fourth port of the four-way switching valve 13 and a gas-side inlet-outlet port of the heat-source-side heat exchanger 14. The sixth pipe P6 forms a connection between a liquid-side inlet-outlet port of the heat-source-side heat exchanger 14 and one end of the heat-source-side first control valve 16. The seventh pipe P7 forms a connection between the other end of the heat-source-side first control valve 16 and one end of a main channel 151 in the subcooler 15. The eighth pipe P8 forms a connection between the other end of the main channel 151 in the subcooler 15 and one end of the liquid-side shutoff valve 18.

The ninth pipe P9 forms a connection between one end of the heat-source-side second control valve 17 and a portion of the sixth pipe P6 between its two ends. The tenth pipe P10 forms a connection between the other end of the heat-source-side second control valve 17 and one end of a subchannel 152 in the subcooler 15. The eleventh pipe P11 forms a connection between the other end of the subchannel 152 in the subcooler 15 and an injection port of the compressor 11.

Each of these refrigerant pipes (the pipes P1 to P11) may be practically constructed of a single pipe or a plurality of pipes connected to each other via a joint.

The compressor 11 is a device that compresses low-pressure refrigerant in the refrigeration cycle to a high pressure. In the present embodiment, the compressor 11 has a closed structure in which a rotary-type or scroll-type positive-displacement compression element is driven and rotated by a compressor motor (not illustrated). The operating frequency of the compressor motor may be controlled by an inverter. The capacity of the compressor 11 is thus controllable. Alternatively, the compressor 11 may be a compressor with fixed capacity.

The accumulator 12 is a container provided to eliminate or reduce the possibility that an excessive amount of liquid refrigerant will be sucked into the compressor 11. The accumulator 12 has a predetermined volumetric capacity required to accommodate refrigerant charged into the refrigerant circuit RC.

The four-way switching valve 13 is a channel-switching mechanism for redirecting a flow of refrigerant in the refrigerant circuit RC. The four-way switching valve 13 enables switching between the normal cycle state and the reverse cycle state. When the four-way switching valve 13 is switched to the normal cycle state, the first port (the first pipe P1) communicates with the second port (the second pipe P2), and the third port (the fourth pipe P4) communicates with the fourth port (the fifth pipe P5) (see solid lines in the four-way switching valve 13 illustrated in FIG. 16). When the four-way switching valve 13 is switched to the reverse cycle state, the first port (the first pipe P1) communicates with the third port (the forth pipe P4), and the second port (the second pipe P2) communicates with the fourth port (the fifth pipe P5) (see broken lines in the four-way switching valve 13 illustrated in FIG. 16).

The heat-source-side heat exchanger 14 is a heat exchanger that functions as a refrigerant condenser (or radiator) or a refrigerant evaporator. The heat-source-side heat exchanger 14 functions as a refrigerant condenser during normal cycle operation (operation in which the four-way switching valve 13 is in the normal cycle state). The heat-source-side heat exchanger 14 functions as a refrigerant evaporator during reverse cycle operation (operation in which the four-way switching valve 13 is in the reverse cycle state). The heat-source-side heat exchanger 14 includes a plurality of heat transfer tubes and a heat transfer fin (not illustrated). The heat-source-side heat exchanger 14 is configured to enable exchange of heat between refrigerant in the heat transfer tubes and air flowing around the heat transfer tubes or around the heat transfer fin (heat-source-side airflow, which will be described later).

The subcooler 15 is a heat exchanger that transforms incoming refrigerant into liquid refrigerant in a subcooled state. The subcooler 15 is, for example, a double-tube heat exchanger, and the main channel 151 and the subchannel 152 are formed in the subcooler 15. The subcooler 15 is configured to enable exchange of heat between refrigerant flowing through the main channel 151 and refrigerant flowing through the subchannel 152.

The heat-source-side first control valve 16 is an electronic expansion valve whose opening degree is controllable, such that the pressure of incoming refrigerant may be reduced in accordance with the opening degree or the flow rate of incoming refrigerant may be regulated in accordance with the opening degree. The heat-source-side first control valve 16 is capable of switching between the opened state and the closed state. The heat-source-side first control valve 16 is disposed between the heat-source-side heat exchanger 14 and the subcooler 15 (the main channel 151).

The heat-source-side second control valve 17 is an electronic expansion valve whose opening degree is controllable, such that the pressure of incoming refrigerant may be reduced in accordance with the opening degree or the flow rate of incoming refrigerant may be regulated in accordance with the opening degree. The heat-source-side second control valve 17 is capable of switching between the opened state and the closed state. The heat-source-side second control valve 17 is disposed between the heat-source-side heat exchanger 14 and the subcooler 15 (the subchannel 152).

The liquid-side shutoff valve 18 is a manual valve disposed in the portion where the eighth pipe P8 is connected to the liquid-side connection pipe LP. One end of the liquid-side shutoff valve 18 is connected to the eighth pipe P8, and the other end of the liquid-side shutoff valve 18 is connected to the liquid-side connection pipe LP.

The gas-side shutoff valve 19 is a manual valve disposed in the portion where the first pipe P1 is connected to the gas-side connection pipe GP. One end of the gas-side shutoff valve 19 is connected to the first pipe P1, and the other end of the gas-side shutoff valve 19 is connected to the gas-side connection pipe GP.

The heat-source-side unit 10 also includes a heat-source-side fan 20, which generates heat-source-side airflow flowing through the heat-source-side heat exchanger 14. The heat-source-side fan 20 is a fan that supplies the heat-source-side heat exchanger 14 with the heat-source-side airflow, which is a cooling source or a heating source for refrigerant flowing through the heat-source-side heat exchanger 14. The heat-source-side fan 20 includes, as a drive source, a heat-source-side fan motor (not illustrated), which executes on-off control and regulates the revolution frequency as circumstances demand.

In addition, the heat-source-side unit 10 includes a plurality of heat-source-side sensors S1 (see FIG. 18) to sense the state (the pressure or temperature in particular) of refrigerant in the refrigerant circuit RC. Each heat-source-side sensor S1 is a pressure sensor or a temperature sensor such as a thermistor or a thermocouple. A first temperature sensor 21, which senses the temperature (suction temperature) of refrigerant on the intake side of the compressor 11 (refrigerant in the third pipe P3), and/or a second temperature sensor 22, which senses the temperature (discharge temperature) of refrigerant on the discharge side of the compressor 11 (refrigerant in the fourth pipe P4) may be included as the heat-source-side sensor S1. A third temperature sensor 23, which senses the temperature of refrigerant on the liquid side of the heat-source-side heat exchanger 14 (refrigerant in the sixth pipe P6), a fourth temperature sensor 24, which senses the temperature of refrigerant in the eighth pipe P8, and/or a fifth temperature sensor 25, which senses the temperature of refrigerant in the eleventh pipe P11 may be included as the heat-source-side sensor S1. A first pressure sensor 27, which senses the pressure (intake pressure) of refrigerant on the intake side of the compressor 11 (refrigerant in the second pipe P2), and/or a second pressure sensor 28, which senses the pressure (discharge pressure) on the discharge side of the compressor 11 (refrigerant in the fourth pipe P4) may be included as the heat-source-side sensor S1.

The heat-source-side unit 10 also includes a heat-source-side unit control unit 29, which controls the operation and states of the devices included in the heat-source-side unit 10. For example, various electric circuits, a microprocessor, and a microcomputer including a memory chip that stores programs to be executed by the microprocessor are included in the heat-source-side unit control unit 29, which can thus perform its functions. The heat-source-side unit control unit 29 is electrically connected to the devices (11, 13, 16, 17, 20) and the heat-source-side sensors S1 of the heat-source-side unit 10 to perform signal input and output. The heat-source-side unit control unit 29 is electrically connected through a communication line to a heat exchanger unit control unit 49

(which will be described later) of the heat exchanger unit 30 to transmit and receive control signals.

(6-2-2) Heat Exchanger Unit

The heat exchanger unit 30 is a device in which a heat medium is cooled and/or heated by exchanging heat with refrigerant. In the present embodiment, cooling of the heat medium and heating of the heat medium are performed in the heat exchanger unit 30 in such a manner that heat is exchanged between the heat medium and refrigerant. The heat medium cooled or heated by the liquid refrigerant in the heat exchanger unit 30 is transferred to the use-side units 60.

The heat exchanger unit 30 is a unit in which a heat medium that is to be transferred to the use-side units 60 is cooled or heated by exchanging heat with the refrigerant. Although the installation site of the heat exchanger unit 30 is not limited, the heat exchanger unit 30 may be installed indoors (e.g., in an equipment/device room). As constituent devices of the refrigerant circuits RC, refrigerant pipes (refrigerant pipes Pa, Pb, Pc, and Pd), expansion valves 31, and on-off valves 32 are included in the heat exchanger unit 30. The number of the refrigerant pipes is the same as the number of the heat-source-side units 10 (the refrigerant circuits RC); that is, the number of the refrigerant pipes is equal to four in the example concerned. The same holds for the number of the expansion valves 31 and the number of the on-off valves 32. As a constituent device of the refrigerant circuits RC and of the heat medium circuit HC, a heat exchanger 33 is included in the heat exchanger unit 30.

The refrigerant pipe Pa forms a connection between the liquid-side connection pipe LP and one end of the expansion valve 31. The refrigerant pipe Pb forms a connection between the other end of the expansion valve 31 and a liquid-side refrigerant inlet-outlet port of the heat exchanger 33. The refrigerant pipe Pc forms a connection between a gas-side refrigerant inlet-outlet port of the heat exchanger 33 and one end of the on-off valve 32. The refrigerant pipe Pd forms a connection between the other end of the on-off valve 32 and the gas-side connection pipe GP. Each of these refrigerant pipes (the pipes Pa to Pd) may be practically constructed of a single pipe or a plurality of pipes connected to each other via a joint.

The expansion valve 31 is an electronic expansion valve whose opening degree is controllable, such that the pressure of incoming refrigerant may be reduced in accordance with the opening degree or the flow rate of incoming refrigerant may be regulated in accordance with the opening degree. The expansion valve 31 is capable of switching between the opened state and the closed state. The expansion valve 31 is disposed between the heat exchanger 33 and the liquid-side connection pipe LP.

The on-off valve 32 is a control valve capable of switching between the opened state and the closed state. The on-off valve 32 in the closed state interrupts refrigerant. The on-off valve 32 is disposed between the heat exchanger 33 and the gas-side connection pipe GP.

A plurality of paths (refrigerant paths RP) for refrigerant flowing through the refrigerant circuits RC are formed in heat exchanger 33. In the heat exchanger 33, the refrigerant paths RP do not communicate with each other. On this account, each refrigerant path RP has a liquid-side inlet-outlet port and a gas-side inlet-outlet port. The number of liquid-side inlet-outlet ports in the heat exchanger 33 is the same as the number of refrigerant paths RP; that is, the number of liquid-side inlet-outlet ports in the heat exchanger 33 is equal to four in the example concerned. The same holds for the number of gas-side inlet-outlet ports in the heat exchanger 33. A path (heat medium path HP) for the heat medium flowing through the heat medium circuit HC is also formed in the heat exchanger 33.

More specifically, a first heat exchanger 34 and a second heat exchanger 35 are included as the heat exchanger 33. The first heat exchanger 34 and the second heat exchanger 35 are discrete devices. Two separate refrigerant paths RP are formed in each of the first heat exchanger 34 and the second heat exchanger 35. The first heat exchanger 34 and the second heat exchanger 35 are configured as follows: one end of each refrigerant path RP is connected to the refrigerant pipe Pb of the corresponding one of the refrigerant circuits RC, and the other end of each refrigerant path RP is connected to the refrigerant pipe Pc of the corresponding one of the refrigerant circuits RC. In the first heat exchanger 34, one end of the heat medium path HP is connected to a heat medium pipe Hb, which will be described later, and the other end of the heat medium path HP is connected to a heat medium pipe Hc, which will be described later. In the second heat exchanger 35, one end of the heat medium path HP is connected to Hc, which will be described later, and the other end of the heat medium path HP is connected to a heat medium pipe Hd, which will be described later. In the heat medium circuit HC, the heat medium path HP of the first heat exchanger 34 and the heat medium path HP of the second heat exchanger 35 are arranged in series. Each of the first heat exchanger 34 and the second heat exchanger 35 is configured to enable exchange of heat between refrigerant flowing through the refrigerant paths RP (the refrigerant circuits RC) and the heat medium flowing through the heat medium path HP (the heat medium circuit HC).

As a constituent device of the heat medium circuit HC, heat medium pipes (heat medium pipes Ha, Hb, Hc, and Hd) and the pump 36 are also included in the heat exchanger unit 30.

One end of the heat medium pipe Ha is connected to the first heat-medium connection pipe H1, and the other end of the heat medium pipe Ha is connected to an intake-side port of the pump 36. One end of the heat medium pipe Hb is connected to a discharge-side port of the pump 36, and the other end of the heat medium pipe Hb is connected to one end of the heat medium path HP of the first heat exchanger 34. One end of the heat medium pipe He is connected to the other end of the heat medium path HP of the first heat exchanger 34, and the other end of the heat medium pipe He is connected to one end of the heat medium path HP of the second heat exchanger 35. One end of the heat medium pipe Hd is connected to the other end of the heat medium path HP of the second heat exchanger 35, and the other end of the heat medium pipe Hd is connected to the second heat-medium connection pipe H2. Each of these heat medium pipes (the pipes Ha to Hd) may be practically constructed of a single pipe or a plurality of pipes connected to each other via a joint.

The pump 36 is disposed in the heat medium circuit HC. During operation, the pump 36 sucks in and discharges the heat medium. The pump 36 includes a motor that is a drive source. The motor is inverter-controlled, and the revolution frequency is regulated accordingly. The discharge flow rate of the pump 36 is thus variable. The heat exchanger unit 30 may include a plurality of pumps 36 connected in series or parallel in the heat medium circuit HC. The pump 36 may be a metering pump.

The heat exchanger unit 30 includes a plurality of heat exchanger unit sensors S2 (see FIG. 18) to sense the state (the pressure or temperature in particular) of refrigerant in the refrigerant circuits RC. Each heat exchanger unit sensor S2 is a pressure sensor or a temperature sensor such as a thermistor or a thermocouple. A sixth temperature sensor 41, which senses the temperature of refrigerant on the liquid side of the heat exchanger 33 (refrigerant in the refrigerant pipe Pb on the refrigerant path RP), and/or a seventh temperature sensor 42, which senses the temperature of refrigerant on the gas-side of the heat exchanger 33 (refrigerant in the refrigerant pipe Pc on the refrigerant path RP) may be included as the heat exchanger unit sensor S2. A third pressure sensor 43, which senses the pressure of refrigerant on the liquid side of the heat exchanger 33 (refrigerant in the refrigerant pipe Pb on the refrigerant path RP), and/or a fourth pressure sensor 44, which senses the pressure on the gas-side of the heat exchanger 33 (refrigerant in the refrigerant pipe Pc on the refrigerant path RP) may be included as the heat exchanger unit sensor S2.

The heat exchanger unit 30 includes an exhaust fan unit to enable the heat exchanger unit 30 to discharge leakage refrigerant at the time of occurrence of refrigerant leakage in the heat exchanger unit 30 (the refrigerant circuit RC). The exhaust fan unit includes an exhaust fan 46. The exhaust fan 46 is driven along with a drive source (e.g., a fan motor). When being driven, the exhaust fan 46 generates a first airflow AF1, which flows out of the heat exchanger unit 30. The exhaust fan 46 is not limited to a particular type of fan and is, for example, a sirocco fan or a propeller fan.

The heat exchanger unit 30 also includes a cooling fan 48. The cooling fan 48 is driven along with a drive source (e.g., a fan motor). When being driven, the cooling fan 48 generates a second airflow AF2 to cool electric components (heating components) disposed in the heat exchanger unit 30. The cooling fan 48 is disposed in such a manner that the second airflow AF2 flows around the heating components to perform heat exchange and then flows out of the heat exchanger unit 30. The cooling fan 48 is not limited to a particular type of fan and is, for example, a sirocco fan or a propeller fan.

The heat exchanger unit 30 also includes a heat exchanger unit control unit 49, which controls the operation and states of the devices included in the heat exchanger unit 30. For example, a microprocessor, a microcomputer including a memory chip that stores programs to be executed by the microprocessor, and various electric components are included in the heat exchanger unit control unit 49, which can thus perform its functions. The heat exchanger unit control unit 49 is electrically connected to the devices and the heat exchanger unit sensors S2 of the heat exchanger unit 30 to perform signal input and output. The heat exchanger unit control unit 49 is electrically connected through a communication line to a heat-source-side unit control unit 29, control units (not illustrated) disposed in the corresponding use-side units 60, or a remote control (not illustrated) to transmit and receive control signals. The electric components included in the heat exchanger unit control unit 49 are cooled by the second airflow AF2 generated by the cooling fan 48.

(6-2-3) Use-Side Unit

Each use-side unit 60 is equipment that uses the heat medium cooled or heated in the heat exchanger unit 30. The individual use-side units 60 are connected to the heat exchanger unit 30 via, for example, the first heat-medium connection pipe H1 and the second heat-medium connection pipe H2. The individual use-side units 60 and the heat exchanger unit 30 constitute the heat medium circuit HC.

In the present embodiment, each use-side unit 60 is an air handling unit or a fan coil unit that performs air conditioning through exchange of heat between the heat medium cooled or heated in the heat exchanger unit 30 and air.

Only one use-side unit 60 is illustrated in FIG. 16. Nevertheless, the heat load treatment system 100 may include a plurality of use-side units, and the heat medium cooled or heated in the heat exchanger unit 30 may branch out to be transferred to the individual use-side units. The use-side units that may be included in the heat load treatment system 100 may be of the same type. Alternatively, more than one type of equipment may be included as the use-side units.

(6-2-4) Liquid-Side Connection Pipe and Gas-Side Connection Pipe

The liquid-side connection pipes LP and the gas-side connection pipes GP form refrigerant paths in such a manner as to connect the heat exchanger unit 30 to the corresponding heat-source-side units 10. The liquid-side connection pipes LP and the gas-side connection pipes GP are installed on-site. Each of the liquid-side connection pipes LP and the gas-side connection pipes GP may be practically constructed of a single pipe or a plurality of pipes connected to each other via a joint.

(6-2-5) First Heat-Medium Connection Pipe and Second Heat-Medium Connection Pipe The first heat-medium connection pipe H1 and the second heat-medium connection pipe H2 form heating medium paths in such a manner as to connect the heat exchanger unit 30 to the corresponding use-side units 60. The first heat-medium connection pipe H1 and the second heat-medium connection pipe H2 are installed on-site. Each of the first heat-medium connection pipe H1 and the second heat-medium connection pipe H2 may be practically constructed of a single pipe or a plurality of pipes connected to each other via a joint.

(6-2-6) Refrigerant Leakage Sensor

The refrigerant leakage sensor 70 is a sensor for sensing leakage of refrigerant in the space in which the heat exchanger unit 30 is installed (an equipment/device room R, which will be described later). More specifically, the refrigerant leakage sensor 70 is configured to sense leakage refrigerant in the heat exchanger unit 30. In the example concerned, the refrigerant leakage sensor 70 is a well-known general-purpose product suited to the type of refrigerant sealed in the refrigerant circuits RC. The refrigerant leakage sensor 70 is disposed in the space in which the heat exchanger unit 30 is installed. In the present embodiment, the refrigerant leakage sensor 70 is disposed in the heat exchanger unit 30.

The refrigerant leakage sensor 70 continuously or intermittently outputs, to the controller 80, electrical signals (refrigerant-leakage-sensor detection signals) corresponding to detection values. More specifically, the refrigerant-leakage-sensor detection signals output by the refrigerant leakage sensor 70 vary in voltage depending on the concentration of refrigerant sensed by the refrigerant leakage sensor 70. In other words, the refrigerant-leakage-sensor detection signals are output to the controller 80 in a manner so as to enable not only a determination on whether leakage of refrigerant has occurred in the refrigerant circuit RC but also a determination of the concentration of leakage refrigerant in the space in which the refrigerant leakage sensor 70 is installed, or more specifically, the concentration of refrigerant sensed by the refrigerant leakage sensor 70.

(6-2-7) Controller

Figure 18:
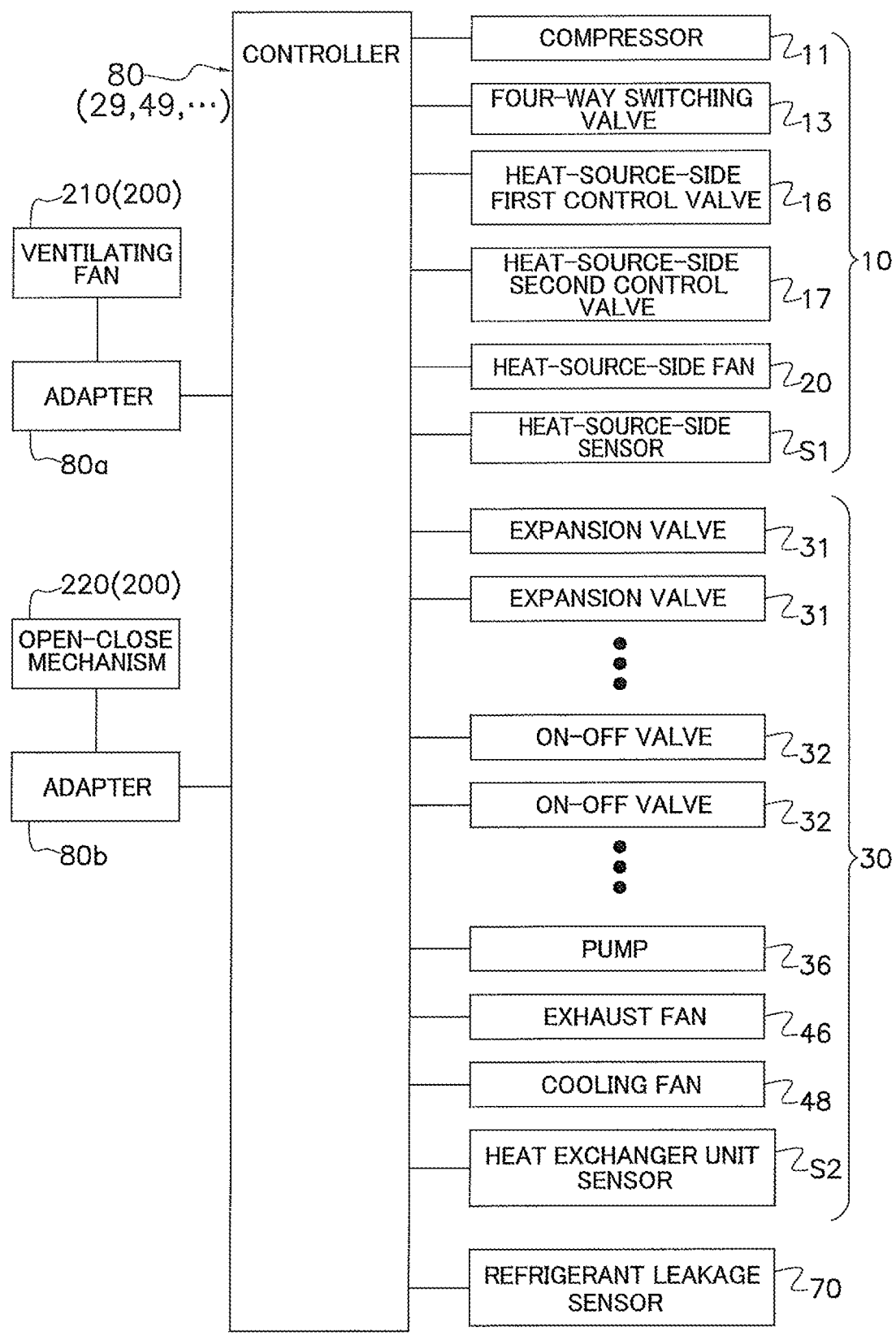
FIG. 18 illustrates a control block of the heat load treatment system according to the first embodiment.

The controller 80 illustrated in FIG. 18 is a computer that controls the states of the individual devices to control the operation of the heat load treatment system 100. In the present embodiment, the controller 80 is configured in such a manner that the heat-source-side unit control unit 29, the heat exchanger unit control unit 49, and devices connected to these units (e.g., control units disposed in the corresponding use-side units and a remote control) are connected to each other through communication lines. In the present embodiment, the heat-source-side unit control unit 29, the heat exchanger unit control unit 49, and the devices connected to these units cooperate to serve as the controller 80.

(6-3) Installation Layout of Heat Load Treatment System

Figure 17:
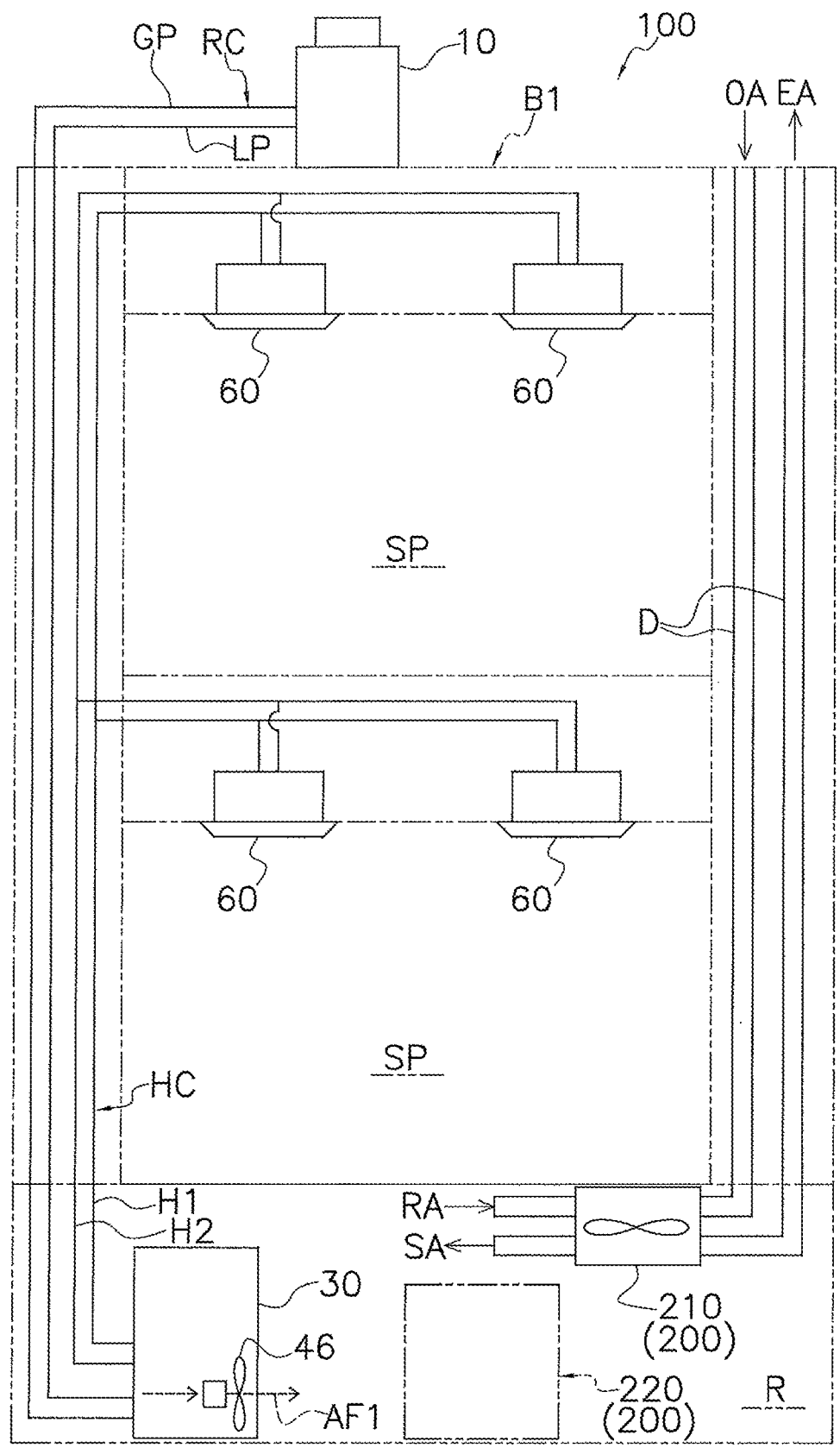
FIG. 17 is a schematic diagram illustrating an installation layout of the heat load treatment system according to the first embodiment.

FIG. 17 is a schematic diagram illustrating an installation layout of the heat load treatment system 100. Although the installation site of the heat load treatment system 100 is not limited, the heat load treatment system 100 is installed in, for example, a building, a commercial facility, or a plant. In the present embodiment, the heat load treatment system 100 is installed in a building B1 as illustrated in FIG. 17. The building B1 has a plurality of floors. The number of floors or rooms in the building B1 may be changed as appropriate.

The building B1 includes the equipment/device room R. The equipment/device room R is a space in which electric equipment, such as a switchboard and a generator, or cooling/heating devices, such as a boiler, are installed. The equipment/device room R is an accessible space in which people can stay. The equipment/device room R is, for example, a basement in which people can walk. In the present embodiment, the equipment/device room R is located on the lowermost floor of the building B1. The building B1 includes a plurality of living spaces SP, each of which is provided for activities of the occupants. In the present embodiment, the living spaces SP are located on the respective floors above the equipment/device room R.

Referring to FIG. 17, the heat-source-side unit 10 is installed on the rooftop of the building B1. The heat exchanger unit 30 is installed in the equipment/device room R. On this account, the liquid-side connection pipe LP and the gas-side connection pipe GP extend in a vertical direction between the rooftop and the equipment/device room R.

Referring to FIG. 17, the individual use-side units 60 are disposed in the living spaces SP. On this account, the first heat-medium connection pipe H1 and the second heat-medium connection pipe H2 extend in a vertical direction through the living spaces SP and the equipment/device room R.

The building B1 is equipped with a ventilating apparatus 200, which provides ventilation (forced ventilation or natural ventilation) in the equipment/device room R. The ventilating apparatus 200 is installed in the equipment/device room R. Specifically, a ventilating fan 210 is installed as the ventilating apparatus 200 in the equipment/device room R. The ventilating fan 210 is connected to a plurality of ventilating ducts D. When being driven, the ventilating fan 210 ventilates the equipment/device room R in such a manner that air (room air RA) in the equipment/device room R is discharged as exhaust air EA to the external space and air (outside air OA) in the external space is supplied as supply air SA to the equipment/device room R. The ventilating fan 210 is thus regarded as the ventilating apparatus that provides ventilation in the equipment/device room R. The operation (e.g., on-off or the revolution frequency) of the ventilating fan 210 may be controlled by the controller 80. The ventilating fan 210 is controlled in such a manner as to switch, as appropriate, between an intermittent operation mode in which the ventilating fan 210 operates intermittently and a continuous operation mode in which the ventilating fan 210 operates continuously.

In the equipment/device room R, an open-close mechanism 220 is also installed as the ventilating apparatus 200. The open-close mechanism 220 is a mechanism capable of switching between an opened state in which the equipment/device room R communicates with another space (e.g., the external space) and a closed state in which the equipment/device room R is shielded. That is, the open-close mechanism 220 opens or closes a vent through which the equipment/device room R communicates with another space. The open-close mechanism 220 is, for example, a door, a hatch, a window, or a shutter, the opening and closing of which are controllable. The open-close mechanism 220 is electrically connected to the controller 80 through an adapter 80b (see FIG. 18). The state (the opened state or the closed state) of the ventilating fan 210 is controlled by the controller 80.

(6-4) Features

The refrigerant mixture that is any one of the refrigerants A to E mentioned above is used as refrigerant sealed in the refrigerant circuits RC serving as a first cycle in the heat load treatment system 100 according to the present embodiment, where the efficiency of heat exchange in the heat exchanger unit 30 is enhanced accordingly.

(7) Second Embodiment

Figure 19:
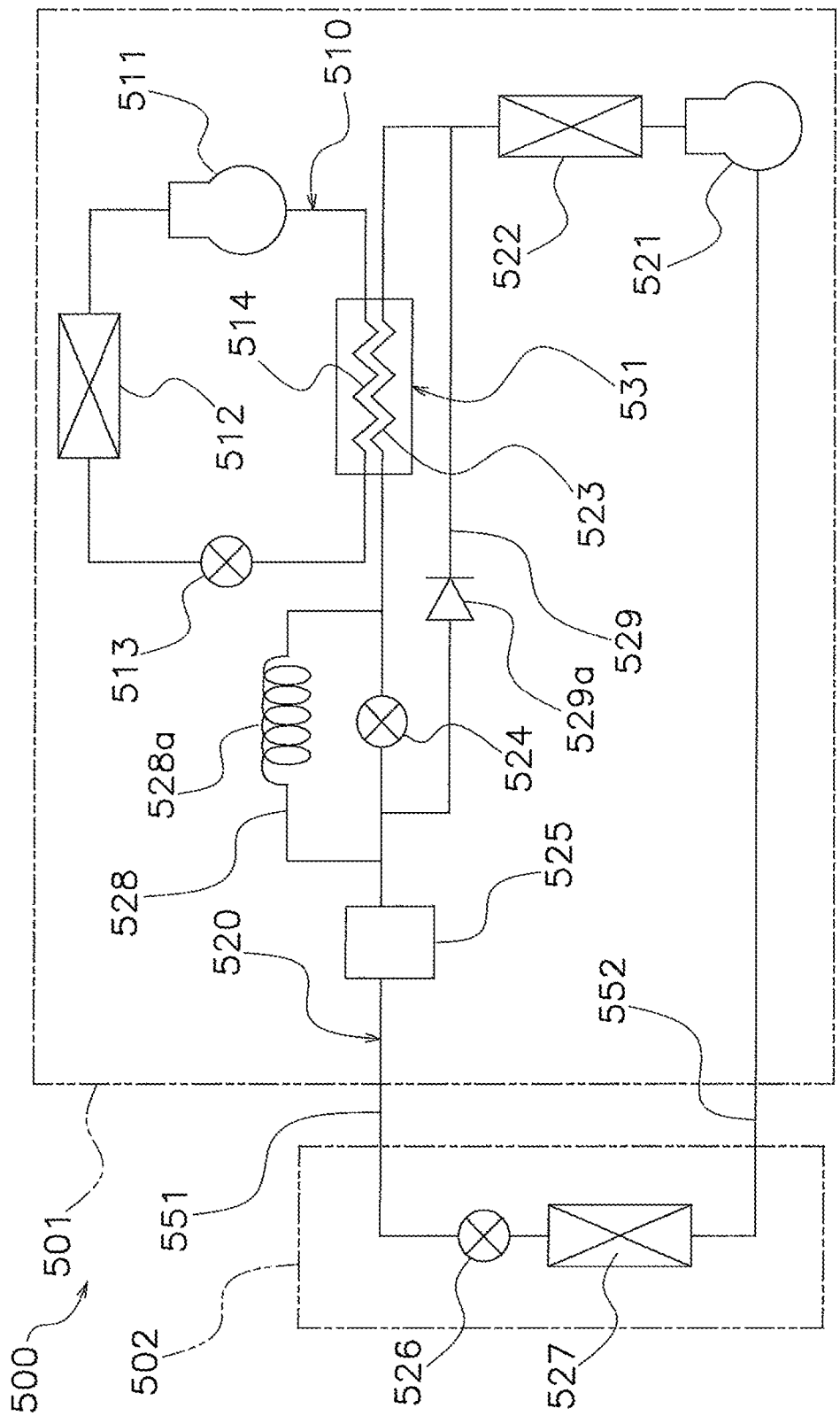
FIG. 19 is a diagram illustrating refrigerant circuits included in a two-stage refrigeration apparatus that is a refrigeration apparatus according to a second embodiment.

FIG. 19 is a diagram illustrating a refrigerant circuit included in a two-stage refrigeration apparatus 500, which is a refrigeration apparatus according to the present embodiment. The two-stage refrigeration apparatus 500 includes a first cycle 510, which is a high-stage-side refrigeration cycle on the high temperature side, and a second cycle 520, which is a low-stage-side refrigeration cycle on the low temperature side. The first cycle 510 and the second cycle 520 are thermally connected to each other through a cascade condenser 531. Constituent elements of the first cycle 510 and the constituent elements of the second cycle 520 are accommodated in an outdoor unit 501 or a cooling unit 502, which will be described later.

With consideration given to possible refrigerant leakage, carbon dioxide ($CO_2$), which does not have a significant impact on global warming, is used as refrigerant sealed in the second cycle 520. Refrigerant sealed in the first cycle 510 is a refrigerant mixture containing 1,2-difluoroethylene and may be any one of the refrigerants A to E mentioned above. The low-temperature-side refrigerant sealed in the second cycle 520 is referred to as a second refrigerant, and the high-temperature-side refrigerant sealed in the first cycle 510 is referred to as a first refrigerant.

The first cycle 510 is a refrigeration cycle through which the first refrigerant circulates. A refrigerant circuit is formed in the first cycle 510 in such a manner that a first compressor 511, a first condenser 512, a first expansion valve 513, and a first evaporator 514 are serially connected to each other via a refrigerant pipe. The refrigerant circuit provided in the first cycle 510 is herein referred to as a first refrigerant circuit.

The second cycle 520 is a refrigeration cycle through which the second refrigerant circulates. A refrigerant circuit is formed in the second cycle 520 in such a manner that a second compressor 521, a second upstream-side condenser 522, a second downstream-side condenser 523, a liquid receiver 525, a second downstream-side expansion valve 526, and a second evaporator 527 are serially connected to each other via a refrigerant pipe. The second cycle 520 includes a second upstream-side expansion valve 524, which is disposed between the second downstream-side condenser 523 and the liquid receiver 525. The refrigerant circuit provided in the second cycle 520 is herein referred to as a second refrigerant circuit.

The two-stage refrigeration apparatus 500 includes the cascade condenser 531 mentioned above. The cascade condenser 531 is configured in such a manner that the first evaporator 514 and the second downstream-side condenser 523 are coupled to each other to enable exchange of heat between refrigerant flowing through the first evaporator 514 and refrigerant flowing through the second downstream-side condenser 523. The cascade condenser 531 is thus regarded as a refrigerant heat exchanger. With the cascade condenser 531 being provided, the second refrigerant circuit and the first refrigerant circuit constitute a multistage configuration.

The first compressor 511 sucks in the first refrigerant flowing through the first refrigerant circuit, compresses the first refrigerant to transform it into high-temperature, high-pressure gas refrigerant, and then discharges the gas refrigerant. In the present embodiment, the first compressor 511 is a compressor of the type that is capable of adjusting the refrigerant discharge amount through control of the revolution frequency by an inverter circuit.

The first condenser 512 causes, for example, air or brine to exchange heat with refrigerant flowing through the first refrigerant circuit, and in turn, the refrigerant is condensed into a liquid. In the present embodiment, the first condenser 512 enables exchange of heat between outside air and refrigerant. The two-stage refrigeration apparatus 500 includes a first condenser fan 512a. The first condenser fan 512a blows outside air into the first condenser 512 to promote heat exchange in the first condenser 512. The airflow rate of the first condenser fan 512a is adjustable.

The first expansion valve 513 decompresses and expands the first refrigerant flowing through the first refrigerant circuit and is, for example, an electronic expansion valve.

In the first evaporator 514, refrigerant flowing through the first refrigerant circuit evaporates and gasifies as a result of heat exchange. In the present embodiment, the first evaporator 514 includes, for example, a heat transfer tube that allows, in the cascade condenser 531, passage of refrigerant flowing through the first refrigerant circuit. In the cascade condenser 531, heat is exchanged between the first refrigerant flowing through the first evaporator 514 and the second refrigerant flowing through the second refrigerant circuit.

The second compressor 521 sucks in the second refrigerant flowing through the second refrigerant circuit, compresses the second refrigerant to transform it into high-temperature, high-pressure gas refrigerant, and then discharges the gas refrigerant. In the present embodiment, the second compressor 521 is, for example, a compressor of the type that is capable of adjusting the refrigerant discharge amount through control of the revolution frequency by an inverter circuit.

The second upstream-side condenser 522 causes, for example, air or brain to exchange heat with refrigerant flowing through the first refrigerant circuit, and in turn, the refrigerant is condensed into a liquid. In the present embodiment, the second upstream-side condenser 522 enables exchange of heat between outside air and refrigerant. The two-stage refrigeration apparatus 500 includes a second condenser fan 522a. The second condenser fan 522a blows outside air into the second upstream-side condenser 522 to promote heat exchange in the second upstream-side condenser 522. The second condenser fan 522a is a fan whose airflow rate is adjustable.

In the second downstream-side condenser 523, the refrigerant condensed into a liquid in the second upstream-side condenser 522 is further transformed into supercooled refrigerant. In the present embodiment, the second downstream-side condenser 523 includes, for example, a heat transfer tube that allows, in the cascade condenser 531, passage of the second refrigerant flowing through the second refrigerant circuit. In the cascade condenser 531, heat is exchanged between the second refrigerant flowing through the second downstream-side condenser 523 and the first refrigerant flowing through the first refrigerant circuit.

The second upstream-side expansion valve 524 decompresses and expands the second refrigerant flowing through the second refrigerant circuit, and the second upstream-side expansion valve 524 in the example concerned is an electronic expansion valve.

The liquid receiver 525 is disposed downstream of the second downstream-side condenser 523 and the second upstream-side expansion valve 524. The liquid receiver 525 stores refrigerant temporarily.

The second downstream-side expansion valve 526 decompresses and expands the second refrigerant flowing through the second refrigerant circuit and is an electronic expansion valve.

In the second evaporator 527, the first refrigerant flowing through the first refrigerant circuit evaporates and gasifies as a result of heat exchange. Exchange of heat between a cooling target and the refrigerant in the second evaporator 527 results in direct or indirect cooling of the cooling target.

Constituent elements of the two-stage refrigeration apparatus 500 mentioned above are accommodated in the outdoor unit 501 or the cooling unit 502. The cooling unit 502 is used as, for example, a refrigerator-freezer showcase or a unit cooler. The first compressor 511, the first condenser 512, the first expansion valve 513, the first evaporator 514, the second compressor 521, the second upstream-side condenser 522, the second downstream-side condenser 523, the second upstream-side expansion valve 524, the liquid receiver 525, a supercooled refrigerant pipe 528, a vapor refrigerant pipe 529, a capillary tube 528a, and a check valve 529a in the present embodiment are accommodated in the outdoor unit 501. The second downstream-side expansion valve 526 and the second evaporator 527 are accommodated in the cooling unit 502. The outdoor unit 501 and the cooling unit 502 are connected to each other via two pipes, namely, a liquid pipe 551 and a gas pipe 552.

With the two-stage refrigeration apparatus 500 being configured as described above, the following describes, in accordance with the flow of refrigerants flowing through the respective refrigerant circuits, the way in which the constituent devices work during normal cooling operation for cooling a cooling target, namely, air.

Referring to FIG. 19, the first cycle 510 works as follows. The first compressor 511 sucks in the first refrigerant, compresses the first refrigerant to transform it into high-temperature, high-pressure gas refrigerant, and then discharges the gas refrigerant. After being discharged, the first refrigerant flows into the first condenser 512. In the first condenser 512, the outside air supplied by the first condenser fan 512a exchanges heat with the first refrigerant in the form of gas refrigerant, and the first refrigerant is in turn condensed into a liquid. After being condensed into a liquid, the first refrigerant flows through the first expansion valve 513. The first refrigerant condensed into a liquid is decompressed by the first expansion valve 513. After being decompressed, the first refrigerant flows into the first evaporator 514 included in the cascade condenser 531. In the first evaporator 514, the first refrigerant evaporates and gasifies by exchanging heat with the second refrigerant flowing through the second downstream-side condenser 523. After the evaporation and gasification, the first refrigerant is sucked into the first compressor 511.

Referring to FIG. 1, the second cycle 520 works as follows. The second compressor 521 sucks in the second refrigerant, compresses the second refrigerant to transform it into high-temperature, high-pressure gas refrigerant, and then discharges the gas refrigerant. After being discharged, the second refrigerant flows into the second upstream-side condenser 522. In the second upstream-side condenser 522, the outside air supplied by the second condenser fan 522a exchanges heat with the second refrigerant, which is in turn condensed and flows into the second downstream-side condenser 523 included in the cascade condenser 531. In the second downstream-side condenser 523, the first refrigerant is supercooled by exchanging heat with the first refrigerant flowing through the first evaporator 514. The supercooled second refrigerant flows through the second upstream-side expansion valve 524. The supercooled second refrigerant is decompressed by the second upstream-side expansion valve 524 to an intermediate pressure. The second refrigerant decompressed to the intermediate pressure flows through the liquid receiver 525 and is then decompressed to a low pressure while flowing through the second downstream-side expansion valve 526. The second refrigerant decompressed to the low pressure flows into the second evaporator 527. The second evaporator 527 operates a second evaporator fan 527a so that air in a refrigerated warehouse exchanges heat with the second refrigerant, which in turn evaporates and gasifies. After the evaporation and gasification, the second refrigerant is sucked into the second compressor 521.

The refrigerant mixture that is any one of the refrigerants A to E mentioned above is used as the first refrigerant sealed in the first cycle 510 of the two-stage refrigeration apparatus 500 according to the present embodiment, where the efficiency of heat exchange in the cascade condenser 531 is enhanced accordingly. Using, as the first refrigerant, the refrigerant mixture that is any one of the refrigerant A to E can help achieve a global warming potential (GWP) lower than the GWP achievable through the use of R32.

(7-1) First Modification of Second Embodiment

In the embodiment above, the refrigerant mixture that is any one of the refrigerants A to E mentioned above is used as the first refrigerant sealed in the first cycle 510, and carbon dioxide is used as the second refrigerant sealed in the second cycle 520. As with the first refrigerant, the second refrigerant may be the refrigerant mixture that is any one of the refrigerants A to E mentioned above. In the example concerned, the first cycle 510 and the second cycle 520 are coupled to each other via the cascade condenser 531 to constitute the two-stage refrigeration apparatus 500. The amount of refrigerant charged into the cycle (the second cycle 520) extending through the cooling unit 502 may be smaller in the apparatus having this configuration than in a one-stage apparatus. This feature enables a reduction in costs associated with safeguards against possible refrigerant leakage in the cooling unit 502.

(7-2) Second Modification of Second Embodiment

In the embodiment above, the refrigerant mixture that is any one of the refrigerants A to E mentioned above is used as the first refrigerant sealed in the first cycle 510, and carbon dioxide is used as the second refrigerant sealed in the second cycle 520. Alternatively, R32 may be used as the first refrigerant, and the refrigerant mixture that is any one of the refrigerants A to E mentioned above may be used as the second refrigerant. Such a refrigerant mixture typically involves a pressure-resistance design value that is lower than the pressure-resistance design value necessitated in the case of using carbon dioxide ($CO_2$), and the level of pressure resistance required of pipes and components constituting the second cycle 520 may be lowered accordingly.

(8) Third Embodiment (8-1) Overall Configuration

Figure 20:
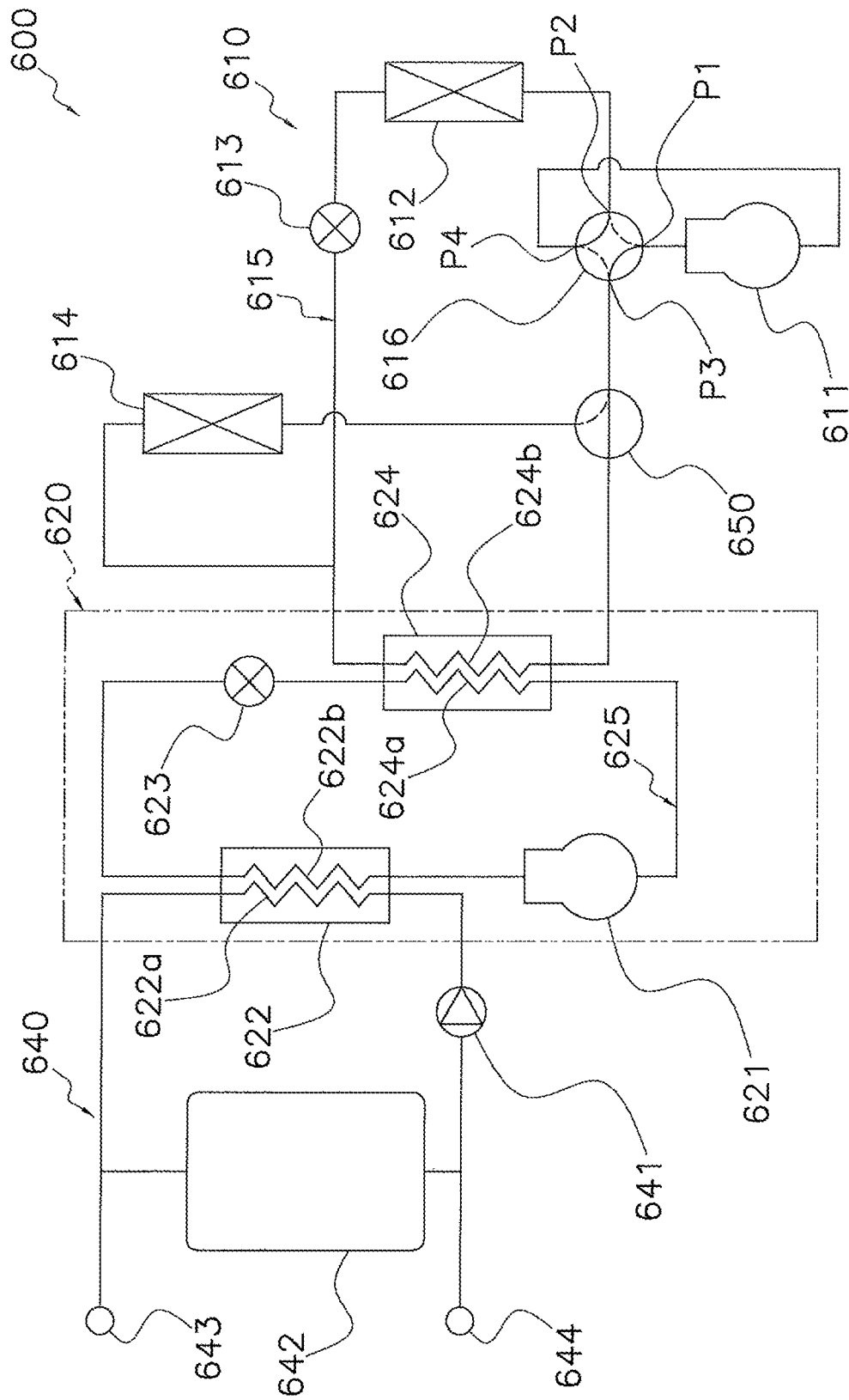
FIG. 20 is a circuit configuration diagram of an air-conditioning hot water supply system that is a refrigeration apparatus according to the second embodiment.

FIG. 20 illustrates an air-conditioning hot water supply system 600, which is a refrigeration apparatus according to a third embodiment. FIG. 20 is a circuit configuration diagram of the air-conditioning hot water supply system 600. The air-conditioning hot water supply system 600 includes an air conditioning apparatus 610 and a hot water supply apparatus 620. The hot water supply apparatus 620 is connected with a hot-water-supply hot water circuit 640.

(8-2) Details on Configuration (8-2-1) Air Conditioning Apparatus

The air conditioning apparatus 610 includes an air-conditioning refrigerant circuit 615, with a compressor 611, an outdoor heat exchanger 612, an expansion valve 613, and an indoor heat exchanger 614 being arranged in such a manner as to be connected to the air-conditioning refrigerant circuit 615. Specifically, the discharge side of the compressor 611 is connected with a first port P1 of a four-way switching valve 616. A gas-side end of the outdoor heat exchanger 612 is connected with a second port P2 of the four-way switching valve 616. A liquid-side end of the outdoor heat exchanger 612 is connected to a liquid-side end of the indoor heat exchanger 614 via the expansion valve 613. A gas-side end of the indoor heat exchanger 614 is connected to a third port P3 of the four-way switching valve 616. A fourth port P4 of the four-way switching valve 616 is connected to the suction side of the compressor 611.

The four-way switching valve 616 allows switching between a first communication state and a second communication state. In the first communication state (denoted by broken lines in the drawing), the first port P1 communicates with the second port P2, and the third port P3 communicates with the fourth port P4. In the second communication state (denoted by solid lines), the first port P1 communicates with the third port P3, and the second port P2 communicates with the fourth port P4. The direction in which refrigerant circulates may be reversed in accordance with the switching operation of the four-way switching valve 616.

In the third embodiment, the air-conditioning refrigerant circuit 615 is charged with refrigerant for the vapor compression refrigeration cycle. The refrigerant is a refrigerant mixture containing 1,2-difluoroethylene and may be any one of the refrigerants A to E mentioned above.

(8-2-2) Hot Water Supply Apparatus

The hot water supply apparatus 620 includes a hot-water-supply refrigerant circuit 625. The hot-water-supply refrigerant circuit 625 includes a compressor 621, a first heat exchanger 622, an expansion valve 623, and a second heat exchanger 624, which are serially connected to each other. The hot-water-supply refrigerant circuit 625 is charged with refrigerant, which is a carbon dioxide refrigerant. The devices constituting the hot-water-supply refrigerant circuit 625 and accommodated in a casing are incorporated into the hot water supply apparatus 620 to constitute a water supply unit.

The first heat exchanger 622 is a water-refrigerant heat exchanger, which is a combination of a heat absorbing unit 622a and a heat radiating unit 622b. The heat radiating unit 622b of the first heat exchanger 622 is connected to the hot-water-supply refrigerant circuit 625, and the heat absorbing unit 622a of the first heat exchanger 622 is connected to the hot-water-supply hot water circuit 640, in which water heating is performed to generate hot water. In the first heat exchanger 622, water heating is performed to generate hot water in the hot-water-supply hot water circuit 640 in such a manner that heat is exchanged between water in the hot-water-supply hot water circuit 640 and the carbon dioxide refrigerant in the hot-water-supply refrigerant circuit 625.

The hot-water-supply hot water circuit 640 is connected with a circulating pump 641, the heat absorbing unit 622a of the first heat exchanger 622, and a hot water storage tank 642. The hot-water-supply hot water circuit 640 provides water-hot water circulation, where water receives heat from the carbon dioxide refrigerant in the first heat exchanger 622 and the generated hot water is then stored in the hot water storage tank 642. For water supply and drainage to and from the hot water storage tank 642, the hot-water-supply hot water circuit 640 is connected with a water supply pipe 643 leading to the hot water storage tank 642 and a hot water outflow pipe 644 leading from the hot water storage tank 642.

The second heat exchanger 624 is a cascade heat exchanger and is a combination of a heat absorbing unit 624a and a heat radiating unit 624b. The heat absorbing unit 624a is connected to the hot-water-supply refrigerant circuit 625, and the heat radiating unit 624b is connected to the air-conditioning refrigerant circuit 615. With the second heat exchanger 624 being a cascade heat exchanger, the air-conditioning refrigerant circuit 615 is in charge of operation on the low-stage (low-temperature) side of the two-stage heat pump cycle, and the hot-water-supply refrigerant circuit 625 is in charge of operation on the high-stage (high-temperature) side of the two-stage heat pump cycle.

The second heat exchanger 624 and the indoor heat exchanger 614 in the air-conditioning refrigerant circuit 615, which is the low-stage side of the two-stage heat pump cycle, are connected in parallel. A three-way switching valve 650 allows switching between the state in which refrigerant in the air-conditioning refrigerant circuit 615 flows through the second heat exchanger 624 and the state in which the refrigerant flows through the indoor heat exchanger 614. In other words, the air-conditioning refrigerant circuit 615, which is the low-stage side of the two-stage heat pump cycle, is capable of switching between a first operation and a second operation. During the first operation, refrigerant circulates between the outdoor heat exchanger 612 and the indoor heat exchanger 614. During the second operation, refrigerant circulates between the outdoor heat exchanger 612 and the second heat exchanger 624.

(8-3) Operation and Working of Air-Conditioning Hot Water Supply System

The following describes the operation and working of the air-conditioning hot water supply system 600.

Air conditioning operation that is the first operation may be performed in such a way as to switch between cooling operation and heating operation. During the cooling operation, the four-way switching valve 616 is set into the first communication state on the broken lines, and the three-way switching valve 650 is set into a first communication state on a broken line. In this setup, refrigerant discharged by the compressor 611 flows through the four-way switching valve 616, enters the outdoor heat exchanger 612 and is condensed in the outdoor heat exchanger 612 by transferring heat to outside air. The refrigerant is expanded in the expansion valve 613 and then enters the indoor heat exchanger 614, where the refrigerant evaporates by absorbing heat from room air. Consequently, the room air is cooled. The refrigerant then flows through the four-way switching valve 616 and is sucked into the compressor 611. The room is cooled by repeated cycles of a compression stroke, a condensation stroke, an expansion stroke, and an evaporation stroke while the refrigerant circulates as described above.

During the heating operation, the four-way switching valve 616 is set into the second communication state on the solid lines, and the three-way switching valve 650 is set into the first communication state on the broken line. In this setup, refrigerant discharged by the compressor 611 flows through the four-way switching valve 616 and the three-way switching valve 650, enters the indoor heat exchanger 614, and is condensed in the indoor heat exchanger 614 by transferring heat to room air. Consequently, the room air is heated. The refrigerant is expanded in the expansion valve 613 and then enters the outdoor heat exchanger 612, where the refrigerant evaporates by absorbing heat from outside air. The refrigerant then flows through the four-way switching valve 616 and is sucked into the compressor 611. The room is heated while the refrigerant circulates as described above.

Meanwhile, hot water storage operation that is the second operation is performed in the middle of the night when air conditioning is not needed. During this operation, the four-way switching valve 616 in the air-conditioning refrigerant circuit 615 is set into the second communication state on the solid lines as in the heating operation, and the three-way switching valve 650 in the air-conditioning refrigerant circuit 615 is set into a second communication state on a solid line as opposed to the state into which the three-way switching valve 650 is set during air conditioning operation. The compressor 621 in the hot-water-supply refrigerant circuit 625 and the circulating pump 641 in the hot-water-supply hot water circuit 640 are also operated.

In this setup, the air-conditioning refrigerant circuit 615 works as follows: refrigerant discharged by the compressor 611 flows through the four-way switching valve 616 and the three-way switching valve 650 and then enters the heat radiating unit 624b of the second heat exchanger 624. In the heat radiating unit 624b, refrigerant flowing through the air-conditioning refrigerant circuit 615 is condensed by transferring heat to the carbon dioxide refrigerant in the hot-water-supply refrigerant circuit 625. Consequently, the carbon dioxide refrigerant is heated. The refrigerant in the air-conditioning refrigerant circuit 615 is then expanded in the expansion valve 613, evaporates in the outdoor heat exchanger 612, flows through the four-way switching valve 616, and is sucked into the compressor 611. The refrigerant in the air-conditioning refrigerant circuit 615 circulates as described above to undergo repeated cycles of a compression stroke, a condensation stroke, an expansion stroke, and an evaporation stroke.

The carbon dioxide refrigerant in the hot-water-supply refrigerant circuit 625 undergoes a compression stroke in the compressor 621, a heat radiation stroke in the heat radiating unit 622b of the first heat exchanger 622, an expansion stroke in the expansion valve 623, and a heat absorption stroke in the heat absorbing unit 624a of the second heat exchanger 624 in the stated order. In the second heat exchanger 624, the carbon dioxide refrigerant absorbs heat from the refrigerant flowing through the air-conditioning refrigerant circuit 615. In the first heat exchanger 622, the carbon dioxide refrigerant transforms the warmth to water in the hot-water-supply hot water circuit 640.

In the hot-water-supply hot water circuit 640, the circulating pump 641 supplies water in the hot water storage tank 642 to the heat absorbing unit 622a of the first heat exchanger 622, where the water is heated (hot water is generated). The hot water generated by the application of heat is sent back to the hot water storage tank 642 and continues to circulate through the hot-water-supply hot water circuit 640 until a predetermined thermal storage temperature is reached. As mentioned above, the hot water storage operation is performed in the middle of the night. Meanwhile, hot water supply operation for letting out hot water from the hot water storage tank 642 is performed during daytime or nighttime hours. During the hot water supply operation, the hot-water-supply refrigerant circuit 625 is nonoperational, and the indoor heat exchanger 614 in the air-conditioning refrigerant circuit 615 may be used to perform the cooling operation or the heating operation.

(8-4) Features of Air-Conditioning Hot Water Supply System

The air-conditioning hot water supply system 600 according to the third embodiment includes the hot water supply apparatus 620, which is a unit-type apparatus. This apparatus includes a cascade heat exchanger as the second heat exchanger 624 on the heat source side of the hot-water-supply refrigerant circuit 625, in which carbon dioxide is used as refrigerant. The second heat exchanger 624 is connected to the air-conditioning refrigerant circuit 615, which is a low-stage-side refrigerant circuit. This configuration enables two-stage heat pump cycle operation. The refrigerant used in the air-conditioning refrigerant circuit 615 is a refrigerant mixture containing 1,2-difluoroethylene and is any one of the refrigerants A to E mentioned above. These features enhance the efficiency of heat exchange in the second heat exchanger 624.

(8-5) Modification of Third Embodiment

In the embodiment above, the refrigerant mixture that is any one of the refrigerants A to E mentioned above is used as the first refrigerant sealed in the air-conditioning refrigerant circuit 615, which is the first cycle, and carbon dioxide is used as the second refrigerant sealed in the hot-water-supply refrigerant circuit 625, which is the second cycle. It is preferred that a refrigerant whose saturation pressure at a predetermined temperature is lower than the saturation pressure of the first refrigerant at the predetermined temperature be used as the second refrigerant sealed in the hot-water-supply refrigerant 625. For example, it is preferred that R134a be sealed in the hot-water-supply refrigerant circuit 625.

While the embodiments of the present disclosure have been described herein above, it is to be appreciated that various changes in form and detail may be made without departing from the spirit and scope of the present disclosure presently or hereafter claimed.

REFERENCE SIGNS LIST

11 compressor (first compressor)
14 heat-source-side heat exchanger (first radiator)
31 expansion valve (first expansion mechanism)
33 heat exchanger
60 use-side unit (second heat absorber)
100 heat load treatment system (refrigeration apparatus)
500 two-stage refrigeration apparatus (refrigeration apparatus)
510 first cycle
511 first compressor
512 first condenser (first radiator)
513 first expansion valve (first expansion mechanism)
514 first evaporator (first heat absorber)
520 second cycle
521 second compressor
523 second downstream-side condenser (second radiator)
524 second upstream-side expansion valve (second expansion mechanism)
526 second downstream-side expansion valve (second expansion mechanism)
527 second evaporator (second heat absorber)
531 cascade condenser (heat exchanger)
HC heat medium circuit (second cycle)
HP heat medium path in heat exchanger (second radiator)
RC refrigerant circuit (first cycle)
RP refrigerant path in heat exchanger (first heat absorber)
600 air-conditioning hot water supply system (refrigeration apparatus)
611 compressor (first compressor)
612 outdoor heat exchanger (first heat absorber)
613 expansion valve (first expansion mechanism)
615 air-conditioning refrigerant circuit (first cycle)
621 compressor (second compressor)
622b heat radiating unit (second radiator)
623 expansion valve (second expansion mechanism)
624 second heat exchanger (heat exchanger)
624a heat absorbing unit (second heat absorber)
624b heat radiating unit (first radiator)
625 hot-water-supply refrigerant circuit (second cycle)

CITATION LIST

Patent Literature

PTL 1: International Publication No. 2014/045400

The invention claimed is:

1. A refrigeration apparatus comprising:
a first cycle including a first compressor, a first radiator, a first expansion mechanism, and a first heat absorber that are arranged in such a manner as to be connected to the first cycle, a first refrigerant circulating through the first cycle; and
a second cycle including a second compressor, a second radiator, a second expansion mechanism, and a second heat absorber that are arranged in such a manner as to be connected to the second cycle, a second refrigerant circulating through the second cycle, wherein
the first heat absorber and the second radiator constitute a heat exchanger in which heat is exchanged between the first refrigerant flowing through the first heat absorber and the second refrigerant flowing through the second radiator, and
at least one of the first refrigerant and the second refrigerant is a refrigerant mixture comprising trans-1,2-difluoroethylene (HFO-1132(E)), difluoromethane (R32), and 2,3,3,3-tetrafluoro-1-propene (R1234yf),
when the mass % of HFO-1132(E), R32, and R1234yf based on their sum in the refrigerant mixture is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:

point O (22.6, 36.8, 40.6),
point N (27.7, 18.2, 54.1), and
point U (3.9, 36.7, 59.4),
or on these line segments;
the line segment ON is represented by coordinates $(0.0072\ y^2-0.6701y+37.512,\ y,\ -0.0072\ y^2-0.3299y+62.488)$;
the line segment NU is represented by coordinates $(0.0083\ y^2-1.7403y+56.635,\ y,\ -0.0083y^2+0.7403y+43.365)$; and
the line segment UO is a straight line.

2. The refrigeration apparatus according to claim 1, wherein
the second cycle further includes a second compressor and a second expansion mechanism that are arranged in such a manner as to be connected to the second cycle,
the first refrigerant flowing through the first radiator of the first cycle releases heat into outside air,
the first refrigerant is the refrigerant mixture, and
the second refrigerant is carbon dioxide.

3. The refrigeration apparatus according to claim 1, wherein
the second cycle further includes a second compressor and a second expansion mechanism that are arranged in such a manner as to be connected to the second cycle,
the first refrigerant flowing through the first radiator of the first cycle releases heat into outside air,
the first refrigerant is the refrigerant mixture, and
the second refrigerant is the refrigerant mixture.

4. The refrigeration apparatus according to claim 1, wherein
the second cycle further includes a second compressor and a second expansion mechanism that are arranged in such a manner as to be connected to the second cycle,
the first refrigerant flowing through the first radiator of the first cycle releases heat into outside air,
the first refrigerant is R32, and
the second refrigerant is the refrigerant mixture.

5. The refrigeration apparatus according to claim 1, wherein
the first refrigerant flowing through the first radiator of the first cycle (RC) releases heat into outside air,
the first refrigerant is the refrigerant mixture, and
the second refrigerant is a liquid medium.

* * * * *